(12) United States Patent
Watanabe et al.

(10) Patent No.: US 9,825,337 B2
(45) Date of Patent: *Nov. 21, 2017

(54) NON-AQUEOUS ELECTROLYTE BATTERY INCLUDING AN AMORPHOUS MATERIAL

(75) Inventors: Haruo Watanabe, Kanagawa (JP); Tomoyo Ooyama, Fukushima (JP); Shunsuke Saito, Fukushima (JP); Shinichi Katayama, Fukushima (JP); Hideki Nakai, Fukushima (JP); Yoshihiro Kudo, Tokyo (JP); Yoshikazu Kato, Fukushima (JP); Muneaki Ando, Fukushima (JP); Koji Morita, Fukushima (JP); Ichiro Yamada, Fukushima (JP); Nobuya Okano, Fukushima (JP); Noritoshi Araki, Fukushima (JP); Shuhei Sugita, Fukushima (JP); Kunihiko Hayashi, Fukushima (JP); Yosuke Hosoya, Fukushima (JP); Tadahiko Kubota, Kanagawa (JP); Shigeru Fujita, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/378,523

(22) PCT Filed: Jun. 17, 2010

(86) PCT No.: PCT/JP2010/060791
§ 371 (c)(1),
(2), (4) Date: Aug. 24, 2012

(87) PCT Pub. No.: WO2010/147236
PCT Pub. Date: Dec. 23, 2010

(65) Prior Publication Data
US 2012/0321911 A1    Dec. 20, 2012

(30) Foreign Application Priority Data

Jun. 17, 2009 (JP) .................................. 2009-144360
Jun. 17, 2009 (JP) .................................. 2009-144361
(Continued)

(51) Int. Cl.
*H01M 4/131* (2010.01)
*H01M 6/14* (2006.01)
(Continued)

(52) U.S. Cl.
CPC ........ *H01M 10/4235* (2013.01); *C01G 51/42* (2013.01); *C01G 53/006* (2013.01);
(Continued)

(58) Field of Classification Search
CPC ......... H01M 10/0567; H01M 10/0568; H01M 10/0569
(Continued)

(56) References Cited

U.S. PATENT DOCUMENTS 4,630,176 A    12/1986  Cuellar et al.
4,633,372 A *  12/1986  Calahan et al. .............. 361/502
(Continued)

FOREIGN PATENT DOCUMENTS

CN    1133649      10/1996
JP    1984-060818   4/1984
(Continued)

OTHER PUBLICATIONS

Chen et al., "Syntheses and Application of All-lithium Salts of Heteropolyacid as Electrolyte of Lithium-ion Battery" Chem. Res. Chinese U., 2004 20(1), 77-80.*
(Continued)

*Primary Examiner* — Rena D Cronin
(74) *Attorney, Agent, or Firm* — K&L Gates LLP

(57) ABSTRACT

A battery is composed of a positive electrode in which a positive electrode active material layer including a positive
(Continued)

electrode active material is formed on a positive electrode collector, a negative electrode in which a negative electrode active material layer including a negative electrode active material is formed on a negative electrode collector, a separator provided between the positive electrode and the negative electrode, and an electrolyte impregnated in the separator. The battery further includes at least one of a heteropoly acid and a heteropoly acid compound as an additive at least in one of the positive electrode, the negative electrode, the separator, and the electrolyte.

12 Claims, 13 Drawing Sheets

(30) Foreign Application Priority Data

| Jun. 17, 2009 | (JP) | ................................ | 2009-144362 |
| Sep. 30, 2009 | (JP) | ................................ | 2009-228630 |
| Mar. 2, 2010 | (JP) | ................................ | 2010-044808 |

(51) Int. Cl.

| *H01M 10/42* | (2006.01) |
| *C01G 51/00* | (2006.01) |
| *C01G 53/00* | (2006.01) |
| *H01M 2/16* | (2006.01) |
| *H01M 4/485* | (2010.01) |
| *H01M 4/505* | (2010.01) |
| *H01M 4/525* | (2010.01) |
| *H01M 4/58* | (2010.01) |
| *H01M 4/62* | (2006.01) |
| *H01M 10/0525* | (2010.01) |
| *H01M 10/0567* | (2010.01) |
| *H01M 10/0587* | (2010.01) |

(52) U.S. Cl.
CPC .............. *C01G 53/42* (2013.01); *H01M 2/16* (2013.01); *H01M 4/131* (2013.01); *H01M 4/485* (2013.01); *H01M 4/505* (2013.01); *H01M 4/525* (2013.01); *H01M 4/5825* (2013.01); *H01M 4/621* (2013.01); *H01M 4/623* (2013.01); *H01M 10/0525* (2013.01); *H01M 10/0567* (2013.01); *H01M 10/0587* (2013.01); *C01P 2002/52* (2013.01); *C01P 2002/82* (2013.01); *C01P 2002/89* (2013.01); *C01P 2004/03* (2013.01); *C01P 2004/61* (2013.01); *C01P 2006/40* (2013.01)

(58) Field of Classification Search
USPC .............................................. 429/188, 218.1
See application file for complete search history.

(56) References Cited

U.S. PATENT DOCUMENTS

| 5,382,481 | A | | 1/1995 | Fleischer |
| 5,501,922 | A | | 3/1996 | Li et al. |
| 5,512,391 | A | | 4/1996 | Fleischer |
| 5,580,681 | A | | 12/1996 | Fleischer |
| 5,731,105 | A | | 3/1998 | Fleischer |
| 6,063,142 | A | * | 5/2000 | Kawakami et al. ......... 29/623.5 |
| 6,225,009 | B1 | | 5/2001 | Fleischer et al. |
| 2007/0099051 | A1 | | 5/2007 | Hocevar et al. |
| 2008/0083626 | A1 | | 4/2008 | Kubo et al. |
| 2008/0096103 | A1 | | 4/2008 | Naarmann |
| 2009/0111020 | A1 | * | 4/2009 | Yamaguchi et al. .......... 429/207 |

FOREIGN PATENT DOCUMENTS

| JP | SHO 59-60818 | 4/1984 |
| JP | 09-508487 | 8/1997 |
| JP | 2002-507310 | 3/2002 |
| JP | 2002-289188 | 10/2002 |
| JP | 2004-214116 | 7/2004 |
| JP | 2007-511873 | 5/2007 |
| JP | 2007-194104 | 8/2007 |
| JP | 2009-107990 | 5/2009 |

OTHER PUBLICATIONS

International Search Report dated Sep. 14, 2010, for corresponding Intl. Appln. No. PCT/JP2010/060791.
European Patent Office, Extended European Search Report issued in connection with European Patent Application Serial No. 10789606.0, dated May 16, 2013. (8 pages).
Chinese Office Action dated Oct. 10, 2013 for corresponding Chinese Appln. No. 201080027341.8 (17 pages).
The State Intellectual Property Office of the People's Republic of China, Notification of the Second Office Action issued in connection with P.R.C. Patent Application No. 2010800273418, dated Jun. 25, 2014. (29 pages).
Japanese Patent Office, Office action issued in connection with Japanese Patent Application No. 2011-519942, dated May 27, 2014. (5 pages).

* cited by examiner

[FIG.1]
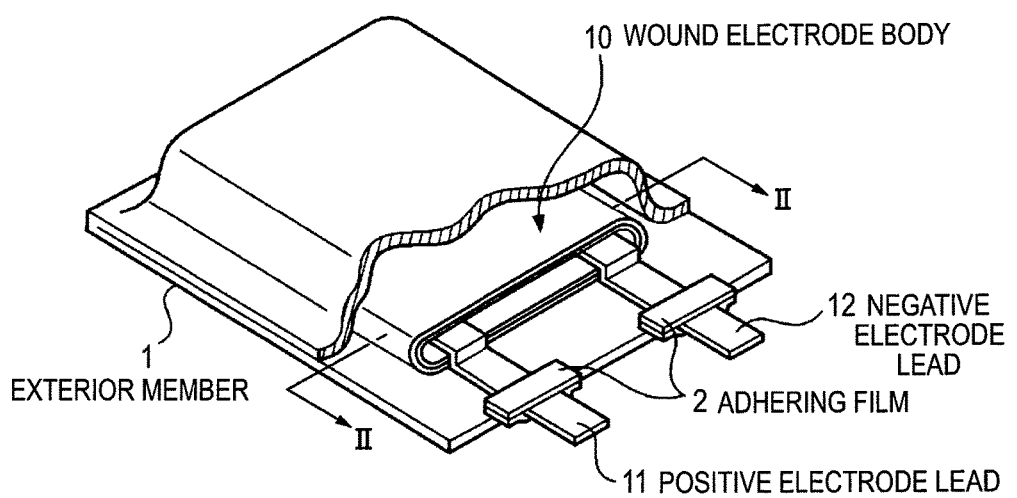

[FIG.2]
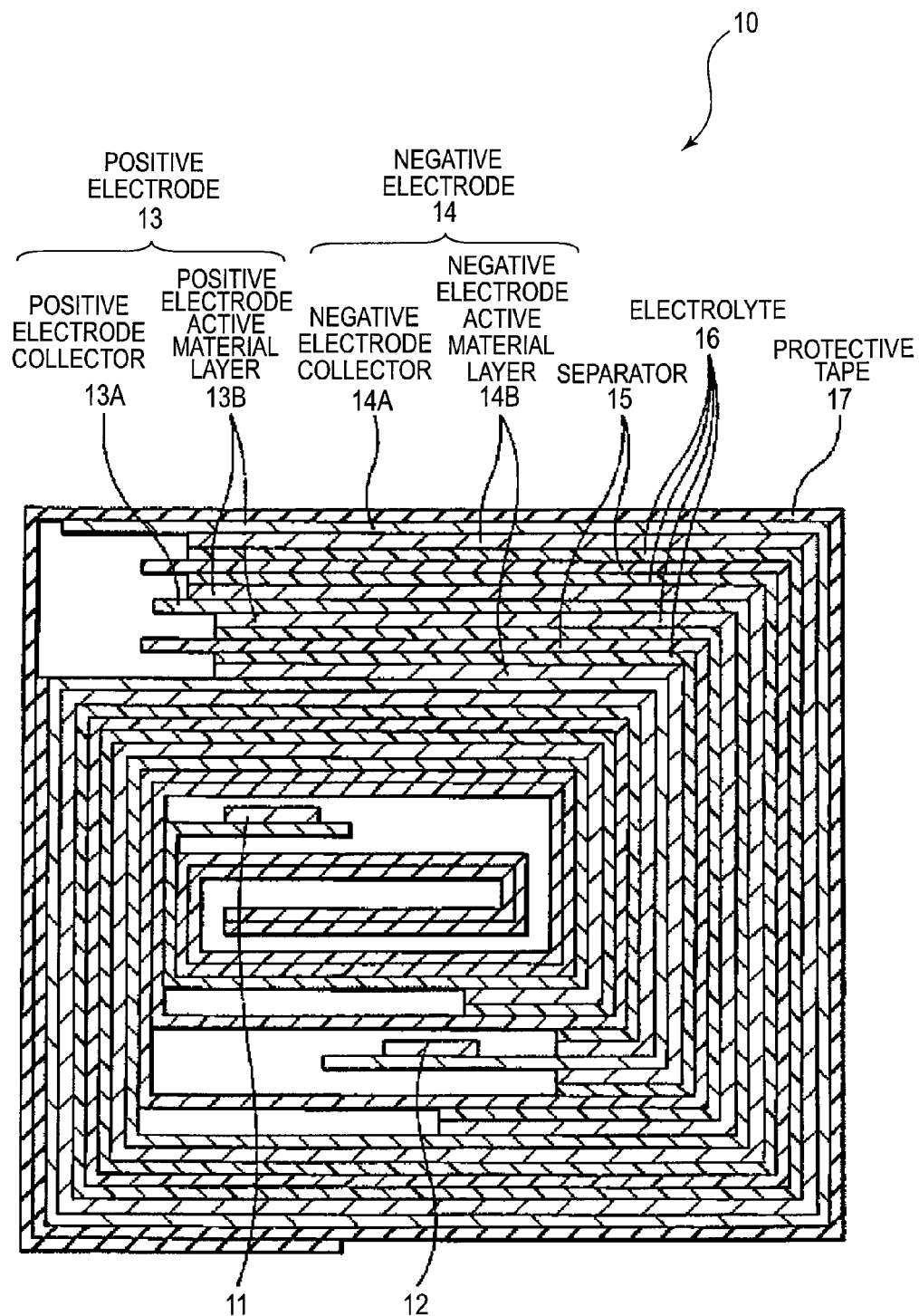

[FIG.3]
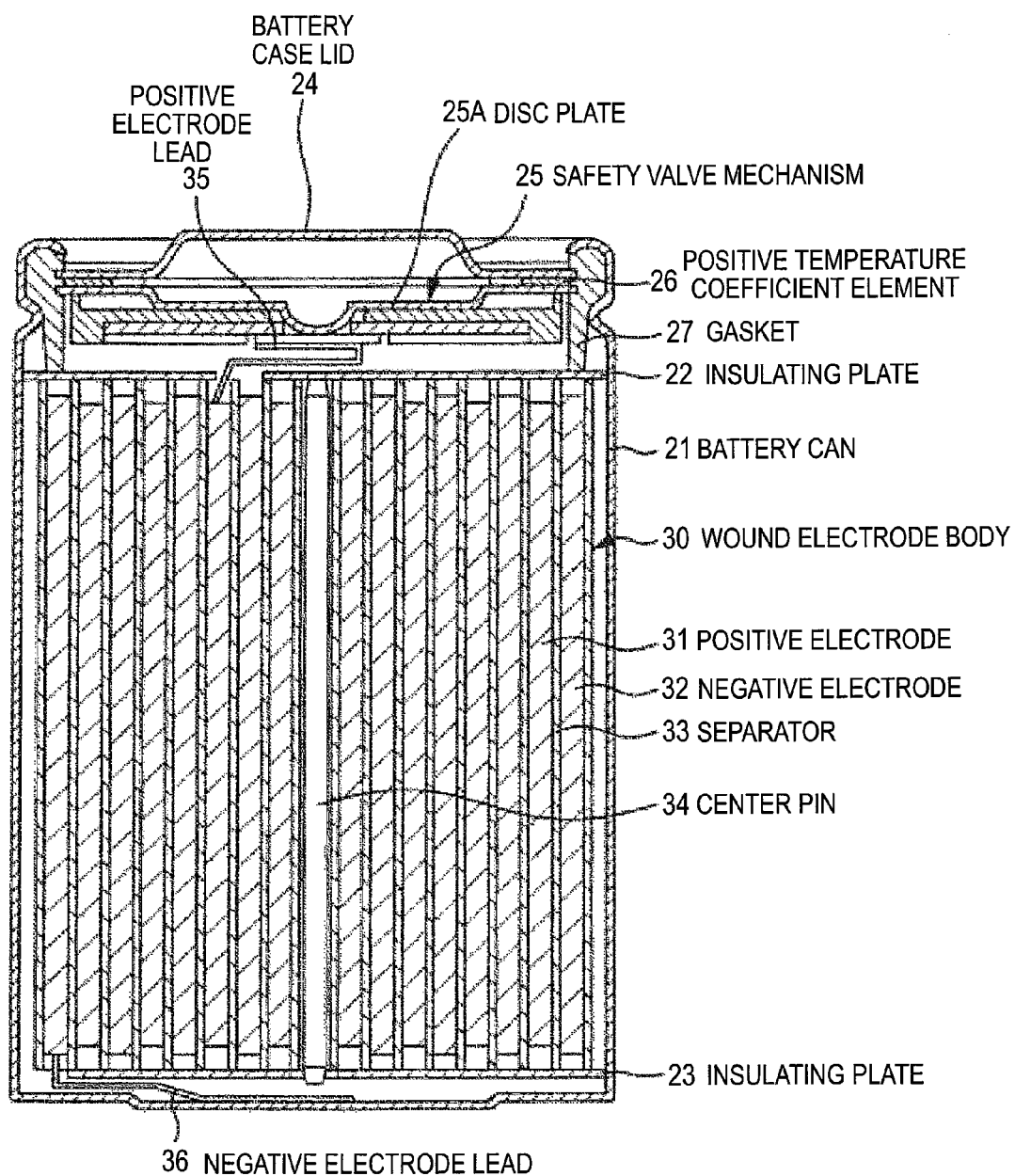

[FIG.4]
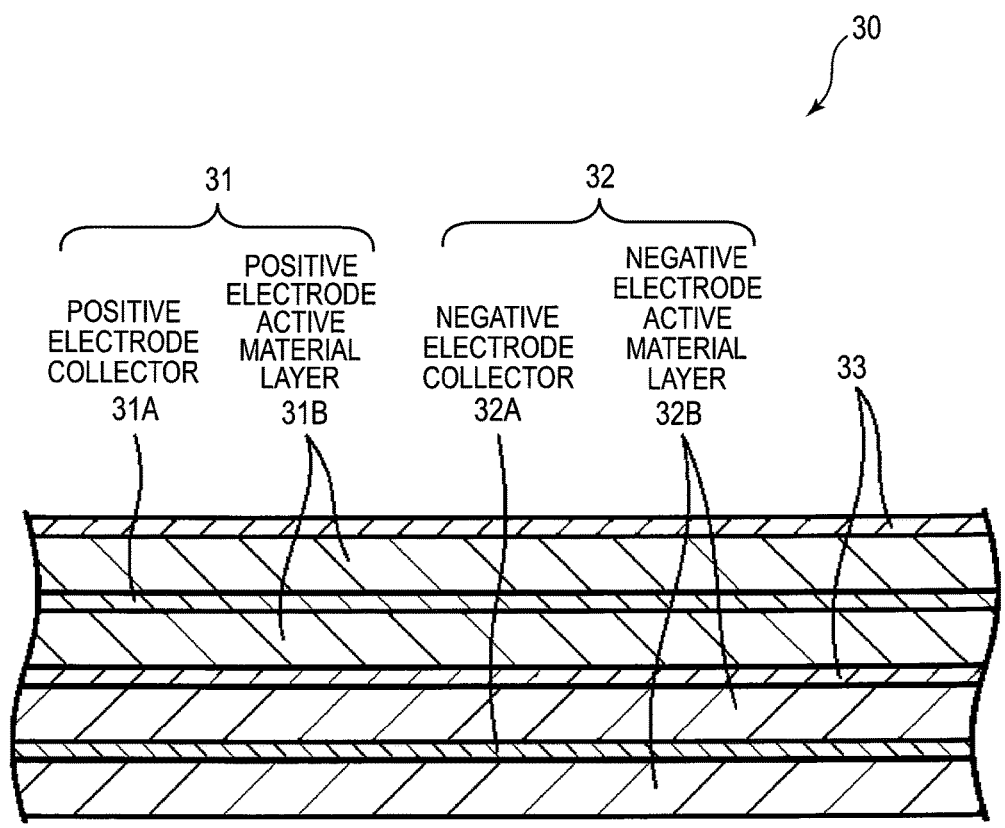

[FIG.5]
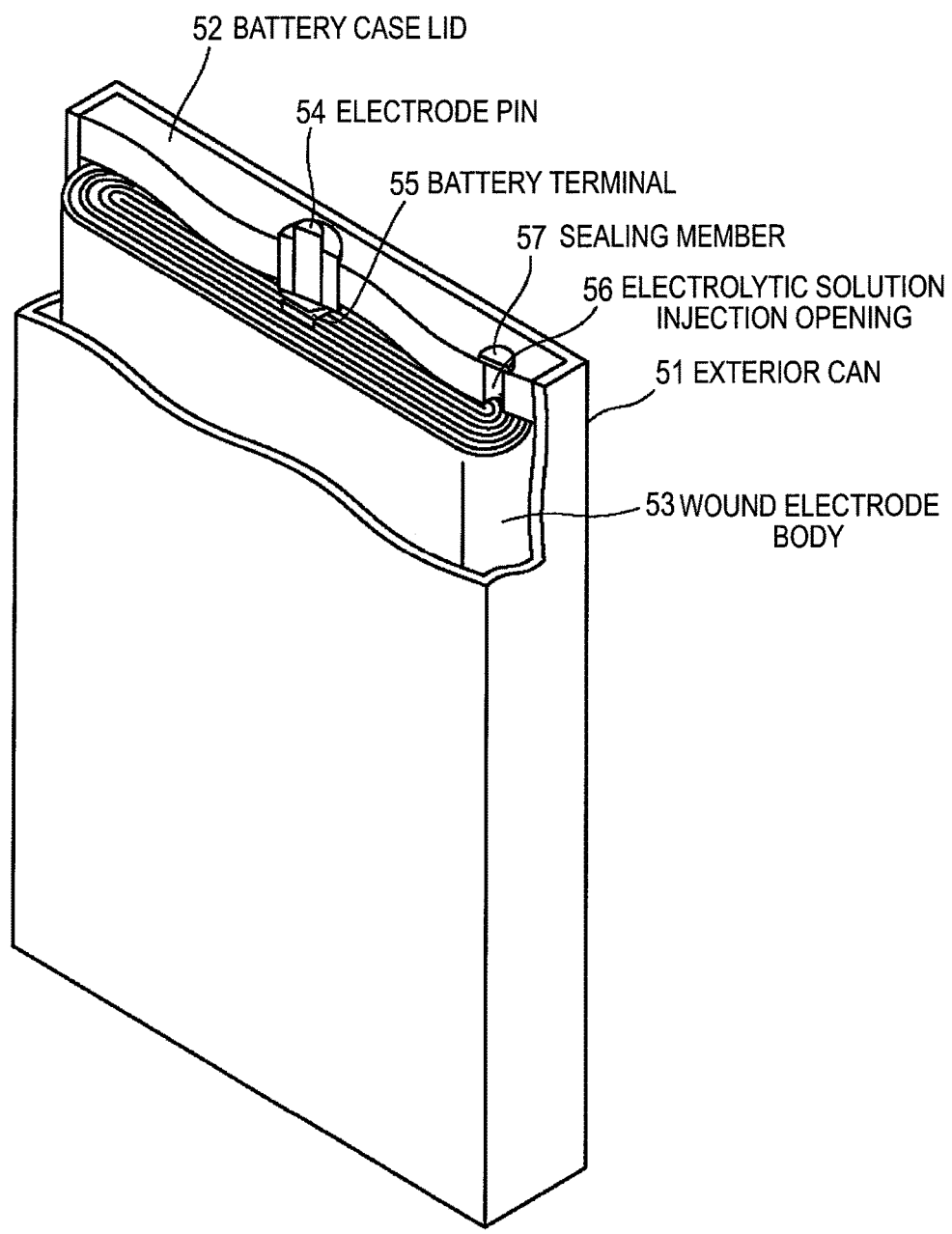

[FIG.6]
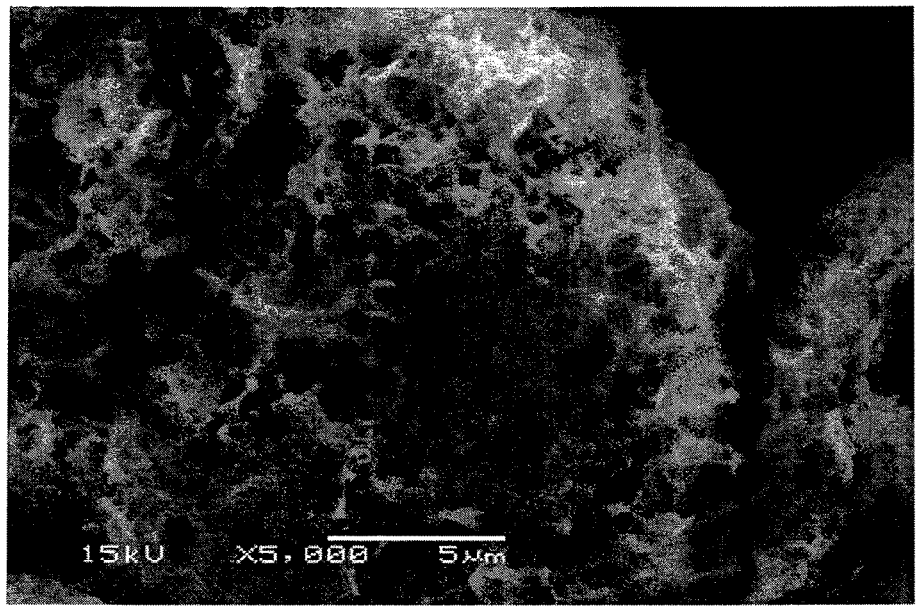

[FIG.7]
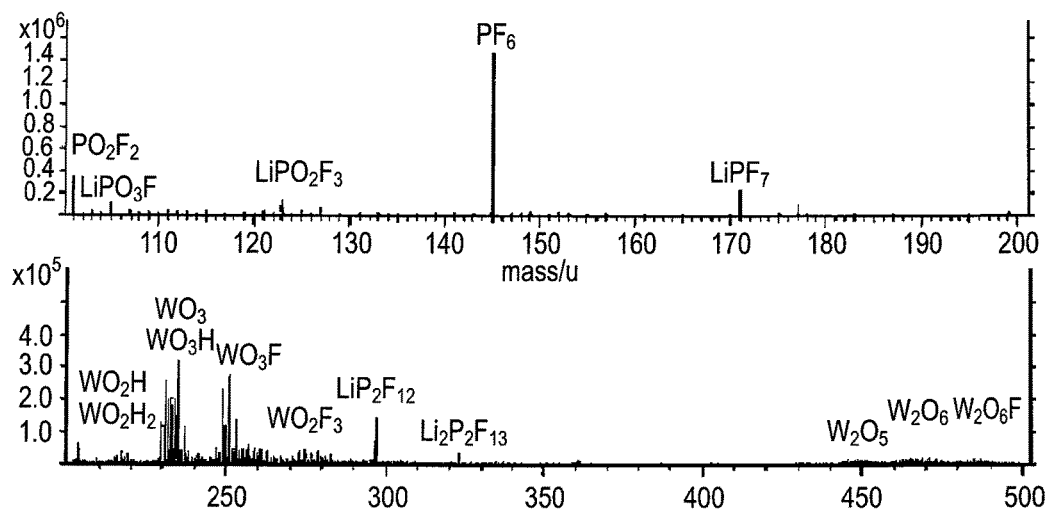

[FIG.8]
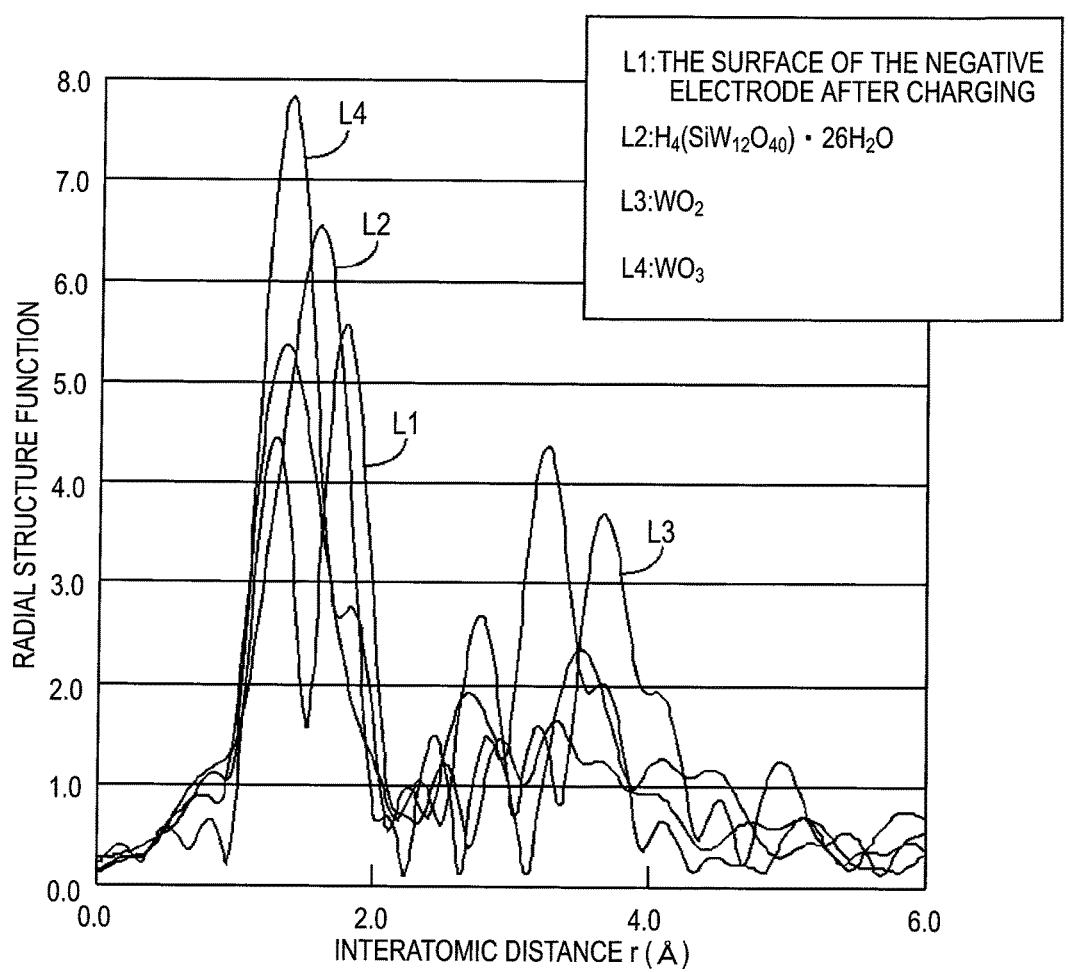

[FIG.9]
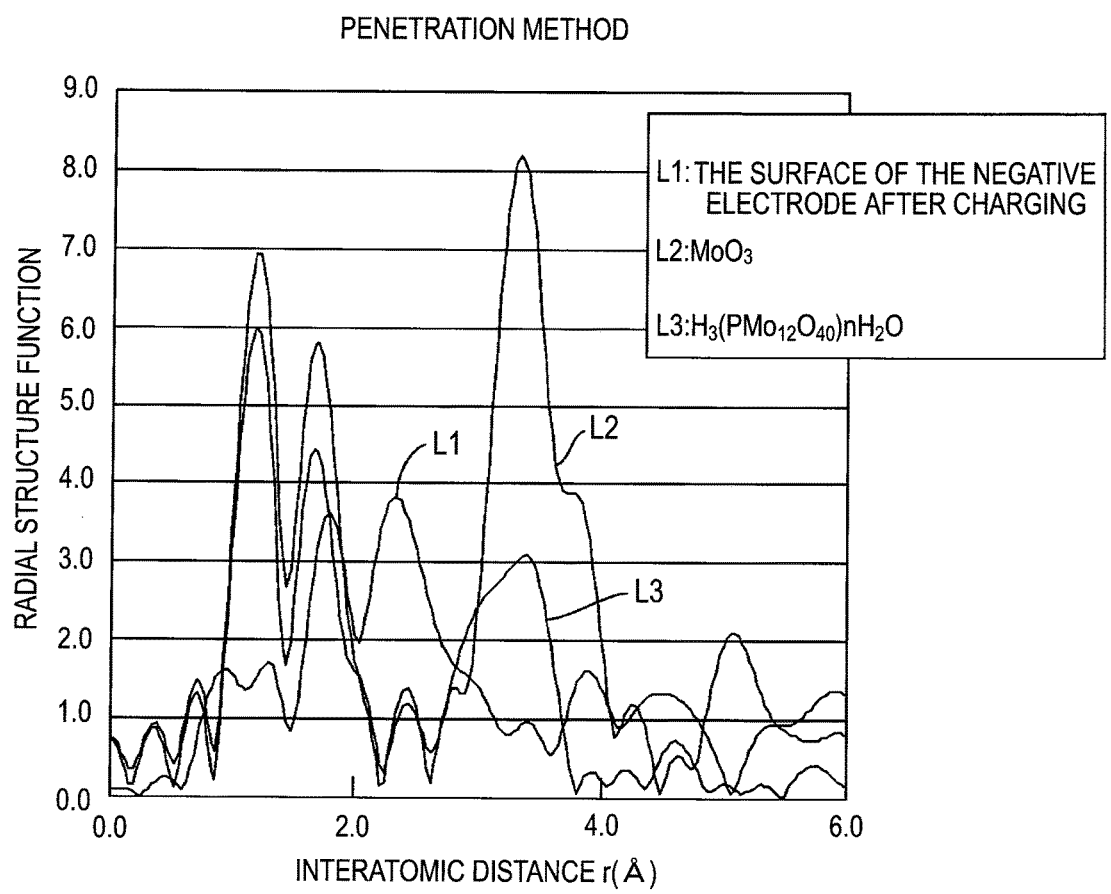

[FIG.10]
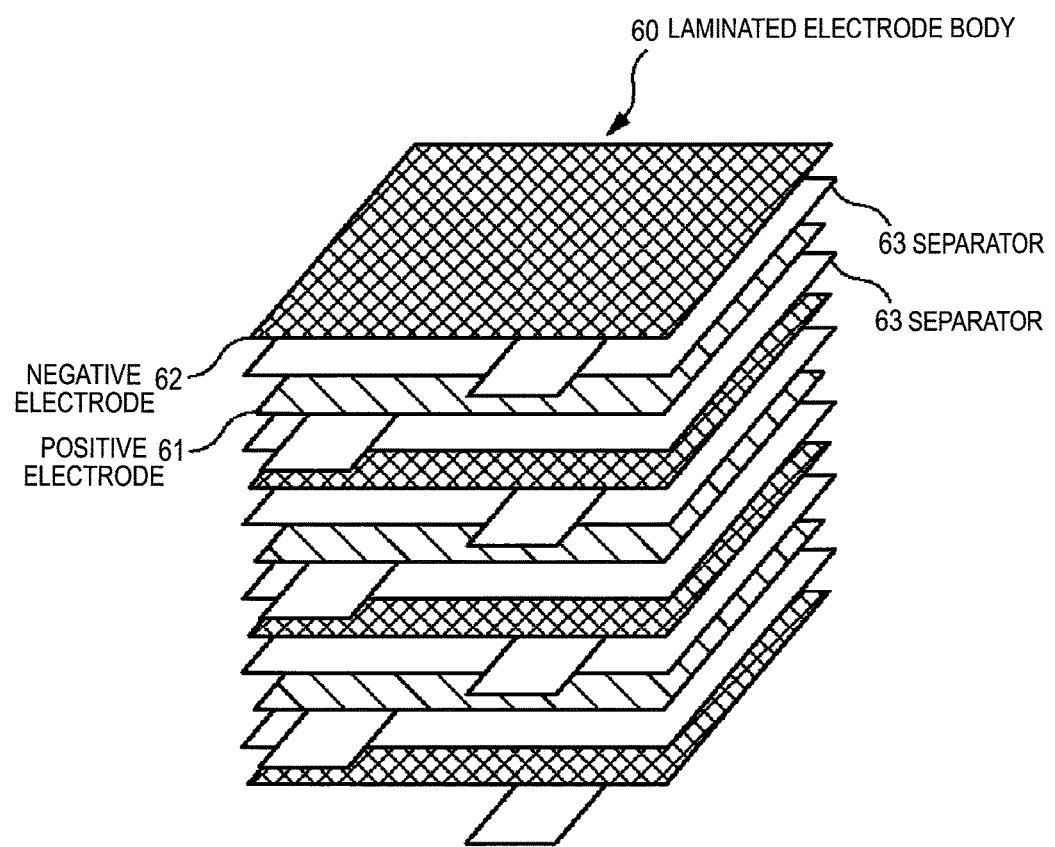

[FIG.11]
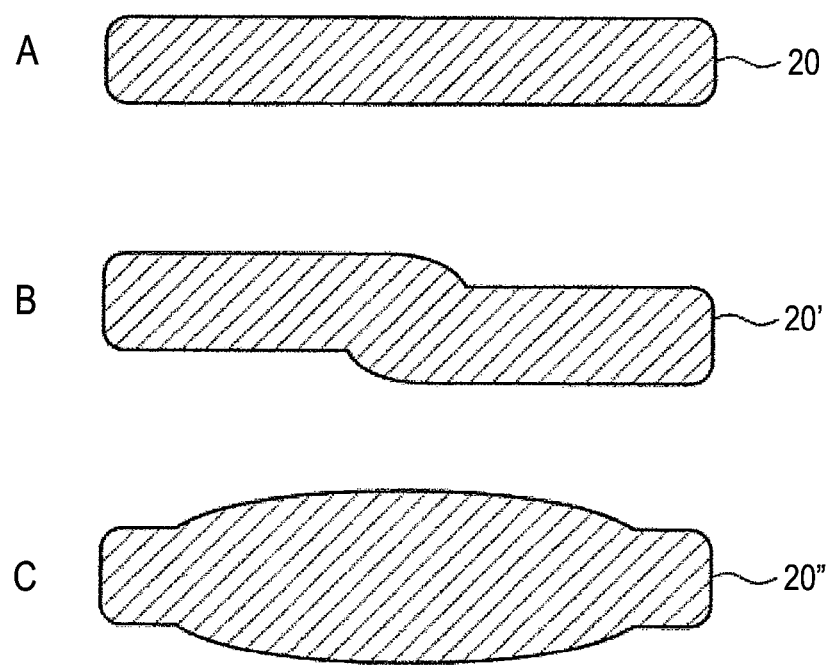

[FIG.12]
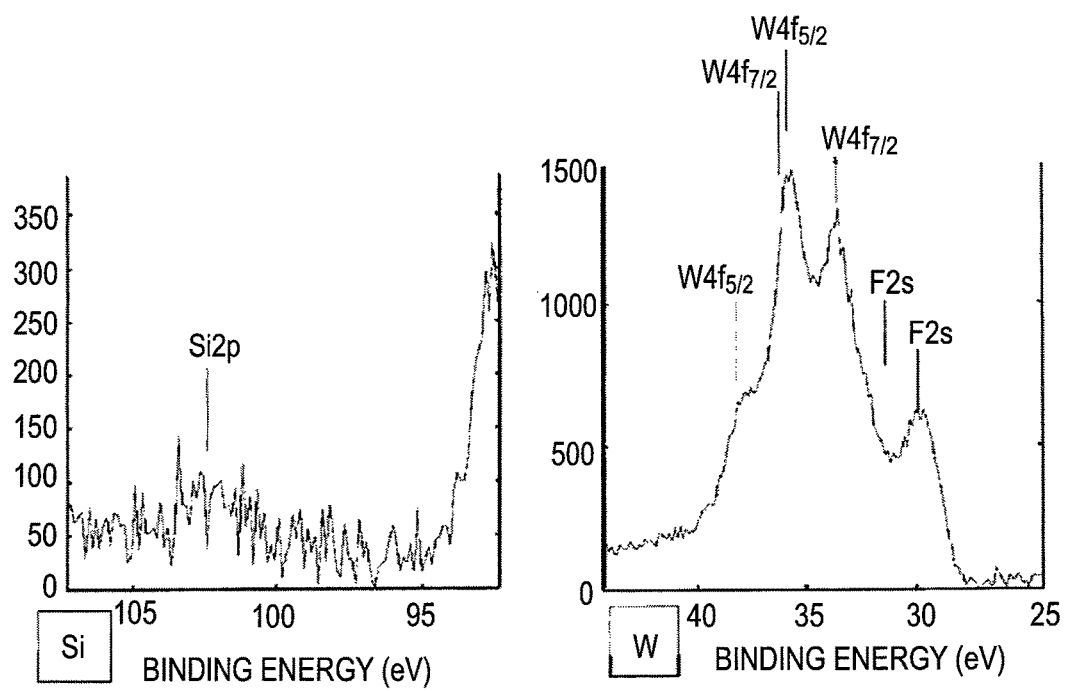

[FIG.13]
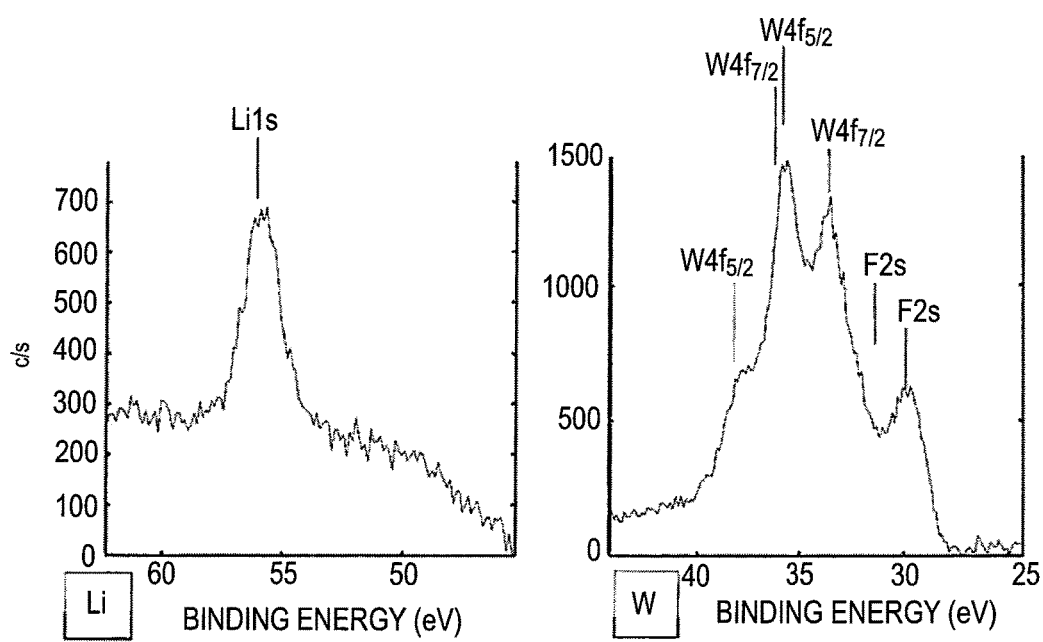

NON-AQUEOUS ELECTROLYTE BATTERY INCLUDING AN AMORPHOUS MATERIAL

CROSS REFERENCE TO RELATED APPLICATIONS

The present application is a National Stage of International Application No. PCT/JP2010/060791 filed on Jun. 17, 2009, which claims priority to Japanese Patent Application No. 2010-044808, filed in the Japanese Patent Office on Mar. 2, 2010; Japanese Patent Application No. 2009-228630, filed in the Japanese Patent Office on Sep. 30, 2009; Japanese Patent Application No. 2009-144362, filed in the Japanese Patent Office on Jun. 17, 2009; Japanese Patent Application No. 2009-144361, filed in the Japanese Patent Office on Jun. 17, 2009; and Japanese Patent Application No. 2009-144360, filed in the Japanese Patent Office on Jun. 17, 2009, respectively, the entire contents of which are being incorporated herein by reference

BACKGROUND

The present invention relates to a non-aqueous electrolyte battery that can suppress gas generation and accompanying battery swelling, a non-aqueous electrolyte battery positive electrode, a non-aqueous electrolyte battery negative electrode, a non-aqueous electrolyte battery separator, an electrolyte for a non-aqueous electrolyte, and a method of manufacturing a non-aqueous electrolyte battery separator.

In recent years, there has been an increasing demand for small size and high capacity secondary batteries in accordance with the distribution of portable devices, such as video cameras or notebook-type personal computers. Secondary batteries in current use include a nickel-cadmium battery in which an alkali electrolytic solution is used and a nickel-hydrogen battery, but the battery voltage is low, about 1.2 V, and improvement of the energy density is difficult. Therefore, studies were made on a lithium metal secondary battery in which the lithium metal having the lightest specific weight among solid single-component substances, 0.534, an extremely low potential, and the largest current capacity per unit weight among metallic negative electrode materials was used.

However, in the secondary batteries in which lithium metal is used for the negative electrode, treelike lithium (dendrite) is precipitated on the surface of the negative electrode during charging, and grows according to the charging and discharging cycles. The growth of the dendrites not only degrades the charging and discharging cycle characteristics of the secondary battery, but also, in the worst case, cuts through the separating membrane (separator) which is disposed to prevent the contact between the positive electrode and the negative electrode. As a result, there are problems in that internal short-circuiting occurs, and the battery breaks due to thermal runaway.

In the past, an electrode material including a heteropoly acid was suggested. For example, PTL 1 suggests an electrode material provided with an ion associate including a heteropoly acid on the electrode surface in order to control the oxidation-reduction potential. In addition, PTL 2 describes that absorption of a heteropoly acid in carbon reduces leakage current and increases the charge capacity. In addition, PTL 3 describes that absorption of a heteropoly acid in carbon enables a reversible oxidation-reduction reaction, and increases the charge capacity without reducing the charge capacity of the carbon material.

PTL 4 describes that use of a polymer including a heteropoly acid improves the characteristics. PTL 5 describes that containing a heteropoly acid in a solid electrolyte realizes high charging properties, a high energy density, and the like. PTL 6 describes that containing a heteropoly acid in a complex film enables proton conduction at a high temperature.

Meanwhile, PTL 7 suggests an invention in which an aggregate of a heteropoly acid is used as an active material. PTL 8 describes that a heteropoly acid made to be insoluble in water is used as an active material. In PTL 7 and 8, it is considered that a thermal treatment of a heteropoly acid makes the heteropoly acid insoluble in a polymerized solvent.

CITATION LIST

Patent Literature

[PTL 1] JP-A-59-060818
[PTL 2] U.S. Pat. No. 4,630,176
[PTL 3] U.S. Pat. No. 4,633,372
[PTL 4] U.S. Pat. No. 5,501,922
[PTL 5] JP-T-2002-507310
[PTL 6] JP-T-2007-511873
[PTL 7] JP-A-2002-289188
[PTL 8] JP-A-2004-214116

SUMMARY

A secondary battery in which a lithium transition metal complex oxide is used as a positive electrode active material has a problem in that gas generation occurs in the battery, and the internal pressure of the battery is liable to be increased. Particularly, a battery in which a laminate film is used for an exterior body has a problem in that the battery is liable to swell due to gas generation. Particularly, in a secondary battery in which a lithium transition metal complex oxide including nickel as the main component is used as a positive electrode active material, the above problem is liable to occur.

In addition, when the battery temperature is excessively increased, the separator is further shrunk. Also, when the separator becomes smaller than the dimensions of the positive electrode and the negative electrode, the positive electrode and the negative electrode come into contact with each other, and therefore it is impossible to prevent the above problem of heat generation in the battery.

However, no study is made in PTL 1 to 8 regarding the viewpoint of the above safety. PTL 1 to 6 pay attention to improvement of an active material or improvement of an electrolyte and a separator. In addition, PTL 7 and 8 describe use of a heteropoly acid as an active material itself, but nothing about the improvement of the safety using a heteropoly acid.

Therefore, an object of the invention is to solve the above problem and to provide a non-aqueous electrolyte battery having both of good battery characteristics and safety, a non-aqueous electrolyte battery positive electrode, a non-aqueous electrolyte battery negative electrode, a non-aqueous electrolyte battery separator, an electrolyte for non-aqueous electrolytes, and a method of manufacturing a non-aqueous electrolyte battery separator.

In order to solve the above problem, a first invention is a non-aqueous electrolyte battery having a positive electrode having a positive electrode active material layer including a positive electrode active material formed at least on one surface of a positive electrode collector, a negative electrode having a negative electrode active material layer including a negative electrode active material formed at least on one surface of a negative electrode collector, a separator provided between the positive electrode and the negative electrode, and an electrolyte, and including a polyacid and/or polyacid compound as an additive.

A second invention is a non-aqueous electrolyte battery positive electrode including a collector and a positive electrode compound layer, in which the positive electrode compound layer includes a positive electrode active material and a polyacid and/or polyacid compound as an additive.

A third invention is a non-aqueous electrolyte battery negative electrode including a collector and a negative electrode compound layer, in which the negative electrode compound layer includes a negative electrode active material and a polyacid and/or polyacid compound as an additive.

A fourth invention is a non-aqueous electrolyte battery separator containing a polyacid and/or polyacid compound. In the fourth invention, it is preferable that the polyacid and/or polyacid compound be present and preferably be filled at least in some of pores in a porous film.

A fifth invention is an electrolyte for non-aqueous electrolyte batteries containing a polyacid and/or polyacid compound.

A sixth invention is a method of manufacturing a non-aqueous battery separator composed of a dissolving step in which a polyacid and/or polyacid compound is melted in a polar organic solvent, an impregnating step in which a porous film is impregnated by the polar organic solvent in which the polyacid and/or polyacid compound is melted, and a drying step in which the porous film in which the polar organic solvent in which the polyacid and/or polyacid compound is melted is impregnated is dried.

A seventh invention is a non-aqueous electrolyte battery having a positive electrode having a positive electrode active material layer including a positive electrode active material formed at least on one surface of a positive electrode collector, a negative electrode having a negative electrode active material layer including a negative electrode active material formed at least on one surface of a negative electrode collector, a separator provided between the positive electrode and the negative electrode, and an electrolyte, in which a polyacid and/or polyacid compound is present at least on a part of the surface of the positive electrode and the negative electrode.

An eighth invention is a non-aqueous electrolyte battery having a positive electrode having a positive electrode active material layer including a positive electrode active material formed at least on one surface of a positive electrode collector, a negative electrode having a negative electrode active material layer including a negative electrode active material formed at least on one surface of a negative electrode collector, a separator provided between the positive electrode and the negative electrode, and an electrolyte, in which a gel-state film including an amorphous polyacid and/or polyacid compound including one or more polyelements or addenda atoms is formed at least on a part of the surface of the negative electrode.

In the eighth invention, it is preferable that the amorphous polyacid and/or polyacid compound precipitated in a three dimensional net-like structure is absorbed in the electrolyte so as to configure the gel-state film. In addition, the radial structure function obtained by Fourier-transforming the extended X-ray absorption fine structure (EXAFS) spectrum of the K absorption end of the polyelement of the amorphous polyacid and/or polyacid compound substantially supply a single peak in a range of 3.0 Å or less.

In the eighth invention, the gel-state film formed at least on a part of the surface of the negative electrode is a polyacid and/or polyacid compound, and preferably a heteropoly acid and/or heteropoly acid compound derivative. In addition, the polyacid or heteropoly acid compound preferably has positive ions of Li+, Na+, K+, Rb+, Cs+, and R4N+, R4P+ (in the formula, "R" is H or a hydrocarbon group having a carbon number of 10 or less).

In addition, in the eighth invention, in a non-aqueous electrolytic solution secondary battery composed by having a tungsten or molybdenum compound at least in the negative electrode, gas is generated at the positive electrode, and the generated gas is absorbed in the negative electrode when the battery is disassembled in a charging state, the positive electrode and the negative electrode are taken out, and each of them is retained in a heating state separately.

Meanwhile, it is preferable that the polyacid ions of the polyacid, polyacid compound, heteropoly acid, and heteropoly acid compound of each of the above inventions have a Keggin structure or Preyssler structure.

In the invention, it is possible to suppress the generation of gas in the battery. In addition, for example, the separator is not easily shrunk, and it is possible to interpose a layer having a high resistance between the positive electrode and the negative electrode so as to prevent the direct contact even when the separator is shrunk.

According to the invention, it is possible to suppress the expansion of a non-aqueous electrolyte battery and obtain high safety.

Additional features and advantages of the present invention are described herein, and will be apparent from, the following Detailed Description and Figures.

BRIEF DESCRITPION OF THE FIGURES

FIG. 1 is a perspective view showing a configuration example of a non-aqueous electrolyte battery according to an embodiment of the invention.

FIG. 2 is a cross-sectional view taken along the line II-II in the wound electrode body 10 shown in FIG. 1.

FIG. 3 is a cross-sectional view showing a configuration example of a non-aqueous electrolyte battery according to an embodiment of the invention.

FIG. 4 is a cross-sectional view showing an enlarged part of the wound electrode body 30 shown in FIG. 3.

FIG. 5 is a cross-sectional view showing a configuration example of a non-aqueous electrolyte battery according to an embodiment of the invention.

FIG. 6 is a SEM image of the surface of the negative electrode of the invention.

FIG. 7 is an example of a secondary ion spectrum from Time-of-Flight Secondary Ion Mass Spectrometry (ToF-SIMS) in the surface of a negative electrode in which a precipitate is precipitated by adding silicotungstic acid to a battery system.

FIG. 8 is an example of the radial structure function of a W—O bond obtained by Fourier-transforming the spectrum by an X-ray absorption fine structure (XAFS) analysis on the surface of a negative electrode in which precipitates are precipitated by adding silicotungstic acid to a battery system.

FIG. 9 is an example of the radial structure function of an Mo—O bond obtained by Fourier-transforming the spectrum by an X-ray absorption fine structure (XAFS) analysis on the surface of a negative electrode in which precipitates are precipitated by adding phosphomolybdic acid to a battery system.

FIG. 10 is a simplified line diagram view showing the configuration of a laminate-type electrode body.

FIG. 11 is a cross-sectional view showing a problem to solve in an eleventh embodiment.

FIG. 12 is a graph showing the XPS analysis results of the surface of the negative electrode of Sample 15-3 in which XPS is used.

FIG. 13 is a graph showing the XPS analysis results of the surface of the negative electrode of Sample 18-3 in which XPS is used.

DETAILED DESCRIPTION

Hereinafter, embodiments of the invention will be described with reference to the drawings. The embodiments described below are specific examples of the invention, and will be given a variety of technically preferable limitations, but the scope of the invention is not limited to the embodiments unless otherwise described particularly in the following description. Meanwhile, the description will be made in the following order.
1. A first embodiment (an example of a non-aqueous electrolyte battery containing a heteropoly acid and/or heteropoly acid compound in the positive electrode active material layer)
2. A second embodiment (an example of a non-aqueous electrolyte battery in which a non-aqueous electrolytic solution is used without being maintained in a polymer)
3. A third embodiment (an example of a non-aqueous electrolyte battery having a cylindrical shape)
4. A fourth embodiment (an example of a non-aqueous electrolyte battery having a square shape)
5. A fifth embodiment (an example of the first embodiment in which the reduced product of the polyacid and/or polyacid compound is precipitated on the surface of the negative electrode)
6. A sixth embodiment (an example of the second embodiment in which the reduced product of the polyacid and/or polyacid compound is precipitated on the surface of the negative electrode)
7. A seventh embodiment (an example in which a polyacid and/or polyacid compound is precipitated on the surface of the positive electrode)
8. An eighth embodiment (an example in which preliminary charging of the non-aqueous electrolyte battery is carried out while embossing is carried out from the outside of the battery so as to precipitate a polyacid and/or polyacid compound and the reduced product thereof)
9. A ninth embodiment (an example in which a separator having a heteropoly acid and/or heteropoly acid compound supported in advance is used)
10. A tenth embodiment (details of the polyacid and/or polyacid compound to be added and precipitated on the negative electrode)
11. Other embodiment (modified example)
1. First Embodiment
(1-1) Configuration of a Non-aqueous Electrolyte Battery FIG. 1 is a perspective view showing a configuration example of a non-aqueous electrolyte battery according to a first embodiment of the invention. The non-aqueous electrolyte battery is, for example, a non-aqueous electrolyte secondary battery. The non-aqueous electrolyte battery is configured to have a wound electrode body 10, to which a positive electrode lead 11 and a negative electrode lead 12 are attached, accommodated inside a film-shaped exterior member 1, and has a flat shape.

Each of the positive electrode lead 11 and the negative electrode lead 12 has, for example, a reed shape, and is derived from the inside of the exterior member 1 toward the outside, for example, in the same direction. The positive electrode lead 11 is composed of a metallic material, such as aluminum (Al), and the negative electrode lead 12 is composed of a metallic material, such as nickel (Ni).

The exterior member 1 is a laminate film having a structure in which, for example, an insulating layer, a metal layer and an outermost layer are laminated in this order and bonded by a laminating process and the like. The exterior members 1 are mutually fused or adhered by an adhesive at the outer circumferential portions with the insulating layer side inside.

The insulating layer is composed of a polyolefin resin, such as polyethylene, polypropylene, modified polyethylene, modified polypropylene, and copolymers thereof. This is because the water permeability can be reduced, and the airtightness is excellent. The metal layer is composed of foil-shaped or sheet-shaped aluminum, stainless steel, nickel, iron, or the like. The outermost layer may be composed of, for example, the same resin as for the insulating layer, or may be composed of nylon and the like. This is because the strength with respect to tearing, sudden displacement, or the like can be increased. The exterior member 1 may have layers other than the insulating layer, the metal layer, and the outermost layer.

Adhering films 2 are inserted between the exterior member 1 and the positive electrode lead 11 and the negative electrode lead 12 in order to improve the adhesiveness between the positive electrode lead 11 and the negative electrode lead 12 and the inside of the exterior member 1 and prevent the intrusion of outside air. The adhering film 2 is composed of a material having airtightness with respect to the positive electrode lead 11 and the negative electrode lead 12. When the positive electrode lead 11 and the negative electrode lead 12 are composed of the above metallic material, the positive electrode lead 11 and the negative electrode lead 12 are preferably composed of, for example, a polyolefin resin, such as polyethylene, polypropylene, modified polyethylene, and modified polypropylene.

FIG. 2 is a cross-sectional view taken along the line II-II in the wound electrode body 10 shown in FIG. 1. The wound electrode body 10 is obtained by laminating a positive electrode 13 and a negative electrode 14 through a separator 15 and an electrolyte 16 and winding them, and the outermost circumferential portion is protected by a protective tape 17.

[Positive Electrode]

The positive electrode 13 has, for example, a positive electrode collector 13A and positive electrode active material layers 13B provided on both sides of the positive electrode collector 13A. For example, a metal foil, such as an aluminum foil, can be used as the positive electrode collector 13A.

The positive electrode active material layer 13B includes at least one of a positive electrode active material and a polyacid and/or polyacid compound that are soluble in an electrolytic solution. In addition, the positive electrode active material layer 13B further includes a conducting agent, such as a carbon material, and a bonding agent, such as polyvinylidene fluoride and polytetrafluoroethylene. Meanwhile, the polyacid and/or polyacid compound included in the positive electrode active material layer 13B makes no contribution to battery capacity.

[Positive Electrode Active Material]

The positive electrode active material is a lithium complex oxide particle including nickel and/or cobalt. This is because the use of a lithium complex oxide particle can produce a high capacity and a high discharging potential. The lithium complex oxide particle is, for example, a lithium complex oxide grain having a layered salt-type structure whose average composition is represented by (Chem. 1). The lithium complex oxide particle may be a primary particle or a secondary particle.

$$Li_aCo_bNi_cM1_{1-b-c}O_d \quad \text{(Chem. 1)}$$

(In the formula, "M1" is one or more elements selected from boron (B), magnesium (Mg), aluminum (Al), silicon (Si), phosphorous (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), tin (Sn), lead (Pb), and antimony (Sb). "a", "b", "c", and "d" are values in ranges of $0.2 \le a \le 1.4$, $0 \le b \le 1.0$, $0 \le c \le 1.0$, and $1.8 \le d \le 2.2$, respectively). The lithium composition varies depending on the state of charging and discharging, and "a" represents a value in a complete discharging state.

Here, the range of "a" is, for example, $0.2 \le a \le 1.4$ in (Chem. 1). When this value is decreased, the layered salt structure of the basic crystal structure of the lithium complex oxide collapses, recharging becomes difficult, and the capacity is significantly degraded. When this value is increased, lithium diffuses to the outside of the above complex oxide particle, acts as an obstacle to the control of the basicity of the subsequent treatment process, and, ultimately, causes an adverse effect of the accelerated gelatinization of a positive electrode paste during kneading.

Meanwhile, the lithium complex oxide of (Chem. 1) may include—or in the past may have included—excess lithium. That is, "a" that shows the lithium composition of the lithium complex oxide of (Chem. 1) may be larger than 1.2. Here, the value of "1.2" is the lithium composition of this kind of lithium complex oxide disclosed in the past, and the same action and effect can be obtained in the present application by the same crystal structure as when a=1 (for example, refer to JP-A-2008-251434, which is a prior application by the present applicant).

Even when "a" that shows the lithium composition of the lithium complex oxide of (Chem. 1) is larger than 1.2, the crystal structure of the lithium complex oxide is the same as when "a" is 1.2 or less. In addition, even when "a" that shows the lithium composition in the formula 1 is larger than 1.2, the chemical state of transition metals that compose the lithium complex oxide in a redox reaction brought about by charging and discharging is not significantly changed in comparison to the case of "a" of being 1.2 or less as long as "a" is 1.4 or less.

The ranges of "b" and "c" are, for example, $0 \le b \le 1.0$, $0 \le c \le 1.0$. When the values are decreased outside these ranges, the discharge capacity of the positive electrode active material is reduced. When the values are increased outside these ranges, the stability of the crystal structure of the complex oxide particle is degraded, and the degradation of the capacity of the repetition of charging and discharging of the positive electrode active material and the degradation of the stability are caused.

The range of "d" is, for example, $1.8 \le d \le 2.2$. When the value is decreased outside this range, and increased outside the range, the stability of the crystal structure of the complex oxide particle is degraded, the degradation of the capacity of the repetition of charging and discharging of the positive electrode active material and degradation of the safety are caused, and the discharge capacity of the positive electrode active material is reduced.

In addition, it is also possible to use a lithium complex oxide particle having a spinel structure whose average composition is represented by (Chem. 2).

$$Li_hMn_{2-i}M2_iO_j \quad \text{(Chem. 2)}$$

(In the formula, "M2" represents at least one from a group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W). "h", "i", and "j" are values in ranges of $0.9 \le h \le 1.1$, $0 \le i \le 0.6$, and $3.7 \le j \le 4.1$. Meanwhile, the lithium composition varies with the charging and discharging state, and the value of "h" represents a value in a complete discharging state).

Furthermore, a positive electrode active material having an olefin crystal structure shown in (Chem. 3) may be used in the invention.

$$Li_aMn_bFe_cM_dPO_4 \quad \text{(Chem. 3)}$$

(In the formula, $0 \le a \le 2$, $b+c+d \le 1$, $0 \le b \le 1$, $0 \le c \le 1$, and $0 \le d \le 1$, "$M_d$" is at least one selected from magnesium (Mg), nickel (Ni), cobalt (Co), aluminum (Al), tungsten (W), niobium (Nb), titanium (Ti), silicon (Si), chromium (Cr), copper (Cu), and zinc (Zn).

A lithium complex oxide including nickel as the main component is particularly preferred as the lithium complex oxide. The "including nickel as the main component" refers to the fact that a nickel component has the largest amount included of the metal elements that compose the lithium complex oxide (excluding lithium). The lithium complex oxide including nickel as the main component is, for example, a lithium complex oxide including a larger amount of the nickel component than the cobalt component in (Chem. 1), and having an average composition represented by the following (Chem. 4) with the "c" range in a range of $0.5 \le c \le 1.0$.

$$Li_3CO_bNi_cM1_{1-b-c}O_d \quad \text{(Chem. 4)}$$

(In the formula, "M1" is one or more elements selected from boron (B), magnesium (Mg), aluminum (Al), silicon (Si), phosphorous (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), tin (Sn), lead (Pb), and antimony (Sb). "a", "b", "c", and "d" are values in ranges of $0.2 \le a \le 1.4$, $0 \le b \le 0.5$, $0.5 \le c \le 1.0$, and $1.8 \le d \le 2.2$, respectively. Meanwhile, the lithium composition varies with the charging and discharging state, and the value of "x" represents a value in a complete discharging state).

The lithium complex oxide whose average composition is represented by the (Chem. 4) is a lithium complex oxide for lithium secondary batteries which can realize almost the same high voltage and high energy density as a lithium complex oxide including cobalt as the main component.

The lithium complex oxide including nickel as the main component has a small content of cobalt, which is an unstable and expensive resource, and is highly economical in comparison to the lithium complex oxide including cobalt as the main component. Furthermore, the lithium complex oxide including nickel as the main component has an advantage of a larger battery capacity than the lithium complex oxide including cobalt as the main component, and there is demand for further enhancing this advantage.

Meanwhile, in a secondary battery in which the lithium complex oxide including nickel as the main component is used, there is a problem in that an increase in the internal pressure occurs due to the generation of gas in the battery. In addition, when a laminate film is used for the exterior member of the secondary battery, there is a problem in that battery swelling is liable to occur due to the generation of gas in the battery, and there is demand for solving this problem.

[Regarding Suppression of Gas Generation]

Here, the mechanisms of gas generation and the suppression of gas generation, which were obtained by thorough studies of the present inventors and the like, will be described for better understanding of the invention.

It is a common belief that the contribution of the positive electrode active material to the generation of gas in a non-aqueous electrolyte battery is caused by the following (cause 1) and (cause 2).

(Cause 1) Carbonate included in the positive electrode active material generates carbon dioxide by a non-aqueous electrolytic solution-derived acid component.

(Cause 2) The organic components of the non-aqueous electrolytic solution and the like are oxidized by the strong oxidative powder of the positive electrode active material in the charging state so as to generate carbon dioxide or carbon monoxide.

As a result, it can be considered that a surface treatment of the positive electrode active material together with an effective treatment that lowers the carbonate content in the positive electrode active material can produce an effective treatment that suppresses the oxidative activity of the surface of the positive electrode active material. In addition, in the past, a tendency has been suggested regarding the corresponding relationship between the amount of the above residual carbonate and swelling that swelling is large in a system having a large amount of residual carbonate, and swelling is small in a system having a small amount of residual carbonate.

In contrast to the above, according to the results of thorough studies of the inventors, a tendency that the amount of residual carbonate is not directly reflected in the swelling even when the amount of residual carbonate is somewhat large was obtained in the invention. This suggests that swelling can be suppressed as a whole as long as residual carbonate is not always decomposed so as to generate $CO_2$, and sufficiently suppresses the oxidation of organic components, such as non-aqueous electrolytic solution and the like. Meanwhile, even in the invention, it is needless to say that a small content of the residual carbonate in the positive electrode is more preferable in order to suppress swelling.

[Particle Diameter]

The average particle diameter of the positive electrode active material is preferably 2.0 μm to 50 μm. When the average particle diameter is less than 2.0 μm, the positive electrode active material layer is separated when the positive electrode active material layer is pressed during the manufacturing of the positive electrode. In addition, it is necessary to increase the added amount of a conducting agent or bonding agent in order to increase the surface area of the positive electrode active material, and there is a tendency that the energy density per unit weight is decreased. On the other hand, when the average particle diameter exceeds 50 μm, there is a tendency that the particle penetrates the separator, and short-circuiting occurs.

[Polyacid, Polyacid Compound]

A film is formed on an electrode by adding a polyacid and polyacid compound to the battery system.

The polyacid refers to an oxyacid condensate. Polyacid ions in the polyacid and polyacid compound preferably have a Keggin structure, Anderson structure, Dawson structure, Preyssler structure, or the like, and are easily dissolved in a solvent of the battery.

The polyacid and/or polyacid compound of the invention is a polyacid and/or polyacid compound having polyatoms (or addenda atoms) selected from element group (a), or a polyacid and/or polyacid compound having polyatoms selected from element group (a), some of which are substituted with at least any element selected from element group (b).

Element group (a): Mo, W, Nb, and V

Element group (b): Ti, Cr, Mn, Fe, Co, Ni, Cu, Zn, Ga, Zr, Tc, Rh, Cd, In, Sn, Ta, Re, Tl, and Pb.

Examples of the polyacid used in the invention include tungstic (VI) acid, molybdic (VI) acid, and the like. Specific examples include anhydrous tungstic acid, anhydrous molybdic acid, and hydrates thereof. Examples of the hydrates that can be used include orthotungstic acid ($H_2WO_4$), which is tungstic acid monohydrate ($WO_3.H_2O$), molybdic acid dihydrate ($H_4MoO_5$, $H_2MoO_4.H_2O$, $MoO_3.2H_2O$) to orthomolybdic acid ($H_2MoO_4$), which is molybdic acid monohydrate ($MoO_3.H_2O$). In addition, it is also possible to use anhydrous tungstic acid ($WO_3$) whose hydrogen content is smaller than metatungstic acid, paratungstic acid, and the like, which are the isopolyacid of the hydrates, and, ultimately, is 0, anhydrous molybdic acid ($MoO_3$) whose hydrogen content is smaller than metamolybdic acid, paramolybdic acid, and the like, and, ultimately, is zero.

In addition, the following heteropoly acid and heteropoly acid compound are preferred as the polyacid and polyacid compound.

[Heteropoly Acid, Heteropoly Acid Compound]

The heteropoly acid refers to a condensate of two or more of oxoacids having a hetero atom. Heteropoly acid ions in the heteropoly acid and heteropoly acid compound preferably have a Keggin structure, Anderson structure, Dawson structure, Preyssler structure, or the like, and are easily dissolved in a solvent of the battery.

The heteropoly acid and/or heteropoly acid compound is a heteropoly acid and/or heteropoly acid compound having polyatoms selected from element group (a), or a heteropoly acid and/or heteropoly acid compound having polyatoms selected from element group (a), some of which are substituted with at least any element selected from element group (b).

Element group (a): Mo, W, Nb, and V

Element group (b): Ti, Cr, Mn, Fe, Co, Ni, Cu, Zn, Ga, Zr, Tc, Rh, Cd, In, Sn, Ta, Re, Tl, and Pb.

In addition, the heteropoly acid and/or heteropoly acid compound is a heteropoly acid and/or heteropoly acid compound having polyatoms selected from element group (c), or a heteropoly acid and/or heteropoly acid compound having polyatoms selected from element group (c), some of which are substituted with at least any element selected from element group (d).

Element group (c): B, Al, Si, P, Cr, Mn, Fe, Co, Ni, Cu, Zn, Ge, and As

Element group (d): H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U, and Np.

Specific examples of the heteropoly acid and/or heteropoly acid compound include heteropoly acids and/or heteropoly acid compounds represented by the following general formulas ((formula A) to (formula D)).

$$H_xA_y[BD_6O_{24}] \cdot zH_2O \quad \text{(Formula A) Anderson structure}$$

(In the formula, "x", "y", and "z" are values in ranges of $0 \leq x \leq 8$, $0 \leq y \leq 8$, and $0 \leq z \leq 50$, respectively. However, at least one of "x" and "y" is not 0.)

$$H_xA_y[BD_{12}O_{40}] \cdot zH_2O \quad \text{(Formula B) Keggin structure}$$

(In the formula, "x", "y", and "z" are values in ranges of $0 \leq x \leq 4$, $0 \leq y \leq 4$, and $0 \leq z \leq 50$, respectively. However, at least one of "x" and "y" is not 0.)

$$H_xA_y[B_2D_{18}O_{62}] \cdot zH_2O \quad \text{(Formula C) Dawson structure}$$

(In the formula, "x", "y", and "z" are values in ranges of $0 \leq x \leq 8$, $0 \leq y \leq 8$, and $0 \leq z \leq 50$, respectively. However, at least one of "x" and "y" is not 0.)

$$H_xA_y[H_5D_{30}O_{110}] \cdot zH_2O \quad \text{(Formula D) Preyssler structure}$$

(In the formula, "x", "y", and "z" are values in ranges of $0 \leq x \leq 15$, $0 \leq y \leq 15$, and $0 \leq z \leq 50$, respectively. However, at least one of "x" and "y" is not 0.)

Meanwhile, in the above (formula A) to (formula D), "A" represents lithium (Li), sodium (Na), potassium (K), rubidium (Rb), cesium (Cs), magnesium (Mg), calcium (Ca), aluminum (Al), ammonium ($NH_4$), ammonium salts, and phosphonium salts. "B" represents phosphorous (P), silicon (Si), arsenic (As), and germanium (Ge). "D" is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl).

Examples of the heteropoly acid used in the invention include heteropolytungstic acids, such as phosphotungstic acid and silicotungstic acid, and heteropolymolybdic acids, such as phosphomolybdic acid and silicomolybdic acid.

In addition, materials, such as phosphovanado-molybdic acid, phosphotungsto-molybdic acid, silicovanado-molybdic acid, and silicotungsto-molybdic acid, can be used as the material including a plurality of polyelements.

The heteropoly acid compound preferably has positive ions, for example, $Li^+$, $Na^+$, $K^+$, $Rb^+$, $Cs^+$, $R4N^+$, and $R4P^+$ (in the formula, "R" is H or a hydrocarbon group having a carbon number of 10 or less). In addition, the positive ion is more preferably $Li^+$, tetra-normal-butyl ammonium or tetra-normal-butyl phosphonium.

Examples of the heteropoly acid compound include heteropoly tungstate compounds, such as sodium silicotungstate, sodium phosphotungstate, ammonium phosphotungstate, and tetra silicotungstate-tetra-n-butyl phosphonium salt. In addition, the heteropoly acid compound includes heteropolymolybdate compounds, such as sodium phosphomolybdate, ammonium phosphomolybdate, and triphosphomolybdate-tetra-n-butyl ammonium salt. Furthermore, compounds including a plurality of polyacids include materials, such as triphosphotangutorinemolybdate-tetra-n-ammonium salt. The heteropoly acid and heteropoly acid compound may be used in combination of two or more kinds. The heteropoly acid or heteropoly acid compound is easily dissolved in a solvent, stable in a battery, and does not easily have an adverse effect, such as reaction with other materials.

Use of the heteropoly acid and/or heteropoly acid compound is preferred due to its high solubility in a solvent used when the positive electrode compound and the negative electrode compound are prepared, a non-aqueous solvent used in an electrolyte, and the like. In addition, the polyacid and/or polyacid compound having no hetero atom tends to be slightly poor in the effect per the added weight in comparison to the heteropoly acid and/or heteropoly acid compound. However, since the solubility in a polar solvent is low, the polyacid and/or polyacid compound having no hetero atom is excellent in terms of paint characteristics, such as paint viscoelasticity and aging variation thereof, and is useful from the industrial viewpoint.

Meanwhile, in the polyacid and polyacid compound, or the heteropoly acid and/or heteropoly acid compound, the polyacid preferably has a ratio of the number of hydrogen atoms to the number of polyatoms of 0 to 4.0. When the hydrogen atoms/polyatoms ratio exceeds 4.0, the water content of the non-aqueous electrolytic solution secondary battery of the invention is increased, the electrolyte is degraded, and degradation of a variety of battery characteristics is caused.

Hereinafter, the invention in which the heteropoly acid and/or heteropoly acid compound is used will be described. Meanwhile, the same added amount, actions, effects, and the like can be obtained even when the polyacid and/or polyacid compound is used.

The optimal range of the mixed amount of the heteropoly acid and/or heteropoly acid compound is preferably 0.01% by weight to 5.0% by weight with respect to 100% by weight of the mixed amount of the positive electrode active material. Meanwhile, the weight of the heteropoly acid is a value from which the weight of water of hydration contained in the heteropoly acid is subtracted. In addition, similarly, the weight of the heteropoly acid compound is a value from which the weight of water of hydration contained in the heteropoly acid compound is subtracted.

When the positive electrode active material is a lithium complex oxide having a larger amount of the nickel component than the cobalt component, the optimal range of the mixed amount of the heteropoly acid and/or heteropoly acid compound is preferably 0.05% by weight to 5.0% by weight with respect to 100% by weight of the mixed amount of the positive electrode active material.

When the heteropoly acid and/or heteropoly acid compound is added excessively outside the optimal range of the mixed amount of the heteropoly acid and/or heteropoly acid compound, the discharge capacity is degraded, and the effect of improving the swelling reduction is not exhibited. On the other hand, when the mixed amount of the heteropoly acid and/or heteropoly acid compound is smaller than outside the optimal range, the effect of reducing the swelling amount is not exhibited.

The positive electrode 13 preferably has a thickness of 250 μm or less.

[Negative Electrode]

The negative electrode 14 has, for example, a negative electrode collector 14A and negative electrode active material layers 14B provided on both surfaces of the negative electrode collector 14A. The negative electrode collector 14A is composed of, for example, a metal foil, such as a copper foil.

The negative electrode active material layer 14B is composed by, for example, including one or two or more of any of negative electrode materials that can absorb and discharge lithium as the negative electrode active material, and may include a conducting agent and a bonding agent according to necessity.

Examples of the negative electrode materials that can absorb and discharge lithium include carbon materials, such as graphite, non-graphitizable carbon or easily-graphitizable carbon. Any carbon material may be used singly, or a mixture of two or more may be used. In addition, two or more of carbon materials having different average particle diameters may be mixed and used.

In addition, the negative electrode material that can absorb and discharge lithium includes materials including lithium and a metal element or semimetal element that can form an alloy as component elements. Specific examples include lithium and a single-component substance, alloy, or compound of a metal element that can form an alloy; lithium and a single-component substance, alloy, or compound of a semimetal element that can form an alloy; or materials having at least in part a phase of one or two or more of the above.

Examples of the metal element or semimetal element include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Among them, group 14 metal elements or semimetal elements in the long form of periodic table are preferred, and silicate (Si) or tin (Sn) is particularly preferred. This is because silicon (Si) and tin (Sn) have a large capability of absorbing and discharging lithium, and can obtain a high energy density.

Examples of the silicon alloy include alloys including at least one from a group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr) as the second component element other than silicon (Si). Examples of the tin (Sn) alloy include alloys including at least one from a group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr) as the second component element other than tin (Sn).

Examples of the silicon (Si) compound or the tin (Sn) compound include alloys including oxygen (O) or carbon (C), and may include the above second component element in addition to silicon (Si) or tin (Sn).

Among the above, a CoSnC-containing material that includes tin, cobalt, and carbon as the component elements, and has a carbon content of 9.9% by mass to 29.7% by mass and a fraction of cobalt with respect to the total of tin and cobalt of 30% by mass to 70% by mass is preferred as the negative electrode material. This is because a high energy density can be obtained, and excellent cycle characteristics can be obtained in such composition ranges.

The CoSnC-containing material may further include other component elements according to necessity. Preferred examples of the other component elements include silicon, iron, nickel, chromium, indium, niobium (Nb), germanium, titanium, molybdenum (Mo), aluminum, phosphorous (P), gallium (Ga), or bismuth, and the CoSnC-containing material may include two or more. This is because the capacity or cycle characteristics can be further improved.

Meanwhile, the CoSnC-containing material has a phase including tin, cobalt, and carbon, and this phase preferably has a low crystallinity or amorphous structure. In addition, in the CoSnC-containing material, at least some of carbon, which is the component element, is preferably bonded with a metal element or semimetal element, which is the other component element. This is because, while it is considered that the cycle characteristics are degraded by agglomeration or crystallization of tin and the like, such agglomeration or crystallization can be suppressed by bonding of carbon with the other element.

Examples of a measurement method that investigates the bonding state of the elements include X-ray photoelectron spectroscopy (XPS) and the like. In XPS, a carbon is (C1s) peak appears at 284.5 eV for graphite in an apparatus that is energy-calibrated so that a gold atom 4f (Au4f) peak is obtained at 84.0 eV. In addition, the carbon is peak appears at 284.8 eV for surface-contaminated carbon. In contrast to this, when the charge density of carbon element is increased, for example, when carbon is bonded with a metal element or semimetal element, the C1s peak appears in a range lower than 284.5 eV. That is, when the peak of the synthetic wave of C1s obtained for the CoSnC-containing material appears in a range lower than 284.5 eV, at least some of the carbon included in the CoSnC-containing material is bonded with a metal element or semimetal element, which is the other component element.

Meanwhile, in XPS measurement, for example, the C1s peak is used for the correction of the energy axis of a spectrum. In general, since surface-contaminated carbon is present on the surface, the C1s peak of the surface-contaminated carbon is set to 284.8 eV, which is used as the energy criterion. In XPS measurement, since the waveform of the C1s peak is obtained as a form including the peak of the surface-contaminated carbon and the peak of carbon in the CoSnC-containing material, the peak of the surface-contaminated carbon and the peak of carbon in the CoSnC-containing material are separated by an analysis using, for example, commercially available software. In waveform analyses, the location of the main peak present in the minimum bonding energy side is used as the energy criterion (284.8 eV).

[Separator]

Any substances may be used as the separator 15 as long as the substances are electrically stable, are chemically stable with respect to the positive electrode active material, the negative electrode active material, or the solvent, and are not electrically conductive. For example, sheet-shaped non-woven fabrics of polymers, porous films, glass or ceramic fibers can be used, and the laminate of a plurality of them may be used. Particularly, use of a porous polyolefin film is preferred, and a complex of the porous polyolefin film with a thermal resistance material composed of polyimide, glass, ceramic fibers, and the like may be used.

[Electrolyte]

The electrolyte 16 contains an electrolytic solution and a supporting body including a polymer compound that supports the electrolytic solution, and forms a so-called gel state. The electrolytic solution includes an electrolyte salt and a solvent that dissolves the electrolyte salt. Examples of the electrolyte salt include lithium salts of $LiPF_6$, $LiClO_4$, $LiBF_4$, $LiN(SO_2CF_3)_2$, $LiN(SO_2C_2F_5)_2$, $LiAsF_6$, and the like. Any one or a mixture of two or more may be used as the electrolyte salts.

Examples of the solvent include lactone-based solvents, such as γ-butyrolactone, γ-valerolactone, δ-valerolactone, and ε-caprolactone, carbonate ester-based solvents, such as ethylene carbonate, propylene carbonate, butylene carbonate, vinylene carbonate, dimethyl carbonate, ethyl methyl carbonate, and diethyl carbonate, ether-based solvents, such as 1,2-dimethoxyethane, 1-ethoxy-2-methoxyethane, 1,2-diethoxyethane, tetrahydrofuran, and 2-methyltetrahydrofuran, nitrile-based solvents, such as acetonitrile, non-aqueous solvents, such as sulfolane-based solvents, phosphoric acids, phosphate ester solvents, and pyrrolidones. Any one may be used singly, or a mixture of two or more may be used as the solvent.

In addition, the solvent preferably includes a fluorinated compound in place of some or all of the hydrogen atoms in a cyclic ester or chain-shaped ester. It is preferable to use a difluorinated ethylene carbonate (4,5-difluoro-1,3-dioxolan-2-one) as the fluorinated compound. This is because the charging and discharging cycle characteristics can be improved even when the negative electrode 14 including a silicon (Si), tin (Sn), germanium (Ge), or other compound as the negative electrode active material is used, and, particularly, a difluorinated ethylene carbonate is excellent in terms of a cycle characteristic improvement effect.

Any substance that absorbs the solvent so as to be gelatinized may be used as the polymer compound, and examples thereof include fluorine-based polymer compounds, such as polyfluorinated vinylidene and copolymers of vinylidene fluoride and hexafluoropropylene, ether-based polymer compounds, such as polyethylene oxide and cross-linking bodies including polyethylene oxide, substances including polyacrylonitrile, polypropylene oxide, or polymethyl methacrylate as the repeating unit. Any one may be used singly, or a mixture of two or more may be used as the polymer compound.

Particularly, fluorine-based polymer compounds are desirable in terms of oxidation-reduction stability, and, among the above, copolymers including vinylidene fluoride and hexafluoropropylene as the components are preferred. Furthermore, the copolymers may include monoesters of unsaturated dibasic acids, such as monomethyl maleic acid ester, halogenated ethylene, such as chlorotrifluoroethylene, cyclic ester carbonates of unsaturated compounds, such as vinylene carbonate, epoxy group-containing acryl vinyl monomer, and the like as the component. This is because improved characteristics can be obtained.

(1-2) Method of Manufacturing the Non-aqueous Electrolyte Battery

Next, the method of manufacturing the non-aqueous electrolyte battery will be described.

[Method of Manufacturing the Positive Electrode]

The positive electrode 13 is manufactured in the following manner. Firstly, a positive electrode active material, a bonding agent, a conducting agent, such as a carbon material, and the heteropoly acid and/or heteropoly acid compound are mixed so as to prepare a positive electrode compound, and the positive electrode compound is dispersed in a solvent, such as N-methyl-2-pyrrolidone, thereby preparing a positive electrode compound slurry. Polyfluorinated vinylidene, polytetrafluoroethylene or the like is used as the bonding agent.

More specifically, for example, firstly, a positive electrode active material, a bonding agent, and a conducting agent are mixed. In addition, the heteropoly acid and/or heteropoly acid compound is dissolved in a solvent, such as N-methyl-2-pyrrolidone, thereby preparing a solution. Next, the solution and the mixture are mixed so as to prepare a positive electrode compound.

Next, a solvent, such as N-methyl-2-pyrrolidone, is further added to the positive electrode compound, and the positive electrode active material, the bonding agent, the conducting agent, and the heteropoly acid and/or heteropoly acid compound are dispersed in the solvent. Thereby, a positive electrode compound slurry is obtained.

At this time, the inherent problem occurring when a positive electrode active material having an olefin-type crystal structure is used is solved by the addition of the heteropoly acid compound. The positive electrode active material having an olefin-type crystal structure has a problem in that the material itself has low electron conductivity, and good battery characteristics are obtained by mixing particle-shaped or fibrous carbon black and the like as the conducting agent. On the other hand, due to the mixing of the conducting agent, air is liable to be included in the positive electrode compound slurry. In the case of the properties of such a positive electrode compound slurry, it becomes difficult to coat the positive electrode compound slurry on the positive electrode collector. Dispersion of the heteropoly acid and/or heteropoly acid compound in the positive electrode compound slurry can increase the fluidity of the positive electrode compound slurry and facilitate coating.

The positive electrode active material is generally alkaline. Due to this, the viscosity of the positive electrode compound slurry in which polyfluorinated vinylidene (PVdF) is used as a conducting agent increases as time lapses, and therefore there is a problem regarding the preserving properties of the slurry. The addition of the heteropoly acid and/or heteropoly acid compound neutralizes the positive electrode compound slurry, and suppresses the influence to the minimum extent, thereby improving the coating properties. In addition, the addition of the heteropoly acid and/or heteropoly acid compound also affects $\zeta$ potential-induced dispersibility and can cause pseudo agglomeration between the positive electrode active material and the conducting agent (carbon) by optimizing the added amount. An increase in the size of the appearing particle while maintaining the conductivity increases the fluidity of the slurry, and can reduce the solvent necessary for dispersion.

Next, after the positive electrode compound slurry is coated and dried on the positive electrode collector 13A, compacting is carried out using a roll press machine or the like so as to form the positive electrode active material layer 13B, thereby obtaining the positive electrode 13. Meanwhile, the conducting agent, such as a carbon material, is mixed according to necessity when the positive electrode compound is prepared.

[Method of Manufacturing the Negative Electrode]

Next, the negative electrode 14 is manufactured by the following method. Firstly, a negative electrode active material and a bonding agent are mixed so as to prepare a negative electrode compound, and the negative electrode compound is dispersed in a solvent, such as N-methyl-2-pyrrolidone, thereby producing a negative electrode compound slurry. Next, after the negative electrode compound slurry is coated on the negative electrode collector 14A, and the solvent is dried, compacting is carried out using a roll press machine and the like so as to form the negative electrode active material layer 14B, thereby obtaining the negative electrode 14.

In addition, the negative electrode 14 can also be manufactured in the following manner. That is, a negative electrode active material, a bonding agent, and a thickening agent are mixed so as to prepare a negative electrode compound, and the negative electrode compound was dispersed in a solvent, such as water, so as to produce a negative electrode compound slurry. Next, after the negative electrode compound slurry is coated on the negative electrode collector 14A, and the solvent is dried, compacting is carried out using a roll press machine or the like so as to form the negative electrode active material layer 14B, thereby obtaining the negative electrode

[Method of Assembling the Non-aqueous Electrolyte Battery]

The non-aqueous electrolyte battery can be manufactured, for example, in the following manner. Firstly, a precursor solution including an electrolytic solution, a polymer compound, and a mixed solvent is coated on the positive electrode 13 and the negative electrode 14, respectively, and the mixed solvent is volatilized, thereby forming the electrolyte 16. After that, the positive electrode lead 11 is attached to the end portion of the positive electrode collector 13A by welding, and the negative electrode lead 12 is attached to the end portion of the negative electrode collector 14A by welding.

Next, after the positive electrode 13 and the negative electrode 14 having the electrolyte 16 formed thereon are laminated through the separator 15 so as to produce a laminate, the laminate is wound in the longitudinal direction, the protective tape 17 is adhered to the outermost circumferential portion, thereby forming the wound electrode body 10. Finally, for example, the wound electrode body 10 is interposed in the exterior member 1, and sealed by adhering the outer edge portions of the exterior member 1 by thermal fusion and the like. At this time, the adhering film 2 is inserted between the positive electrode lead 11 and the negative electrode lead 12 and the exterior member 1. Thereby, the non-aqueous electrolyte battery shown in FIGS. 1 and 2 is completed.

In addition, the non-aqueous electrolyte battery may be manufactured in the following manner. Firstly, the positive electrode 13 and the negative electrode 14 are manufactured in the above manner, and the positive electrode lead 11 and the negative electrode lead 12 are attached to the positive electrode 13 and the negative electrode 14. In addition, the positive electrode 13 and the negative electrode 14 are laminated through the separator 15 and wound, and the protective tape 17 is adhered to the outermost circumferential portion, thereby forming a wound electrode body, which is the precursor of the wound electrode body 10. Next, the wound electrode body is interposed in the exterior member 1, and accommodated in the exterior member 1 by thermally fusing the outer circumferential end portion except one side into a bag shape. Subsequently, an electrolyte composition including an electrolytic solution, a monomer, which is a raw material of a polymer compound, a polymerization initiator, and other materials, such as a polymerization inhibitor, according to necessity, is prepared and injected in the exterior member 1.

Afterwards, the electrolyte composition is injected and sealed by thermally fusing the opening of the exterior member 1 under a vacuum atmosphere. Next, the gel-state electrolyte 16 is formed by supplying heat so as to polymerize the monomers into a polymer compound, and the non-aqueous electrolyte battery shown in FIGS. 1 and 2 is assembled.

[Effects]

According to the non-aqueous electrolyte battery of the first embodiment of the invention, the gas generation in the battery can be reduced. In addition, since the gas generation in the battery can be reduced, swelling of the battery can be suppressed.

2. Second Embodiment

A second embodiment of the invention will be described. The non-aqueous electrolyte battery 20 according to the second embodiment of the invention is used in the non-aqueous electrolyte battery 20 of the second embodiment without maintaining a non-aqueous electrolytic solution in a polymer instead of the gel-state electrolyte 16. In this case, the electrolytic solution is impregnated in the separator 15. The same electrolytic solution as in the first embodiment can be used.

The non-aqueous electrolyte battery 20 having the above configuration can be manufactured, for example, in the following manner. Firstly, the positive electrode 13 and the negative electrode 14 are manufactured. Since the positive electrode 13 and the negative electrode 14 are manufactured in the same manner as in the first embodiment, detailed description will not be made herein.

Next, after the positive electrode lead 11 and the negative electrode lead 12 are attached to the positive electrode 13 and the negative electrode 14, the positive electrode 13 and the negative electrode 14 are laminated through the separator 15 and wound, and the protective tape 17 is adhered to the outermost circumferential portion.

Thereby, a wound electrode body having a configuration from which the electrolyte 16 is omitted is obtained in the configuration of the wound electrode body 10. After the wound electrode body is interposed in the exterior member 1, the electrolytic solution is injected, and the exterior member 1 is sealed. Thereby, the non-aqueous electrolyte battery 20 according to the second embodiment of the invention is obtained.

[Effects]

The same effects as in the first embodiment can be obtained in the second embodiment of the invention. In the second embodiment of the invention, gas generation in the electrolytic solution can be suppressed, and swelling of the battery can be suppressed.

3. Third Embodiment

Next, the configuration of the non-aqueous electrolyte battery 20 according to a third embodiment of the invention will be described with reference to FIGS. 3 to 4. FIG. 3 shows the configuration of the non-aqueous electrolyte battery 20 according to the third embodiment of the invention.

(3-1) Configuration of the Non-aqueous Electrolyte Battery

The non-aqueous electrolyte battery 20 is a so-called cylindrical battery, and has a wound electrode body 30 in which a band-shaped positive electrode 31 and a band-shaped negative electrode 32 are wound through a separator 33 in an almost hollow cylindrical battery can 21.

An electrolytic solution, which is a liquid electrolyte, is impregnated in the separator 33. The battery can 21 is composed of, for example, nickel (Ni)-plated iron (Fe), in which one end portion is sealed, and the other end portion is opened. In the battery can 21, a pair of insulating plates 22 and 23 is disposed respectively and vertically with respect to the winding circumferential face so that the wound electrode body 30 is interposed.

A battery case lid 24, a safety valve mechanism 25 provided inside the battery case lid 24, and a positive temperature coefficient (PTC) element 26 are swaged through a gasket 27 so as to be attached to the opened end portion of the battery can 21. Thereby, the inside of the battery can 21 is sealed.

The battery case lid 24 is composed of, for example, the same material as the battery can 21. The safety valve mechanism 25 is electrically connected to the battery case lid 24 through the positive temperature coefficient element 26. The safety valve mechanism 25 turns back a disc plate 25A when internal short-circuiting occurs or the internal pressure of the battery becomes above a certain degree due to external heating and the like so that the electrical connection between the battery can lid 24 and the wound electrode body 30 is cut off.

The positive temperature coefficient element 26 limits an electric current by an increase in the resistance value when the temperature is increased, and prevents abnormal heat generation caused by a large electric current. The gasket 27 is composed of, for example, an insulating material, and has asphalt coated on the surface.

The wound electrode body 30 is wound around, for example, a center pin 34. A positive electrode lead 35 composed of aluminum (Al) or the like is connected to the positive electrode 31 of the wound electrode body 30, and a negative electrode lead 36 composed of nickel (Ni) or the like is connected to the negative electrode 32. The positive electrode lead 35 is welded to the safety valve mechanism 25 so as to be electrically connected to the battery case lid 24, and the negative electrode lead 36 is welded to the battery can 21 so as to be electrically connected.

FIG. 4 is a cross-sectional view showing an enlarged part of the wound electrode body 30 shown in FIG. 3. The wound electrode body 30 is obtained by laminating the positive electrode 31 and the negative electrode 32 through the separator 33 and winding them.

The positive electrode 31 has, for example, a positive electrode collector 31A and positive electrode active material layers 31B provided on both faces of the positive electrode collector 31A. For example, the negative electrode has, for example, a negative electrode collector 32A and negative electrode active material layers 32B provided on both faces of the negative electrode collector 32A. The respective configurations of the positive electrode collector 31A, the positive electrode active material layer 31B, the negative electrode collector 32A, the negative electrode active material layer 32B, the separator 33, and the electrolytic solution are the same as those of the positive electrode collector 13A, the positive electrode active material layer 13B, the negative electrode collector 14A, the negative electrode active material layer 14B, the separator 15, and the electrolytic solution in the first embodiment.

(3-2) Method of Manufacturing the Non-aqueous Electrolyte Battery

Next, the method of manufacturing the non-aqueous electrolyte battery 20 according to the third embodiment of the invention will be described. The positive electrode 31 is manufactured in the following manner. Firstly, a positive electrode active material, a bonding agent, and the heteropoly acid and/or heteropoly acid compound are mixed so as to prepare a positive electrode compound, and the positive electrode compound is dispersed in a solvent, such as N-methyl-2-pyrrolidone, thereby preparing a positive electrode compound slurry. Next, after the positive electrode compound slurry is coated and dried on the positive electrode collector 31A, compacting is carried out using a roll press machine or the like so as to form the positive electrode active material layer 31B, thereby obtaining the positive electrode 31. Meanwhile, the mixed amount of the heteropoly acid and/or heteropoly acid compound, and the like are the same as in the first embodiment, and therefore detailed description will not be made.

The negative electrode 32 is manufactured in the following manner. Firstly, a negative electrode active material and a bonding agent are mixed so as to prepare a negative electrode compound, and the negative electrode compound is dispersed in a solvent, such as N-methyl-2-pyrrolidone, thereby preparing a negative electrode compound slurry. Next, after the negative electrode compound slurry is coated and dried on the negative electrode collector 32A, compacting is carried out using a roll press machine or the like so as to form the negative electrode active material layer 32B, thereby obtaining the negative electrode 32.

Next, a positive electrode lead 35 is attached to the positive electrode collector 31A by welding, and a negative electrode lead 36 is attached to the negative electrode collector 32A by welding. After that, the positive electrode 31 and the negative electrode 32 are laminated through the separator 33, the front end portion of the positive electrode lead 35 is welded to the safety valve mechanism 25, and the front end portion of the negative electrode lead 36 is welded to the battery can 21.

In addition, the wound positive electrode 31 and negative electrode 32 are interposed between a pair of insulating plates 22 and 23, and accommodated in the battery can 21. After the positive electrode 31 and the negative electrode 32 are accommodated in the battery can 21, the electrolyte is injected in the battery can 21, and is impregnated in the separator 33.

After that, the battery case lid 24, the safety valve mechanism 25, and the positive temperature coefficient (PTC) element 26 are swaged to the opening end portion of the battery can 21 through the gasket 27 so as to be fixed. Thereby, the non-aqueous electrolyte battery 20 shown in FIG. 3 is manufactured.

[Effects]

In the non-aqueous electrolyte battery 20 according to the third embodiment of the invention, gas generation can be suppressed, and breakage due to an increase in the internal pressure can be prevented.

4. Fourth Embodiment

The configuration example of the non-aqueous electrolyte battery 20 according to a fourth embodiment of the invention will be described. The non-aqueous electrolyte battery 20 according to the fourth embodiment of the invention has a square shape as shown in FIG. 5.

The non-aqueous electrolyte battery 20 is manufactured in the following manner. As shown in FIG. 5, firstly, a wound electrode body 53 is accommodated in an exterior can 51, which is a square-type can made of, for example, a metal, such as aluminum (Al) and iron (Fe).

In addition, after an electrode pin 54 provided in a battery case lid 52 and an electrode terminal 55 derived from the wound electrode body 53 are connected to each other, and the opening is sealed with the electrode case lid 52, an electrolytic solution is injected from an electrolytic solution injecting opening 56, thereby performing sealing with a sealing member 57. Thereby, the non-aqueous electrolyte battery 20 can be obtained.

Meanwhile, the wound electrode body 53 is obtained by laminating the positive electrode and the negative electrode through the separator, and winding them. Since the positive electrode, the negative electrode, the separator, and the electrolytic solution are the same as in the first embodiment, detailed description will not be made.

[Effects]

In the non-aqueous electrolyte battery 20 according to the fourth embodiment of the invention, gas generation in the electrolytic solution can be suppressed, and breakage due to an increase in the internal pressure caused by the gas generation can be prevented.

5. Fifth Embodiment

In a fifth embodiment, the reduced product of the polyacid and/or polyacid compound is precipitated on the surface of the negative electrode 14. In the fifth embodiment, the non-aqueous electrolyte battery 20 in which the reduced product of the polyacid and/or polyacid compound is precipitated on the surface of the negative electrode 14 by including the heteropoly acid and/or heteropoly acid compound in the electrolyte will be described.

(5-1) Configuration of the Non-aqueous Electrolyte Battery

[Positive Electrode]

The positive electrode 13 is the same as in the first embodiment except that the heteropoly acid is not included.

[Negative Electrode]

The negative electrode 14 has, for example, the negative electrode collector 14A and the negative electrode active material layers 14B provided on both surfaces of the negative electrode collector 14A. The negative electrode collector 14A is composed of, for example, a metal foil, such as a copper foil. In addition, the reduced product of the polyacid and/or polyacid compound is precipitated on the surface of the negative electrode 14 in the invention. The reduced product of the polyacid and/or polyacid compound is obtained by, for example, electrolyzing and precipitating the heteropoly acid and/or heteropoly acid compound. Here, the reduced product of the polyacid and/or polyacid compound refers to the reduced polyacid and/or polyacid compound.

In the invention, for example, the heteropoly acid becomes a polyacid compound having a poorer solubility than the heteropoly acid and is present on the surface of the negative electrode 14 by charging or preliminary charging. In addition, there is a heteropoly acid that is reduced by charging or preliminary charging so as to become a polyacid compound having a poorer solubility than the heteropoly acid and is present on the surface of the negative electrode 14. Furthermore, there is a heteropoly acid that is reduced by charging or preliminary charging so as to become the reduced product of a polyacid compound which is a polyacid compound in a more-reduced state than the heteropoly acid and is present on the surface of the negative electrode 14. In addition, the polyacid and/or polyacid compound may be included in the negative electrode active material layer 14B, that is, between the negative electrode active material particles.

Here, the reducing properties of the precipitated polyacid and/or polyacid compound can be confirmed by X-ray photoelectron spectroscopy (XPS) analysis. In addition, the precipitation of the reduced product of the polyacid and/or polyacid compound can be confirmed by disassembling the charged or preliminary-charged non-aqueous electrolyte battery 20 and taking out the negative electrode 14. For example, if the composition of a precipitate precipitated on the negative electrode collector 14A is confirmed, and the reduced product of the polyacid and/or polyacid compound is precipitated, it can be easily presumed that the reduced product of the polyacid and/or polyacid compound is similarly precipitated on the negative electrode active material layer 14B.

The precipitated amount of the reduced product of the polyacid and/or polyacid compound precipitated in the negative electrode 14 is set to have a proportion in which the ratio of the peak count number of Cu 2p 3/2 (having a peak in the vicinity of 930 eV) to the peak count number of Mo 3d 5/2 is 1000:1 to 10000:1 in an XPS analysis when the negative electrode collector 14A is copper (Cu), and the polyatom is molybdenum (Mo). In addition, at this time, when the surface of the negative electrode collector 14A in which a molybdenum compound is precipitated is analyzed by XPS, the peak location of Mo 3d 5/2 is preferably 232.0 eV to 233.6 eV.

In addition, the precipitated amount of the polyacid and/or polyacid compound precipitated on the negative electrode 14 is set to have a proportion in which the ratio of the peak count number of Cu 2p 3/2 (having a peak in the vicinity of 930 eV) to the peak count number of W 4f 7/2 is 1000:1 to 10000:1 in an XPS analysis when the negative electrode collector 13A is aluminum, and the polyatom is tungsten (W). In addition, at this time, when the surface of the negative electrode collector 14A in which a tungsten compound is precipitated is analyzed by XPS, the peak location of W 4f 7/2 is preferably 32.0 eV to 35.4 eV.

Precipitation of the reduced product of the polyacid and/or polyacid compound on the surface of the negative electrode 14 puts the positive electrode 13 and the negative electrode 14 into contact, and prevents the abrupt flow of a large electric current, whereby the instantaneous heat generation in a secondary battery can be suppressed. This is considered to be because the reduced product of the polyacid and/or polyacid compound precipitated on the surface of the negative electrode 14 increases the strength of the separator 15 that is adhered to the negative electrode 14.

In addition, inclusion of the reduced product of the polyacid and/or polyacid compound on the negative electrode active material 14B can suppress the swelling of the non-aqueous electrolyte battery 20 caused by gas generation in the battery. This is considered to be because the reduced product of the polyacid and/or polyacid compound absorbs and fixes carbon dioxide ($CO_2$) and the like generated in the battery.

[Electrolyte]

The electrolyte is an electrolytic solution including an electrolyte salt and a solvent that dissolves the electrolyte salt. In addition, the heteropoly acid and/or heteropoly acid compound is added to the electrolytic solution in a state in which the non-aqueous electrolyte battery 20 is yet to be charged.

Furthermore, the heteropoly acid and/or heteropoly acid compound is added to the electrolyte in advance in order to precipitate the polyacid and/or polyacid compound on the surface of the negative electrode 14. It is possible to precipitate the polyacid compound on the surface of the negative electrode 14 by carrying out charging or preliminary charging after the manufacturing of the non-aqueous electrolyte battery 20.

In addition, the material as described in the first embodiment can be used as the heteropoly acid and/or heteropoly acid compound. Meanwhile, the weight of the heteropoly acid is a value from which the weight of water of hydration contained in the heteropoly acid is subtracted. In addition, similarly, the weight of the heteropoly acid compound is a value from which the weight of water of hydration contained in the heteropoly acid compound is subtracted.

The heteropoly acid and/or heteropoly acid compound included in the electrolyte can be detected by nuclear magnetic resonance spectroscopy (NMR) in the same manner as in the first embodiment.

(5-2) Method of Manufacturing the Non-aqueous Electrolyte Battery

Hereinafter, the method of manufacturing the non-aqueous electrolyte battery of the invention will be described. A case in which an electrolytic solution is used will be described in the manufacturing method of the fifth embodiment.

[Method of Manufacturing the Positive Electrode]

The method of manufacturing the positive electrode 13 is the same as in the first embodiment except that the heteropoly acid and/or heteropoly acid compound is not mixed during the preparation of the positive electrode compound.

[Method of Manufacturing the Negative Electrode]

The negative electrode 14 is manufactured in the same manner as in the first embodiment.

[Manufacturing of the Electrolyte]

The electrolyte is manufactured in the following manner. Firstly, a non-aqueous solvent and an electrolyte salt are mixed so as to manufacture an electrolytic solution, and, for example, the heteropoly acid and/or heteropoly acid compound is mixed with the electrolytic solution. At this time, it is preferable to add 0.01% by weight to 5.0% by weight of the heteropoly acid and heteropoly acid compound with respect to 100% by weight of the negative electrode active material. When the heteropoly acid and/or heteropoly acid compound is added excessively outside this range, the discharge capacity of the non-aqueous electrolyte battery 20 is degraded. On the other hand, when the heteropoly acid and/or heteropoly acid compound is added in a minute amount outside this range, the safety of the non-aqueous electrolyte battery, which is a purpose of the invention, cannot be obtained.

[Method of Manufacturing the Non-aqueous Electrolyte Battery]

The non-aqueous electrolyte battery 20 can be manufactured in the same manner as in the first embodiment. The non-aqueous electrolyte battery 20 of the fifth embodiment of the invention in which the reduced product of the polyacid and/or polyacid compound is precipitated on the surface of the negative electrode 14 is completed by charging or preliminarily charging the manufactured battery. Meanwhile, as described in detail in the examples, no precipitate is confirmed when the heteropoly acid and/or heteropoly acid compound is not added to the electrolytic solution. Therefore, the precipitate precipitated on the negative electrode is considered to be derived from the heteropoly acid and/or heteropoly acid compound.

[Effects]

In the first embodiment of the invention, the contact between the positive electrode 13 and the negative electrode 14 is suppressed, and an abrupt increase in the battery temperature due to an instantaneous flow of a large electric current is suppressed.

6. Sixth Embodiment

A sixth embodiment of the invention will be described. In the sixth embodiment, the non-aqueous electrolyte battery 20 of the sixth embodiment in which the heteropoly acid and/or heteropoly acid compound is mixed not with the electrolyte, but with the negative electrode active material 14B will be described. Meanwhile, in the sixth embodiment, only differences from the fifth embodiment will be described.

(6-1) Configuration of the Non-aqueous Electrolyte Battery

[Negative Electrode]

The negative electrode active material 14B is composed of, for example, any one or two or more of negative materials that can absorb and discharge lithium and the heteropoly acid and/or heteropoly acid compound as negative active materials, and may also include a conducting agent and a bonding agent according to necessity. The heteropoly acid and/or heteropoly acid compound is precipitated on the surface of the negative electrode 14 as the reduced product of the polyacid and/or polyacid compound by electrolysis. In addition, the reduced product of the polyacid and/or polyacid compound may be included between negative electrode active material particles. In addition, the optimal range of the precipitated amount of the reduced product of the polyacid and/or polyacid compound is preferably 0.01% by weight to 5.0% by weight with respect to 100% by weight of the positive electrode active material. The precipitated amount of the reduced product of the polyacid and/or polyacid compound can be detected by NMR. Meanwhile, the weight of the heteropoly acid is a value from which the weight of water of hydration contained in the heteropoly acid is subtracted. In addition, similarly, the weight of the heteropoly acid compound is a value from which the weight of water of hydration contained in the heteropoly acid compound is subtracted. Meanwhile, the reduced product of the polyacid and/or polyacid compound precipitated on the surface of the negative electrode 14 can be confirmed by detecting the composition of the precipitate precipitated on the negative electrode collector 14A in the same manner as in the fifth embodiment.

[Electrolyte]

The electrolyte is an electrolytic solution including an electrolyte salt and a solvent that dissolves the electrolyte salt. In the sixth embodiment, the heteropoly acid and heteropoly acid compound is not added to the electrolyte.

(6-2) Method of Manufacturing the Non-aqueous Electrolyte Battery

Hereinafter, the method of manufacturing the non-aqueous electrolyte battery of the invention will be described. A case in which a gel electrolyte is used will be described in the manufacturing method of the sixth embodiment.

[Method of Manufacturing the Negative Electrode]

The negative electrode 14 is manufactured in the following manner. Firstly, a negative electrode active material, a bonding agent, and a conducting agent according to necessity are mixed. In addition, the heteropoly acid and/or heteropoly acid compound is dissolved in a solvent, such as N-methyl-2-pyrrolidone, thereby preparing a solution. At this time, it is preferable to add 0.01% by weight to 5.0% by weight of the heteropoly acid and/or heteropoly acid compound with respect to 100% by weight of the negative electrode active material. Meanwhile, the weight of the heteropoly acid is a value from which the weight of water of hydration contained in the heteropoly acid is subtracted. In addition, similarly, the weight of the heteropoly acid compound is a value from which the weight of water of hydration contained in the heteropoly acid compound is subtracted. When the heteropoly acid and/or heteropoly acid compound is added excessively outside this range, the discharge capacity of the non-aqueous electrolyte battery 20 is degraded. On the other hand, when the heteropoly acid and/or heteropoly acid compound is added in a minute amount outside this range, the safety of the non-aqueous electrolyte battery, which is a purpose of the invention, cannot be obtained.

Next, the solution and the mixture are mixed so as to prepare a negative electrode compound, and the negative electrode compound is dispersed in a solvent, such as N-methyl-2-pyrrolidone, thereby producing a negative electrode compound slurry. Next, after the negative electrode compound slurry is coated on the negative electrode collector 14A, and the solvent is dried, compacting is carried out using a roll press machine or the like so as to form the negative electrode active material layer 14B, thereby obtaining the negative electrode 14.

[Method of Manufacturing the Electrolyte and the Non-aqueous Electrolyte Battery]

The electrolyte is manufactured in the following manner. Firstly, a non-aqueous solvent and an electrolyte salt are mixed so as to manufacture an electrolytic solution. In addition, the manufactured electrolytic solution, a polymer compound, and a diluting solution are mixed so as to prepare a sol-state precursor solution. Subsequently, the sol-state precursor solution is coated on the positive electrode active material layer 11B and the negative electrode active material layer 12B, respectively, and, after that, the diluting solvent in the precursor solution is volatized. Thereby, a gel-state electrolyte layer is formed.

Subsequently, with regard to each of the positive electrode 13 and the negative electrode 14 having the gel state electrolyte layer formed therein, the positive electrode lead 11 is attached to the end portion of the positive electrode collector 13A by welding, and the negative electrode lead 12 is attached to the end portion of the negative electrode collector 14A by welding.

Next, after the positive electrode 13 and the negative electrode 14 having the gel electrolyte layer formed thereon are laminated through the separator 15 so as to produce a laminate, the laminate is wound in the longitudinal direction, thereby forming the wound electrode body 10. Finally, for example, the wound electrode body 10 is interposed in the exterior member 1, and sealed by adhering the outer edge portions of the exterior member 1 by thermal fusion and the like. At this time, the adhering film 2 is inserted between the positive electrode lead 11 and the negative electrode lead 12 and the exterior member 1. Furthermore, the manufactured battery is charged or preliminarily charged. Thereby, the non-aqueous electrolyte battery 20 of the second embodiment of the invention in which the reduced product of the polyacid and/or polyacid compound is precipitated on the surface of the negative electrode 14 is completed. Meanwhile, similarly to the fifth embodiment, the precipitate precipitated on the negative electrode is considered to be derived from the heteropoly acid and/or heteropoly acid compound.

In addition, the gel electrolyte layer may be manufactured in the following manner. Firstly, the positive electrode 13 and the negative electrode 14 are manufactured in the above manner, and the positive electrode lead 11 and the negative electrode lead 12 are attached to the positive electrode 13 and the negative electrode 14. In addition, the positive electrode 13 and the negative electrode 14 are laminated through the separator 15 and wound, thereby forming the wound electrode body 10. Next, the wound electrode body 10 is interposed in the exterior member 1, and accommodated in the exterior member 1 by thermally fusing the outer circumferential end portion except one side into a bag shape. Subsequently, an electrolyte composition including an electrolytic solution, a monomer, which is a raw material of a polymer compound, a polymerization initiator, and other materials, such as a polymerization inhibitor, according to necessity, is prepared and injected in the exterior member 1.

After the electrolyte composition is injected and sealed by thermally fusing the opening of the exterior member 1 under a vacuum atmosphere. Next, the gel-state electrolyte is formed by supplying heat so as to polymerize the monomers into a polymer compound.

[Effects]

In the sixth embodiment of the invention, the same effects as in the fifth embodiment can be obtained. That is, in the sixth embodiment, the contact between the positive electrode 13 and the negative electrode 14 is suppressed, and an abrupt increase in the battery temperature due to an instantaneous flow of a large electric current is suppressed. Furthermore, the swelling of the battery due to gas generation caused by the decomposition of the electrolytic solution can be suppressed.

7. Seventh Embodiment

In a seventh embodiment, the polyacid and/or polyacid compound is precipitated on the surface of the positive electrode 13. In the seventh embodiment, the non-aqueous electrolyte battery 20 in which the polyacid and/or polyacid compound is precipitated on the surface of the positive electrode 13 by including the heteropoly acid and/or heteropoly acid compound in the positive electrode compound will be described.

(7-1) Configuration of the Non-aqueous Electrolyte Battery

[Positive Electrode]

The positive electrode active material layer 13B is configured to include, for example, a positive electrode active material, a conducting material, such as a carbon material, a bonding material, such as polyvinylidene fluoride and polytetrafluoroethylene, and the polyacid and/or polyacid compound. The heteropoly acid and/or heteropoly acid compound is precipitated on the surface of the positive electrode 13 as the polyacid and/or polyacid compound by electrolysis. In addition, the polyacid and polyacid compound may be included between positive electrode active material particles.

The precipitation of the polyacid and/or polyacid compound on the surface of the positive electrode 13 can be confirmed by disassembling the charged or preliminary-charged non-aqueous electrolyte battery 20 and taking out the positive electrode 13. For example, the polyacid and/or polyacid compound on the positive electrode collector 13A can be confirmed by disassembling the charged or preliminary-charged non-aqueous electrolyte battery 20, taking out the positive electrode 13, and measuring the composition of the precipitate precipitated on the positive electrode collector 13A.

The precipitated amount of the polyacid and/or polyacid compound precipitated on the positive electrode 13 can be confirmed by an X-ray photoelectron spectroscopy (XPS) analysis. The precipitated amount of the polyacid and/or polyacid compound is set to have a proportion in which the ratio of the peak count number of Al 2p (having a peak in the vicinity of 70 eV) to the peak count number of Mo 3d 5/2 is 1:1 to 10000:1 in an XPS analysis when the positive electrode collector 13A is aluminum (Al), and the polyatom is molybdenum (Mo). In addition, at this time, when the surface of the positive electrode collector 13A in which a molybdenum compound is precipitated is analyzed by XPS, the peak location of Mo 3d 5/2 is preferably 228.5 eV to 232.0 eV.

In addition, the precipitated amount of the polyacid and/or polyacid compound precipitated in the positive electrode 13 is set to have a proportion in which the ratio of the peak count number of Al 2p (having a peak in the vicinity of 70 eV) to the peak count number of W 4f 7/2 is 1:1 to 10000:1 in an XPS analysis when the positive electrode collector 13A is aluminum, and the polyatom is tungsten (W). In addition, at this time, when the surface of the positive electrode collector 13A in which a tungsten compound is precipitated is analyzed by XPS, the peak location of W 4f 7/2 is preferably 35.4 eV to 36.9 eV.

[Negative Electrode]

The negative electrode active material layer 14B is configured to include, for example, any one or two or more of negative electrode materials that can absorb and discharge lithium as negative electrode active materials, and may also include a conducting agent and a bonding agent according to necessity.

[Electrolyte]

The electrolyte is an electrolytic solution including an electrolyte salt and a solvent that dissolves the electrolyte salt. In addition, the electrolyte may be a gel electrolyte by an electrolytic solution and a polymer compound.

(7-2) Method of Manufacturing the Non-aqueous Electrolyte Battery

Hereinafter, the method of manufacturing the non-aqueous electrolyte battery of the invention will be described. A case in which a gel electrolyte is used will be described in the manufacturing method of the seventh embodiment.

[Method of Manufacturing the Positive Electrode]

The positive electrode 13 is manufactured in the following manner. Firstly, a positive electrode active material, a bonding agent, and a conducting agent are mixed. In addition, the heteropoly acid and/or heteropoly acid compound is dissolved in a solvent, such as N-methyl-2-pyrrolidone, thereby preparing a solution. At this time, it is preferable to add 0.01% by weight to 5.0% by weight of the heteropoly acid and/or heteropoly acid compound with respect to 100% by weight of the positive electrode active material. Meanwhile, the weight of the heteropoly acid is a value from which the weight of water of hydration contained in the heteropoly acid is subtracted. In addition, similarly, the weight of the heteropoly acid compound is a value from which the weight of water of hydration contained in the heteropoly acid compound is subtracted. When the heteropoly acid and/or heteropoly acid compound is added excessively outside this range, the discharge capacity of the non-aqueous electrolyte battery 20 is degraded. On the other hand, when the heteropoly acid and/or heteropoly acid compound is added in a minute amount outside this range, the safety of the non-aqueous electrolyte battery, which is a purpose of the invention, cannot be obtained.

Next, the solution and the mixture are mixed so as to prepare a positive electrode compound, and the positive electrode compound is dispersed in a solvent, such as N-methyl-2-pyrrolidone, thereby producing a positive electrode compound slurry. Next, after the positive electrode compound slurry is coated on the positive electrode collector 13A, and the solvent is dried, compacting is carried out using a roll press machine or the like so as to form the positive electrode active material layer 13B, thereby obtaining the positive electrode 13.

[Method of Manufacturing the Electrolyte and the Non-aqueous Electrolyte Battery]

The electrolyte is manufactured in the following manner. Firstly, a non-aqueous solvent and an electrolyte salt are mixed so as to manufacture an electrolytic solution. In addition, the manufactured electrolytic solution, a polymer compound, and a diluting solution are mixed so as to prepare a sol-state precursor solution. Subsequently, the sol-state precursor solution is coated on the positive electrode active material layer 11B and the negative electrode active material layer 12B, respectively, and, after that, the diluting solvent in the precursor solution is volatized. Thereby, a gel-state electrolyte layer is formed.

Subsequently, with regard to each of the positive electrode 13 and the negative electrode 14 having the gel state electrolyte layer formed therein, the positive electrode lead 11 is attached to the end portion of the positive electrode collector 13A by welding, and the negative electrode lead 12 is attached to the end portion of the negative electrode collector 14A by welding.

Next, after the positive electrode 13 and the negative electrode 14 having the gel electrolyte layer formed thereon are laminated through the separator 15 so as to produce a laminate, the laminate is wound in the longitudinal direction, thereby forming the wound electrode body 10. Finally, for example, the wound electrode body 10 is interposed in the exterior member 1, and sealed by adhering the outer edge portions of the exterior member 1 by thermal fusion and the like. At this time, the adhering film 2 is inserted between the positive electrode lead 11 and the negative electrode lead 12 and the exterior member 1. Furthermore, the manufactured battery is charged or preliminarily charged. Thereby, the non-aqueous electrolyte battery 20 of the seventh embodiment of the invention in which the reduced product of the polyacid and/or polyacid compound is precipitated on the surface of the positive electrode 13 is completed. Meanwhile, similarly to the fifth embodiment, the precipitate precipitated on the positive electrode is considered to be derived from the heteropoly acid and/or heteropoly acid compound.

In addition, the gel electrolyte layer may be manufactured in the following manner. Firstly, the positive electrode 13 and the negative electrode 14 are manufactured in the above manner, and the positive electrode lead 11 and the negative electrode lead 12 are attached to the positive electrode 13 and the negative electrode 14. In addition, the positive electrode 13 and the negative electrode 14 are laminated through the separator 15 and wound, thereby forming the wound electrode body 10. Next, the wound electrode body 10 is interposed in the exterior member 1, and accommodated in the exterior member 1 by thermally fusing the outer circumferential end portion except one side into a bag shape. Subsequently, an electrolyte composition including an electrolytic solution, a monomer, which is a raw material of a polymer compound, a polymerization initiator, and other materials, such as a polymerization inhibitor, according to necessity, is prepared and injected in the exterior member 1.

After the electrolyte composition is injected the opening of the exterior member 1 is sealed by thermally fusing under a vacuum atmosphere. Next, the gel-state electrolyte is formed by supplying heat so as to polymerize the monomers into a polymer compound.

[Effects]

In the seventh embodiment of the invention, the same effects as in the fifth embodiment can be obtained. That is, in the seventh embodiment, the contact between the positive electrode 13 and the negative electrode 14 is suppressed, and an abrupt increase in the battery temperature due to an instantaneous flow of a large electric current is suppressed. Furthermore, the swelling of the battery due to gas generation caused by the decomposition of the electrolytic solution can be suppressed.

8. Eighth Embodiment

In an eighth embodiment, the polyacid and/or polyacid compound is precipitated in the positive electrode 13 and/or the negative electrode 14 by carrying out preliminary charging in a state in which the non-aqueous electrolyte battery 20 is embossed from the outside so as to prevent swelling from occurring during charging. Meanwhile, the material as described in the first embodiment can be used as the heteropoly acid and/or heteropoly acid compound used in the eighth embodiment.

(8-1) Configuration of the Non-aqueous Electrolyte Battery

[Positive Electrode]

The positive electrode 13 has, for example, the positive electrode collector 13A and the positive electrode active material layers 13B provided on both sides of the positive electrode collector 13A, and the same positive electrode active material, conducting agent, and bonding agent as in the first embodiment can be used. In the eighth embodiment, the polyacid and/or polyacid compound is precipitated on the surface of the positive electrode 13 and/or in the positive electrode active material layer 13B, that is, in the gap between the positive electrode active materials. The polyacid and/or polyacid compound is precipitated, similarly to the fifth embodiment, by, for example, electrolyzing the heteropoly acid and/or heteropoly acid compound.

[Negative Electrode]

The negative electrode 14 has, for example, the negative electrode collector 14A and the negative electrode active material layers 14B provided on both sides of the negative electrode collector 14A, and the same negative electrode active material, and bonding agent as in the first embodiment can be used. In the eighth embodiment, the polyacid and/or polyacid compound is precipitated on the surface of the negative electrode 14 and/or on the negative electrode active material layer 14B, that is, in the gap between the negative electrode active materials. The polyacid and/or polyacid compound is precipitated, similarly to the fifth embodiment, by, for example, electrolyzing the heteropoly acid and/or heteropoly acid compound.

[Separator]

The separator 15 is composed of the same porous film, and the like as in the first embodiment, and, furthermore, has the polyacid and/or polyacid compound precipitated at least in some of pores formed on the surface of the separator 15.

In the invention, for example, the heteropoly acid becomes a polyacid having a lower solubility than the heteropoly acid by charging or preliminary charging, and is precipitated so as to be interposed between the positive electrode 13 or the negative electrode 14 and the separator 15. In addition, the thickness of the separator 15 interposed between the positive electrode 13 and the negative electrode 14 can be maintained, and the positive electrode 13 and the negative electrode 14 is not easily brought into contact with each other by, for example, precipitating the polyacid compound at least in some of the pores in the separator 15.

Meanwhile, the polyacid compound to be precipitated is a polyacid compound precipitated after the heteropoly acid is reduced by charging or preliminary charging, and the polyacid compound having a poorer solubility than the heteropoly acid. In addition, there is a polyacid precipitated after becoming the reduced product of a polyacid compound which is a polyacid compound in a more-reduced state than the heteropoly acid by charging or preliminary charging.

(8-2) Method of Manufacturing the Non-aqueous Electrolyte Battery

The non-aqueous electrolyte battery 20 can be manufactured by manufacturing the flat wound electrode body 10 in the same manner as in the first embodiment, covering the wound electrode body with the exterior member 1. After that, for example, embossing the wound electrode body from the top face and the bottom face of the wound electrode body 10, and carrying out preliminary charging in a state in which the non-aqueous electrolyte battery 20 is not swollen during charging. Meanwhile, the positive electrode 13, the negative electrode 14, and the separator 15 are more strongly fixed by carrying out preliminary charging while embossing from the outside. Therefore, it becomes more difficult for shrinkage of the separator 15 to occur. Meanwhile, similarly to the fifth embodiment, the precipitate precipitated on the positive electrode is considered to be derived from the heteropoly acid and/or heteropoly acid compound.

In addition, it is also possible to add the heteropoly acid and heteropoly acid compound not to the positive electrode compound, but to the negative electrode compound, and carry out preliminary charging while carrying out embossing.

[Effects]

Like the eighth embodiment, the separator 15 is fixed to the positive electrode 13 and the negative electrode 14 by precipitating the polyacid and/or polyacid compound on the surface of the exposed portion of the positive electrode collector 13A or the negative electrode collector 14A. Thereby, shrinkage of the separator 15 can be suppressed, and, even when the battery is abnormally heated, it is possible to prevent the positive electrode 13 and the negative electrode 14 from being brought into contact so as to abruptly flow a large electric current, and the instantaneous heat generation in the non-aqueous electrolyte battery 20 can be suppressed.

9. Ninth Embodiment

A ninth embodiment is the non-aqueous electrolyte battery 20 in which the separator 15 having the heteropoly acid and/or heteropoly acid compound supported in a porous film is used. The same material as described in the first embodiment can be used as the heteropoly acid and/or heteropoly acid compound.

(9-1) Configuration of the Non-aqueous Electrolyte Battery

[Positive Electrode]

The positive electrode 13 has, for example, the positive electrode collector 13A and the positive electrode active material layers 13B provided on both sides of the positive electrode collector 13A. For example, a metal foil, such as an aluminum foil, can be used as the positive electrode collector 13A. The positive electrode active material layer 13B includes a positive electrode active material, a conducting agent, such as a carbon material, and a bonding agent, such as polyvinylidene fluoride and polytetrafluoroethylene.

[Negative Electrode]

The negative electrode 14 has, for example, the negative electrode collector 14A and the negative electrode active material layers 14B provided on both sides of the negative electrode collector 14A. For example, a metal foil, such as an aluminum foil, can be used as the negative electrode collector 14A. The negative electrode active material layer 14B includes a negative electrode active material and a bonding agent, such as polyvinylidene fluoride and polytetrafluoroethylene.

[Electrolyte]

The same material as in the first embodiment can be used as the electrolyte.

[Separator]

A porous film having the heteropoly acid and/or heteropoly acid compound supported in advance is used as the separator 15. In the separator 15, the heteropoly acid and/or heteropoly acid compound precipitates a polyacid and/or polyacid compound at least in some of pores in the porous film.

(9-2) Method of Manufacturing the Non-aqueous Electrolyte Battery

[Method of Manufacturing the Positive Electrode]

The positive electrode 13 is manufactured in the same manner as in the first embodiment except that the heteropoly acid and/or heteropoly acid compound is not mixed with the negative electrode compound.

[Method of Manufacturing the Negative Electrode]

The negative electrode 14 is manufactured in the same manner as in the first embodiment except that the heteropoly acid and/or heteropoly acid compound is not mixed with the positive electrode compound.

[Method of Manufacturing the Separator]

Hereinafter, an example of the method of manufacturing the separator 15 in the ninth embodiment will be described.

Firstly, a porous film, such as a porous polyolefin film, is immersed and impregnated by a solution having the heteropoly acid and/or heteropoly acid compound dissolved in a polar organic solvent, such as dimethyl carbonate, and then is dried under a vacuum atmosphere.

[Method of Manufacturing the Non-aqueous Electrolyte Battery]

The non-aqueous electrolyte battery 20 is manufactured in the same manner as in the first electrode except that the separator 15 in which the heteropoly acid and/or heteropoly acid compound is precipitated is used.

Like the ninth embodiment, an adverse effect on the safety-improving effect can be reduced by supporting the heteropoly acid and/or heteropoly acid compound in the separator 15. That is, when the positive electrode compound and the negative electrode compound contain the heteropoly acid and/or heteropoly acid compound, the viscoelasticity of the compounds is changed. In addition, when the electrolyte contains the heteropoly acid and/or heteropoly acid compound, there is a case in which the properties of the electrolyte are changed. Thereby, there is a concern in that a different problem from that of the past may occur in the manufacturing process.

In addition, since the separator 15 is laminated and wound with the positive electrode 13 and the negative electrode 14 in the process of manufacturing the wound electrode body, there is a concern in that the separator may receive strong compression, and the pores in the porous film may be crumpled. When the pores in the porous film are crumpled, there is problem in that the permeation of ions is hindered in a future state in which the electrolyte is impregnated, and the battery responsiveness is degraded.

In contrast to this, the crumpling of the pores can be suppressed by forming the heteropoly acid and/or heteropoly acid compound into a solid particle or a solid film, and precipitating and filling the solid particles of the solid film into the pores in the separator 15. The heteropoly acid and/or heteropoly acid compound precipitated in the pores is eluted into the electrolytic solution by, for example, injecting the electrolytic solution at the latter phase of the battery manufacturing process. Therefore, the pores in the separator 15 are opened, and the permeability of ions is not impaired. Since the degradation of the permeability of ions caused by the sealing or narrowing of the pores in the separator 15 can be prevented, for example, it is possible to suppress the degradation of the cycle retention ratio.

On the other hand, in the non-aqueous electrolyte battery 20, the eluted heteropoly acid and/or heteropoly acid compound exhibits a safety-improving effect.

Examples of the effects of using the heteropoly acid and/or heteropoly acid compound as the material that supports the separator 15, that is, examples of the safety-improving effect of the eluted heteropoly acid and/or heteropoly acid compound include the following.

[Effects]

As described above, when the separator 15 present between the positive electrode 13 and the negative electrode 14 is shrunk to a large extent, large thermal shrinkage occurs in the separator 15, and the internal short-circuit area between the positive electrode 13 and the negative electrode 14 is extended. However, in the ninth embodiment, the heteropoly acid and/or heteropoly acid compound is eluted into the electrolytic solution by, for example, injecting the electrolytic solution when the wound electrode body 10 is covered with the exterior member 1. The eluted heteropoly acid and/or heteropoly acid compound is precipitated again as a polyacid and/or polyacid compound by carrying out the charging or preliminary charging of the non-aqueous electrolyte battery 20. The polyacid and/or polyacid compound is precipitated at least in some of the pores formed on, for example, the surface of the separator 15 among the positive electrode 13, the negative electrode 14, the positive electrode active material layer 13B, and the negative electrode active material layer 14B. Thereby, shrinkage of the separator 15 can be prevented even when the battery temperature becomes the melting point or greater of the separator 15.

10. Tenth Embodiment

In a tenth embodiment, a more detailed embodiment of a film formed on at least some of the surface of the negative electrode as described in the first to ninth embodiments will be described.

[Negative Electrode Film]

The precipitate on the surface of the negative electrode as described in any of the first to ninth embodiments includes a polyacid and/or polyacid compound. The polyacid and/or polyacid compound is amorphous, and, for example, absorbs the non-aqueous electrolyte so as to be present on the surface of the negative electrode as a gel-state negative electrode film. The precipitate including the polyacid and/or polyacid compound is grown and precipitated, for example, in a three dimensional net-like structure during preliminary charging or charging.

In addition, the precipitated polyacid and/or polyacid compound may be reduced at least in some parts, in which the valence of the polyatom is less than hexavalent. Meanwhile, it is preferable that at least some of the precipitated polyacid and/or polyacid compound be not reduced and have hexavalent polyatom ions.

For example, when the polyatom of the polyacid and/or polyacid compound on the surface of the negative electrode is tungsten, it is preferable to include both tungsten ions having a valence of less than hexavalency and hexavalent tungsten ions. Similarly, when the polyatom of the polyacid and/or polyacid compound is, for example, molybdenum, it is preferable to include both molybdenum ions having a valence of less than hexavalency and hexavalent molybdenum ions. When the reduced polyatom ion and the non-reduced polyatom ion are present as a mixture, the stability of the polyacid and/or polyacid compound having a gas-absorbing effect, and improvement in the resistance with respect to the electrolyte can be expected.

In addition, when a layer including the polyacid and/or polyacid compound precipitated on the negative electrode is analyzed by time-of-flight secondary ion mass spectrometer (ToF-SIMS), both of the peak of at least one included in the following secondary ion group (A) and the peak of at least one included in the following secondary ion group (B) may be detected.

Secondary ion group (A): $Li_2OH^+$, $Li_2F^+$, $Li_3F_2^+$, $Li_4F_3^+$, $Li_5F4^+$, $Li_2PO_3^+$, $Li_4PO4^+$, $Li_5PO4F^+$, $Li_3CO_3^+$, $LiF_2^-$, $Li_2F_3^-$, $Li_3F4^-$, $LiPO_2F^-$, $LiPO_3F^-$, $LiPO_2F_3^-$, $LiPF7^-$, $LiP_2Fl_2^-$, $Li_2P_2Fl_3^-$ Secondary ion group (B): $Li_3WO4^+$, $Li_4WO_5F^+$, $WO_3^-$, $WO_3H^-$, $WO_3F^-$, $WO_2F_3^-$, $W_2O_5^-$, $W_2O_6^-$, $W_2O_6F^-$, $MoO_3^-$, $MoO_4H^-$, $MoO_3F^-$, $Mo_2O_6^-$.

This is because there are cases in which a compound generated by a reaction between the non-aqueous electrolyte component and, for example, lithium is present on the surface of the negative electrode by a reaction with the non-aqueous electrolyte on the surface of the negative electrode. It is considered that the presence of such a lithium compound makes a denser film on the surface of the negative electrode.

In addition, the layer including the polyacid and/or polyacid compound precipitated on the negative electrode includes hetero atoms and polyatoms, and the atomic ratio between the hetero atoms and the polyatoms (the number of the polyatoms/the number of hetero atoms) is preferably in a range of 5 to 20. The atomic ratio between the hetero atoms and the polyatoms can be analyzed by, for example, X-ray photoelectron spectroscopy (XPS).

The film can be stably formed by including both the hetero atoms and the polyatoms, and the effect of suppressing gas generation can be increased.

The gel-state film including the amorphous polyacid and/or polyacid compound including one or more polyelements formed on the surface of the negative electrode can be confirmed by, for example, a scanning electron microscope (SEM) as shown in FIG. 6. Meanwhile, FIG. 6 is a SEM image of the surface of the negative electrode after charging, which has been photographed after the electrolytic solution has been washed and dried.

In addition, the precipitation of the amorphous polyacid and/or polyacid compound can be confirmed based on the structure analysis by the X-ray absorption fine structure (XAFS) analysis of the film formed on the surface of the negative electrode and the chemical information of the molecules by the Time-of-Flight Secondary Ion Mass Spectrometry (ToF-SIMS).

FIG. 7 shows an example of a secondary ion spectrum by Time-of-Flight Secondary Ion Mass Spectrometry (ToF-SIMS) of the surface of the negative electrode of the non-aqueous electrolyte battery in which the negative electrode film is formed by adding silicon tungstate to the battery system and carrying out charging. It is found from FIG. 7 that molecules having tungsten (W) and oxygen (O) as component elements are present.

In addition, FIG. 8 shows an example of the radial structure function of a W—O bond obtained by carrying out Fourier-transformation on the spectrum by an X-ray absorption fine structure (XAFS) analysis on the surface of the negative electrode of the non-aqueous electrolyte battery in which the negative electrode film is formed by adding silicon tungstate to the battery system and carrying out charging. In addition, FIG. 8 shows an example of the radial structure function of a W—O bond of tungstic acids ($WO_3$ and $WO_2$), which are polyacids that can be used in the invention, and silicon tungstate ($H_4(SiW_{12}O_{40}) \cdot 26H_2O$), which is a heteropoly acid, together with the analysis results of the negative electrode film.

It is found from FIG. 8 that the peak L1 of the precipitate on the surface of the negative electrode and the respective peaks L2, L3, and L4 of silicon tungstate ($H_4(SiW_{12}O_{40}) \cdot 26H_2O$), tungsten dioxide ($WO_3$), and tungsten trioxide ($WO_2$) have peaks at different locations, and have different structures. In the tungsten dioxide ($WO_2$) and tungsten trioxide ($WO_3$) of typical tungsten oxides, and silicon tungstate ($H_4(SiW_{12}O_{40}) \cdot 26H_2O$), which is the starting material of the invention, it can be confirmed from the radial structure function that the major peaks are present in a range of 1.0 Å to 2.0 Å, and peaks are also present in a range of 2.0 Å to 4.0 Å.

In contrast to this, with regard to the distribution of the W—O bond distance of the polyacid having the tungstic acid precipitated in the positive electrode and the negative electrode in the invention as the main component, peaks are confirmed in a range of 1.0 Å to 2.0 Å, but the same clear peak as the peak L1 is not observed outside the range. That is, no peak is substantially observed in a range exceeding 3.0 Å. In such a state, it is confirmed that the precipitate on the surface of the negative electrode is amorphous.

In addition, FIG. 9 shows an example of the radial structure function of a Mo—O bond of molybdenum trioxide ($MoO_3$) and phosphomolybdic acid ($H_3(PMo_{12}O_{40}) \cdot nH_2O$), which are typical molybdenum oxides that can be used in the invention.

As shown in FIG. 9, almost the same results as the case where silicotungstic acid is used are obtained even when, for example, phosphomolybdic acid is used. That is, the peak L1 of the precipitate on the surface of the negative electrode has a peak at a different location from the peak L2 of molybdic trioxide ($MoO_3$) of a molybdenum oxide, and the peak L3 of phosphomolybdic acid ($H_3(PMo_{12}O_{40}) \cdot nH_2O$), and has a different structure. In addition, the peak L1 of the precipitate on the surface of the negative electrode has a peak in a range of 1.5 Å to 3.0 Å, but the same clear peak as the peak L1 is not observed outside the range. That is, no peak is substantially observed in a range exceeding 3.0 Å. In such a state, it is confirmed that the precipitate on the surface of the negative electrode is amorphous.

[Effects]

It is possible to form a denser film and suppress gas generation by forming a film on the surface of the negative electrode in the tenth embodiment.

11. Eleventh Embodiment

In an eleventh embodiment, the non-aqueous electrolyte battery 20 including a positive electrode in which a bonding agent containing a fluorine-containing copolymer composed of a repeating unit that is based on fluorine-containing monomers composed of vinylidene fluoride (VdF), hexafluoropropylene (HFP), and tetrafluoroethylene (TFE) or chlorotrifluoroethylene (CTFE) is used, and the heteropoly acid and/or heteropoly acid compound in the battery system will be described.

In the eleventh invention, the gel-state film as described in detail in the tenth embodiment is formed on the surface of the negative electrode.

In recent years, an increase in the capacity and the power has been in progress in the non-aqueous electrolyte battery, and a decrease in the amount of the bonding agent has been in progress in order to realize the increase in the capacity and the power in batteries whose thickness and weight are reduced. Meanwhile, high adhesiveness at the interface between the positive electrode and the negative electrode is necessary for the increase in the capacity and the power of the battery, and there is demand for an electrode having high flexibility in order to obtain the adhesiveness at the battery interface.

When a low-flexibility battery is used, there is a concern that cracking in the active material layer may occur in a process for manufacturing a wound-type battery element. In addition, there is another concern that the battery will be broken due to an increase in the battery volume caused by charging and discharging, or the change in the battery volume will cause strains and voids in the battery such that the precipitation of lithium occurs while the battery is used. Particularly, since the volume change of the negative electrode caused by charging and discharging is large in the non-aqueous electrolyte battery in which a metal-based negative electrode active material or an alloy-based negative electrode active material is used, such a problem becomes liable to occur.

FIG. 11A is a cross-sectional view of a laminate film-type non-aqueous electrolyte battery 20 before charging. When a low-flexibility battery is used, the non-aqueous electrolyte battery 20 is strained by the volume change of the battery caused by the first charging after the first charging as shown in FIG. 11B. In addition, repetition of charging and discharging forms a state in which the non-aqueous electrolyte battery 20 is strained, and an interface is not closely formed between the positive electrode and the negative electrode. Lithium is liable to be precipitated in voids generated between the positive electrode and the negative electrode, and the thickness of the consequent non-aqueous electrolyte battery is significantly increased as shown in FIG. 11C. Accordingly, cycle characteristics and safety are degraded.

In order to solve the above problem, a variety of studies have been made regarding bonding agents used for the positive electrode with a purpose of obtaining an electrode having a high flexibility. For example, a study was made regarding copolymerizing vinylidene fluoride (VdF), which is a monomer used as an ordinary bonding agent, and another monomer that can develop flexibility. However, in a bonding agent for which the above composition is changed, the stability with respect to non-aqueous electrolytes is degraded, the bonding agent is swollen such that the resistance in the positive electrode active material layer is increased, and battery characteristics are degraded. In addition, there are cases in which the bonding agent is swollen and dissolved with respect to the non-aqueous electrolyte, and the function as the bonding agent is degraded. In the positive electrode whose function as the bonding agent is degraded, separation or chipping of the positive electrode active material layer occurs, which results in degradation of the safety.

Therefore, the eleventh embodiment suggests a non-aqueous electrolyte battery in which a film is formed on the surface of the negative electrode so as to increase the adhesiveness between the separator and the negative electrode, and the flexibility of the positive electrode is improved, thereby suppressing the battery strain caused by charging and discharging of the battery, and improving the battery characteristics.

(11-1) Configuration of the Non-aqueous Electrolyte Battery
[Positive Electrode]

The positive electrode active material layer 13B is configured by including, for example, a positive electrode active material, a conducting agent, such as a carbon material, a bonding agent containing a fluorine-containing copolymer composed of a repeating unit that is based on fluorine-containing monomers composed of vinylidene fluoride (VdF), hexafluoropropylene (HFP), and tetrafluoroethylene (TFE) or chlorotrifluoroethylene (CTFE), and the heteropoly acid and/or heteropoly acid compound.

Meanwhile, since the same materials as in each of the above embodiments can be used except the bonding agent, description will not be made.

In the eleventh embodiment, hexafluoropropylene (HFP) and tetrafluoroethylene (TFE) or chlorotrifluoroethylene (CTFE) are copolymerized in order to supply flexibility to the positive electrode active material layer.

Here, with regard to the bonding agent containing a fluorine-containing copolymer composed of a repeating unit that is based on fluorine-containing monomers composed of vinylidene fluoride (VdF), hexafluoropropylene (HFP), and tetrafluoroethylene (TFE), it is preferable to copolymerize vinylidene fluoride (VDF) in a range of 55 mol % to 85 mol %, hexafluoropropylene (HFP) in a range of 1 mol % to 10 mol %, and tetrafluoroethylene (TFE) in a range of 10 mol % to 40 mol %.

In addition, with regard to the bonding agent containing a fluorine-containing copolymer composed of a repeating unit that is based on fluorine-containing monomers composed of vinylidene fluoride (VdF) and at least one of hexafluoropropylene (HFP) and chlorotrifluoroethylene (CTFE), it is preferable to copolymerize vinylidene fluoride (VDF) in a range of 85 mol % to 99 mol %, hexafluoropropylene (HFP) and tetrafluoroethylene (TFE) in a range of 1 mol % to 15 mol % in a total.

When the copolymerization fraction of vinylidene fluoride (VdF) is larger than this range, the flexibility of the positive electrode 13 cannot be obtained, and cracking in the positive electrode active material layer 13B during manufacturing of a battery element, strain of the battery element during charging and discharging, or breakage of the positive electrode 13 are caused. In addition, when the copolymerization fraction of vinylidene fluoride (VdF) is smaller than the range, the bonding agent is swollen so as to lose the function as the bonding agent, and the positive electrode active material layer 13B is separated from the positive electrode collector 13A such that the amount of the positive electrode active material that contributes to the battery reaction is reduced.

Meanwhile, the fluorine-containing copolymer may include other monomers as the repeating unit. In addition, other bonding agents may be used together with the fluorine-containing copolymer. The bonding agent in the eleventh embodiment includes the fluorine-containing copolymer, and may be added in an ordinary added amount, such as 1% by weight to 10% by weight.

[Negative Electrode]

The negative electrode 14 has, for example, the negative electrode collector 14A and the negative electrode active material layers 14B provided on both surfaces of the negative electrode collector 14A. The same negative electrode active material, bonding agent, and the like as in the first embodiment can be used. In the eleventh embodiment, the polyacid and/or polyacid compound is precipitated at least on the surface of the negative electrode 14. The polyacid and/or polyacid compound is, similarly to the fifth embodiment, precipitated by, for example, electrolyzing the heteropoly acid and/or heteropoly acid compound.

Meanwhile, while carbon-based materials, metal or alloy-based materials can be used as the negative electrode active material, particularly, a more significant effect can be obtained when a metal or alloy-based material is used as the negative electrode active material. The same metal or alloy-based material as in the first embodiment can be used.

[Separator]

The separator 15 is composed of the same porous film and the like as in the first embodiment, and, furthermore, the adhesiveness of the negative electrode 14 is maintained by infiltration of the polyacid and/or polyacid compound precipitated on the surface of the negative electrode 14 at least in some of pores formed on the surface of the separator 15.

The polyacid and/or polyacid compound precipitated between the negative electrode 14 and the separator 15 in the eleventh embodiment are the same polyacid and/or polyacid compound as in the eighth embodiment.

[Electrolyte]

The electrolyte is an electrolytic solution including an electrolyte salt and a solvent that dissolves the electrolyte salt. In addition, the electrolyte may be formed into a gel-state electrolyte by an electrolytic solution and a polymer compound.

(11-2) Method of Manufacturing the Non-aqueous Electrolyte Battery

Since the non-aqueous electrolyte battery 20 in the eleventh embodiment can be manufactured by the same method as in the other embodiments except that the above bonding agent is used, description will not be made. Meanwhile, the battery system contains the heteropoly acid and/or heteropoly acid compound in order to precipitate the polyacid and/or polyacid compound on the surface of the negative electrode 14. The heteropoly acid and/or heteropoly acid compound may be added to any of the positive electrode compound, the negative electrode compound, or the non-aqueous electrolyte.

Meanwhile, when a thin non-aqueous electrolyte battery in which the laminate film 26 is used is manufactured, a more preferred battery composition can be made by carrying out the preliminary charging of the non-aqueous electrolyte battery while carrying out embossing from the outside of the battery like the eighth embodiment.

In addition, the same effects can be obtained even for a cylindrical battery.

[Effects]

In the eleventh embodiment of the invention, the productivity of the non-aqueous electrolyte battery, the battery characteristic-improving effect, and the like can be obtained. That is, since the negative electrode 14 and the separator 15 are adhered so as to suppress degradation of the battery characteristics, and a physical pressure is applied, it is possible to suppress the volume change of the positive electrode 13. In addition, since the flexibility of the positive electrode 13 is high, the adhesiveness between the positive electrode 13 and the negative electrode 14 is maintained, and voids due to deformation are not easily generated. In addition, since cracking in the manufacturing process can be prevented, it is possible to obtain a production cost-improving effect. These effects can be developed significantly by combining with the heteropoly acid and/or heteropoly acid compound.

12. Twelfth Embodiment

In a twelfth embodiment, a laminate film-type non-aqueous electrolyte battery 20 in which a polymer material, such as polyvinylidene fluoride, is adhered to the separator in advance so as to form a gel electrolyte layer will be described. Meanwhile, in this embodiment, the heteropoly acid and/or heteropoly acid compound may be added to any of the positive electrode compound, the negative electrode compound, and the non-aqueous electrolyte. Hereinafter, an example in which the heteropoly acid is added to the non-aqueous electrolytic solution will be described.

(12-1) Configuration of the Non-aqueous Electrolyte Battery

[Separator]

The separator 15 is electrically stable, and has a polymer compound adhered to the surface of a porous film or the like that is chemically stable with respect to the positive electrode active material, the negative electrode active material, or the solvent. Any substance that absorbs the non-aqueous solvent so as to be gelatinized may be used as the polymer compound, and examples thereof include fluorine-based polymer compounds, such as polyfluorinated vinylidene and copolymers of vinylidene fluoride and hexafluoropropylene, ether-based polymer compounds, such as polyethylene oxide and crosslinking bodies including polyethylene oxide, substances including polyacrylonitrile, polypropylene oxide, or polymethyl methacrylate as the repeating unit. Any one may be used singly, or a mixture of two or more may be used as the polymer compound.

The polymer compound adhered to the surface of the porous film or the like absorbs the non-aqueous electrolytic solution and is gelatinized by heating so that a gel electrolyte layer is formed. Therefore, the gel electrolyte-forming process on the surface of the electrode becomes unnecessary.

[Positive Electrode]

The positive electrode 13 has, for example, the positive electrode collector 13A and the positive electrode active material layers 13B provided on both surfaces of the positive electrode collector 13A. The same positive electrode active material, bonding agent, and the like as in the first embodiment can be used. In the twelfth embodiment, the polyacid and/or polyacid compound is precipitated at least on the surface of the positive electrode 13. The polyacid and/or polyacid compound is, similarly to the fifth embodiment, precipitated by, for example, electrolyzing the heteropoly acid and/or heteropoly acid compound.

Meanwhile, it is preferable to provide an exposed portion of the positive electrode collector 15A in which the positive electrode active material layer 15B is not formed at least at one of both end portions of the positive electrode 15 in order to increase the adhesiveness with the separator 15. The exposed portion of the positive electrode collector 15A is preferably, for example, 5 mm or more. The exposed portion of the positive electrode collector 15A is provided, and the polyacid and/or polyacid compound precipitated on the exposed portion of the positive electrode collector 15A and the gel electrolyte layer are more strongly adhered.

[Negative Electrode]

The negative electrode 14 has, for example, the negative electrode collector 14A and the negative electrode active material layers 14B provided on both surfaces of the negative electrode collector 14A. The same negative electrode active material, bonding agent, and the like as in the first embodiment can be used. In the eighth embodiment, the polyacid and/or polyacid compound is precipitated on the surface of the negative electrode 14. The polyacid and/or polyacid compound is, similarly to the fifth embodiment, precipitated by, for example, electrolyzing the heteropoly acid and/or heteropoly acid compound.

Meanwhile, it is preferable to provide an exposed portion of the negative electrode collector 14A in which the negative electrode active material layer 14B is not formed at least at one of both end portions of the negative electrode 14 in order to increase the adhesiveness with the separator 15. The exposed portion of the negative electrode collector 14A is preferably, for example, 5 mm or more. The exposed portion of the negative electrode collector 14A is provided, and the polyacid and/or polyacid compound precipitated on the exposed portion of the negative electrode collector 14A and the gel electrolyte layer are more strongly adhered.

Here, the polyacid and/or polyacid compound is significantly precipitated, particularly, on the surface of the negative electrode 14. Therefore, the exposed portion of the collector is preferably provided at least at the end portion of the negative electrode 14.

In addition, the positive electrode or the negative electrode and the separator are preferably adhered with a separation strength of 10 [mN/mm] or more.

(12-2) Method of Manufacturing the Non-aqueous Electrolyte Battery

In the embodiment, a porous film having a polymer compound that gelatinizes a non-aqueous electrolytic solution coated on the surface is used as the separator 15.

The separator 15 is obtained by coating a polymer solution having a polymer compound dissolved in an organic solvent with respect to the porous film which is a base material, immersing the porous film in a solvent that has compatibility with respect to the above solvent and is a poor solvent with respect to the polymer compound, and drying the porous film.

As the organic solvent that dissolves the polymer compound include polar solvents, for example, N-methyl-2-pyrrolidone, γ-butyrolactone, N,N-dimethylacetamide, N,N-dimethyl sulfoxide, and the like can be used. In addition, as the solvent that has compatibility with respect to the above organic solvent and is a poor solvent with respect to the polymer compound, for example, water, ethyl alcohol, and propyl alcohol can be used.

In addition, the wound electrode body is manufactured by laminating the positive electrode 13 and the negative electrode 14 through the above separator 15. Next, the wound electrode body is accommodated in a bag-shaped exterior member, and a non-aqueous electrolytic solution to which the heteropoly acid is added is injected from the opening of the exterior member. In addition, the opening portion of the exterior member is sealed by thermal fusion and the like. Finally, heating is carried out while a load is applied to the exterior member, and the separator 15 is adhered to the positive electrode 13 and the negative electrode 14 through the polymer compound. Thereby, the non-aqueous electrolytic solution is impregnated in the polymer compound, and the polymer compound is gelatinized so as to form a gel electrolyte layer, whereby the non-aqueous electrolyte battery is completed.

Precipitates derived from the heteropoly acid compound are precipitated on the surface of the negative electrode by preliminarily charging or charging the manufactured non-aqueous electrolyte battery, thereby forming a film. In addition, the precipitate is strongly adhered to the gel electrolyte layer, and, particularly, the adhesiveness of the interface between the negative electrode and the separator is increased.

<Effects>

In the non-aqueous electrolyte battery 20 as manufactured in the above manner, the adhesiveness between the positive electrode 13 and the negative electrode 14 and the gel electrolyte layer formed on the surface of the separator 15 and the adhesiveness between the gel electrolyte layer and the separator 15 are improved, which leads to the improvement of battery characteristics. While the gel electrolyte can prevent leakage of the non-aqueous electrolytic solution, since the battery characteristics are degraded when the adhesiveness between the gel electrolyte and the electrode is degraded, it is important to improve the adhesiveness of the interface by a method like the embodiment.

In addition, in the non-aqueous electrolyte battery 20 of the present application in which the heteropoly acid and/or heteropoly acid compound is added to the battery system, the polyacid and/or polyacid compound precipitated on the surface of the electrode and the gel electrolyte layer are strongly adhered, and the adhesiveness between the electrode, the gel electrolyte layer and the separator 15 are further increased. Thereby, the effect of preventing the deformation of the electrode or the strain of the battery element caused by expansion and shrinkage of the electrode according to the charging and discharging cycle can be obtained to a greater extent.

Therefore, it is also preferable to apply this configuration to the eleventh embodiment. The negative electrode 14 and the separator 15 can be strongly adhered by the configuration of the embodiment, and the positive electrode 13 having a high flexibility can be obtained by the eleventh embodiment. Thereby, it is possible to further suppress deformation of the battery element.

13. Other Embodiment (Modified Example)

The invention is not limited to the above embodiments of the invention, and a variety of modifications or applications are allowed within a scope not departing from the gist of the invention. For example, the shape of the non-aqueous electrolyte battery is not limited to the above. For example, the shape of the non-aqueous electrolyte battery may be a coin shape.

In addition, for example, a polymer solid electrolyte composed of an ion-conductive polymer material, an inorganic solid electrolyte composed of an inorganic material having ion conductivity, and the like may be used as the electrolyte. Examples of the ion-conductive polymer material include polyether, polyester, polyphosphazene, polysiloxane, and the like. In addition, examples of the inorganic solid electrolyte include ion-conductive ceramics, ion-conductive crystals, ion-conductive glass, and the like.

When natural graphite is used for the negative electrode in the non-aqueous electrolyte battery in which the polyacid and/or polyacid compound is present, a greater effect can be obtained. In the non-aqueous electrolyte battery in which natural graphite is used as the negative electrode active material, since natural graphite has a larger specific surface area than artificial graphite, carbon dioxide generated by swelling during high-temperature storage is absorbed in the surface of the active material, and the recovery capacity after high-temperature storage or the cycle characteristics are significantly degraded while the appearing gas swelling of the battery is small. However, in the non-aqueous electrolyte battery in which the polyacid and/or polyacid compound is present, the recovery capacity after high-temperature storage can reduce the degradation of the cycle characteristics while the gas swelling can be suppressed.

The reasons are not clear, but it is considered to be because $CO_2$ is fixed in the film derived from the polyacid and/or polyacid compound, whereby swelling by gas is suppressed, and an obstacle to discharging and inserting of lithium ions, such as when $CO_2$ is absorbed in the surface of the natural graphite, is not caused.

As other battery configurations, for example, not only a battery in which a wound electrode body obtained by laminating a band-shaped positive electrode and negative electrode through a separator and winding them is used, but also a non-aqueous electrolyte battery in which a so-called stack-type laminate electrode body 60 in which a sheet-shaped positive electrode 61 and negative electrode 62 are laminated through a separator 63 as shown in FIG. 10 can be employed. The non-aqueous electrolyte battery is a laminate film-type non-aqueous electrolyte battery in which the electrode body is formed by laminating the positive electrode and the negative electrode, and covering them with a laminate film, and has the same configuration as in the first embodiment except the configuration of the electrode body. Therefore, hereinafter, only the electrode body of the sixth embodiment will be described.

[Positive Electrode and Negative Electrode]

As shown in FIG. 6, the positive electrode 61 is obtained by forming positive electrode active material layers on both faces of a rectangular positive electrode collector. It is preferable to form the positive electrode collector of the positive electrode 61 integrally with a positive electrode terminal. In addition, likewise, the negative electrode 62 is produced by forming negative electrode active material layers on a rectangular negative electrode collector.

The positive electrode 61 and the negative electrode 62 are laminated in an order of the positive electrode 61, a separator 63, the negative electrode 62, and a separator 63 so as to produce a laminate electrode body 60. The laminate electrode body 60 may be maintained in the laminate state of the electrode by adhering an insulating tape and the like. The laminate electrode body 60 is covered with a laminate film and the like, and is sealed in the battery together with a non-aqueous electrolytic solution. In addition, a gel electrolyte may be used instead of the non-aqueous electrolytic solution.

Furthermore, the battery voltage may be 4.20 V, which is the full charge voltage of an ordinary lithium ion battery, or may be in a range of 4.25 V to 4.80 V, which is higher than that of a lithium ion secondary battery of the past. Particularly, when the battery voltage is in a range of 4.25 V to 4.80 V, a large effect is exhibited.

That is, it is possible to improve the energy density of the battery by carrying out charging so that the maximum charging voltage becomes 4.20 V or more, preferably 4.30 V or more, and more preferably 4.40 V or more in a state of an appropriate positive electrode to negative electrode ratio being designed using a positive electrode active material having a lithium-containing transition metal oxide including lithium cobalt oxide ($LiCoO_2$) or lithium nickel oxide ($LiNiO_2$). In addition, it is also possible to suppress gas generation during continuous charging under a high-temperature environment. However, when the charging voltage becomes high, the reactivity between the positive electrode and the electrolytic solution becomes high, and the generated amount of gas including carbon dioxide ($CO_2$) is increased.

In contrast to this, in the non-aqueous electrolyte battery in which the polyacid and/or polyacid compound is present at least in some of the surface of the positive electrode and the negative electrode, it is confirmed that gas generation is suppressed in the positive electrode, or carbon dioxide ($CO_2$) is generated, but this does not lead to battery swelling and the like. This is considered to be because carbon dioxide ($CO_2$) is fixed in the polyacid and/or polyacid compound. Therefore, even when the charging voltage is increased, swelling of the cell or an increase in the internal pressure is suppressed, and therefore a high energy density can be realized.

EXAMPLE 1

[When Silicomolybdic Acid is Used as the Heteropoly Acid]

Hereinafter, the invention will be described in detail by examples, but the invention is not limited to the examples. Meanwhile, the weight of the heteropoly acid is a value from which the weight of water of hydration contained in the heteropoly acid is subtracted. Similarly, the weight of the heteropoly acid compound is a value from which the weight of water of hydration contained in the heteropoly acid compound is subtracted.

<Sample 1-1>

Firstly, 90 parts by mass of a positive electrode active material composed of complex oxide particles having an average composition of $Li_{0.98}Co_{0.20}Ni_{0.80}O_2$ and an average particle diameter of 12 μm measured by the laser scattering method, 5 parts by mass of graphite, which is a conducting agent, and 5 parts by mass of polyvinylidene fluoride, which is a bonding agent, were mixed.

Subsequently, silicomolybdic acid ($H_4(SiMo_{12}O_{40})$) was dissolved in N-methyl-2-pyrrolidone, thereby manufacturing 10% by weight of a silicomolybdic acid solution. In addition, the silicomolybdic acid solution in which the added amount of silicomolybdic acid corresponded to 0.05% by weight of the positive electrode active material was added to the above mixture. Furthermore, a desired amount of N-methyl-2-pyrrolidone was added and dispersed, thereby manufacturing a slurry-form positive electrode compound.

This positive electrode compound slurry was evenly coated and dried on both faces of a positive electrode collector composed of a 20 μm-thick aluminum foil, and compacting was carried out using a roll press machine so as to form a positive electrode active material layer, thereby manufacturing a positive electrode. Subsequently, a positive electrode lead was attached to the positive electrode collector exposed portion of the positive electrode.

Next, 95 parts by mass of graphite powder that was crushed as a negative electrode active material, and 5 parts by mass of polyvinylidene fluoride as a bonding agent were mixed so as to prepare a negative electrode compound, and, furthermore, the mixture was dispersed in N-methyl-2-pyrrolidone, which was a dispersion medium, thereby producing a negative electrode compound slurry. Next, this negative electrode compound slurry was evenly coated and dried on both faces of a negative electrode collector composed of a 15 μm-thick copper foil, and compacting was carried out using a roll press machine so as to form a negative electrode active material layer, thereby manufacturing a negative electrode. Subsequently, a negative electrode lead was attached to the negative electrode collector exposed portion of the negative electrode.

Next, the manufactured positive electrode and negative electrode were adhered through a separator composed of a 25 μm-thick microporous polyethylene film, wound in the longitudinal direction, and a protective tape was attached to the outermost circumferential portion, thereby manufacturing a wound electrode body. Subsequently, this wound electrode body was filled in an exterior member, three sides of the exterior member were thermally fused, and one side was not thermally fused, thereby having an opening. A damp-proof aluminum laminate film composed by laminating a 25 μm-thick nylon film, a 40 μm-thick aluminum foil, and a 30 μm-thick polypropylene film sequentially from the outermost layer was used as the exterior member.

Subsequently, an electrolytic solution was manufactured by dissolving 1 mol/l of hexafluorophosphate ($LiPF_6$) as an electrolyte salt in a solvent in which ethylene carbonate (EC) and ethyl methyl carbonate (EMC) were mixed so that the mass ratio became 5:5. This electrolytic solution was injected from the opening of the exterior member, and the remaining side of the exterior member was thermally fused at a reduced pressure and sealed, thereby manufacturing a secondary battery.

<Sample 1-2>

A secondary battery was manufactured in the same manner as in Sample 1-1 except that the added amount of the silicomolybdic acid was set to 0.01% by weight of the positive electrode active material.

<Sample 1-3>

A secondary battery was manufactured in the same manner as in Sample 1-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the silicomolybdic acid was not added.

<Sample 1-4>

A secondary battery was manufactured in the same manner as in Sample 1-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicomolybdic acid was set to 0.005% by weight of the positive electrode active material.

<Sample 1-5>

A secondary battery was manufactured in the same manner as in Sample 1-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicomolybdic acid was set to 0.20% by weight of the positive electrode active material.

<Sample 1-6>

A secondary battery was manufactured in the same manner as in Sample 1-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicomolybdic acid was set to 0.50% by weight of the positive electrode active material.

<Sample 1-7>

A secondary battery was manufactured in the same manner as in Sample 1-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicomolybdic acid was set to 1.0% by weight of the positive electrode active material.

<Sample 1-8>

A secondary battery was manufactured in the same manner as in Sample 1-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicomolybdic acid was set to 3.0% by weight of the positive electrode active material.

<Sample 1-9>

A secondary battery was manufactured in the same manner as in Sample 1-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicomolybdic acid was set to 5.0% by weight of the positive electrode active material.

<Sample 1-10>

A secondary battery was manufactured in the same manner as in Sample 1-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicomolybdic acid was set to 7.0% by weight of the positive electrode active material.

<Sample 1-11>

A secondary battery was manufactured in the same manner as in Sample 1-1 except that a positive electrode active material composed of complex oxide particles having an average composition of $Li_{1.02}Co_{0.98}Mg_{0.01}Al_{0.01}O_2$ and an average particle diameter of 14 μm measured by the laser scattering method was used, and the silicomolybdic acid was not added.

<Sample 1-12>

A secondary battery was manufactured in the same manner as in Sample 1-1 except that a positive electrode active material composed of complex oxide particles having an average composition of $Li_{1.02}Co_{0.98}Mg_{0.01}Al_{0.01}O_2$ and an average particle diameter of 14 μm measured by the laser scattering method was used, and the added amount of the silicomolybdic acid was set to 0.005% by weight of the positive electrode active material.

<Sample 1-13>

A secondary battery was manufactured in the same manner as in Sample 1-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the silicomolybdic acid was set to 0.01% by weight of the positive electrode active material.

<Sample 1-14>

A secondary battery was manufactured in the same manner as in Sample 1-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the silicomolybdic acid was set to 0.10% by weight of the positive electrode active material.

<Sample 1-15>

A secondary battery was manufactured in the same manner as in Sample 1-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the silicomolybdic acid was set to 0.50% by weight of the positive electrode active material.

<Sample 1-16>

A secondary battery was manufactured in the same manner as in Sample 1-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the silicomolybdic acid was set to 1.0% by weight of the positive electrode active material.

<Sample 1-17>

A secondary battery was manufactured in the same manner as in Sample 1-1 except that a positive electrode active material composed of complex oxide particles having an average composition of $Li_{0.98}Co_{0.20}Ni_{0.77}Al_{0.03}O_2$ and an average particle diameter of 12 μm measured by the laser scattering method was used, and the added amount of the silicomolybdic acid was set to 1.0% by weight of the positive electrode active material.

<Sample 1-18>

A secondary battery was manufactured in the same manner as in Sample 1-1 except that a positive electrode active material composed of complex oxide particles having an average composition of $Li_{0.98}Co_{0.15}Ni_{0.80}Mn_{0.05}O_2$ and an average particle diameter of 12 μm measured by the laser scattering method was used, and the added amount of the silicomolybdic acid was set to 1.0% by weight of the positive electrode active material.

<Sample 1-19>

A secondary battery was manufactured in the same manner as in Sample 1-1 except that a positive electrode active material composed of complex oxide particles having an average composition of $Li_{0.98}Co_{0.15}Ni_{0.80}Al_{0.04}Ba_{0.01}O_2$ and an average particle diameter of 12 μm measured by the laser scattering method was used, and the added amount of the silicomolybdic acid was set to 1.0% by weight of the positive electrode active material.

<Sample 1-20>

A secondary battery was manufactured in the same manner as in Sample 1-1 except that a positive electrode active material composed of complex oxide particles having an average composition of $Li_{0.98}Co_{0.15}Ni_{0.80}Al_{0.04}Sn_{0.01}O_2$ and an average particle diameter of 12 μm measured by the laser scattering method was used, and the added amount of the silicomolybdic acid was set to 1.0% by weight of the positive electrode active material.

<Sample 1-21>

A secondary battery was manufactured in the same manner as in Sample 1-1 except that a positive electrode active material composed of complex oxide particles having an average composition of $Li_{0.98}Co_{0.28}Ni_{0.70}Al_{0.02}O_2$ and an average particle diameter of 12 μm measured by the laser scattering method was used, and the added amount of the silicomolybdic acid was set to 1.0% by weight of the positive electrode active material.

<Sample 1-22>

A secondary battery was manufactured in the same manner as in Sample 1-1 except that a positive electrode active material composed of complex oxide particles having an average composition of $Li_{0.98}Co_{0.40}Ni_{0.60}O_2$ and an average particle diameter of 12 μm measured by the laser scattering method was used, and the added amount of the silicomolybdic acid was set to 1.0% by weight of the positive electrode active material.

[Evaluation of the Secondary Battery: The Swelling Amount of the Battery]

After the secondary battery of each of the samples was charged by a constant current until the battery voltage reached 4.2 V at a constant current of 880 mA under conditions of 23° C., constant voltage charging was carried out until the electric current value reached 1 mA at a constant voltage of 4.2 V. After that, the full-charged secondary battery was maintained under conditions of 80° C. for 4 days. The amount of change of the thickness of the secondary battery at this time was measured as the swelling amount of the battery during the high-temperature storage.

[Evaluation of the Secondary Battery: Discharge Capacity]

Regarding the secondary batteries of Samples 1-3 to 1-10 in which $Li_{0.98}Co_{0.15}Ni_{0.80}Al_{0.05}O_2$ was used as the positive electrode active material, the discharge capacity was measured. Firstly, after constant current charging was carried out until the battery voltage of the secondary battery of each of the samples reached 4.2 V at a constant current of 880 mA under conditions of 23° C., constant voltage charging was carried out until the electric current value reached 1 mA at a constant voltage of 4.2 V. Subsequently, discharging at 0.2 C was carried out, and the discharge capacity was measured until the battery voltage reached 3.0 V.

The following Table 1 shows the results of the evaluations.

TABLE 1

| | Positive electrode active material | Average particle diameter [μm] | Heteropoly acid | Added amount [% by weight] | Expanded amount [mm] | Discharge capacity [mAh/g] |
|---|---|---|---|---|---|---|
| Sample 1-1 | $Li_{0.98}Co_{0.20}Ni_{0.80}O_2$ | 12 | Silicomolybdic acid | 0.05 | 5.82 | — |
| Sample 1-2 | | | Silicomolybdic acid | 0.10 | 4.87 | — |
| Sample 1-3 | $Li_{0.98}Co_{0.15}Ni_{0.80}Al_{0.05}O_2$ | 14 | — | — | 13.3 | 185.7 |
| Sample 1-4 | | | Silicomolybdic acid | 0.005 | 11.1 | 185.3 |
| Sample 1-5 | | | Silicomolybdic acid | 0.20 | 4.41 | 184.0 |
| Sample 1-6 | | | Silicomolybdic acid | 0.50 | 3.72 | 183.2 |
| Sample 1-7 | | | Silicomolybdic acid | 1.0 | 2.45 | 181.1 |
| Sample 1-8 | | | Silicomolybdic acid | 3.0 | 2.31 | 173.8 |
| Sample 1-9 | | | Silicomolybdic acid | 5.0 | 2.40 | 165.2 |
| Sample 1-10 | | | Silicomolybdic acid | 7.0 | 2.32 | 155.7 |
| Sample 1-11 | $Li_{1.02}Co_{0.98}Mg_{0.01}Al_{0.01}O_2$ | 12 | — | — | 7.82 | — |
| Sample 1-12 | | | Silicomolybdic acid | 0.005 | 6.98 | — |
| Sample 1-13 | | | Silicomolybdic acid | 0.01 | 5.47 | — |
| Sample 1-14 | | | Silicomolybdic acid | 0.10 | 4.02 | — |
| Sample 1-15 | | | Silicomolybdic acid | 0.50 | 3.21 | — |
| Sample 1-16 | | | Silicomolybdic acid | 1.0 | 2.25 | — |
| Sample 1-17 | $Li_{0.98}Co_{0.20}Ni_{0.77}Al_{0.03}O_2$ | 12 | Silicomolybdic acid | 1.0 | 3.11 | — |
| Sample 1-18 | $Li_{0.98}Co_{0.15}Ni_{0.80}Mn_{0.05}O_2$ | 12 | Silicomolybdic acid | 1.0 | 3.63 | — |
| Sample 1-19 | $Li_{0.98}Co_{0.15}Ni_{0.80}Al_{0.04}Ba_{0.01}O_2$ | 12 | Silicomolybdic acid | 1.0 | 3.26 | — |
| Sample 1-20 | $Li_{0.98}Co_{0.15}Ni_{0.80}Al_{0.04}Sn_{0.01}O_2$ | 12 | Silicomolybdic acid | 1.0 | 2.53 | — |
| Sample 1-21 | $Li_{0.98}Co_{0.28}Ni_{0.70}Al_{0.02}O_2$ | 12 | Silicomolybdic acid | 1.0 | 3.21 | — |
| Sample 1-22 | $Li_{0.98}Co_{0.40}Ni_{0.60}O_2$ | 12 | Silicomolybdic acid | 1.0 | 3.58 | — |

As shown in Table 1, it was found that battery swelling could be suppressed in the secondary batteries containing silicomolybdic acid in the positive electrode in comparison to the secondary batteries of Samples 1-3 and 1-11 containing no silicomolybdic acid.

For example, Samples 1-3 to 1-10 used $Li_{0.98}Co_{0.15}Ni_{0.80}Al_{0.05}O_2$ as the positive electrode active material. As shown in Table 1, it was found that the amount of the battery swelling was reduced by adding silicomolybdic acid in comparison to Sample 1-3 to which silicomolybdic acid was not added. In addition, it was found that, as the added amount of silicomolybdic acid is increased, the effect of suppressing battery swelling is improved, and substantially the same effect is maintained when the added amount is 1.0% by weight or more. Furthermore, as the added amount of silicomolybdic acid is increased, the discharge capacity was degraded, and, for example, the discharge capacity was abruptly degraded when the added amount was 7.0% by weight or less.

It was found that the effect of suppressing battery swelling is significantly high in Samples 1-5 to 1-10 in which the added amount of silicomolybdic acid was 0.20% by weight or more in contrast to Sample 1-4 in which the added amount of silicomolybdic acid was 0.005% by weight. On the other hand, as shown in Table 1, as the added amount of silicomolybdic acid was increased, the discharge capacity was degraded, and the discharge capacity was less than 160 mAh/g in Sample 1-10 in which the added amount of silicomolybdic acid was 7.0% by weight.

Samples 1-11 to 1-16 used $Li_{1.02}Co_{0.98}Mg_{0.01}Al_{0.01}O_2$ as the positive electrode active material, and, similarly to Samples 1-3 to 1-10, battery swelling could be suppressed as the added amount of silicomolybdic acid was increased. In addition, like Samples 1-17 to 1-22, when the added amount of silicomolybdic acid was 1.0% by weight, battery swelling could be reduced regardless of the composition of the complex oxide.

As is clear from the comparison of Samples 1-3 and 1-11, when the positive electrode active material having a large content of nickel (Ni) (Sample 1-3) was used, the generated amount of gas was increased, and battery swelling was increased. However, it was found that, in Samples 1-7 and 1-16 to which the same amount of silicomolybdic acid was added, the amount of battery swelling was substantially the same, and a particularly significant effect of suppressing battery swelling was obtained in the secondary batteries in which the positive electrode active material having a large content of nickel (Ni) was used.

EXAMPLE 2

[When Phosphomolybdic Acid is Used as the Heteropoly Acid]

<Sample 2-1>

A secondary battery was manufactured in the same manner as in Sample 1-1 except that a positive electrode active material composed of complex oxide particles having an average composition of $Li_{0.98}Co_{0.20}Ni_{0.80}O_2$ and an average particle diameter of 12 μm measured by the laser scattering method was used, and the added amount of the phosphomolybdic acid ($H_3(PMo_{12}O_{40})$) was set to 0.05% by weight of the positive electrode active material.

<Sample 2-2>

A secondary battery was manufactured in the same manner as in Sample 2-1 except that the added amount of the phosphomolybdic acid was set to 0.10% by weight of the positive electrode active material.

<Sample 2-3>

A secondary battery was manufactured in the same manner as in Sample 2-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the phosphomolybdic acid was not added.

<Sample 2-4>

A secondary battery was manufactured in the same manner as in Sample 2-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphomolybdic acid was set to 0.005% by weight of the positive electrode active material.

<Sample 2-5>

A secondary battery was manufactured in the same manner as in Sample 2-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphomolybdic acid was set to 0.20% by weight of the positive electrode active material.

<Sample 2-6>

A secondary battery was manufactured in the same manner as in Sample 2-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphomolybdic acid was set to 0.50% by weight of the positive electrode active material.

<Sample 2-7>

A secondary battery was manufactured in the same manner as in Sample 2-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphomolybdic acid was set to 1.0% by weight of the positive electrode active material.

<Sample 2-8>

A secondary battery was manufactured in the same manner as in Sample 2-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphomolybdic acid was set to 3.0% by weight of the positive electrode active material.

<Sample 2-9>

A secondary battery was manufactured in the same manner as in Sample 2-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphomolybdic acid was set to 5.0% by weight of the positive electrode active material.

<Sample 2-10>

A secondary battery was manufactured in the same manner as in Sample 2-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphomolybdic acid was set to 6.0% by weight of the positive electrode active material.

<Sample 2-11>

A secondary battery was manufactured in the same manner as in Sample 2-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the phosphomolybdic acid was not added.

<Sample 2-12>

A secondary battery was manufactured in the same manner as in Sample 2-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the phosphomolybdic acid was set to 0.005% by weight of the positive electrode active material.

<Sample 2-13>

A secondary battery was manufactured in the same manner as in Sample 2-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the phosphomolybdic acid was set to 0.01% by weight of the positive electrode active material.

<Sample 2-14>

A secondary battery was manufactured in the same manner as in Sample 2-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the phosphomolybdic acid was set to 0.10% by weight of the positive electrode active material.

<Sample 2-15>

A secondary battery was manufactured in the same manner as in Sample 2-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the phosphomolybdic acid was set to 0.50% by weight of the positive electrode active material.

<Sample 2-16>

A secondary battery was manufactured in the same manner as in Sample 2-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the phosphomolybdic acid was set to 1.0o by weight of the positive electrode active material.

<Sample 2-17>

A secondary battery was manufactured in the same manner as in Sample 2-1 except that a positive electrode active material composed of complex oxide particles having an average composition of $Li_{0.98}Co_{0.20}Ni_{0.77}Al_{0.03}O_2$ and an average particle diameter of 12 μm measured by the laser scattering method was used, and the added amount of the phosphomolybdic acid was set to 1.0% by weight of the positive electrode active material.

<Sample 2-18>

A secondary battery was manufactured in the same manner as in Sample 2-1 except that a positive electrode active material composed of complex oxide particles having an average composition of $Li_{0.98}Co_{0.15}Ni_{0.80}Mn_{0.05}O_2$ and an average particle diameter of 12 μm measured by the laser scattering method was used, and the added amount of the phosphomolybdic acid was set to 1.0% by weight of the positive electrode active material.

<Sample 2-19>

A secondary battery was manufactured in the same manner as in Sample 2-1 except that a positive electrode active material composed of complex oxide particles having an average composition of $Li_{0.98}Co_{0.15}Ni_{0.80}Al_{0.04}Ba_{0.01}O_2$ and an average particle diameter of 12 μm measured by the laser scattering method was used, and the added amount of the phosphomolybdic acid was set to 1.0% by weight of the positive electrode active material.

<Sample 2-20>

A secondary battery was manufactured in the same manner as in Sample 2-1 except that a positive electrode active material composed of complex oxide particles having an average composition of $Li_{0.98}Co_{0.15}Ni_{0.80}Al_{0.04}Sn_{0.01}O_2$ and an average particle diameter of 12 μm measured by the laser scattering method was used, and the added amount of the phosphomolybdic acid was set to 1.0% by weight of the positive electrode active material.

<Sample 2-21>

A secondary battery was manufactured in the same manner as in Sample 2-1 except that a positive electrode active material composed of complex oxide particles having an average composition of $Li_{0.98}Co_{0.28}Ni_{0.70}Al_{0.02}O_2$ and an average particle diameter of 12 μm measured by the laser scattering method was used, and the added amount of the phosphomolybdic acid was set to 1.0% by weight of the positive electrode active material.

<Sample 2-22>

A secondary battery was manufactured in the same manner as in Sample 2-1 except that a positive electrode active material composed of complex oxide particles having an average composition of $Li_{0.98}Co_{0.40}Ni_{0.60}O_2$ and an average particle diameter of 12 μm measured by the laser scattering method was used, and the added amount of the phosphomolybdic acid was set to 1.0% by weight of the positive electrode active material.

[Evaluation of the Secondary Battery: The Swelling Amount of the Battery]

The swelling amount (the amount of change of the thickness) of the secondary battery of each of the samples was measured as the swelling amount during a high-temperature storage by the same method as in Example 1.

The following Table 2 shows the results of the evaluation.

TABLE 2

|  | Positive electrode active material | Average particle diameter [μm] | Heteropoly acid | Added amount [% by weight] | Swelling amount [mm] |
| --- | --- | --- | --- | --- | --- |
| Sample 2-1 | $Li_{0.98}Co_{0.20}Ni_{0.80}O_2$ | 12 | Phosphomolybdic acid | 0.05 | 5.25 |
| Sample 2-2 |  |  | Phosphomolybdic acid | 0.10 | 4.94 |
| Sample 2-3 | $Li_{0.98}Co_{0.15}Ni_{0.80}Al_{0.06}O_2$ | 14 | — | — | 13.3 |
| Sample 2-4 |  |  | Phosphomolybdic acid | 0.005 | 10.81 |
| Sample 2-5 |  |  | Phosphomolybdic acid | 0.20 | 4.38 |
| Sample 2-6 |  |  | Phosphomolybdic acid | 0.50 | 3.62 |
| Sample 2-7 |  |  | Phosphomolybdic acid | 1.0 | 2.37 |
| Sample 2-8 |  |  | Phosphomolybdic acid | 3.0 | 2.42 |
| Sample 2-9 |  |  | Phosphomolybdic acid | 5.0 | 2.33 |
| Sample 2-10 |  |  | Phosphomolybdic acid | 6.0 | 2.21 |
| Sample 2-11 | $Li_{1.02}Co_{0.98}Mg_{0.01}Al_{0.01}O_2$ | 12 | — | — | 7.82 |
| Sample 2-12 |  |  | Phosphomolybdic acid | 0.005 | 7.11 |
| Sample 2-13 |  |  | Phosphomolybdic acid | 0.01 | 5.88 |
| Sample 2-14 |  |  | Phosphomolybdic acid | 0.10 | 3.95 |
| Sample 2-15 |  |  | Phosphomolybdic acid | 0.50 | 3.14 |
| Sample 2-16 |  |  | Phosphomolybdic acid | 1.0 | 2.08 |
| Sample 2-17 | $Li_{0.98}Co_{0.20}Ni_{0.77}Al_{0.03}O_2$ | 12 | Phosphomolybdic acid | 1.0 | 2.98 |
| Sample 2-18 | $Li_{0.98}Co_{0.15}Ni_{0.80}Mn_{0.05}O_2$ | 12 | Phosphomolybdic acid | 1.0 | 3.14 |
| Sample 2-19 | $Li_{0.98}Co_{0.15}Ni_{0.80}Al_{0.04}Ba_{0.01}O_2$ | 12 | Phosphomolybdic acid | 1.0 | 2.97 |

TABLE 2-continued

| Positive electrode active material | Average particle diameter [μm] | Heteropoly acid | Added amount [% by weight] | Swelling amount [mm] |
|---|---|---|---|---|
| Sample 2-20 $Li_{0.98}Co_{0.15}Ni_{0.80}Al_{0.04}Sn_{0.01}O_2$ | 12 | Phosphomolybdic acid | 1.0 | 2.76 |
| Sample 2-21 $Li_{0.98}Co_{0.28}Ni_{0.70}Al_{0.02}O_2$ | 12 | Phosphomolybdic acid | 1.0 | 3.23 |
| Sample 2-22 $Li_{0.98}Co_{0.40}Ni_{0.60}O_2$ | 12 | Phosphomolybdic acid | 1.0 | 3.55 |

As shown in Table 2, it was found that battery swelling could be suppressed in the secondary batteries containing phosphomolybdic acid in the positive electrode in comparison to the secondary batteries of Samples 2-3 and 2-11 containing no phosphomolybdic acid.

For example, Samples 2-3 to 2-10 used $Li_{0.98}Co_{0.15}Ni_{0.80}Al_{0.05}O_2$ as the positive electrode active material. Similarly to Example 1, it was found that the swelling amount of the battery was reduced by adding phosphomolybdic acid in comparison to Sample 2-3 to which phosphomolybdic acid was not added. In addition, it was found that, as the added amount of phosphomolybdic acid is increased, the effect of suppressing battery swelling is improved, and substantially the same effect is maintained when the added amount is 1.0% by weight or more.

In addition, even in Samples 2-11 to 2-16 in which $Li_{1.02}Cu_{0.98}Mg_{0.01}Al_{0.01}O_2$ was used as the positive electrode active material, similarly, it was found that, as the added amount of phosphomolybdic acid is increased, the effect of suppressing battery swelling is improved. Particularly, Samples 2-13 to 3-16 to which 0.01% by weight or more of phosphomolybdic acid was added could obtain a significant effect of suppressing battery swelling.

In addition, as in Samples 2-17 to 2-22, when the added amount of phosphomolybdic acid was 1.0% by weight, battery swelling could be reduced regardless of the composition of the complex oxide. Furthermore, it was found that a particularly significant effect of suppressing battery swelling was obtained in the secondary batteries in which the positive electrode active material having a large content of nickel (Ni) was used.

EXAMPLE 3

[When Phosphotungstic Acid is Used as the Heteropoly Acid]

<Sample 3-1>

A secondary battery was manufactured in the same manner as in Sample 1-1 except that a positive electrode active material composed of complex oxide particles having an average composition of $Li_{0.98}Co_{0.20}Ni_{0.80}O_2$ and an average particle diameter of 12 μm measured by the laser scattering method was used, and the added amount of the phosphotungstic acid ($H_3(PW_{12}O_{40})$) was set to 0.05% by weight of the positive electrode active material.

<Sample 3-2>

A secondary battery was manufactured in the same manner as in Sample 3-1 except that the added amount of the phosphotungstic acid was set to 0.10% by weight of the positive electrode active material.

<Sample 3-3>

A secondary battery was manufactured in the same manner as in Sample 3-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the phosphotungstic acid was not added.

<Sample 3-4>

A secondary battery was manufactured in the same manner as in Sample 3-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphotungstic acid was set to 0.005% by weight of the positive electrode active material.

<Sample 3-5>

A secondary battery was manufactured in the same manner as in Sample 3-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphotungstic acid was set to 0.20% by weight of the positive electrode active material.

<Sample 3-6>

A secondary battery was manufactured in the same manner as in Sample 3-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphotungstic acid was set to 0.50% by weight of the positive electrode active material.

<Sample 3-7>

A secondary battery was manufactured in the same manner as in Sample 3-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphotungstic acid was set to 1.0% by weight of the positive electrode active material.

<Sample 3-8>

A secondary battery was manufactured in the same manner as in Sample 3-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphotungstic acid was set to 3.0% by weight of the positive electrode active material.

<Sample 3-9>

A secondary battery was manufactured in the same manner as in Sample 3-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the phosphotungstic acid was set to 5.0% by weight of the positive electrode active material.

<Sample 3-10>

A secondary battery was manufactured in the same manner as in Sample 3-1 except that a positive electrode active material composed of complex oxide particles having an average composition of $Li_{1.02}Co_{0.98}Mg_{0.01}Al_{0.01}O_2$ and an average particle diameter of 14 μm measured by the laser scattering method was used, and the phosphotungstic acid was not added.

<Sample 3-11>

A secondary battery was manufactured in the same manner as in Sample 3-1 except that a positive electrode active material composed of complex oxide particles having an average composition of $Li_{1.02}Co_{0.98}Ni_{0.01}Al_{0.01}O_2$ and an average particle diameter of 14 μm measured by the laser scattering method was used, and the added amount of the phosphotungstic acid was set to 0.005% by weight of the positive electrode active material.

<Sample 3-12>

A secondary battery was manufactured in the same manner as in Sample 3-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the phosphotungstic acid was set to 0.01% by weight of the positive electrode active material.

<Sample 3-13>

A secondary battery was manufactured in the same manner as in Sample 3-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the phosphotungstic acid was set to 0.10% by weight of the positive electrode active material.

<Sample 3-14>

A secondary battery was manufactured in the same manner as in Sample 3-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the phosphotungstic acid was set to 0.50% by weight of the positive electrode active material.

<Sample 3-15>

A secondary battery was manufactured in the same manner as in Sample 3-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the phosphotungstic acid was set to 1.0o by weight of the positive electrode active material.

<Sample 3-16>

A secondary battery was manufactured in the same manner as in Sample 3-1 except that a positive electrode active material composed of complex oxide particles having an average composition of $Li_{0.98}Co_{0.20}Ni_{0.77}Al_{0.03}O_2$ and an average particle diameter of 12 μm measured by the laser scattering method was used, and the added amount of the phosphotungstic acid was set to 1.0% by weight of the positive electrode active material.

<Sample 3-17>

A secondary battery was manufactured in the same manner as in Sample 3-1 except that a positive electrode active material composed of complex oxide particles having an average composition of $Li_{0.98}Co_{0.15}Ni_{0.80}Mn_{0.05}O_2$ and an average particle diameter of 12 μm measured by the laser scattering method was used, and the added amount of the phosphotungstic acid was set to 1.0% by weight of the positive electrode active material.

<Sample 3-18>

A secondary battery was manufactured in the same manner as in Sample 3-1 except that a positive electrode active material composed of complex oxide particles having an average composition of $Li_{0.98}Co_{0.15}Ni_{0.80}Al_{0.04}Ba_{0.01}O_2$ and an average particle diameter of 12 μm measured by the laser scattering method was used, and the added amount of the phosphotungstic acid was set to 1.0% by weight of the positive electrode active material.

<Sample 3-19>

A secondary battery was manufactured in the same manner as in Sample 3-1 except that a positive electrode active material composed of complex oxide particles having an average composition of $Li_{0.98}Co_{0.15}Ni_{0.80}Al_{0.04}Sn_{0.01}O_2$ and an average particle diameter of 12 μm measured by the laser scattering method was used, and the added amount of the phosphotungstic acid was set to 1.0% by weight of the positive electrode active material.

<Sample 3-20>

A secondary battery was manufactured in the same manner as in Sample 3-1 except that a positive electrode active material composed of complex oxide particles having an average composition of $Li_{0.98}Co_{0.28}Ni_{0.70}Al_{0.02}O_2$ and an average particle diameter of 12 μm measured by the laser scattering method was used, and the added amount of the phosphotungstic acid was set to 1.0% by weight of the positive electrode active material.

<Sample 3-21>

A secondary battery was manufactured in the same manner as in Sample 3-1 except that a positive electrode active material composed of complex oxide particles having an average composition of $Li_{0.98}Co_{0.40}Ni_{0.60}O_2$ and an average particle diameter of 12 μm measured by the laser scattering method was used, and the added amount of the phosphotungstic acid was set to 1.0% by weight of the positive electrode active material.

[Evaluation of the Secondary Battery: The Swelling Amount of the Battery]

The swelling amount (the amount of change of the thickness) of the secondary battery of each of the samples was measured as the swelling amount during a high-temperature storage by the same method as in Example 1.

The following Table 3 shows the results of the evaluation.

TABLE 3

| | Positive electrode active material | Average particle diameter [μm] | Heteropoly acid | Added amount [% by weight] | Swelling amount [mm] |
|---|---|---|---|---|---|
| Sample 3-1 | $Li_{0.98}Co_{0.20}Ni_{0.80}O_2$ | 12 | Phosphotungstic acid | 0.05 | 4.98 |
| Sample 3-2 | | | Phosphotungstic acid | 0.10 | 4.95 |

TABLE 3-continued

|  | Positive electrode active material | Average particle diameter [μm] | Heteropoly acid | Added amount [% by weight] | Swelling amount [mm] |
|---|---|---|---|---|---|
| Sample 3-3 | $Li_{0.98}Co_{0.15}Ni_{0.80}Al_{0.05}O_2$ | 14 | — | — | 13.3 |
| Sample 3-4 |  |  | Phosphotungstic acid | 0.005 | 11.2 |
| Sample 3-5 |  |  | Phosphotungstic acid | 0.20 | 4.48 |
| Sample 3-6 |  |  | Phosphotungstic acid | 0.50 | 3.59 |
| Sample 3-7 |  |  | Phosphotungstic acid | 1.0 | 2.20 |
| Sample 3-8 |  |  | Phosphotungstic acid | 3.0 | 2.23 |
| Sample 3-9 |  |  | Phosphotungstic acid | 5.0 | 2.31 |
| Sample 3-10 | $Li_{1.02}Co_{0.98}Mg_{0.01}Al_{0.01}O_2$ | 12 | — | — | 7.82 |
| Sample 3-11 |  |  | Phosphotungstic acid | 0.005 | 7.02 |
| Sample 3-12 |  |  | Phosphotungstic acid | 0.01 | 5.16 |
| Sample 3-13 |  |  | Phosphotungstic acid | 0.10 | 4.32 |
| Sample 3-14 |  |  | Phosphotungstic acid | 0.50 | 3.03 |
| Sample 3-15 |  |  | Phosphotungstic acid | 1.0 | 2.01 |
| Sample 3-16 | $Li_{0.98}Co_{0.20}Ni_{0.77}Al_{0.03}O_2$ | 12 | Phosphotungstic acid | 1.0 | 2.83 |
| Sample 3-17 | $Li_{0.98}Co_{0.15}Ni_{0.80}Mn_{0.05}O_2$ | 12 | Phosphotungstic acid | 1.0 | 3.82 |
| Sample 3-18 | $Li_{0.98}Co_{0.15}Ni_{0.80}Al_{0.04}Ba_{0.01}O_2$ | 12 | Phosphotungstic acid | 1.0 | 2.71 |
| Sample 3-19 | $Li_{0.98}Co_{0.15}Ni_{0.80}Al_{0.04}Sn_{0.01}O_2$ | 12 | Phosphotungstic acid | 1.0 | 2.62 |
| Sample 3-20 | $Li_{0.98}Co_{0.28}Ni_{0.70}Al_{0.02}O_2$ | 12 | Phosphotungstic acid | 1.0 | 3.43 |
| Sample 3-21 | $Li_{0.98}Co_{0.40}Ni_{0.60}O_2$ | 12 | Phosphotungstic acid | 1.0 | 3.62 |

As shown in Table 3, it was found that battery swelling could be suppressed in the secondary batteries containing phosphotungstic acid in the positive electrode in comparison to the secondary batteries of Samples 3-3 and 3-10 containing no phosphotungstic acid. In addition, it was found that battery swelling, that is, gas generation in the battery could be reduced regardless of the composition of the complex oxide. It was found that, in each of the samples, battery swelling was significantly suppressed by setting the added amount of phosphotungstic acid to 0.01% by weight or more in comparison to the secondary batteries of Samples 3-4 and 3-11 in which the added amount of phosphotungstic acid was 0.005% by weight.

In addition, it was found that, as the added amount of phosphotungstic acid is increased, the effect of suppressing battery swelling is improved, and substantially the same effect is maintained when the added amount is 1.0% by weight or more. In addition, for example, like Samples 3-7 and 3-15 to 3-21 in which the added amount of phosphotungstic acid was 1.0% by weight, the amount of battery swelling could be reduced regardless of the composition of the complex oxide.

Furthermore, when the positive electrode active material having a large content of nickel (Ni) is used, battery swelling is increased in the secondary battery to which phosphotungstic acid is not added (Sample 3-3). However, for example, battery swelling in Samples 3-7 and 3-15 to which the same amount of phosphotungstic acid was added becomes substantially the same by adding phosphotungstic acid, and it was found that battery swelling can be suppressed regardless of the content of nickel (Ni) in the positive electrode active material. That is, it was found that, when the positive electrode active material having a large content of nickel (Ni) is used, a significant effect of suppressing battery swelling can be obtained by adding phosphotungstic acid.

EXAMPLE 4

[When Silicotungstic Acid is Used as the Heteropoly Acid]
<Sample 4-1>
A secondary battery was manufactured in the same manner as in Sample 1-1 except that a positive electrode active material composed of complex oxide particles having an average composition of $Li_{0.98}Co_{0.20}Ni_{0.80}O_2$ and an average particle diameter of 12 μm measured by the laser scattering method was used, and the added amount of the silicotungstic acid ($H_4(SiW_{12}O_{40})$) was set to 0.05% by weight of the positive electrode active material.
<Sample 4-2>
A secondary battery was manufactured in the same manner as in Sample 4-1 except that the added amount of the silicotungstic acid was set to 0.10% by weight of the positive electrode active material.
<Sample 4-3>
A secondary battery was manufactured in the same manner as in Sample 4-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the silicotungstic acid was not added.
<Sample 4-4>
A secondary battery was manufactured in the same manner as in Sample 4-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicotungstic acid was set to 0.005% by weight of the positive electrode active material.
<Sample 4-5>
A secondary battery was manufactured in the same manner as in Sample 4-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicotungstic acid was set to 0.20% by weight of the positive electrode active material.
<Sample 4-6>
A secondary battery was manufactured in the same manner as in Sample 4-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicotungstic acid was set to 0.50% by weight of the positive electrode active material.

<Sample 4-7>
A secondary battery was manufactured in the same manner as in Sample 4-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicotungstic acid was set to 1.0% by weight of the positive electrode active material.

<Sample 4-8>
A secondary battery was manufactured in the same manner as in Sample 4-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicotungstic acid was set to 3.0% by weight of the positive electrode active material.

<Sample 4-9>
A secondary battery was manufactured in the same manner as in Sample 4-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, and the added amount of the silicotungstic acid was set to 5.0% by weight of the positive electrode active material.

<Sample 4-10>
A secondary battery was manufactured in the same manner as in Sample 4-1 except that a positive electrode active material composed of complex oxide particles having an average composition of $Li_{0.98}Co_{0.15}Ni_{0.80}Al_{0.05}O_2$ and an average particle diameter of 14 μm measured by the laser scattering method was used, the added amount of the silicotungstic acid was set to 0.3% by weight of the positive electrode active material, and phosphomolybdic acid was added in 0.2% by weight of the positive electrode active material.

<Sample 4-11>
A secondary battery was manufactured in the same manner as in Sample 4-1 except that a positive electrode active material composed of complex oxide particles having an average composition of $Li_{1.02}Co_{0.98}Mg_{0.01}Al_{0.01}O_2$ and an average particle diameter of 14 μm measured by the laser scattering method was used, and the silicotungstic acid was not added.

<Sample 4-12>
A secondary battery was manufactured in the same manner as in Sample 4-1 except that a positive electrode active material composed of complex oxide particles having an average composition of $Li_{1.02}Co_{0.98}Ni_{0.01}Al_{0.01}O_2$ and an average particle diameter of 14 μm measured by the laser scattering method was used, and the added amount of the silicotungstic acid was set to 0.005% by weight of the positive electrode active material.

<Sample 4-13>
A secondary battery was manufactured in the same manner as in Sample 4-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the silicotungstic acid was set to 0.01% by weight of the positive electrode active material.

<Sample 4-14>
A secondary battery was manufactured in the same manner as in Sample 4-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the silicotungstic acid was set to 0.10% by weight of the positive electrode active material.

<Sample 4-15>
A secondary battery was manufactured in the same manner as in Sample 4-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the silicotungstic acid was set to 0.50% by weight of the positive electrode active material.

<Sample 4-16>
A secondary battery was manufactured in the same manner as in Sample 4-1 except that a positive electrode active material composed of complex oxide particles having an average composition of $Li_{1.02}Co_{0.98}Mg_{0.01}Al_{0.01}O_2$ and an average particle diameter of 12 μm measured by the laser scattering method was used, and the added amount of the silicotungstic acid was set to 1.0% by weight of the positive electrode active material.

<Sample 4-17>
A secondary battery was manufactured in the same manner as in Sample 4-1 except that a positive electrode active material composed of complex oxide particles having an average composition of $Li_{0.98}Co_{0.20}Ni_{0.77}Al_{0.03}O_2$ and an average particle diameter of 12 μm measured by the laser scattering method was used, and the added amount of the silicotungstic acid was set to 1.0% by weight of the positive electrode active material.

<Sample 4-18>
A secondary battery was manufactured in the same manner as in Sample 4-1 except that a positive electrode active material composed of complex oxide particles having an average composition of $Li_{0.98}Co_{0.15}Ni_{0.80}Mn_{0.05}O_2$ and an average particle diameter of 12 μm measured by the laser scattering method was used, and the added amount of the silicotungstic acid was set to 1.0% by weight of the positive electrode active material.

<Sample 4-19>
A secondary battery was manufactured in the same manner as in Sample 4-1 except that a positive electrode active material composed of complex oxide particles having an average composition of $Li_{0.98}Co_{0.15}Ni_{0.80}Al_{0.04}Ba_{0.01}O_2$ and an average particle diameter of 12 μm measured by the laser scattering method was used, and the added amount of the silicotungstic acid was set to 1.0% by weight of the positive electrode active material.

<Sample 4-20>
A secondary battery was manufactured in the same manner as in Sample 4-1 except that a positive electrode active material composed of complex oxide particles having an average composition of $Li_{0.98}Co_{0.15}Ni_{0.80}Al_{0.04}Sn_{0.01}O_2$ and an average particle diameter of 12 μm measured by the laser scattering method was used, and the added amount of the silicotungstic acid was set to 1.0% by weight of the positive electrode active material.

<Sample 4-21>

A secondary battery was manufactured in the same manner as in Sample 4-1 except that a positive electrode active material composed of complex oxide particles having an average composition of $Li_{0.98}Co_{0.28}Ni_{0.70}Al_{0.02}O_2$ and an average particle diameter of 12 μm measured by the laser scattering method was used, and the added amount of the silicotungstic acid was set to 1.0% by weight of the positive electrode active material.

<Sample 4-22>

A secondary battery was manufactured in the same manner as in Sample 4-1 except that a positive electrode active material composed of complex oxide particles having an average composition of $Li_{0.98}Co_{0.40}Ni_{0.60}O_2$ and an average particle diameter of 12 μm measured by the laser scattering method was used, and the added amount of the silicotungstic acid was set to 1.0% by weight of the positive electrode active material.

[Evaluation of the Secondary Battery: The Swelling Amount of the Battery]

The swelling amount (the amount of change of the thickness) of the secondary battery of each of the samples was measured as the swelling amount during a high-temperature storage by the same method as in Example 1.

The following Table 4 shows the results of the evaluation.

effect is maintained when the added amount is 1.0% by weight or more. In addition, for example, like Samples 4-7 and 4-16 to 4-22, when the added amount of phosphotungstic acid was 1.0% by weight, the amount of battery swelling could be reduced regardless of the composition of the complex oxide.

Furthermore, as is clear from Samples 4-3 and 4-11, when the positive electrode active material having a large content of nickel (Ni), to which silicotungstic acid was not added, is used, battery swelling is increased. However, for example, in Samples 4-7 and 4-16 to which the same amount of silicotungstic acid was added, battery swelling becomes substantially the same. Therefore, it was found that a particularly significant effect can be obtained in the positive electrode active material having a large content of nickel (Ni).

EXAMPLE 5

[Example in which the Heteropoly Acid is Added to the Electrolytic Solution so as to Precipitate the Reduced Product of the Polyacid and/or Polyacid Compound on the Surface of the Negative Electrode]

<Sample 5-1>

[Manufacturing of the Positive Electrode]

Firstly, 92% by weight of lithium cobalt oxide as a positive electrode active material having an average com-

TABLE 4

|  | Positive electrode active material | Average particle diameter [μm] | Heteropoly acid | Added amount [% by weight] | Swelling amount [mm] |
| --- | --- | --- | --- | --- | --- |
| Sample 4-1 | $Li_{0.98}Co_{0.20}Ni_{0.80}O_2$ | 12 | Silicotungstic acid | 0.05 | 6.96 |
| Sample 4-2 |  |  | Silicotungstic acid | 0.10 | 5.51 |
| Sample 4-3 | $Li_{0.98}Co_{0.15}Ni_{0.80}Al_{0.05}O_2$ | 14 | — | — | 13.3 |
| Sample 4-4 |  |  | Silicotungstic acid | 0.005 | 11.9 |
| Sample 4-5 |  |  | Silicotungstic acid | 0.20 | 5.04 |
| Sample 4-6 |  |  | Silicotungstic acid | 0.50 | 4.12 |
| Sample 4-7 |  |  | Silicotungstic acid | 1.0 | 3.95 |
| Sample 4-8 |  |  | Silicotungstic acid | 3.0 | 3.56 |
| Sample 4-9 |  |  | Silicotungstic acid | 5.0 | 2.92 |
| Sample 4-10 |  |  | Silicotungstic acid | 0.3 | 2.91 |
|  |  |  | Phosphomolybdic acid | 0.2 |  |
| Sample 4-11 | $Li_{1.02}Co_{0.98}Mg_{0.01}Al_{0.01}O_2$ | 12 | — | — | 7.82 |
| Sample 4-12 |  |  | Silicotungstic acid | 0.005 | 7.01 |
| Sample 4-13 |  |  | Silicotungstic acid | 0.01 | 6.33 |
| Sample 4-14 |  |  | Silicotungstic acid | 0.10 | 4.54 |
| Sample 4-15 |  |  | Silicotungstic acid | 0.50 | 3.24 |
| Sample 4-16 |  |  | Silicotungstic acid | 1.0 | 3.26 |
| Sample 4-17 | $Li_{0.98}Co_{0.20}Ni_{0.77}Al_{0.03}O_2$ | 12 | Silicotungstic acid | 1.0 | 3.54 |
| Sample 4-18 | $Li_{0.98}Co_{0.15}Ni_{0.80}Mn_{0.05}O_2$ | 12 | Silicotungstic acid | 1.0 | 3.91 |
| Sample 4-19 | $Li_{0.98}Co_{0.15}Ni_{0.80}Al_{0.04}Ba_{0.01}O_2$ | 12 | Silicotungstic acid | 1.0 | 3.88 |
| Sample 4-20 | $Li_{0.98}Co_{0.15}Ni_{0.80}Al_{0.04}Sn_{0.01}O_2$ | 12 | Silicotungstic acid | 1.0 | 3.21 |
| Sample 4-21 | $Li_{0.98}Co_{0.28}Ni_{0.70}Al_{0.02}O_2$ | 12 | Silicotungstic acid | 1.0 | 3.38 |
| Sample 4-22 | $Li_{0.98}Co_{0.40}Ni_{0.60}O_2$ | 12 | Silicotungstic acid | 1.0 | 3.78 |

As shown in Table 4, it was found that battery swelling could be suppressed in the secondary battery of each of the samples containing silicotungstic acid in the positive electrode in comparison to the secondary batteries of Samples 4-3 and 4-11 containing no silicotungstic acid. In addition, it was found that battery swelling, that is, gas generation in the battery could be reduced regardless of the composition of the complex oxide. It was found that, in each of the samples, battery swelling was significantly suppressed by setting the added amount of silicotungstic acid to 0.01% by weight or more in comparison to the secondary batteries of Samples 4-4 and 4-12 in which the added amount of silicotungstic acid was small.

In addition, it was found that, as the added amount of silicotungstic acid is increased, the effect of suppressing battery swelling is improved, and substantially the same position of $LiCo_{0.98}Al_{0.01}Mg_{0.01}O_2$ 13% by weight of polyvinylidene fluoride powder, which was a bonding agent, and 5% by weight of graphite, which was a conducting agent, were dry-mixed. Subsequently, N-methyl-2-pyrrolidone was adjusted and added to the mixture, thereby preparing a slurry-form positive electrode compound. Next, the positive electrode compound slurry was evenly coated on both faces of an aluminum foil, which is a positive electrode collector, and was dried at a reduced pressure at 100° C. for 24 hours, thereby forming a positive electrode active material layer. In addition, compacting was carried out using a roll press machine so as to produce a positive electrode sheet, and the positive electrode sheet was cut out into a 48 mm×300 mm band shape, thereby producing a positive electrode. Finally, a positive electrode lead composed of an aluminum ribbon was welded to the positive electrode collector exposed portion at the end portion of the positive electrode.

[Manufacturing of the Negative Electrode]

91% by weight of artificial graphite as a negative electrode active material and 9% by weight of polyvinylidene fluoride powder as a bonding agent were dispersed in N-methyl-2-pyrrolidone so as to prepare a slurry-form negative electrode compound. Next, the negative electrode compound slurry was evenly coated on both faces of a copper foil, which acts as a negative electrode collector, and was dried at a reduced pressure at 120° C. for 24 hours, thereby forming a negative electrode active material layer. In addition, compacting was carried out using a roll press machine so as to produce a negative electrode sheet, and the negative electrode sheet was cut out into a 50 mm×310 mm band shape, thereby producing a negative electrode. Finally, a negative electrode lead composed of a nickel ribbon was welded to the negative electrode collector exposed portion at the end portion of the negative electrode.

[Manufacturing of the Electrolytic Solution]

The electrolytic solution was manufactured in the following manner. Firstly, ethylene carbonate (EC) and diethyl carbonate (DEC) were mixed in a weight ratio of 4:6 so as to produce a mixed solvent. Subsequently, hexafluorophosphate (LiPF$_6$) was dissolved in the mixed solvent in a concentration of 1.0 mol/kg so as to prepare a solution, and, furthermore, 1.0% by weight of silicotungstic acid (H$_4$(SiW$_{12}$O$_{40}$)) was dissolved.

[Manufacturing of the Wound Electrode Body]

Next, the band-shaped positive electrode and the band-shaped negative electrode, which were manufactured in the above manner, were laminated through a 20 μm-thick porous polyethylene separator, and wound in the longitudinal direction, thereby obtaining a wound electrode body. The positive electrode, the negative electrode, and the separator had a configuration in which the end portion of the negative electrode was protruded from the end portion of the positive electrode, and the end portion of the separator was protruded toward the outside of the end portion of the negative electrode. The positive electrode, the negative electrode, and the separator were assembled so that the protruded widths in both sides were equivalent. This wound electrode body was interposed by a laminate film in which a resin layer was formed on both faces of an aluminum foil, and the outer circumferential portions of the laminate film were thermally fused except one side.

Subsequently, an electrolytic solution was injected from the opening of the laminate film, and the remaining side was sealed at a reduced pressure, thereby sealing the wound electrode body in the laminate film. Meanwhile, the resin side was disposed at a part of the positive electrode lead and the negative electrode lead, and the laminate film then faced and was sealed on the laminated film.

Next, the manufactured battery was preliminarily charged until 3.2 V at 100 mA, and electrolysis reduction of silicotungstic acid was carried out. Meanwhile, the capacity change of the positive electrode in this phase was a small amount that could be ignored. Subsequently, the battery in a preliminarily charged state was disassembled, and it was confirmed that a tungsten compound was precipitated on the negative electrode, and the separator was adhered to the surface of the negative electrode. Meanwhile, it was observed by X-ray photoelectron spectroscopy (XPS) that the precipitated tungsten compound (W$^{5.2+}$) was reduced and precipitated.

In addition, the negative electrode having the separator adhered thereto was taken out for each separator, and new positive electrode and negative electrode which were manufactured by the above method were wound, thereby assembling a wound electrode body. The newly assembled wound electrode body was accommodated in a laminate film, and the sides of the laminate film were thermally fused except one side.

Meanwhile, hexafluorophosphate (LiPF$_6$) was dissolved in a mixed solvent, in which ethylene carbonate (EC) and diethyl carbonate (DEC) were mixed in a weight ratio of 4:6, in a concentration of 1.0 mol/kg so as to prepare a non-aqueous electrolytic solution containing no silicotungstic acid. The electrolytic solution was injected from the opening of the laminate film in which the wound electrode body was accommodated, and sealed by thermally fusing the remaining side of the laminate film. Thereby, a secondary battery for testing, in which a tungsten compound was precipitated on the negative electrode, was manufactured.

<Sample 5-2>

A battery for testing was manufactured in the same manner as in Sample 5-1 except that phosphotungstic acid (H$_3$(PW$_{12}$O$_{40}$)) was used instead of silicotungstic acid (H$_4$(SiW$_{12}$O$_{40}$)) Meanwhile, it was confirmed in the negative electrode that was used for the battery for testing by disassembling the battery in a preliminarily charged state that a tungsten compound was precipitated on the negative electrode, and the separator was adhered to the surface of the negative electrode. Meanwhile, it was observed by X-ray photoelectron spectroscopy (XPS) that the precipitated tungsten compound (W$^{5.0+}$) was reduced and precipitated.

<Sample 5-3>

A battery for testing was manufactured in the same manner as in Sample 5-1 except that silicomolybdic acid (H$_4$(SiMo$_{12}$O$_{40}$)) was used instead of silicotungstic acid (H$_4$(SiW$_{12}$O$_{40}$)). Meanwhile, it was confirmed in the negative electrode that was used for the battery for testing by disassembling the battery in a preliminarily charged state that a molybdenum compound was precipitated on the negative electrode, and the separator was adhered to the surface of the negative electrode. Meanwhile, it was observed by X-ray photoelectron spectroscopy (XPS) that the precipitated tungsten compound (W$^{4.8+}$) was reduced and precipitated.

<Sample 5-4>

A battery for testing was manufactured in the same manner as in Sample 5-1 except that phosphomolybdic acid (H$_3$(PMo$_{12}$O$_{40}$)) was used instead of silicotungstic acid (H$_4$(SiW$_{12}$O$_{40}$)). Meanwhile, it was confirmed in the negative electrode that was used for the battery for testing by disassembling the battery in a preliminarily charged state that a molybdenum compound was precipitated on the negative electrode, and the separator was adhered to the surface of the negative electrode. Meanwhile, it was observed by X-ray photoelectron spectroscopy (XPS) that the precipitated tungsten compound (W$^{4.5+}$) was reduced and precipitated.

<Sample 5-5>

A battery was manufactured without adding silicotungstic acid to the electrolytic solution used before preliminary charging, and disassembled after preliminary charging was carried out. Here, it was not possible to confirm precipitates on the negative electrode after the disassembly and the adhesion of the separator to the surface of the negative electrode. Therefore, the precipitate on the surface of the negative electrode, which was confirmed in Sample 5-1, could be considered to be derived from the silicotungstic acid that was added to the electrolytic solution. The battery for testing was manufactured in the same manner as in Sample 5-1 except that the negative electrode and the separator having no precipitate were used.

[Evaluation of the Battery for Testing]

With regard to batteries for testing of each of the examples and comparative examples, the following evaluation and test were carried out.

(a) Heating Test

The battery for testing was disposed under conditions of room temperature, constant current charging was carried out at 1 C, and then the constant current charging was switched to constant voltage charging when the battery voltage reached 4.5 V, thereby charging the battery into a full charge state. After that, the battery for testing was fed into a constant temperature vessel of room temperature, heated at 5° C./minute, maintained at a constant temperature at a point of time when the battery reached 150° C., and maintained for one hour from the point of the time.

(b) Nail Penetration Test

The battery for testing was disposed under conditions of 60° C., constant current charging was carried out at 1 C, and then the constant current charging was switched to constant voltage charging when the battery voltage reached 4.5 V, thereby charging the battery into a full charge state. After that, the battery for testing was penetrated by a nail having a diameter of 2.5 mm under conditions of 60° C.

(c) Overcharging Test

The battery for testing in a discharged state was disposed under conditions of room temperature, and the battery for testing was over-charged by a large electric current of 5 C from the discharged state with a maximum of 24 V.

The results of the respective tests are shown in Table 1. Meanwhile, "O" is marked for the battery where nothing occurred in the heating test, the nail penetration test, and the overcharging test. Meanwhile, "1" is marked for the battery in which the laminate film was swollen by heat generation, "2" is marked for the battery in which slight smoking occurred, and "3" is marked for the battery in which gas blowout occurred.

TABLE 5

|  | Negative electrode active material | Material added to electrolytic solution | Added amount [% by weight] | Heating test | Nail penetration test | Over-charging test |
|---|---|---|---|---|---|---|
| Sample 5-1 | Artificial graphite | Silicotungstic acid | 1.0 | O | O | 1 |
| Sample 5-2 | Artificial graphite | Phosphotungstic acid | 1.0 | 1 | O | 1 |
| Sample 5-3 | Artificial graphite | Silicomolybdic acid | 1.0 | 1 | 1 | O |
| Sample 5-4 | Artificial graphite | Phosphomolybdic acid | 1.0 | O | 1 | O |
| Sample 5-5 | Artificial graphite | — | 0 | 2 | 3 | 2 |

As is clear from the results of the tests, in Samples 5-1 to 1-4 in which the heteropoly acid was added to the electrolytic solution, no problem occurred or, simply, the laminate film was swollen in each of the tests. In contrast to this, in Sample 5-5 in which the tungstic acid compound was not added to the negative electrode, slight smoking or gas blowout occurred in the battery for testing.

Therefore, it was confirmed that safety is improved by using the negative electrode in which a tungstic acid compound or molybdenum compound is precipitated on the surface.

EXAMPLE 6

[Example in which the Heteropoly Acid is Added to the Negative Electrode Active Material Layer so as to Precipitate the Reduced Product of the Polyacid and/or Polyacid Compound on the Surface of the Negative Electrode]

<Sample 6-1>

[Manufacturing of the Positive Electrode]

A positive electrode was manufactured in the same manner as in Example 1-1.

[Manufacturing of the Negative Electrode]

Firstly, 91% by weight of artificial graphite as a negative electrode active material and 9% by weight of polyvinylidene fluoride powder, which was a bonding agent were dry-mixed. Subsequently, N-methyl-2-pyrrolidone was adjusted and added to the mixture, thereby preparing a slurry-form negative electrode compound. Meanwhile, silicotungstic acid ($H_4(SiW_{12}O_{40})$) was dissolved in N-methyl-2-pyrrolidone so as to manufacture a silicotungstic acid solution having a concentration of 5.0% by mass. In addition, the silicotungstic acid solution having an added amount of silicotungstic acid corresponding to 0.01% by mass with respect to the negative electrode active material was added to the negative electrode compound slurry. A negative electrode was manufactured in the same manner as in Example 1-1 except the above.

[Manufacturing of the Electrolytic Solution]

The electrolytic solution was manufactured in the following manner. Firstly, ethylene carbonate (EC) and dimethyl carbonate (DMC) were mixed in a weight ratio of 4:6 so as to produce a mixed solvent. Subsequently, hexafluorophosphate ($LiPF_6$) was dissolved in the mixed solvent in a concentration of 1.0 mol/kg so as to prepare a solution.

[Manufacturing of the Wound Electrode Body]

A battery for testing was manufactured in the same manner as in Example 1-1 using the positive electrode, the negative electrode, and the electrolyte. Meanwhile, in Sample 6-1, preliminary charging, disassembly after preliminary charging, confirmation of the precipitation of a tungsten compound, and the manufacturing of the battery for testing in which the negative electrode in which a tungsten compound was precipitated was used were not carried out, and a tungsten compound was precipitated by charging of the battery for testing.

<Sample 6-2>

A negative electrode was manufactured in the same manner as in Sample 6-1 except that the added amount of silicotungstic acid ($H_4(SiW_{12}O_{40})$) was set to be 1.0% by mass with respect to the negative electrode active material.

<Sample 6-3>
A negative electrode was manufactured in the same manner as in Sample 6-1 except that the added amount of silicotungstic acid ($H_4(SiW_{12}O_{40})$) was set to be 3.0% by mass with respect to the negative electrode active material.
<Sample 6-4>
A negative electrode was manufactured in the same manner as in Sample 6-1 except that the added amount of silicotungstic acid ($H_4(SiW_{12}O_{40})$) was set to be 5.0% by mass with respect to the negative electrode active material.
<Sample 6-5>
A negative electrode was manufactured in the same manner as in Sample 6-1 except that phosphotungstic acid ($H_3(PW_{12}O_{40})$) was used instead of silicotungstic acid ($H_4(SiW_{12}O_{40})$), and the added amount of was set to be 1.0% by weight.
<Sample 6-6>
A negative electrode was manufactured in the same manner as in Sample 6-1 except that phosphotungstic acid ($H_3(PW_{12}O_{40})$) was used instead of silicotungstic acid ($H_4(SiW_{12}O_{40})$), and the added amount of was set to be 3.0% by weight.
<Sample 6-7>
A negative electrode was manufactured in the same manner as in Sample 6-1 except that phosphotungstic acid ($H_3(PW_{12}O_{40})$) was used instead of silicotungstic acid ($H_4(SiW_{12}O_{40})$), and the added amount of was set to be 5.0% by weight.
<Sample 6-8>
A negative electrode was manufactured in the same manner as in Sample 6-1 except that silicomolybdic acid ($H_4(SiMo_{12}O_{40})$) was used instead of silicotungstic acid ($H_4(SiW_{12}O_{40})$), and the added amount of was set to be 1.0% by weight.
<Sample 6-9>
A negative electrode was manufactured in the same manner as in Sample 6-1 except that silicomolybdic acid ($H_4(SiMo_{12}O_{40})$) was used instead of silicotungstic acid ($H_4(SiW_{12}O_{40})$), and the added amount of was set to be 3.0% by weight.
<Sample 6-10>
A negative electrode was manufactured in the same manner as in Sample 6-1 except that silicomolybdic acid ($H_4(SiMo_{12}O_{40})$) was used instead of silicotungstic acid ($H_4(SiW_{12}O_{40})$), and the added amount of was set to be 5.0% by weight.
<Sample 6-11>
A negative electrode was manufactured in the same manner as in Sample 6-1 except that phosphomolybdic acid ($H_3(PMo_{12}O_{40})$) was used instead of silicotungstic acid ($H_4(SiW_{12}O_{40})$), and the added amount of was set to be 1.0% by weight.
<Sample 6-12>
A negative electrode was manufactured in the same manner as in Sample 6-1 except that phosphomolybdic acid ($H_3(PMo_{12}O_{40})$) was used instead of silicotungstic acid ($H_4(SiW_{12}O_{40})$), and the added amount of was set to be 3.0% by weight.
<Sample 6-13>
A negative electrode was manufactured in the same manner as in Sample 6-1 except that phosphomolybdic acid ($H_3(PMo_{12}O_{40})$) was used instead of silicotungstic acid ($H_4(SiW_{12}O_{40})$), and the added amount of was set to be 5.0% by weight.

<Sample 6-14>
A negative electrode was manufactured in the same manner as in Sample 6-1 except that silicotungstic acid ($H_4(SiW_{12}O_{40})$) was not added.
<Sample 6-15>
A negative electrode was manufactured in the same manner as in Sample 6-1 except that the added amount of silicotungstic acid ($H_4(SiW_{12}O_{40})$) was set to be 0.005% by mass with respect to the negative electrode active material.
[Evaluation of the Battery for Testing]
(d) Measurement of the Battery Swelling Amount
After the secondary battery of each of the samples was charged by a constant current until the battery voltage reached 4.2 V at a constant current of 880 mA under conditions of 23° C., constant voltage charging was carried out until the electric current value reached 1 mA at a constant voltage of 4.2 V. After that, the full-charged secondary battery was maintained under conditions of 80° C. for 4 days. The amount of change of the thickness of the secondary battery at this time was measured as the swelling amount of the battery during the high-temperature storage.
The following Table 6 shows the results of the evaluation.

TABLE 6

| | Negative electrode active material | Material added to the negative electrode | Added amount [% by weight] | Amount of change of battery thickness [mm] |
|---|---|---|---|---|
| Sample 6-1 | Artificial graphite | Silicotungstic acid | 0.01 | 3.96 |
| Sample 6-2 | Artificial graphite | Silicotungstic acid | 1.0 | 3.46 |
| Sample 6-3 | Artificial graphite | Silicotungstic acid | 3.0 | 3.13 |
| Sample 6-4 | Artificial graphite | Silicotungstic acid | 5.0 | 2.92 |
| Sample 6-5 | Artificial graphite | Phosphotungstic acid | 1.0 | 3.67 |
| Sample 6-6 | Artificial graphite | Phosphotungstic acid | 3.0 | 3.15 |
| Sample 6-7 | Artificial graphite | Phosphotungstic acid | 5.0 | 3.05 |
| Sample 6-8 | Artificial graphite | Silicomolybdic acid | 1.0 | 3.76 |
| Sample 6-9 | Artificial graphite | Silicomolybdic acid | 3.0 | 3.51 |
| Sample 6-10 | Artificial graphite | Silicomolybdic acid | 5.0 | 3.15 |
| Sample 6-11 | Artificial graphite | Phosphomolybdic acid | 1.0 | 3.22 |
| Sample 6-12 | Artificial graphite | Phosphomolybdic acid | 3.0 | 3.36 |
| Sample 6-13 | Artificial graphite | Phosphotungstic acid | 5.0 | 2.87 |
| Sample 6-14 | Artificial graphite | — | — | 13.3 |
| Sample 6-15 | Artificial graphite | Silicotungstic acid | 0.005 | 6.95 |

It was found from the test results that battery swelling can be significantly suppressed by adding the heteropoly acid to the negative electrode compound so as to manufacture a non-aqueous electrolyte battery in comparison to Sample 6-14 to which silicomolybdic acid was not added.

Example 7

[When the Polyacid and/or Polyacid Compound is Precipitated on the Surface of the Positive Electrode]
<Sample 7-1>
[Manufacturing of the Positive Electrode]
Firstly, 92 parts by mass of a positive electrode active material composed of complex oxide particles (lithium cobalt acid) having an average composition of $LiCo_{0.98}Al_{0.01}Mg_{0.01}O_2$, 5 parts by mass of graphite powder, which was a conducting agent, and 3 parts by mass of polyvinylidene fluoride powder, which was a bonding agent, were mixed.

Subsequently, phosphomolybdic acid ($H_3(PMo_{12}O_{40})$) was dissolved in N-methyl-2-pyrrolidone, and a phosphomolybdic acid solution having an added amount of phosphomolybdic acid corresponding to 0.5% by weight of the positive electrode active material was added to the mixture. Furthermore, a desired amount of N-methyl-2-pyrrolidone, which was a dispersion medium, was added to and dispersed in the mixture, thereby manufacturing a slurry-form positive electrode compound.

This positive electrode compound slurry was evenly coated on both faces of a positive electrode collector composed of a 20 μm-thick aluminum foil, and dried at a reduced pressure at 100° C. for 24 hours, thereby forming a positive electrode active material layer. In addition, compacting was carried out on the positive electrode active material layer using a roll press machine so as to produce a positive electrode sheet. The positive electrode sheet was cut out into a 48 mm×300 mm band shape, thereby manufacturing a positive electrode. Subsequently, a positive electrode lead was welded to the positive electrode collector exposed portion of the positive electrode.

[Manufacturing of the Negative Electrode]

Firstly, 91 parts by mass of artificial graphite as a negative electrode active material and 9 parts by mass of polyvinylidene fluoride powder as a bonding agent were mixed so as to prepare a negative electrode compound, and, furthermore, the negative electrode compound was dispersed in N-methyl-2-pyrrolidone, which was a dispersion medium, thereby producing a negative electrode compound slurry. Next, the negative electrode compound slurry was evenly coated on both faces of a negative electrode collector composed of a 15 μm-thick copper foil, and dried at a reduced pressure at 120° C. for 24 hours, thereby forming a negative electrode active material layer. In addition, compacting was carried out on the negative electrode active material layer using a roll press machine so as to produce a negative electrode sheet. The negative electrode sheet was cut out into a 50 mm×310 mm band shape, thereby manufacturing a negative electrode. Subsequently, a negative electrode lead was welded to the negative electrode collector exposed portion of the negative electrode.

[Assembly of the Non-aqueous Electrolyte Battery]

Next, the manufactured positive electrode and negative electrode were adhered through a separator composed of a 20 μm-thick porous polyethylene film, wound in the longitudinal direction, and a protective tape was attached to the outermost circumferential portion, thereby manufacturing a flat-type wound electrode body. At this time, a structure in which the negative electrode was protruded outside the positive electrode, and the separator was protruded outside the negative electrode was made.

Subsequently, this wound electrode body was filled in an exterior member, three sides of the exterior member were thermally fused, and one side was not thermally fused, thereby having an opening. A damp-proof aluminum laminate film composed by laminating a 25 μm-thick nylon film, a 40 μm-thick aluminum foil, and a 30 μm-thick polypropylene film sequentially from the outermost layer was used as the exterior member.

Subsequently, as an electrolyte salt, 1 mol/l of hexafluorophosphate ($LiPF_6$) was dissolved in a solvent, in which ethylene carbonate (EC) and propylene carbonate (PC) were mixed in a mass ratio of 4:6, thereby manufacturing an electrolytic solution. The electrolytic solution was injected from the opening of the exterior member, and sealed by thermally fusing the remaining side of the exterior member under reduced pressure, thereby manufacturing a secondary battery. Meanwhile, at this time, an adhering film was interposed between the positive lead and the negative lead, and the exterior member.

Meanwhile, the secondary battery was charged by a constant current and a constant voltage at room temperature and 1 C until 4.2 V. After that, when the secondary battery was disassembled at a low temperature, and the electrode was unwound, a precipitate was observed on the surface of the positive electrode. As a result of measurement by an XPS analysis, the precipitate was a molybdic acid compound, and the main portion of the molybdic acid compound was $Mo^{6+}$.

<Sample 7-2>

The complex oxide particle having an average composition of $LiNi_{0.77}CO_{0.20}Al_{0.03}O_2$ (lithium nickelate) was used as the positive electrode active material. In addition, the amount of phosphomolybdic acid added to the positive electrode compound was set to 1.0% by weight. A secondary battery was manufactured in the same manner as in Sample 7-1 except the above. Meanwhile, as a result of confirmation after charging the secondary battery under the charging conditions and disassembling the secondary battery, a molybdic acid compound was precipitated on the surface of the positive electrode, and the main portion of the molybdic acid compound was $Mo^{6}\%$.

<Sample 7-3>

The complex oxide particle having an average composition of $LiMn_2O_4$ (spinel-type lithium manganate) was used as the positive electrode active material. In addition, the amount of phosphomolybdic acid added to the positive electrode compound was set to 0.5% by weight. A secondary battery was manufactured in the same manner as in Sample 7-1 except the above. Meanwhile, as a result of confirmation after charging the secondary battery under the charging conditions and disassembling the secondary battery, a molybdic acid compound was precipitated on the surface of the positive electrode, and the main portion of the molybdic acid compound was $Mo^{6+}$.

<Sample 7-4>

The heteropoly acid added to the positive electrode compound was changed from phosphomolybdic acid to phosphotungstic acid ($H_3(PW_{12}O_{40})$). A secondary battery was manufactured in the same manner as in Sample 7-1 except the above. Meanwhile, as a result of confirmation after charging the secondary battery under the charging conditions and disassembling the secondary battery, a tungstic acid compound was precipitated on the surface of the positive electrode, and the main portion of the tungstic acid compound was $W^{6+}$.

<Sample 7-5>

The heteropoly acid added to the positive electrode compound was changed from phosphomolybdic acid to phosphotungstic acid. A secondary battery was manufactured in the same manner as in Sample 7-2 except the above. Meanwhile, as a result of confirmation after charging the secondary battery under the charging conditions and disassembling the secondary battery, a tungstic acid compound was precipitated on the surface of the positive electrode, and the main portion of the tungstic acid compound was $W^{6+}$.

<Sample 7-6>

The heteropoly acid added to the positive electrode compound was changed from phosphomolybdic acid to phosphotungstic acid. A secondary battery was manufactured in the same manner as in Sample 7-3 except the above. Meanwhile, as a result of confirmation after charging the secondary battery under the charging conditions and disassembling the secondary battery, a tungstic acid compound was precipitated on the surface of the positive electrode, and the main portion of the tungstic acid compound was $W^{6+}$.
<Sample 7-7>

The heteropoly acid added to the positive electrode compound was changed from phosphomolybdic acid to silicomolybdic acid ($H_4(SiMo_{12}O_{40})$). A secondary battery was manufactured in the same manner as in Sample 7-1 except the above. Meanwhile, as a result of confirmation after charging the secondary battery under the charging conditions and disassembling the secondary battery, a molybdic acid compound was precipitated on the surface of the positive electrode, and the main portion of the molybdic acid compound was $Mo^{6+}$.
<Sample 7-8>

The heteropoly acid added to the positive electrode compound was changed from phosphomolybdic acid to silicomolybdic acid. A secondary battery was manufactured in the same manner as in Sample 7-2 except the above. Meanwhile, as a result of confirmation after charging the secondary battery under the charging conditions and disassembling the secondary battery, a molybdic acid compound was precipitated on the surface of the positive electrode, and the main portion of the molybdic acid compound was $Mo^{6+}$.
<Sample 7-9>

The heteropoly acid added to the positive electrode compound was changed from phosphomolybdic acid to silicomolybdic acid. A secondary battery was manufactured in the same manner as in Sample 7-3 except the above. Meanwhile, as a result of confirmation after charging the secondary battery under the charging conditions and disassembling the secondary battery, a molybdic acid compound was precipitated on the surface of the positive electrode, and the main portion of the molybdic acid compound was $Mo^{6+}$.
<Sample 7-10>

The heteropoly acid added to the positive electrode compound was changed from phosphomolybdic acid to silicotungstic acid ($H_4(SiW_{12}O_{40})$). A secondary battery was manufactured in the same manner as in Sample 7-1 except the above. Meanwhile, as a result of confirmation after charging the secondary battery under the charging conditions and disassembling the secondary battery, a tungstic acid compound was precipitated on the surface of the positive electrode, and the main portion of the tungstic acid compound was $W^{6+}$.
<Sample 7-11>

The heteropoly acid added to the positive electrode compound was changed from phosphomolybdic acid to silicotungstic acid. A secondary battery was manufactured in the same manner as in Sample 7-2 except the above. Meanwhile, as a result of confirmation after charging the secondary battery under the charging conditions and disassembling the secondary battery, a tungstic acid compound was precipitated on the surface of the positive electrode, and the main portion of the tungstic acid compound was $W^{6+}$.
<Sample 7-12>

The heteropoly acid added to the positive electrode compound was changed from phosphomolybdic acid to silicotungstic acid. A secondary battery was manufactured in the same manner as in Sample 7-3 except the above. Meanwhile, as a result of confirmation after charging the secondary battery under the charging conditions and disassembling the secondary battery, a tungstic acid compound was precipitated on the surface of the positive electrode, and the main portion of the tungstic acid compound was $W^{6+}$.
<Sample 7-13>

A secondary battery was manufactured in the same manner as in Sample 7-1 except that phosphomolybdic acid was not added to the positive electrode compound.
<Sample 7-14>

A secondary battery was manufactured in the same manner as in Sample 7-2 except that phosphomolybdic acid was not added to the positive electrode compound.
<Sample 7-15>

A secondary battery was manufactured in the same manner as in Sample 7-3 except that phosphomolybdic acid was not added to the positive electrode compound.

[Evaluation of the Secondary Battery: Heating Test]

After the secondary battery of each of the samples was overcharged by a constant electric current and a constant voltage at 1 C until 4.5 V, the secondary battery was fed into a high-temperature vessel of room temperature, and heated at 5° C./minute, and maintained at a constant temperature for one hour at a point of time when the secondary battery reached 150° C.

[Evaluation of the Secondary Battery: Nail Penetration Test]

After the secondary battery of each of the samples was overcharged by a low electric current and a constant voltage at 1 C until 4.5 V, the shape of the secondary battery was confirmed when the secondary battery was penetrated by a nail having a diameter of 5.0 mm under conditions of 60° C.

[Evaluation of the Secondary Battery: Overcharging Test]

After the secondary battery of each of the samples in a discharged state was overcharged by a large electric current of 5 C under conditions of room temperature until the battery voltage reached 24 V, the charging was finished at a point of time when the total charging time became one hour. The shape of the secondary battery was confirmed at this time.

The following Table 7 shows the results of the evaluations.

TABLE 7

|  | Positive electrode active material | Heteropoly acid added to the positive electrode active material layer | Added amount of the heteropoly acid [% by weight] | Heating test | Nail penetration test | Overcharging test |
| --- | --- | --- | --- | --- | --- | --- |
| Sample 7-1 | $LiCo_{0.98}Al_{0.01}Mg_{0.01}O_2$ | Phosphomolybdic acid | 0.5 | O | O | O |
| Sample 7-2 | $LiNi_{0.77}Co_{0.20}Al_{0.03}O_2$ | Phosphomolybdic acid | 1.0 | O | Battery expansion | Battery expansion |
| Sample 7-3 | $LiMn_2O_4$ | Phosphomolybdic acid | 0.5 | O | O | O |
| Sample 7-4 | $LiCo_{0.98}Al_{0.01}Mg_{0.01}O_2$ | Phosphotungstic acid | 0.5 | O | O | O |
| Sample 7-5 | $LiNi_{0.77}Co_{0.20}Al_{0.03}O_2$ | Phosphotungstic acid | 1.0 | Battery expansion | Battery expansion | O |
| Sample 7-6 | $LiMn_2O_4$ | Phosphotungstic acid | 0.5 | O | O | O |
| Sample 7-7 | $LiCo_{0.98}Al_{0.01}Mg_{0.01}O_2$ | Silicomolybdic acid | 0.5 | O | Battery expansion | O |

TABLE 7-continued

| | Positive electrode active material | Heteropoly acid added to the positive electrode active material layer | Added amount of the heteropoly acid [% by weight] | Heating test | Nail penetration test | Overcharging test |
|---|---|---|---|---|---|---|
| Sample 7-8 | $LiNi_{0.77}Co_{0.20}Al_{0.03}O_2$ | Silicomolybdic acid | 1.0 | Battery expansion | Battery expansion | O |
| Sample 7-9 | $LiMn_2O_4$ | Silicomolybdic acid | 0.5 | O | O | O |
| Sample 7-10 | $LiCo_{0.98}Al_{0.01}Mg_{0.01}O_2$ | Silicotungstic acid | 0.5 | Battery expansion | O | O |
| Sample 7-11 | $LiNi_{0.77}Co_{0.20}Al_{0.03}O_2$ | Silicotungstic acid | 1.0 | O | Battery expansion | O |
| Sample 7-12 | $LiMn_2O_4$ | Silicotungstic acid | 0.5 | O | Battery expansion | O |
| Sample 7-13 | $LiCo_{0.98}Al_{0.01}Mg_{0.01}O_2$ | — | — | Gas blowout | Gas blowout | Gas blowout |
| Sample 7-14 | $LiNi_{0.77}Co_{0.20}Al_{0.03}O_2$ | — | — | Gas blowout | Gas blowout | Gas blowout |
| Sample 7-15 | $LiMn_2O_4$ | — | — | Slight smoking | Slight smoking | Slight smoking |

Meanwhile, "O" is marked for the battery where nothing occurred in the nail penetration test and the heating test in Table 7.

As is clear from Table 7, in Samples 7-13 to 7-15 in which the heteropoly acid or heteropoly acid compound was not mixed with the positive electrode, the precipitate of the heteropoly acid or heteropoly acid compound was not precipitated on the surface of the positive electrode. In addition, in each of the evaluation tests, gas blowout or slight smoking occurred. In contrast to this, it was found that, in Samples 7-1 to 7-12 in which the precipitate of the polyacid or polyacid compound was precipitated on the positive electrode, deformation did not occur in the battery, or simply swelling occurred in the battery, and the battery had a high stability.

This is considered to be because it became difficult for short-circuiting to occur by the polyacid or polyacid compound being precipitated on the surface of the positive electrode even when the positive electrode and the negative electrode were brought into contact with each other.

EXAMPLE 8

[When the Heteropoly Acid is Precipitated by Carrying Out Preliminary Charging while Embossing was Carried Out]
<Sample 8-1>
[Manufacturing of the Positive Electrode]

Firstly, 92 parts by mass of a positive electrode active material composed of complex oxide particles (lithium cobalt acid) having an average composition of $LiCo_{0.98}Al_{0.01}Mg_{0.01}O_2$, 5 parts by mass of graphite powder, which was a conducting agent, and 3 parts by mass of polyvinylidene fluoride powder, which was a bonding agent, were mixed.

Subsequently, silicomolybdic acid ($H_4(SiMo_{12}O_{40})$) was dissolved in N-methyl-2-pyrrolidone, and a phosphomolybdic acid solution having an added amount of silicomolybdic acid corresponding to 0.3% by weight of the positive electrode active material was added to the mixture. Furthermore, a desired amount of N-methyl-2-pyrrolidone, which was a dispersion medium, was added to and dispersed in the mixture, thereby manufacturing a slurry-form positive electrode compound.

This positive electrode compound slurry was evenly coated on both faces of a positive electrode collector composed of a 20 μm-thick aluminum foil, and dried at a reduced pressure at 100° C. for 24 hours, thereby forming a positive electrode active material layer. In addition, compacting was carried out on the positive electrode active material layer using a roll press machine so as to produce a positive electrode sheet. The positive electrode sheet was cut out into a 48 mm×300 mm band shape, thereby manufacturing a positive electrode. Subsequently, a positive electrode lead was welded to the positive electrode collector exposed portion of the positive electrode.

[Manufacturing of the Negative Electrode]

Firstly, 91 parts by mass of artificial graphite as a negative electrode active material and 9 parts by mass of polyvinylidene fluoride powder as a bonding agent were mixed so as to prepare a negative electrode compound, and, furthermore, the negative electrode compound was dispersed in N-methyl-2-pyrrolidone, which was a dispersion medium, thereby producing a negative electrode compound slurry. Next, the negative electrode compound slurry was evenly coated on both faces of a negative electrode collector composed of a 15 μm-thick copper foil, and dried at a reduced pressure at 120° C. for 24 hours, thereby forming a negative electrode active material layer. In addition, compacting was carried out on the negative electrode active material layer using a roll press machine so as to produce a negative electrode sheet. The negative electrode sheet was cut out into a 50 mm×310 mm band shape, thereby manufacturing a negative electrode. Subsequently, a negative electrode lead was welded to the negative electrode collector exposed portion of the negative electrode.

[Assembly of the Non-aqueous Electrolyte Battery]

Next, the manufactured positive electrode and negative electrode were adhered through a separator composed of a 20 μm-thick porous polyethylene film, wound in the longitudinal direction, and a protective tape was attached to the outermost circumferential portion, thereby manufacturing a flat-type wound electrode body. At this time, a structure in which the negative electrode was protruded outside the positive electrode, and the separator was protruded outside the negative electrode was made.

Subsequently, this wound electrode body was filled in an exterior member, three sides of the exterior member were thermally fused, and one side was not thermally fused, thereby having an opening. A damp-proof aluminum laminate film composed by laminating a 25 μm-thick nylon film, a 40 μm-thick aluminum foil, and a 30 μm-thick polypropylene film sequentially from the outermost layer was used as the exterior member.

Subsequently, as an electrolyte salt, 1 mol/l of hexafluorophosphate ($LiPF_6$) was dissolved in a solvent, in which ethylene carbonate (EC) and propylene carbonate (PC) were mixed in a mass ratio of 4:6, thereby manufacturing an electrolytic solution. The electrolytic solution was injected from the opening of the exterior member, and sealed by thermally fusing the remaining side of the exterior member, thereby, manufacturing a secondary battery. Meanwhile, at this time, an adhering film was interposed between the positive electrode lead and the negative electrode lead, and the exterior member.

After that, the flat-type secondary battery was interposed from the up and down direction, and embossed from the outside so as to prevent expansion of the secondary battery during charging. In this state, the secondary battery was preliminarily charged by a constant current and a constant voltage at room temperature and 0.2 C until 4.2 V. After that, the secondary battery was charged by a constant current at 0.2 C until 2.5 V, thereby manufacturing a secondary battery.

<Sample 8-2>

The complex oxide particle having an average composition of $LiNi_{0.77}CO_{0.20}Al_{0.03}O_2$ (lithium nickelate) was used as the positive electrode active material. In addition, the amount of silicomolybdic acid added to the positive electrode compound was set to 0.5% by weight. A secondary battery was manufactured in the same manner as in Sample 8-1 except the above.

<Sample 8-3>

A secondary battery was manufactured in the same manner as in Sample 8-1 except that the complex oxide particle having an average composition of $LiMn_2O_4$ (spinel-type lithium manganate) was used as the positive electrode active material.

<Sample 8-4>

A secondary battery was manufactured in the same manner as in Sample 8-1 except that the heteropoly acid added to the positive electrode compound was changed from silicomolybdic acid to phosphomolybdic acid ($H_4(SiMo_{12}O_{40})$).

<Sample 8-5>

A secondary battery was manufactured in the same manner as in Sample 8-2 except that the heteropoly acid added to the positive electrode compound was changed from silicomolybdic acid to phosphotungstic acid, and the added amount was set to 0.5% by weight.

<Sample 8-6>

A secondary battery was manufactured in the same manner as in Sample 8-3 except that the heteropoly acid added to the positive electrode compound was changed from silicomolybdic acid to phosphotungstic acid.

<Sample 8-7>

A secondary battery was manufactured in the same manner as in Sample 8-1 except that the heteropoly acid added to the positive electrode compound was changed from silicomolybdic acid to silicotungstic acid ($H_4(SiW_{12}O_{40})$).

<Sample 8-8>

A secondary battery was manufactured in the same manner as in Sample 8-2 except that the heteropoly acid added to the positive electrode compound was changed from silicomolybdic acid to silicotungstic acid, and the added amount was set to 0.5% by weight.

<Sample 8-9>

A secondary battery was manufactured in the same manner as in Sample 8-3 except that the heteropoly acid added to the positive electrode compound was changed from silicomolybdic acid to silicotungstic acid.

<Sample 8-10>

A secondary battery was manufactured in the same manner as in Sample 8-1 except that the heteropoly acid added to the positive electrode compound was changed from silicomolybdic acid to phosphotungstic acid ($H_3(PW_{12}O_{40})$).

<Sample 8-11>

A secondary battery was manufactured in the same manner as in Sample 8-2 except that the heteropoly acid added to the positive electrode compound was changed from silicomolybdic acid to phosphotungstic acid, and the added amount was set to 0.5% by weight.

<Sample 8-12>

A secondary battery was manufactured in the same manner as in Sample 8-3 except that the heteropoly acid added to the positive electrode compound was changed from silicomolybdic acid to phosphotungstic acid.

<Sample 8-13>

A secondary battery was manufactured in the same manner as in Sample 8-1 except that preliminary charging and discharging were not carried out in an embossed state.

<Sample 8-14>

A secondary battery was manufactured in the same manner as in Sample 8-2 except that preliminary charging and discharging were not carried out in an embossed state.

<Sample 8-15>

A secondary battery was manufactured in the same manner as in Sample 8-3 except that preliminary charging and discharging were not carried out in an embossed state.

<Sample 8-16>

A secondary battery was manufactured in the same manner as in Sample 8-4 except that preliminary charging and discharging were not carried out in an embossed state.

<Sample 8-17>

A secondary battery was manufactured in the same manner as in Sample 8-5 except that preliminary charging and discharging were not carried out in an embossed state.

<Sample 8-18>

A secondary battery was manufactured in the same manner as in Sample 8-6 except that preliminary charging and discharging were not carried out in an embossed state.

<Sample 8-19>

A secondary battery was manufactured in the same manner as in Sample 8-7 except that preliminary charging and discharging were not carried out in an embossed state.

<Sample 8-20>

A secondary battery was manufactured in the same manner as in Sample 8-8 except that preliminary charging and discharging were not carried out in an embossed state.

<Sample 8-21>

A secondary battery was manufactured in the same manner as in Sample 8-9 except that preliminary charging and discharging were not carried out in an embossed state.

<Sample 8-22>

A secondary battery was manufactured in the same manner as in Sample 8-10 except that preliminary charging and discharging were not carried out in an embossed state.

<Sample 8-23>

A secondary battery was manufactured in the same manner as in Sample 8-11 except that preliminary charging and discharging were not carried out in an embossed state.

<Sample 8-24>

A secondary battery was manufactured in the same manner as in Sample 8-12 except that preliminary charging and discharging were not carried out in an embossed state.

[Evaluation of the Secondary Battery: Heating Test]

After the secondary battery of each of the samples was overcharged by a constant electric current and a constant voltage at 1 C until 4.5 V, the secondary battery was fed into a high-temperature vessel of room temperature, and heated at 5° C./minute, and maintained at a constant temperature for one hour at a point of time when the secondary battery reached 150° C.

[Evaluation of the Secondary Battery: Nail Penetration Test]

After the secondary battery of each of the samples was overcharged by a low electric current and a constant voltage at 1 C until 4.5 V, the shape of the secondary battery was confirmed when the secondary battery was penetrated by a nail having a diameter of 2.5 mm under conditions of 60° C.
[Evaluation of the Secondary Battery: Overcharging Test]

After the secondary battery of each of the samples in a discharged state was overcharged by a large electric current of 5 C under conditions of room temperature until the battery voltage reached 24 V, the charging was finished at a point of time when the total charging time became one hour. The shape of the secondary battery was confirmed at this time.

The following Table 8 shows the results of the evaluations.

TABLE 8

| | Positive electrode active material | Heteropoly acid added to the positive electrode active material layer | Added amount of the heteropoly acid [% by weight] | Preliminary charging/ discharging in a pressurized state | Heating test | Nail penetration test | Overcharging test |
|---|---|---|---|---|---|---|---|
| Sample 8-1 | $LiCo_{0.98}Al_{0.01}Mg_{0.01}O_2$ | Silicomolybdic acid | 0.3 | Yes | O | O | Battery expansion |
| Sample 8-2 | $LiNi_{0.77}Co_{0.02}Al_{0.03}O_2$ | Silicomolybdic acid | 0.5 | Yes | Battery expansion | Battery expansion | O |
| Sample 8-3 | $LiMn_2O_4$ | Silicomolybdic acid | 0.3 | Yes | Battery expansion | Battery expansion | O |
| Sample 8-4 | $LiCo_{0.98}Al_{0.01}Mg_{0.01}O_2$ | Silicomolybdic acid | 0.3 | No | Slight smoking | Battery expansion | Battery expansion |
| Sample 8-5 | $LiNi_{0.77}Co_{0.20}Al_{0.03}O_2$ | Silicomolybdic acid | 0.5 | No | Slight smoking | Slight smoking | Battery expansion |
| Sample 8-6 | $LiMn_2O_4$ | Silicomolybdic acid | 0.3 | No | Battery expansion | Battery expansion | Battery expansion |
| Sample 8-7 | $LiCo_{0.98}Al_{0.01}Mg_{0.01}O_2$ | Phosphomolybdic acid | 0.3 | Yes | O | O | Battery expansion |
| Sample 8-8 | $LiNi_{0.77}Co_{0.20}Al_{0.03}O_2$ | Phosphomolybdic acid | 0.5 | Yes | Battery expansion | Battery expansion | O |
| Sample 8-9 | $LiMn_2O_4$ | Phosphomolybdic acid | 0.3 | Yes | Battery expansion | O | O |
| Sample 8-10 | $LiCo_{0.98}Al_{0.01}Mg_{0.01}O_2$ | Phosphomolybdic acid | 0.3 | No | Slight smoking | Battery expansion | Battery expansion |
| Sample 8-11 | $LiNi_{0.77}Co_{0.20}Al_{0.03}O_2$ | Phosphomolybdic acid | 0.5 | No | Slight smoking | Slight smoking | Battery expansion |
| Sample 8-12 | $LiMn_2O_4$ | Phosphomolybdic acid | 0.3 | No | Battery expansion | Battery expansion | O |
| Sample 8-13 | $LiCo_{0.98}Al_{0.01}Mg_{0.01}O_2$ | Silicotungstic acid | 0.3 | Yes | O | O | Battery expansion |
| Sample 8-14 | $LiNi_{0.77}Co_{0.20}Al_{0.03}O_2$ | Silicotungstic acid | 0.5 | Yes | Battery expansion | Battery expansion | Battery expansion |
| Sample 8-15 | $LiMn_2O_4$ | Silicotungstic acid | 0.3 | Yes | Battery expansion | Battery expansion | O |
| Sample 8-16 | $LiCo_{0.98}Al_{0.01}Mg_{0.01}O_2$ | Silicotungstic acid | 0.3 | No | Slight smoking | Battery expansion | Battery expansion |
| Sample 8-17 | $LiNi_{0.77}Co_{0.20}Al_{0.03}O_2$ | Silicotungstic acid | 0.5 | No | Slight smoking | Slight smoking | Battery expansion |
| Sample 8-18 | $LiMn_2O_4$ | Silicotungstic acid | 0.3 | No | Battery expansion | Battery expansion | O |
| Sample 8-19 | $LiCo_{0.98}Al_{0.01}Mg_{0.01}O_2$ | Phosphotungstic acid | 0.3 | Yes | O | Battery expansion | Battery expansion |
| Sample 8-20 | $LiNi_{0.77}Co_{0.20}Al_{0.03}O_2$ | Phosphotungstic acid | 0.5 | Yes | Battery expansion | Battery expansion | Battery expansion |
| Sample 8-21 | $LiMn_2O_4$ | Phosphotungstic acid | 0.3 | Yes | Battery expansion | Battery expansion | O |
| Sample 8-22 | $LiCo_{0.98}Al_{0.01}Mg_{0.01}O_2$ | Phosphotungstic acid | 0.3 | No | Slight smoking | Battery expansion | Battery expansion |
| Sample 8-23 | $LiNi_{0.77}Co_{0.20}Al_{0.03}O_2$ | Phosphotungstic acid | 0.5 | No | Slight smoking | Slight smoking | Battery expansion |
| Sample 8-24 | $LiMn_2O_4$ | Phosphotungstic acid | 0.3 | No | Battery expansion | Battery expansion | O |

Meanwhile, in Table 8, "O" is marked for the battery where nothing occurred in the nail penetration test and the heating test.

As is clear from Table 8, in Samples 8-13 to 8-24 in which preliminary charging was not carried out while carrying out embossing, battery expansion or slight smoking, depending on the test, occurred. In contrast to this, in Samples 8-1 to 8-12 in which preliminary charging was carried out while carrying out embossing, deformation did not occur in the battery, or simply swelling occurred in the battery, and the battery had a high safety. Meanwhile, in this example, with regard to Samples 8-13 to 8-24 in which preliminary charging was not carried out while carrying out embossing, the battery was disassembled and investigated after the charging of each of the tests. Then, in comparison to the secondary battery in which preliminary charging was carried out, the precipitated form of the heteropoly acid was substantially the same, but the adhesiveness between the negative electrode and the separator was decreased in the secondary battery in which preliminary charging was not carried out. This is considered to be because the adhesiveness between the electrode and the separator is improved by carrying out preliminary charging on the secondary battery while carrying out embossing, and a high safety can be obtained.

EXAMPLE 9

[When a Separator Having the Heteropoly Acid Supported in Advance is Used]
<Sample 9-1>
[Manufacturing of the Positive Electrode]

Firstly, 92 parts by mass of a positive electrode active material composed of complex oxide particles (lithium cobalt acid) having an average composition of $LiCo_{0.98}Al_{0.01}Mg_{0.01}O_2$, 5 parts by mass of graphite powder, which was a conducting agent, and 3 parts by mass of polyvinylidene fluoride powder, which was a bonding agent, were mixed so as to prepare a positive electrode compound, and, furthermore, this positive electrode compound was dispersed in N-methyl-2-pyrrolidone, which was a dispersion medium, thereby manufacturing a slurry-form positive electrode compound slurry.

This positive electrode compound slurry was evenly coated on both faces of a positive electrode collector composed of a 20 μm-thick aluminum foil, and dried at a reduced pressure at 100° C. for 24 hours, thereby forming a positive electrode active material layer. In addition, compacting was carried out on the positive electrode active material layer using a roll press machine so as to produce a positive electrode sheet. The positive electrode sheet was cut out into a 48 mm×300 mm band shape, thereby manufacturing a positive electrode. Subsequently, a positive electrode lead was welded to the positive electrode collector exposed portion of the positive electrode.

[Manufacturing of the Negative Electrode]

91 parts by mass of artificial graphite as a negative electrode active material and 9 parts by mass of polyvinylidene fluoride powder as a bonding agent were mixed so as to prepare a negative electrode compound, and, furthermore, the negative electrode compound was dispersed in N-methyl-2-pyrrolidone, which was a dispersion medium, thereby producing a negative electrode compound slurry.

Next, the negative electrode compound slurry was evenly coated on both faces of a negative electrode collector composed of a 15 µm-thick copper foil, and dried at a reduced pressure at 120° C. for 24 hours, thereby forming a negative electrode active material layer. In addition, compacting was carried out on the negative electrode active material layer using a roll press machine so as to produce a negative electrode sheet. The negative electrode sheet was cut out into a 50 mm×310 mm band shape, thereby manufacturing a negative electrode. Subsequently, a negative electrode lead was welded to the negative electrode collector exposed portion of the negative electrode.

[Manufacturing of the Separator]

A 20 µm-thick and 52 mm-wide porous polyethylene film was immersed and impregnated by a solution having silicomolybdic acid ($H_4(SiMo_{12}O_{40})$) dissolved in dimethyl carbonate, and dried under a vacuum atmosphere. At this time, a solution vessel of methyl carbonate dissolved in silicomolybdic acid was installed between a reel that winds off the porous polyethylene film and a reel that winds in the porous polyethylene film. In addition, the porous polyethylene film was introduced to, immersed in, pulled off from the solution vessel at the same speed, dried, and wound. Furthermore, the porous polyethylene film was dried under vacuum at room temperature so as to produce a separator. Meanwhile, the impregnated amount (area density) of the silicomolybdic acid in the separator was 1.0% by weight of the coating density (area density) of the positive electrode.

[Assembly of the Non-aqueous Electrolyte Battery]

Next, the positive electrode, the separator, the negative electrode, and the separator were laminated sequentially and adhered using the manufactured positive electrode, negative electrode, and separator, wound in the longitudinal direction, and a protective tape was attached to the outermost circumferential portion, thereby manufacturing a flat-type wound electrode body. At this time, a structure in which the negative electrode was protruded outside the positive electrode, and the separator was protruded outside the negative electrode was made.

Subsequently, this wound electrode body was filled in an exterior member, three sides of the exterior member were thermally fused, and one side was not thermally fused, thereby having an opening. A damp-proof aluminum laminate film composed by laminating a 25 µm-thick nylon film, a 40 µm-thick aluminum foil, and a 30 µm-thick polypropylene film sequentially from the outermost layer was used as the exterior member.

Subsequently, as an electrolyte salt, 1 mol/l of hexafluorophosphate ($LiPF_6$) was dissolved in a solvent, in which ethylene carbonate (EC) and propylene carbonate (PC) were mixed in a mass ratio of 4:6, thereby manufacturing an electrolytic solution. The electrolytic solution was injected from the opening of the exterior member, and sealed by thermally fusing the remaining side of the exterior member, thereby, manufacturing a secondary battery. Meanwhile, at this time, an adhering film was interposed between the positive electrode lead and the negative electrode lead, and the exterior member.

[Evaluation of the Secondary Battery: Heating Test]

After the secondary battery of each of the samples was overcharged by a constant current and a constant voltage at 1 C until 4.5 V at room temperature, the secondary battery was fed into a high-temperature vessel of room temperature, and heated at 5° C./minute, and maintained at a constant temperature for one hour at a point of time when the secondary battery reached 150° C.

[Evaluation of the Secondary Battery: Nail Penetration Test]

After the secondary battery of each of the samples was overcharged by a low electric current and a constant voltage at 1 C under conditions of 60° C. until 4.5 V, the shape of the secondary battery was confirmed when the secondary battery was penetrated by a nail having a diameter of 2.5 mm under conditions of 60° C.

[Evaluation of the Secondary Battery: Overcharging Test]

After the secondary battery of each of the samples in a discharged state was overcharged by a large electric current of 5 C under conditions of room temperature until the battery voltage reached 24 V, the charging was finished at a point of time when the total charging time became one hour. The shape of the secondary battery was confirmed at this time.

[Evaluation of the Secondary Battery: Cycle Test]

After the secondary battery of each of the samples in a discharged state was charged by a constant current and a constant voltage until 4.2 V at 1 C under conditions of room temperature, the secondary battery was charged by a constant current until 2.5 V at 1 C. The discharge capacity at this time was obtained as the initial capacity. After that, charging and discharging were carried out 100 cycles under the same conditions, and the discharge capacity at the $100^{th}$ cycle was measured. The cycle retention ratio was computed by {(the discharge capacity at the $100^{th}$ cycle/the initial capacity)× 100}.

<Sample 9-2>

A secondary battery was manufactured in the same manner as in Sample 9-1 except that the complex oxide particle having an average composition of $LiNi_{0.77}CO_{0.20}Al_{0.03}O_2$ (lithium nickelate) was used as the positive electrode active material, and the respective evaluations were carried out.

<Sample 9-3>

A secondary battery was manufactured in the same manner as in Sample 9-1 except that the complex oxide particle having an average composition of $LiMn_2O_4$ (spinel-type lithium manganate) was used as the positive electrode active material. In addition, as the cycle test, after the battery was charged by a constant current and a constant voltage until 4.3 V at 1 C under conditions of room temperature, and then a charging and discharging cycle in which constant current discharging was carried out until 3.0 V at 1 C was carried out 100 cycles, the cycle retention ratio was measured. The heating test, the nail penetration test, and the overcharge test were carried out under the same conditions as in Sample 9-1.

<Sample 9-4>

A secondary battery was manufactured in the same manner as in Sample 9-1 except that a separator in which a solution having phosphomolybdic acid ($H_3(PMo_{12}O_{40})$) dissolved instead of silicomolybdic acid was impregnated in a porous polyethylene film, and dried under a vacuum atmosphere was used, and the respective evaluations were carried out.

<Sample 9-5>

A secondary battery was manufactured in the same manner as in Sample 9-2 except that a separator in which a solution having phosphomolybdic acid ($H_3(PMo_{12}O_{40})$) dissolved instead of silicomolybdic acid was impregnated in a porous polyethylene film, and dried under a vacuum atmosphere was used, and the respective evaluations were carried out.

<Sample 9-6>

A secondary battery was manufactured in the same manner as in Sample 9-3 except that a separator in which a solution having phosphomolybdic acid ($H_3(PMo_{12}O_{40})$) dissolved instead of silicomolybdic acid was impregnated in a porous polyethylene film, and dried under a vacuum atmosphere was used, and the respective evaluations were carried out.

<Sample 9-7>
A secondary battery was manufactured in the same manner as in Sample 9-1 except that a separator in which a solution having silicotungstic acid ($H_4(SiW_{12}O_{40})$) dissolved instead of silicomolybdic acid was impregnated in a porous polyethylene film, and dried under a vacuum atmosphere was used, and the respective evaluations were carried out.

<Sample 9-8>
A secondary battery was manufactured in the same manner as in Sample 9-2 except that a separator in which a solution having silicotungstic acid ($H_4(SiW_{12}O_{40})$) dissolved instead of silicomolybdic acid was impregnated in a porous polyethylene film, and dried under a vacuum atmosphere was used, and the respective evaluations were carried out.

<Sample 9-9>
A secondary battery was manufactured in the same manner as in Sample 9-3 except that a separator in which a solution having silicotungstic acid ($H_4(SiW_{12}O_{40})$) dissolved instead of silicomolybdic acid was impregnated in a porous polyethylene film, and dried under a vacuum atmosphere was used, and the respective evaluations were carried out.

<Sample 9-10>
A secondary battery was manufactured in the same manner as in Sample 9-1 except that a separator in which a solution having phosphotungstic acid ($H_3(PW_{12}O_{40})$) dissolved instead of silicomolybdic acid was impregnated in a porous polyethylene film, and dried under a vacuum atmosphere was used, and the respective evaluations were carried out.

<Sample 9-11>
A secondary battery was manufactured in the same manner as in Sample 9-2 except that a separator in which a solution having phosphotungstic acid ($H_3(PW_{12}O_{40})$) dissolved instead of silicomolybdic acid was impregnated in a porous polyethylene film, and dried under a vacuum atmosphere was used, and the respective evaluations were carried out.

<Sample 9-12>
A secondary battery was manufactured in the same manner as in Sample 9-3 except that a separator in which a solution having phosphotungstic acid ($H_3(PW_{12}O_{40})$) dissolved instead of silicomolybdic acid was impregnated in a porous polyethylene film, and dried under a vacuum atmosphere was used, and the respective evaluations were carried out.

<Sample 9-13>
A secondary battery was manufactured in the same manner as in Sample 9-1 except that a separator composed of a porous polyethylene film in which the heteropoly acid was not supported in advance was used, and the respective evaluations were carried out.

<Sample 9-14>
A secondary battery was manufactured in the same manner as in Sample 9-2 except that a separator composed of a porous polyethylene film in which the heteropoly acid was not supported in advance was used, and the respective evaluations were carried out.

<Sample 9-15>
A secondary battery was manufactured in the same manner as in Sample 9-3 except that a separator composed of a porous polyethylene film in which the heteropoly acid was not supported in advance was used, and the respective evaluations were carried out.

The following Table 9 shows the results of the evaluations.

TABLE 9

| | Positive electrode active material | Heteropoly acid impregnated in the separator | Added amount of the heteropoly acid [% by weight] | Maximum voltage during charging [V] | Minimum voltage during charging [V] | Heating test | Nail penetration test | Over-charging test | Cycle retention ratio [%] |
|---|---|---|---|---|---|---|---|---|---|
| Sample 9-1 | $LiCo_{0.98}Al_{0.01}Mg_{0.01}O_2$ | Silicomolybdic acid | 0.3 | 4.2 | 2.5 | O | O | O | 95.8 |
| Sample 9-2 | $LiNi_{0.77}Co_{0.20}Al_{0.03}O_2$ | Silicomolybdic acid | 0.5 | 4.2 | 2.5 | O | Battery expansion | O | 95.9 |
| Sample 9-3 | $LiMn_2O_4$ | Silicomolybdic acid | 0.3 | 4.3 | 3.0 | O | O | O | 96.9 |
| Sample 9-4 | $LiCo_{0.98}Al_{0.01}Mg_{0.01}O_2$ | Phosphomolybdic acid | 0.3 | 4.2 | 2.5 | O | O | O | 95.2 |
| Sample 9-5 | $LiNi_{0.77}Co_{0.20}Al_{0.03}O_2$ | Phosphomolybdic acid | 0.5 | 4.2 | 2.5 | O | Battery expansion | Battery expansion | 96.2 |
| Sample 9-6 | $LiMn_2O_4$ | Phosphomolybdic acid | 0.3 | 4.3 | 3.0 | O | O | O | 96.8 |
| Sample 9-7 | $LiCo_{0.98}Al_{0.01}Mg_{0.01}O_2$ | Silicotungstic acid | 0.3 | 4.2 | 2.5 | O | Battery expansion | O | 94.8 |
| Sample 9-8 | $LiNi_{0.77}Co_{0.20}Al_{0.03}O_2$ | Silicotungstic acid | 0.5 | 4.2 | 2.5 | O | Battery expansion | Battery expansion | 95.2 |
| Sample 9-9 | $LiMn_2O_4$ | Silicotungstic acid | 0.3 | 4.3 | 3.0 | O | O | O | 96.2 |
| Sample 9-10 | $LiCo_{0.98}Al_{0.01}Mg_{0.01}O_2$ | Phosphotungstic acid | 0.3 | 4.2 | 2.5 | O | O | O | 95.8 |
| Sample 9-11 | $LiNi_{0.77}Co_{0.20}Al_{0.03}O_2$ | Phosphotungstic acid | 0.5 | 4.2 | 2.5 | O | Battery expansion | O | 95.9 |
| Sample 9-12 | $LiMn_2O_4$ | Phosphotungstic acid | 0.3 | 4.3 | 3.0 | O | O | O | 96.9 |
| Sample 9-13 | $LiCo_{0.98}Al_{0.01}Mg_{0.01}O_2$ | — | 0.3 | 4.2 | 2.5 | O | Battery expansion | O | 94.5 |

TABLE 9-continued

| | Positive electrode active material | Heteropoly acid impregnated in the separator | Added amount of the heteropoly acid [% by weight] | Maximum voltage during charging [V] | Minimum voltage during charging [V] | Heating test | Nail penetration test | Over- charging test | Cycle retention ratio [%] |
|---|---|---|---|---|---|---|---|---|---|
| Sample 9-14 | $LiNi_{0.77}Co_{0.20}Al_{0.03}O_2$ | — | 0.5 | 4.2 | 2.5 | Battery expansion | Battery expansion | Battery expansion | 95.1 |
| Sample 9-15 | $LiMn_2O_4$ | — | 0.3 | 4.3 | 3.0 | O | O | O | 95.8 |

Meanwhile, in Table 9, "O" is marked for the battery where nothing occurred in the nail penetration test and the heating test.

As is clear from Table 9, it was found that, when the same positive electrode active material was used, the battery in which the separator having the heteropoly acid supported in advance was used tended to have an increased safety in comparison to, for example, Samples 9-1,9-4, 9-7, 9-10, and 9-13. In addition, it was found that the cycle retention ratio is improved by using a separator in which the heteropoly acid is supported in advance even when the safety is substantially the same. In addition, the same tendency was observed even in other samples in which lithium nickelate or spinel-type lithium manganate was used as the positive electrode active material.

This is considered to be because the separator was shrunk during the manufacturing of the wound electrode body, and it was possible to prevent the pores in the porous film from being crumpled by using a separator in which the heteropoly acid was supported in advance. In addition, it is considered that the heteropoly acid supported in the separator is dissolved in an electrolytic solution during assembly of the battery, whereby the heteropoly acid is precipitated in future charging, and the safety is improved.

EXAMPLE 10

[When the Heteropoly Acid Including a Plurality of Polyatoms is Added]
<Sample 10-1>
[Manufacturing of the Positive Electrode]

90% by weight of lithium cobalt oxide ($LiCo_{0.20}Ni_{0.50}Mn_{0.30}O_2$) as the positive electrode active material, 5% by weight of graphite powder as the conducting agent, and 5% by weight of polyvinylidene fluoride powder as the bonding agent were dry-mixed, and N-methyl-pyrrolidone was added, thereby preparing a positive electrode compound.

Next, this positive electrode compound slurry was evenly coated on both faces of a positive electrode collector composed of a 20 μm-thick aluminum foil, and dried at a reduced pressure at 100° C. for 24 hours, thereby forming a positive electrode active material layer. In addition, compacting was carried out on the positive electrode active material layer using a roll press machine so as to produce a positive electrode sheet. The positive electrode sheet was cut out into a 48 mm×300 mm band shape, thereby manufacturing a positive electrode. Finally, a lead of an aluminum ribbon was welded to the end portion of the positive electrode.
[Manufacturing of the Negative Electrode]

95% by weight of artificial graphite as a negative electrode active material and 5% by weight of polyvinylidene fluoride powder as a bonding agent were dispersed in N-methyl-pyrrolidone, thereby producing a slurry-form negative electrode compound. Next, the negative electrode compound was evenly coated on both faces of a negative electrode collector composed of a 15 μm-thick copper foil, and dried at a reduced pressure at 120° C. for 24 hours, thereby forming a negative electrode active material layer. In addition, compacting was carried out on the negative electrode active material layer using a roll press machine so as to produce a negative electrode sheet, and the negative electrode sheet was cut out into a 50 mm×310 mm band shape, thereby manufacturing a negative electrode. Finally, a lead of a nickel ribbon was welded to the non-woven fabric portion of the negative electrode.
[Assembly of the Battery]

The band-shaped positive electrode and the band-shaped negative electrode, which were manufactured in the above manner, were laminated through a 25 μm-thick porous polyethylene separator, and wound in the longitudinal direction, thereby obtaining a electrode wound body. A structure in which the negative electrode was protruded outside the positive electrode, and the separator was protruded outside the negative electrode was made. Assembly was carried out so that the protruded width became the same at both sides.

The wound electrode body was interposed by an exterior film composed by interposing an aluminum foil with a pair of resin films, and sealed by thermally fusing the outer circumferential portions of the exterior film except one side. A non-aqueous electrolytic solution having 1.0 mol/kg of hexafluorophosphate ($LiPF_6$) as an electrolyte salt and 1.5% by weight of phosphovanado-molybdic acid ($H_4(PVMo_{11}O_{40})\cdot nH_2O$) as the heteropoly acid dissolved in a mixed solvent in which ethylene carbonate (EC) and propylene carbonate (PC) were mixed in a weight ratio of 4:6 was injected to the exterior film so that the wound body was sealed in the exterior film. Meanwhile, at this time, a portion where a resin specimen was brought into contact with the positive electrode terminal and the negative electrode terminal was interposed in the sealed portion of the exterior film, and sealed by thermal fusion, thereby manufacturing a non-aqueous electrolytic solution secondary battery.

In the non-aqueous electrolyte secondary battery, after constant current charging was carried out until the battery voltage reached 4.2 V by a constant current of 880 mA under conditions of 23° C., constant voltage charging was carried out until the electric current value reached 1 mA at a constant voltage of 4.2 V. After that, it was confirmed by disassembling the battery that a gel-state film was formed on the surface of the negative electrode.
<Sample 10-2>

A non-aqueous electrolyte battery was manufactured in the same manner as in Sample 10-1 except that the complex oxide ($LiMn_{1.9}Al_{0.1}O_4$) was used as the positive electrode active material, and 1.0% by weight of phosphovanado-molybdic acid ($H_4(PVMo_{11}O_{40})\cdot nH_2O$) was used as the heteropoly acid that was added to the non-aqueous electrolytic solution. After that, as a result of charging and disassembling the battery by the same method as in Sample 10-1, it was confirmed that a gel-state film was formed on the surface of the negative electrode.

<Sample 10-3>

A non-aqueous electrolyte battery was manufactured in the same manner as in Sample 10-1 except that the complex oxide ($LiNi_{0.77}Co_{0.20}Al_{0.03}O_2$) was used as the positive electrode active material, and 1.5% by weight of tri-tetra-n-ammonium phosphotungstic-molybdate ($((n-C_4H_9)_4N)_3$ ($PW_6Mo_6O_{40}$)) was used as the heteropoly acid that was added to the non-aqueous electrolytic solution. After that, as a result of charging and disassembling the battery by the same method as in Sample 10-1, it was confirmed that a gel-state film was formed on the surface of the negative electrode.

<Sample 10-4>

A non-aqueous electrolyte battery was manufactured in the same manner as in Sample 10-1 except that phosphovanado-molybdic acid ($H_4(PVMo_{11}O_{40}).nH_2O$) was not added to the non-aqueous electrolytic solution. After that, as a result of charging and disassembling the battery by the same method as in Sample 10-1, it was confirmed that a gel-state film was not formed on the surface of the negative electrode.

<Sample 10-5>

A non-aqueous electrolyte battery was manufactured in the same manner as in Sample 10-2 except that phosphovanado-molybdic acid ($H_4(PVMo_{11}O_{40}).nH_2O$) was not added to the non-aqueous electrolytic solution. After that, as a result of charging and disassembling the battery by the same method as in Sample 10-1, it was confirmed that a gel-state film was not formed on the surface of the negative electrode.

<Sample 10-6>

A non-aqueous electrolyte battery was manufactured in the same manner as in Sample 10-3 except that tri-tetra-n-ammonium phosphotungstic-molybdate ($((n-C_4H_9)_4N)_3$ ($PW_6Mo_6O_{40}$)) was not added to the non-aqueous electrolytic solution. After that, as a result of charging and disassembling the battery by the same method as in Sample 10-1, it was confirmed that a gel-state film was not formed on the surface of the negative electrode.

(b) Evaluation of Battery Swelling

After the thickness of the battery was measured, and constant current charging was carried out until the battery voltage reached 4.2 V at a constant current of 880 mA under conditions of 23° C., constant voltage charging was carried out until the electric current value reached 1 mA at a constant voltage of 4.2 V, and the battery was stored under conditions of 80° C. for 4 days. After that, the thickness of the battery after high-temperature storage was measured, and the difference from the thickness of the battery before charging was used as the swelling amount during high-temperature storage.

The results are shown in the following table.

It was found from Table 10 that battery swelling during high-temperature storage was suppressed in the battery to which phosphotungstic acid having a plurality of polyatoms was added. In addition, the effect could be obtained regardless of the positive electrode active material, and, like Sample 10-3, a particularly significant effect of suppressing battery swelling could be obtained in a complex oxide particle including a large amount of Ni as a transition element and having a large amount of gas generated.

EXAMPLE 11

[When the Heteropoly Acid Salt is Added]

<Sample 11-1>

[Manufacturing of the Positive Electrode]

90% by weight of lithium cobalt oxide ($LiCo_{0.20}Ni_{0.50}Mn_{0.30}O_2$) as the positive electrode active material, 5% by weight of graphite powder as the conducting agent, and 5% by weight of polyvinylidene fluoride powder as the bonding agent were dry-mixed, and N-methyl-pyrrolidone was added, thereby preparing a positive electrode compound.

Next, this positive electrode compound was evenly coated on both faces of a positive electrode collector composed of a 20 μm-thick aluminum foil, and dried at a reduced pressure at 100° C. for 24 hours, thereby forming a positive electrode active material layer. In addition, compacting was carried out on the positive electrode active material layer using a roll press machine so as to produce a positive electrode sheet. The positive electrode sheet was cut out into a 48 mm×300 mm band shape, thereby manufacturing a positive electrode. Finally, a lead of an aluminum ribbon was welded to the end portion of the positive electrode.

[Manufacturing of the Negative Electrode]

Firstly, 95% by weight of artificial graphite as a negative electrode active material and 5% by weight of polyvinylidene fluoride powder as a bonding agent were dispersed in N-methyl-pyrrolidone, thereby producing a slurry-form negative electrode compound. Next, the negative electrode compound was evenly coated on both faces of a negative electrode collector composed of a 15 μm-thick copper foil, and dried at a reduced pressure at 120° C. for 24 hours, thereby forming a negative electrode active material layer. In addition, compacting was carried out on the negative electrode active material layer using a roll press machine so as to produce a negative electrode sheet, and the negative electrode sheet was cut out into a 50 mm×310 mm band shape, thereby manufacturing a negative electrode. Finally, a lead of a nickel ribbon was welded to the non-woven fabric portion of the negative electrode compound.

TABLE 10

| | Positive electrode active material | Heteropoly acid Material | Added amount [% by weight] | Battery swelling amount [mm] |
|---|---|---|---|---|
| Sample 10-1 | $LiCo_{0.20}Ni_{0.50}Mn_{0.30}O_2$ | phosphovanado-molybdic acid | 0.5 | 3.52 |
| Sample 10-2 | $LiMn_{1.9}Al_{0.1}O_4$ | phosphotangutorinemolybdate | 1.0 | 2.33 |
| Sample 10-3 | $LiNi_{0.77}Co_{0.20}Al_{0.03}O_2$ | triphosphotangutorinemolybdate-tetra-n-ammonium salt | 1.5 | 2.95 |
| Sample 10-4 | $LiCo_{0.20}Ni_{0.50}Mn_{0.30}O_2$ | — | — | 10.7 |
| Sample 10-5 | $LiMn_{1.9}Al_{0.1}O_4$ | — | — | 6.35 |
| Sample 10-6 | $LiNi_{0.77}Co_{0.20}Al_{0.03}O_2$ | — | — | 13.8 |

[Assembly of the Battery]

The band-shaped positive electrode and the band-shaped negative electrode, which were manufactured in the above manner, were laminated through a 25 μm-thick porous polyethylene separator, and wound in the longitudinal direction, thereby obtaining a wound electrode body. A structure in which the negative electrode was protruded outside the positive electrode, and the separator was protruded outside the negative electrode was made. Assembly was carried out so that the protruded width became the same at both sides.

The wound electrode body was interposed by an exterior film composed by interposing an aluminum foil with a pair of resin films, and sealed by thermally fusing the outer circumferential portions of the exterior film except one side. A non-aqueous electrolytic solution having 1.0 mol/kg of hexafluorophosphate ($LiPF_6$) as an electrolyte salt and 1.5% by weight of tri-tetra-n-butylammonium phosphomolybdate ((($n$-$C_4H_9$)$_4$N)$_3$($PMo_{12}O_{40}$)) as the heteropoly acid dissolved in a mixed solvent in which ethylene carbonate (EC) and propylene carbonate (PC) were mixed in a weight ratio of 4:6 was injected to the exterior film so that the wound body was sealed in the exterior film. Meanwhile, at this time, a portion where a resin specimen was brought into contact with the positive electrode terminal and the negative electrode terminal was interposed in the sealed portion of the exterior film, and sealed by thermal fusion, thereby manufacturing a non-aqueous electrolytic solution secondary battery.

<Sample 11-2>

A non-aqueous electrolyte battery was manufactured in the same manner as in Sample 11-1 except that the complex oxide ($LiMn_{1.9}Al_{0.1}O_4$) was used as the positive electrode active material, and 1.0% by weight of lithium phosphotungstic acid ($Li_3(PW_{12}O_{40})$) that was added to the non-aqueous electrolytic solution was used as the heteropoly acid.

<Sample 11-3>

A non-aqueous electrolyte battery was manufactured in the same manner as in Sample 11-1 except that the complex oxide ($LiNi_{0.77}Co_{0.20}Al_{0.03}O_2$) was used as the positive electrode active material, and 1.5% by weight of tri-tetra-n-butylphosphonium silicotungstate ((($n$-$C_4H_9$)$_4$P)$_4$($SiW_{12}O_{40}$)) was used as the heteropoly acid that was added to the non-aqueous electrolytic solution.

<Sample 11-4>

A non-aqueous electrolyte battery was manufactured in the same manner as in Sample 11-2 except that tri-tetra-n-butylammonium phosphomolybdate ((($n$-$C_4H_9$)$_4$N)$_3$($PMo_{12}O_{40}$)) was not added to the non-aqueous electrolytic solution.

<Sample 11-5>

A non-aqueous electrolyte battery was manufactured in the same manner as in Sample 11-2 except that lithium phosphotungstic acid ($Li_3(PW_{12}O_{40})$) was not added to the non-aqueous electrolytic solution.

<Sample 11-6>

A non-aqueous electrolyte battery was manufactured in the same manner as in Sample 11-3 except that tri-tetra-n-butylammonium silicotungstate ((($n$-$C_4H_9$)$_4$P)$_4$($SiW_{12}O_{40}$)) was not added to the non-aqueous electrolytic solution.

[Evaluation of the Battery]

(a) Evaluation of Battery Swelling

After the thickness of the battery was measured, and constant current charging was carried out until the battery voltage reached 4.2 V at a constant current of 880 mA under conditions of 23° C., constant voltage charging was carried out until the electric current value reached 1 mA at a constant voltage of 4.2 V, and the battery was stored under conditions of 80° C. for 4 days. After that, the thickness of the battery after high-temperature storage was measured, and the difference from the thickness of the battery before charging was used as the swelling amount during high-temperature storage.

The results are shown in the following table.

TABLE 11

| | Positive electrode active material | Heteropoly acid Material | Added amount [% by weight] | Battery swelling amount [mm] |
|---|---|---|---|---|
| Sample 11-1 | $LiCo_{0.20}Ni_{0.50}Mn_{0.30}O_2$ | tri-tetra-n-butylammonium phosphomolybdate | 1.5 | 3.52 |
| Sample 11-2 | $LiMn_{1.9}Al_{0.1}O_4$ | lithium phosphotangustate | 1.0 | 2.33 |
| Sample 11-3 | $LiNi_{0.77}Co_{0.20}Al_{0.03}O_2$ | tri-tetra-n-butylphosphonium silicotungstate | 1.5 | 2.95 |
| Sample 11-4 | $LiCo_{0.20}Ni_{0.50}Mn_{0.30}O_2$ | — | — | 10.7 |
| Sample 11-5 | $LiMn_{1.9}Al_{0.1}O_4$ | — | — | 6.35 |
| Sample 11-6 | $LiNi_{0.77}Co_{0.20}Al_{0.03}O_2$ | — | — | 13.8 |

It was found from Table 11 that battery swelling during high-temperature storage was suppressed in the battery to which the heteropoly acid compound was added. In addition, the effect could be obtained regardless of the positive electrode active material, and, like Sample 11-3, a particularly significant effect of suppressing battery swelling could be obtained in a complex oxide particle including a large amount of Ni as a transition element and having a large amount of gas generated.

EXAMPLE 12

[When an Orthopoly Acid or Anhydrous Polyacid is Added as the Heteropoly Acid]

<Sample 12-1>

[Manufacturing of the Positive Electrode]

90% by weight of lithium ($Li_{0.98}Co_{0.2}Ni_{0.80}O_{2.0}$) having an average particle diameter of 12 μm as the positive electrode active material, 5% by weight of graphite powder as the conducting agent, and 5% by weight of polyvinylidene fluoride powder as the bonding agent were dry-mixed. Subsequently, a silicotungstic acid solution manufactured by dissolving orthotungstic acid ($H_2WO_4$) in N-methylpyrrolidone was added to the mixture so as to become 0.05% by weight with respect to the positive electrode active material, and, furthermore, N-methylpyrrolidone was added, thereby preparing a positive electrode compound.

Next, this positive electrode compound was evenly coated on both faces of a positive electrode collector composed of a 20 μm-thick aluminum foil, and dried at a reduced pressure at 100° C. for 24 hours, thereby forming a positive electrode active material layer. In addition, compacting was carried out on the positive electrode active material layer using a roll press machine so as to produce a positive electrode sheet. The positive electrode sheet was cut out into a 48 mm×300 mm band shape, thereby manufacturing a positive electrode. Finally, a lead of an aluminum ribbon was welded to the end portion of the positive electrode.

[Manufacturing of the Negative Electrode]

95% by weight of artificial graphite as a negative electrode active material and 5% by weight of polyvinylidene fluoride powder as a bonding agent were dispersed in N-methyl-pyrrolidone, thereby producing a slurry-form negative electrode compound. Next, the negative electrode compound was evenly coated on both faces of a negative electrode collector composed of a 15 μm-thick copper foil, and dried at a reduced pressure at 120° C. for 24 hours, thereby forming a negative electrode active material layer. In addition, compacting was carried out on the negative electrode active material layer using a roll press machine so as to produce a negative electrode sheet, and the negative electrode sheet was cut out into a 50 mm×310 mm band shape, thereby manufacturing a negative electrode. Finally, a lead of a nickel ribbon was welded to the non-woven fabric portion of the negative electrode.

[Assembly of the Battery]

The band-shaped positive electrode and the band-shaped negative electrode, which were manufactured in the above manner, were laminated through a 20 μm-thick porous polyethylene separator, and wound in the longitudinal direction, thereby obtaining a wound electrode body. A structure in which the negative electrode was protruded outside the positive electrode, and the separator was protruded outside the negative electrode was made. Assembly was carried out so that the protruded width became the same at both sides.

The wound electrode body was interposed by an exterior film composed by interposing an aluminum foil with a pair of resin films, and sealed by thermally fusing the outer circumferential portions of the exterior film except one side. A non-aqueous electrolytic solution prepared by dissolving LiPF$_6$ in a mixed solvent in which ethylene carbonate (EC) and propylene carbonate (PC) were mixed in a weight ratio of 4:6 in a concentration of 1.0 mol/kg was injected to the exterior film so that the wound body was sealed in the exterior film. Meanwhile, at this time, a portion where a resin specimen was brought into contact with the positive electrode terminal and the negative electrode terminal was interposed in the sealed portion of the exterior film, and sealed by thermal fusion, thereby manufacturing a non-aqueous electrolytic solution secondary battery.

<Sample 12-2>

A non-aqueous electrolyte battery was manufactured in the same manner as in Sample 12-1 except that the added amount of orthotungstic acid (H$_2$WO$_4$) was set to 0.10% by weight with respect to the positive electrode active material.

<Sample 12-3>

A non-aqueous electrolyte battery was manufactured in the same manner as in Sample 12-1 except that a lithium complex oxide (LiCo$_{0.98}$Ni$_{0.80}$Al$_{0.05}$O$_{2.1}$) having an average particle diameter of 14 μm was used as the positive electrode active material, and 0.01% by weight of orthotungstic acid (H$_2$WO$_4$) was added as the heteropoly acid.

<Sample 12-4>

A non-aqueous electrolyte battery was manufactured in the same manner as in Sample 12-3 except that 0.20% by weight of orthotungstic acid (H$_2$WO$_4$) was added as the heteropoly acid.

<Sample 12-5>

A non-aqueous electrolyte battery was manufactured in the same manner as in Sample 12-3 except that 0.50% by weight of orthotungstic acid (H$_2$WO$_4$) was added as the heteropoly acid.

<Sample 12-6>

A non-aqueous electrolyte battery was manufactured in the same manner as in Sample 12-3 except that 1.0% by weight of anhydrous tungstic acid (WO$_3$) was added as the heteropoly acid.

<Sample 12-7>

A non-aqueous electrolyte battery was manufactured in the same manner as in Sample 12-3 except that 3.0% by weight of anhydrous tungstic acid (WO$_3$) was added as the heteropoly acid.

<Sample 12-8>

A non-aqueous electrolyte battery was manufactured in the same manner as in Sample 12-3 except that 5.0% by weight of anhydrous tungstic acid (WO$_3$) was added as the heteropoly acid.

<Sample 12-9>

A non-aqueous electrolyte battery was manufactured in the same manner as in Sample 12-1 except that a lithium complex oxide (Li$_{1.02}$Co$_{0.98}$Mg$_{0.01}$Al0.01O$_2$) having an average particle diameter of 12 μm was used as the positive electrode active material, and 0.05% by weight of orthotungstic acid (H$_2$WO$_4$) was added as the heteropoly acid.

<Sample 12-10>

A non-aqueous electrolyte battery was manufactured in the same manner as in Sample 12-9 except that 0.10% by weight of orthotungstic acid (H$_2$WO$_4$) was added as the heteropoly acid.

<Sample 12-11>

A non-aqueous electrolyte battery was manufactured in the same manner as in Sample 12-9 except that 0.50% by weight of orthotungstic acid (H$_2$WO$_4$) was added as the heteropoly acid.

<Sample 12-12>

A non-aqueous electrolyte battery was manufactured in the same manner as in Sample 12-9 except that 1.0% by weight of anhydrous tungstic acid (WO$_3$) was added as the heteropoly acid.

<Sample 12-13>

A non-aqueous electrolyte battery was manufactured in the same manner as in Sample 12-1 except that a lithium complex oxide (LiMn$_{1.9}$Al$_{0.1}$O$_4$) having an average particle diameter of 14 μm was used as the positive electrode active material, and 0.20% by weight of orthotungstic acid (H$_2$WO$_4$) was added as the heteropoly acid.

<Sample 12-14>

A non-aqueous electrolyte battery was manufactured in the same manner as in Sample 12-13 except that 1.0% by weight of anhydrous tungstic acid (WO$_3$) was added as the heteropoly acid.

<Sample 12-15> to <Sample 12-19>

Non-aqueous electrolyte batteries were manufactured in the same manner as in Sample 12-1 to Sample 12-5 except that orthotungstic acid was used as the orthomolybdic acid.

<Sample 12-20> to <Sample 12-21>

Non-aqueous electrolyte batteries were manufactured in the same manner as in Sample 12-6 to Sample 12-8 except that anhydrous tungstic acid was used as the anhydrous molybdic acid.

<Sample 12-23> to <Sample 12-25>

Non-aqueous electrolyte batteries were manufactured in the same manner as in Sample 12-9 to Sample 12-11 except that orthotungstic acid was used as the orthomolybdic acid.

<Sample 12-26>

A non-aqueous electrolyte battery was manufactured in the same manner as in Sample 12-12 except that anhydrous tungstic acid was used as the anhydrous molybdic acid.

<Sample 12-27>

A non-aqueous electrolyte battery was manufactured in the same manner as in Sample 12-13 except that orthotungstic acid was used as the orthomolybdic acid.

<Sample 12-28>

A non-aqueous electrolyte battery was manufactured in the same manner as in Sample 12-14 except that orthotungstic acid was used as the orthomolybdic acid.

<Sample 12-29>

A non-aqueous electrolyte battery was manufactured in the same manner as in Sample 12-3 except that 0.10% by weight of orthotungstic acid ($H_2WO_4$) was added as the heteropoly acid.

<Sample 12-30>

A non-aqueous electrolyte battery was manufactured in the same manner as in Sample 12-29 except that 1.0% by weight of orthotungstic acid ($H_2WO_4$) was added as the heteropoly acid.

<Sample 12-31>

A non-aqueous electrolyte battery was manufactured in the same manner as in Sample 12-29 except that 5.0% by weight of orthotungstic acid ($H_2WO_4$) was added as the heteropoly acid.

<Sample 12-32>

A non-aqueous electrolyte battery was manufactured in the same manner as in Sample 12-29 except that 0.10% by weight of orthomolybdic acid ($H_2MoO_4$) was added as the heteropoly acid.

<Sample 12-33>

A non-aqueous electrolyte battery was manufactured in the same manner as in Sample 12-29 except that 1.0% by weight of orthomolybdic acid ($H_2MoO_4$) was added as the heteropoly acid.

<Sample 12-34>

A non-aqueous electrolyte battery was manufactured in the same manner as in Sample 12-29 except that 5.0% by weight of orthomolybdic acid ($H_2MoO_4$) was added as the heteropoly acid.

<Sample 12-35>

A non-aqueous electrolyte battery was manufactured in the same manner as in Sample 12-3 except that the heteropoly acid was not added.

<Sample 12-36>

A non-aqueous electrolyte battery was manufactured in the same manner as in Sample 12-8 except that the heteropoly acid was not added.

<Sample 12-37>

A non-aqueous electrolyte battery was manufactured in the same manner as in Sample 12-12 except that the heteropoly acid was not added.

[Evaluation of the Battery]

(a) Evaluation of Battery Swelling

After the thickness of the battery was measured, and constant current charging was carried out until the battery voltage reached 4.2 V at a constant current of 880 mA under conditions of 23° C., constant voltage charging was carried out until the electric current value reached 1 mA at a constant voltage of 4.2 V, and the battery was stored under conditions of 80° C. for 4 days. After that, the thickness of the battery after high-temperature storage was measured, and the difference from the thickness of the battery before charging was used as the swelling amount during high-temperature storage.

The results are shown in the following table.

TABLE 12

| | Positive electrode active material | Heteropoly acid | | Heating test | Nail penetration test | Overcharging test |
| | | Material | Added amount [% by weight] | | | |
|---|---|---|---|---|---|---|
| Sample 12-1 | $LiCo_{0.98}Al_{0.01}Mg_{0.01}O_2$ | Silicotungstic acid | 0.5 | 1 | O | O |
| Sample 12-2 | $LiNi_{0.77}Co_{0.20}Al_{0.03}O_2$ | Silicotungstic acid | 1.0 | O | 1 | O |
| Sample 12-3 | $LiMn_2O_4$ | Silicotungstic acid | 0.5 | O | 1 | O |
| Sample 12-4 | $LiCo_{0.98}Al_{0.01}Mg_{0.01}O_2$ | Phosphomolybdic acid | 0.5 | O | O | O |
| Sample 12-5 | $LiNi_{0.77}Co_{0.20}Al_{0.03}O_2$ | Phosphomolybdic acid | 1.0 | O | 1 | 1 |
| Sample 12-6 | $LiMn_2O_4$ | Phosphomolybdic acid | 0.5 | O | O | O |
| Sample 12-7 | $LiCo_{0.98}Al_{0.01}Mg_{0.01}O_2$ | — | — | 3 | 3 | 3 |
| Sample 12-8 | $LiNi_{0.77}Co_{0.20}Al_{0.03}O_2$ | — | — | 3 | 3 | 3 |
| Sample 12-9 | $LiMn_2O_4$ | — | — | 2 | 2 | 2 |

It was found from Table 12 that battery swelling was suppressed in Sample 12-1 to Sample 12-34 to which the heteropoly acid was added. It was found that the effect of suppressing battery swelling is not limited to the material of the positive electrode active material. In addition, it was found that the same effect of suppressing battery swelling can be obtained even when added to any of the positive electrode and the negative electrode.

In addition, it was found that the amount of battery swelling was increased in Sample 12-35 to Sample 12-37 to which the heteropoly acid was not added.

EXAMPLE 13

[Regarding the Relevance Between the Reduced State of the Positive Electrode Surface and the Negative Electrode Surface and Battery Characteristics]

<Sample 13-1>

[Manufacturing of the Positive Electrode]

92% by weight of lithium cobalt oxide ($LiCo_{0.98}Al_{0.01}Mg_{0.01}O_2$) as the positive electrode active material, 5% by weight of graphite powder as the conducting agent, and 3% by weight of polyvinylidene fluoride powder as the bonding agent were dry-mixed. Subsequently, a silicotungstic acid solution manufactured by dissolving silicotungstic acid ($H_4(SiW_{12}O_{40})$) in N-methylpyrrolidone was added to the mixture so as to become 0.5% by weight with respect to the positive electrode active material, and, furthermore, N-methyl pyrrolidone was added, thereby preparing a positive electrode compound.

Next, this positive electrode compound was evenly coated on both faces of a positive electrode collector composed of an aluminum foil, and dried at a reduced pressure at 100° C. for 24 hours, thereby forming a positive electrode active material layer. In addition, compacting was carried out on the positive electrode active material layer using a roll press machine so as to produce a positive electrode sheet. The positive electrode sheet was cut out into a 48 mm×300 mm band shape, thereby manufacturing a positive electrode. Finally, a lead of an aluminum ribbon was welded to the end portion of the positive electrode.

[Manufacturing of the Negative Electrode]

91% by weight of artificial graphite as a negative electrode active material and 9% by weight of polyvinylidene fluoride powder as a bonding agent were dispersed in N-methyl-pyrrolidone, thereby producing a slurry-form negative electrode compound. Next, the negative electrode compound was evenly coated on both faces of a copper foil that became the negative electrode collector, and dried at a reduced pressure at 120° C. for 24 hours, thereby forming a negative electrode active material layer. In addition, compacting was carried out on the negative electrode active material layer using a roll press machine so as to produce a negative electrode sheet, and the negative electrode sheet was cut out into a 50 mm×310 mm band shape, thereby manufacturing a negative electrode. Finally, a lead of a nickel ribbon was welded to the non-woven fabric portion of the negative electrode.

[Assembly of the Battery]

The band-shaped positive electrode and the band-shaped negative electrode, which were manufactured in the above manner, were laminated through a 20 μm-thick porous polyethylene separator, and wound in the longitudinal direction, thereby obtaining a wound electrode body. A structure in which the negative electrode was protruded outside the positive electrode, and the separator was protruded outside the negative electrode was made. Assembly was carried out so that the protruded width became the same at both sides.

The wound electrode body was interposed by an exterior film composed by interposing an aluminum foil with a pair of resin films, and sealed by thermally fusing the outer circumferential portions of the exterior film except one side. A non-aqueous electrolytic solution prepared by dissolving $LiPF_6$ in a mixed solvent in which ethylene carbonate (EC) and propylene carbonate (PC) were mixed in a weight ratio of 4:6 in a concentration of 1.0 mol/kg was injected to the exterior film so that the wound body was sealed in the exterior film. Meanwhile, at this time, a portion where a resin specimen was brought into contact with the positive electrode terminal and the negative electrode terminal was interposed in the sealed portion of the exterior film, and sealed by thermal fusion, thereby manufacturing a non-aqueous electrolytic solution secondary battery.

[Confirmation of the Precipitate]

As a result of disassembling and investigating the battery that was charged by a constant current and a constant voltage until 4.2 V at room temperature and 1 C, a precipitate was observed between the negative electrode and the separator, and adhesion of the precipitate by anchorage was observed. This precipitate was observed by an XPS analysis that the main portion of W was reduced and precipitated into $W^{2+}$ and $W^{4+}$ by the chemical shift of W4d5/2 and W4f7/2.

Furthermore, the main portion of the precipitate precipitated on the negative electrode was $W^{6+}$. Furthermore, as a result of study by EXAFS, the precipitate had 2 peaks having the same intensity present in a radius range of 1.0 Å to 2.0 Å in the radial structure function. In addition, at a radius of 3.0 Å or larger, no clear peak, such as a peak that was present in a radius range of 1.0 Å to 2.0 Å was observed. In addition, similarly to the results of the XPS analysis, it was confirmed by the study of XANES that the positive electrode was not reduced, and the negative electrode was reduced.

As is clear from FIG. 8, the precipitate precipitated on the negative electrode had a peak shape that was different from the silicotungstic acid added to the positive electrode compound layer, and also had a peak shape that was different from $Wo_3$ and $Wo_2$. From this result, it is considered that since the precipitate precipitated on the negative electrode is a substance different from the added silicotungstic acid, and is different from $Wo_3$ and $Wo_2$ having a crystalline substance, amorphous tungstic acid is precipitated.

<Sample 13-2>

A non-aqueous electrolyte battery was manufactured in the same manner as in Sample 13-1 except that lithium nickelate ($LiNi_{0.77}CO_{0.20}Al_{0.03}O_2$) was used instead of lithium cobalt oxide ($LiCo_{0.98}Al_{0.01}Mg_{0.01}O_2$) as a positive electrode active material, and the added amount of silicotungstic acid ($H_4(SiW_{12}O_{40})$) was set to 1.0% by weight.

Meanwhile, the precipitate form in the study of the disassembled charged battery was the same as in Example 1. Furthermore, the negative electrode precipitate was observed by an XPS analysis that the main portion of W was reduced and precipitated into $W^{2+}$ and $W^{4+}$ by the chemical shift of W4d5/2 and W4f7/2.

Furthermore, the main portion of W precipitated in the positive electrode was $W^{6+}$. Furthermore, as a result of study by EXAFS, almost the same peak as in Sample 13-1 was obtained, and it was confirmed even in the study of XANES that the positive electrode was not reduced, and the negative electrode was reduced.

<Sample 13-3>

A non-aqueous electrolyte battery was manufactured in the same manner as in Sample 13-1 except that spinel-type lithium manganate ($LiMn_2O_4$) was used instead of lithium cobalt oxide ($LiCo_{0.98}Al_{0.01}Mg_{0.01}O_2$).

Meanwhile, the precipitate form in the study of the disassembled charged battery was the same as in Example 1. Furthermore, the negative electrode precipitate was observed by an XPS analysis that the main portion of W was reduced and precipitated into $W^{2+}$ and $W^{4+}$ by the chemical shift of W4d5/2 and W4f7/2.

Furthermore, the main portion of W precipitated in the positive electrode was $W^{6+}$. Furthermore, as a result of study by EXAFS, almost the same peak as in Sample 13-1 was obtained, and it was confirmed even in the study of XANES that the positive electrode was not reduced, and the negative electrode was reduced.

<Sample 13-4>

A non-aqueous electrolyte battery was manufactured in the same manner as in Sample 13-1 except that phosphomolybdic acid ($H_4(PMo_{12}O_{40})$) was used instead of silicotungstic acid ($H_4(SiW_{12}O_{40})$).

Meanwhile, the precipitate form in the study of the disassembled charged battery was the same as in Example 1. Furthermore, the negative electrode precipitate was observed by an XPS analysis that the main portion of W was reduced and precipitated into $W^{2+}$ and $W^{4+}$ by the chemical shift of W4d5/2 and W4f7/2.

Furthermore, the main portion of W precipitated in the positive electrode was $W^{6+}$. Furthermore, as a result of study by EXAFS, almost the same peak as in Sample 13-1 was obtained, and it was confirmed even in the study of XANES that the positive electrode was not reduced, and the negative electrode was reduced.

<Sample 13-5>

A non-aqueous electrolyte battery was manufactured in the same manner as in Sample 13-1 except that lithium nickelate ($LiNi_{0.77}Co_{0.20}Al_{0.03}O_2$) was used instead of lithium cobalt oxide ($LiCo_{0.98}Al_{0.01}Mg_{0.01}O_2$), phosphomolybdic acid ($H_4(PMo_{12}O_{40})$) was used instead of silicotungstic acid ($H_4(SiW_{12}O_{40})$) and the added amount was set to 1.0% by weight.

Meanwhile, the precipitate form in the study of the disassembled charged battery was the same as in Example 1. Furthermore, the negative electrode precipitate was observed by an XPS analysis that the main portion of W was reduced and precipitated into $W^{2+}$ and $W^{4+}$ by the chemical shift of W4d5/2 and W4f7/2.

Furthermore, the main portion of W precipitated in the positive electrode was $W^{6+}$. Furthermore, as a result of study by EXAFS, almost the same peak as in Sample 13-1 was obtained, and it was confirmed even in the study of XANES that the positive electrode was not reduced, and the negative electrode was reduced.

<Sample 13-6>

A non-aqueous electrolyte battery was manufactured in the same manner as in Sample 13-1 except that spinel-type lithium manganate ($LiMn_2O_4$) was used instead of lithium cobalt oxide ($LiCo_{0.98}Al_{0.01}Mg_{0.01}O_2$) and phosphomolybdic acid ($H_4(PMo_{12}O_{40})$) was used instead of silicotungstic acid ($H_4(SiW_{12}O_{40})$).

Meanwhile, the precipitate form in the study of the disassembled charged battery was the same as in Example 1. Furthermore, the negative electrode precipitate was observed by an XPS analysis that the main portion of W was reduced and precipitated into $W^{2+}$ and $W^{4+}$ by the chemical shift of W4d5/2 and W4f7/2.

Furthermore, the main portion of W precipitated in the positive electrode was $W^{6+}$. Furthermore, as a result of study by EXAFS, almost the same peak as in Sample 13-1 was obtained, and it was confirmed even in the study of XANES that the positive electrode was not reduced, and the negative electrode was reduced.

<Sample 13-7>

A non-aqueous electrolyte battery was manufactured in the same manner as in Sample 13-1 except that silicotungstic acid ($H_4(SiW_{12}O_{40})$) was not added. Meanwhile, in the study of the disassembled charged battery, the precipitate form like Sample 13-1 was not observed.

<Sample 13-8>

A non-aqueous electrolyte battery was manufactured in the same manner as in Sample 13-2 except that silicotungstic acid ($H_4(SiW_{12}O_{40})$) was not added. Meanwhile, in the study of the disassembled charged battery, the precipitate form like Sample 13-1 was not observed.

<Sample 13-9>

A non-aqueous electrolyte battery was manufactured in the same manner as in Sample 13-3 except that silicotungstic acid ($H_4(SiW_{12}O_{40})$) was not added. Meanwhile, in the study of the disassembled charged battery, the precipitate form like Sample 13-1 was not observed.

The heating test, the nail penetration test, the overcharging test were carried out in the following manner, and the safety was evaluated.

[Battery Evaluation]

(a) Heating Test

The battery was overcharged by a constant current and a constant voltage until 4.5 V at room temperature and 1 C (an electric current value that fully discharges the battery in one hour), fed into a constant temperature vessel of room temperature, heated at 5° C./minute, maintained at a constant temperature at a point of time when the battery reached 150° C., and maintained for one hour from the point of the time.

(b) Nail Penetration Test

The battery was overcharged by a constant current and a constant voltage until 4.5 V at 1 C under conditions of 60° C., taken out, and penetrated by a nail having a diameter of 2.5 mm under conditions of 60° C.

(c) Overcharging Test

The battery in a discharged state under conditions of room temperature was overcharged by a large electric current of 5 C with a maximum of 24 V for one hour.

In the results of the heating test, the nail penetration test, and the overcharging test, "O" was determined for the battery where nothing occurred, "1" was determined for the battery in which the exterior film was swollen by heat generation, "2" was determined for the battery in which slight smoking occurred, and "3" was determined for the battery in which gas blowout occurred. The results are shown in the following table.

TABLE 13

| | | Heteropoly acid | | Adhesion between the negative electrode and the separator | Battery swelling amount [mm] | Generated amount of carbon dioxide | |
|---|---|---|---|---|---|---|---|
| | Positive electrode active material | Material | Added amount [% by weight] | | | Positive electrode [$mm^3/cm^2$] | Negative electrode [$mm^3/cm^2$] |
| Sample 13-1 | $LiCo_{0.98}Al_{0.01}Mg_{0.01}O_2$ | Silicotungstic acid | 0.5 | Yes | 2.11 | 23.1 | 21.0 |
| Sample 13-2 | $LiNi_{0.77}Co_{0.20}Al_{0.03}O_2$ | Phosphotungstic acid | 0.5 | Yes | 2.62 | 41.2 | 32.4 |
| Sample 13-3 | $LiMn_2O_4$ | Phosphomolybdic acid | 1.5 | Yes | 2.88 | 22.9 | 21.2 |
| Sample 13-4 | $LiCo_{0.98}Al_{0.01}Mg_{0.01}O_2$ | — | — | No | 8.51 | 30.1 | −2.1 |
| Sample 13-5 | $LiNi_{0.77}Co_{0.20}Al_{0.03}O_2$ | — | — | No | 14.2 | 48.3 | −1.9 |
| Sample 13-6 | $LiMn_2O_4$ | — | — | No | 7.93 | 27.2 | −1.8 |

As is clear from Table 13, high safety was shown in each of the heating test, the nail penetration test, and the overcharging test in Sample 13-1 to Sample 13-6 in which silicotungstic acid and phosphomolybdic acid were added.

In contrast to this, slight smoking or gas blowout occurred in the heating test, the nail penetration test, and the overcharging test in Sample 13-7 to Sample 13-9 in which silicotungstic acid and phosphomolybdic acid were added.

EXAMPLE 14

[Confirmation of the Generation and Absorption of Gas in Each of the positive electrode and the negative electrode]
<Sample 14-1>
[Manufacturing of the Positive Electrode]

92% by weight of lithium cobalt oxide ($LiCo_{0.98}Al_{0.01}Mg_{0.01}O_2$) as the positive electrode active material, 5% by weight of graphite powder as the conducting agent, and 3% by weight of polyvinylidene fluoride powder as the bonding agent were dry-mixed. Subsequently, a silicotungstic acid solution manufactured by dissolving silicotungstic acid ($H_4(SiW_{12}O_{40})$) in N-methylpyrrolidone was added to the mixture so as to become 0.5% by weight with respect to the positive electrode active material, and, furthermore, N-methyl pyrrolidone was added, thereby preparing a positive electrode compound.

Next, this positive electrode compound was evenly coated on both faces of an aluminum foil that became a positive electrode collector, and dried at a reduced pressure at 100° C. for 24 hours, thereby forming a positive electrode active material layer. In addition, compacting was carried out on the positive electrode active material layer using a roll press machine so as to produce a positive electrode sheet. The positive electrode sheet was cut out into a 48 mm×300 mm band shape, thereby manufacturing a positive electrode. Finally, a lead of an aluminum ribbon was welded to the end portion of the positive electrode.

[Manufacturing of the Negative Electrode]

91% by weight of artificial graphite as a negative electrode active material and 9% by weight of polyvinylidene fluoride powder as a bonding agent were dispersed in N-methyl-2-pyrrolidone, thereby producing a slurry-form negative electrode compound. Next, the negative electrode compound was evenly coated on both faces of a copper foil that became the negative electrode collector, and dried at a reduced pressure at 120° C. for 24 hours, thereby forming a negative electrode active material layer. In addition, compacting was carried out on the negative electrode active material layer using a roll press machine so as to produce a negative electrode sheet, and the negative electrode sheet was cut out into a 50 mm×310 mm band shape, thereby manufacturing a negative electrode. Finally, a lead of a nickel ribbon was welded to the non-woven fabric portion of the negative electrode.

[Assembly of the Battery]

The band-shaped positive electrode and the band-shaped negative electrode, which were manufactured in the above manner, were laminated through a 20 µm-thick porous polyethylene separator, and wound in the longitudinal direction, thereby obtaining a wound electrode body. A structure in which the negative electrode was protruded outside the positive electrode, and the separator was protruded outside the negative electrode was made. Assembly was carried out so that the protruded width became the same at both sides.

The wound electrode body was interposed by an exterior film composed by interposing an aluminum foil with a pair of resin films, and sealed by thermally fusing the outer circumferential portions of the exterior film except one side. A non-aqueous electrolytic solution prepared by dissolving $LiPF_6$ in a mixed solvent in which ethylene carbonate (EC) and propylene carbonate (PC) were mixed in a weight ratio of 4:6 in a concentration of 1.0 mol/kg was injected to the exterior film so that the wound body was sealed in the exterior film. Meanwhile, at this time, a proportion where a resin specimen was brought into contact with the positive electrode terminal and the negative electrode terminal was interposed in the sealed portion of the exterior film, and sealed by thermal fusion, thereby manufacturing a non-aqueous electrolytic solution secondary battery.

<Sample 14-2>

A non-aqueous electrolyte battery was manufactured in the same manner as in Sample 14-1 except that lithium nickelate ($LiNi_{0.77}Co_{0.20}Al_{0.03}O_2$) was used as the positive electrode active material, and 0.5% by weight of phosphotungstic acid ($H_3(PW_{12}O_{40})$) was added as the heteropoly acid.

<Sample 14-3>

A non-aqueous electrolyte battery was manufactured in the same manner as in Sample 14-1 except that spinel-type lithium manganate ($LiMn_2O_4$) was used as the positive electrode active material, and 0.5% by weight of phosphotungstic acid ($H_3(PWO_{12}O_{40})$) was added as the heteropoly acid.

<Sample 14-4>

A non-aqueous electrolyte battery was manufactured in the same manner as in Sample 14-1 except that silicotungstic acid ($H_4(SiW_{12}O_{40})$) was not added. Meanwhile, the precipitate form like Sample 14-1 was not observed in the study of the disassembled charged battery <Sample 14-5>

A non-aqueous electrolyte battery was manufactured in the same manner as in Sample 14-2 except that phosphotungstic acid ($H_3(PW_{12}O_{40})$) was not added. Meanwhile, the precipitate form like Sample 14-1 was not observed in the study of the disassembled charged battery <Sample 14-6>

A non-aqueous electrolyte battery was manufactured in the same manner as in Sample 14-3 except that phosphomolybdic acid ($H_3(PMo_{12}O_{40})$) was not added. Meanwhile, the precipitate form like Sample 14-1 was not observed in the study of the disassembled charged battery

[Battery Evaluation]
(a) Evaluation of Battery Swelling

After the thickness of the battery of each of the samples was measured, and preliminary charging was carried out by a constant current and a constant voltage until 4.2 V at room temperature and 0.2 C, constant current discharging was carried out at 0.2 C until 2.5 V, and, again, constant current and constant voltage charging was carried out until 4.2 V at 0.2 C (a pair of metallic lithium 4.25 V). Meanwhile, 1 C refers to an electric current value that fully discharges the battery in one hour.

Subsequently, the battery was stored under the condition of 80° C. for 100 hours. Thereafter, the thickness of the battery after high-temperature storage was measured, and the difference from the thickness of the battery before charging was used as the swelling amount during high-temperature storage.

(b) Evaluation of the Generation and Absorption of Gas in the Electrode

After the thickness of the battery of each of the samples was measured, and preliminary charging was carried out by a constant current and a constant voltage until 4.2 V at room temperature and 0.2 C, constant current discharging was carried out at 0.2 C until 2.5 V, and, again, constant current and constant voltage charging was carried out until 4.2 V at 0.2 C (a pair of metallic lithium 4.25 V).

Subsequently, the battery was disassembled in an argon glove box, the electrode was unwound, and the positive electrode and the negative electrode were separated. At this time, it was confirmed whether or not a precipitate was present between the negative electrode and the separator. The separated positive electrode and negative electrode were used to manufacture wound bodies composed of only the positive electrode or the negative electrode, respectively.

The positive electrode wound body was accommodated in a thermally fusible bag-shaped body manufactured using the same quality film as the exterior film that was used during the manufacturing of the battery. The bag-shaped body A accommodating the positive electrode wound body was stored under conditions of 85° C. for 100 hours, and the volume change of the bag-shaped body in a cooled-to-room-temperature state was measured. In this case, the volume of the bag-shaped body A was obtained from the water face by immersing the bag-shaped body A in a liquid vessel, such as water. Furthermore, the generated gas was taken, the amount of carbon dioxide was measured using gas chromatography, the fraction of the carbon dioxide in the generated gas was determined, and the generated amount of carbon dioxide from the positive electrode was obtained from the fraction of the carbon dioxide and the amount of volume change of the bag-shaped body.

The negative electrode wound body was, similarly to the positive electrode, accommodated in a bag-shaped body, carbon dioxide was introduced, and the bag-shaped body was thermally sealed, thereby manufacturing a bag-shaped body B. The bag-shaped body B swollen by the introduction of carbon dioxide was stored under conditions of 85° C. for 100 hours, and the volume change of the bag-shaped body at room temperature was measured, thereby obtaining the absorption amount of carbon dioxide. Meanwhile, in the negative electrode, the absorption amount of carbon dioxide computed by a decrease in the volume was used as a positive value, and the absorption amount of carbon dioxide computed by an increase in the volume was used as a negative value.

The results are shown in the following table.

TABLE 14

| | Positive electrode active material | Average particle diameter [μm] | Addition location | Heteropoly acid Material | Added amount [% by weight] | Battery swelling amount [mm] |
|---|---|---|---|---|---|---|
| Sample 14-1 | $Li_{0.98}Co_{0.20}Ni_{0.80}O_{2.1}$ | 12 | Positive electrode | Orthotungstic acid | 0.05 | 6.84 |
| Sample 14-2 | | | Positive electrode | Orthotungstic acid | 0.10 | 6.35 |
| Sample 14-3 | $Li_{0.98}Co_{0.15}Ni_{0.80}Al_{0.05}O_{2.1}$ | 14 | Positive electrode | Orthotungstic acid | 0.20 | 5.66 |
| Sample 14-4 | | | Positive electrode | Orthotungstic acid | 0.50 | 5.59 |
| Sample 14-5 | | | Positive electrode | Anhydrous tungstic acid | 1.0 | 6.02 |
| Sample 14-6 | | | Positive electrode | Anhydrous tungstic acid | 3.0 | 5.11 |
| Sample 14-7 | | | Positive electrode | Anhydrous tungstic acid | 5.0 | 4.89 |
| Sample 14-8 | $Li_{1.02}Co_{0.98}Mg_{0.01}Al_{0.01}O_{2.1}$ | 12 | Positive electrode | Orthotungstic acid | 0.05 | 6.86 |
| Sample 14-9 | | | Positive electrode | Orthotungstic acid | 0.10 | 5.33 |
| Sample 14-10 | | | Positive electrode | Orthotungstic acid | 0.50 | 5.24 |
| Sample 14-11 | | | Positive electrode | Anhydrous tungstic acid | 1.0 | 6.35 |
| Sample 14-12 | $LiMn_{1.9}Al_{0.1}O_4$ | 14 | Positive electrode | Orthotungstic acid | 1.0 | 4.05 |
| Sample 14-13 | | | Positive electrode | Anhydrous tungstic acid | 1.0 | 5.97 |
| Sample 14-14 | $Li_{0.98}Co_{0.15}Ni_{0.80}Al_{0.05}O_{2.1}$ | 14 | Positive electrode | Orthotungstic acid | 0.01 | 10.4 |

TABLE 15

| | Positive electrode active material | Average particle diameter [μm] | Addition location | Heteropoly acid Material | Added amount [% by weight] | Battery swelling amount [mm] |
|---|---|---|---|---|---|---|
| Sample 14-15 | $Li_{0.98}Co_{0.20}Ni_{0.80}O_{2.1}$ | 12 | Positive electrode | Orthomolybdic acid | 0.05 | 5.92 |
| Sample 14-16 | | | Positive electrode | Orthomolybdic acid | 0.10 | 5.20 |
| Sample 14-17 | $Li_{0.98}Co_{0.15}Ni_{0.80}Al_{0.05}O_{2.1}$ | 14 | Positive electrode | Orthomolybdic acid | 0.20 | 4.82 |
| Sample 14-18 | | | Positive electrode | Orthomolybdic acid | 0.50 | 4.15 |
| Sample 14-19 | | | Positive electrode | Anhydrous molybdic acid | 1.0 | 4.10 |
| Sample 14-20 | | | Positive electrode | Anhydrous molybdic acid | 3.0 | 3.62 |
| Sample 14-21 | | | Positive electrode | Anhydrous molybdic acid | 5.0 | 3.04 |
| Sample 14-22 | $Li_{1.02}Co_{0.98}Mg_{0.01}Al_{0.01}O_{2.1}$ | 12 | Positive electrode | Orthomolybdic acid | 0.05 | 5.77 |
| Sample 14-23 | | | Positive electrode | Orthomolybdic acid | 0.10 | 4.38 |
| Sample 14-24 | | | Positive electrode | Orthomolybdic acid | 0.50 | 4.11 |
| Sample 14-25 | | | Positive electrode | Anhydrous molybdic acid | 1.0 | 4.88 |
| Sample 14-26 | $LiMn_{1.9}Al_{0.1}O_4$ | 14 | Positive electrode | Orthomolybdic acid | 1.0 | 2.95 |
| Sample 14-27 | | | Positive electrode | Anhydrous molybdic acid | 1.0 | 4.33 |
| Sample 14-28 | $Li_{0.98}Co_{0.15}Ni_{0.80}Al_{0.05}O_{2.1}$ | 14 | Positive electrode | Orthomolybdic acid | 0.01 | 9.47 |
| Sample 14-29 | $Li_{0.98}Co_{0.15}Ni_{0.80}Al_{0.05}O_{2.1}$ | 14 | Negative electrode | Orthotungstic acid | 0.10 | 6.24 |
| Sample 14-30 | | | | Orthotungstic acid | 1.0 | 5.72 |
| Sample 14-31 | | | | Orthotungstic acid | 5.0 | 6.07 |
| Sample 14-32 | | | | Orthomolybdic acid | 0.10 | 3.67 |
| Sample 14-33 | | | | Orthomolybdic acid | 1.0 | 4.82 |
| Sample 14-34 | | | | Orthomolybdic acid | 5.0 | 4.97 |
| Sample 14-35 | $Li_{0.98}Co_{0.15}Ni_{0.80}Al_{0.05}O_{2.1}$ | 14 | Positive electrode | — | — | 13.3 |
| Sample 14-36 | $Li_{1.02}Co_{0.98}Mg_{0.01}Al_{0.01}O_{2.1}$ | 12 | Positive electrode | — | — | 7.82 |
| Sample 14-37 | $LiMn_{1.9}Al_{0.1}O_4$ | 14 | Positive electrode | — | — | 7.02 |

As is clear from Tables 14 and 15, it was found that, in Sample 14-1 to Sample 14-3 to which the heteropoly acid was added, a precipitate was confirmed between the negative electrode and the separator, and the negative electrode and the separator were adhered to each other by the anchoring effect of the precipitate. In addition, in Sample 14-4 to Sample 14-6 to which the heteropoly acid was not added, the amount of battery swelling was increased. In addition, it was found that, in comparison to the case where the heteropoly acid was compared, gas generation from the positive electrode was large, and no gas absorption occurred and slight gas generation occurred at the negative electrode.

EXAMPLE 15

[When Silicotungstic Acid is Added to the Positive Electrode so that a Layer Including Silicon and Tungsten is Precipitated on the Surface of the Negative Electrode]
<Sample 15-1>

Firstly, 90 parts by mass of a positive electrode active material composed of complex oxide particles having an average composition of $Li_{0.98}Co_{0.15}Ni_{0.80}Al_{0.05}O_2$, 5 parts by mass of graphite, which is a conducting agent, and 5 parts by mass of polyvinylidene fluoride, which is a bonding agent, were mixed.

Subsequently, silicotungstic acid ($H_4(SiW_{12}O_{40})$) was dissolved in N-methyl-2-pyrrolidone, thereby manufacturing 10% by weight of a silicotungstic acid solution. In addition, the silicotungstic acid solution in which the added amount of silicotungstic acid corresponded to 0.05% by weight of the positive electrode active material was added to the above mixture. Furthermore, a desired amount of N-methyl-2-pyrrolidone was added and dispersed, thereby manufacturing a slurry-form positive electrode compound.

This positive electrode compound slurry was evenly coated and dried on both faces of a positive electrode collector composed of a 20 μm-thick aluminum foil, and compacting was carried out using a roll press machine so as to form a positive electrode active material layer, thereby manufacturing a positive electrode. Subsequently, a positive electrode lead was attached to the positive electrode collector exposed portion of the positive electrode.

Next, 95 parts by mass of graphite powder that was crushed as a negative electrode active material, and 5 parts by mass of polyvinylidene fluoride as a bonding agent were mixed so as to prepare a negative electrode compound, and, furthermore, the mixture was dispersed in N-methyl-2-pyrrolidone, which was a dispersion medium, thereby producing a negative electrode compound slurry. Next, this negative electrode compound slurry was evenly coated and dried on both faces of a negative electrode collector composed of a 15 μm-thick copper foil, and compacting was carried out using a roll press machine so as to form a negative electrode active material layer, thereby manufacturing a negative electrode. Subsequently, a negative electrode lead was attached to the negative electrode collector exposed portion of the negative electrode.

Next, the manufactured positive electrode and negative electrode were adhered through a separator composed of a 25 μm-thick microporous polyethylene film, wound in the longitudinal direction, and a protective tape was attached to the outermost circumferential portion, thereby manufacturing a wound electrode body. Subsequently, this wound electrode body was filled between an exterior member, the sides of the exterior member were thermally fused, and one side was not thermally fused, thereby having an opening. A damp-proof aluminum laminate film composed by laminating a 25 μm-thick nylon film, a 40 μm-thick aluminum foil, and a 30 μm-thick polypropylene film sequentially from the outermost layer was used as the exterior member.

Subsequently, an electrolytic solution was manufactured by dissolving 1 mol/l of hexafluorophosphate ($LiPF_6$) as an electrolyte salt in a solvent in which ethylene carbonate (EC) and ethyl methyl carbonate (EMC) were mixed so that the mass ratio became 5:5. This electrolytic solution was injected from the opening of the exterior member, and the remaining side of the exterior member was thermally fused at a reduced pressure and sealed, thereby manufacturing a secondary battery.

Next, the manufactured battery was preliminarily charged by 100 mA until 3.2 V so as to precipitate a tungsten compound. Meanwhile, the capacity change of the positive electrode at this stage was a small amount that could be ignored. Thereby, a secondary battery for testing in which a layer including silicon and tungsten was precipitated on the negative electrode was manufactured.
<Sample 15-2>

A secondary battery was manufactured in the same manner as in Sample 15-1 except that the added amount of the silicotungstic acid was set to 0.20% by weight of the positive electrode active material.
<Sample 15-3>

A secondary battery was manufactured in the same manner as in Sample 15-1 except that the added amount of the silicotungstic acid was set to 0.50% by weight of the positive electrode active material.
<Sample 15-4>

A secondary battery was manufactured in the same manner as in Sample 15-1 except that the added amount of the silicotungstic acid was set to 1.0% by weight of the positive electrode active material.
<Sample 15-5>

A secondary battery was manufactured in the same manner as in Sample 15-1 except that the added amount of the silicotungstic acid was set to 3.0% by weight of the positive electrode active material.
<Sample 15-6>

A secondary battery was manufactured in the same manner as in Sample 15-1 except that the added amount of the silicotungstic acid was set to 5.0% by weight of the positive electrode active material.
<Sample 15-7>

A secondary battery was manufactured in the same manner as in Sample 15-1 except that the added amount of the silicotungstic acid was set to 7.0% by weight of the positive electrode active material.
<Sample 15-8>

A secondary battery was manufactured in the same manner as in Sample 15-1 except that the addition of the silicotungstic acid was not carried out.
<Sample 15-9>

A secondary battery was manufactured in the same manner as in Sample 15-1 except that a positive electrode active material having an average composition of $Li_{1.02}Co_{0.98}Mg_{0.01}Al_{0.01}O_2$ was used, and the added amount of the silicotungstic acid was set to 0.005% by weight of the positive electrode active material.
<Sample 15-10>

A secondary battery was manufactured in the same manner as in Sample 15-9 except that the added amount of the silicotungstic acid was set to 0.1% by weight of the positive electrode active material.

<Sample 15-11>
A secondary battery was manufactured in the same manner as in Sample 15-9 except that the added amount of the silicotungstic acid was set to 0.5% by weight of the positive electrode active material.
<Sample 15-12>
A secondary battery was manufactured in the same manner as in Sample 15-9 except that the added amount of the silicotungstic acid was set to 1.0% by weight of the positive electrode active material.
<Sample 15-13>
A secondary battery was manufactured in the same manner as in Sample 15-9 except the added amount of the silicotungstic acid.
[Evaluation of the Secondary Battery: the Swelling Amount of the Battery]
After the secondary battery of each of the samples was charged by a constant current until the battery voltage reached 4.2 V at a constant current of 880 mA under conditions of 23° C., constant voltage charging was carried out until the electric current value reached 1 mA at a constant voltage of 4.2 V. After that, the full-charged secondary battery was maintained under conditions of 80° C. for 4 days. The amount of change of the thickness of the secondary battery at this time was measured as the swelling amount of the battery during the high-temperature storage.
[Evaluation of the Secondary Battery: Discharge Capacity]
Regarding the secondary batteries of Samples 15-1 to 1-8 in which $Li_{0.98}Co_{0.15}Ni_{0.80}Al_{0.05}O_2$ was used as the positive electrode active material, the discharge capacity was measured. Firstly, after constant current charging was carried out until the battery voltage of the secondary battery of each of the samples reached 4.2 V at a constant current of 880 mA under conditions of 23° C., constant voltage charging was carried out until the electric current value reached 1 mA at a constant voltage of 4.2 V. Subsequently, discharging at 0.2 C was carried out, and the discharge capacity was measured until the battery voltage reached 3.0 V.
[Evaluation of the Secondary Battery: Evaluation of the Atomic Ratio of Silicon to Tungsten]
After the secondary battery of each of the samples was charged by a constant current until the battery voltage reached 4.2 V at a constant current of 880 mA under conditions of 23° C., constant voltage charging was carried out until the electric current value reached 1 mA at a constant voltage of 4.2 V. Subsequently, after discharging was carried out at 0.2 C until the battery voltage reached 3.0 V, the battery was disassembled in an inert atmosphere, and the removed negative electrode was washed using dimethyl carbonate for 30 seconds. After that, an X-ray photoelectron spectroscopy (XPS) analysis of the surface of the negative electrode was carried out, and the atomic ratio of silicon to tungsten was investigated. Specifically, the peak intensity of each element detected in the measured spectrum was converted to an atomic composition by using a value of the known relative sensitivity coefficient as an intrinsic value of the measurement system. According to necessity, the intensity values after peaks originating from a variety of elements were separated by carrying out a waveform analysis in which commercially available software was used was used for conversion.

At this time, QUANTERA SXM, manufactured by Ulvac-Phi, Inc., was used as an XPS analysis apparatus. In addition, as the analysis conditions, a monochromized Al-kα ray (1486.6 eV, a beam size of about 100 μmφ) was irradiated, and a photoelectron spectrum was measured. A charging neutralization treatment was not carried out. A fluorine is peak was used for the energy correction of the spectrum. Specifically, the F is spectrum of the sample was measured, a waveform analysis was carried out, and the location of the main peak present on the minimum bonding energy side was set to 685.1 eV. Commercially available software was used for the waveform analysis.

For reference, the XPS analysis results of the surface of the negative electrode of Sample 15-3 in which the XPS was used are shown in FIG. 12.

The following Table 16 shows the results of the evaluations.

TABLE 16

| | Positive electrode active material | Heteropoly acid | | | Swelling amount [mm] | Discharge capacity [mAh/g] | Atomic ratio of tungsten to silicon |
|---|---|---|---|---|---|---|---|
| | | Addition location | Material | Added amount [% by weight] | | | |
| Sample 15-1 | $Li_{0.98}Co_{0.15}Ni_{0.80}Al_{0.05}O_2$ | Positive electrode | Silicotungstic acid | 0.005 | 13.2 | 185.2 | No silicon detected |
| Sample 15-2 | | | | 0.20 | 3.41 | 184.3 | 16.5 |
| Sample 15-3 | | | | 0.50 | 3.20 | 183.5 | 10.2 |
| Sample 15-4 | | | | 1.0 | 2.85 | 182.9 | 12.5 |
| Sample 15-5 | | | | 3.0 | 2.46 | 177.2 | 9.41 |
| Sample 15-6 | | | | 5.0 | 2.35 | 170.2 | 10.2 |
| Sample 15-7 | | | | 7.0 | 2.25 | 156.0 | 8.64 |
| Sample 15-8 | | — | — | — | 14.9 | 185.4 | No Si and W detected |
| Sample 15-9 | $Li_{1.02}Co_{0.98}Mg_{0.01}Al_{0.01}O_2$ | Positive electrode | Silicotungstic acid | 0.005 | 7.39 | — | No silicon detected |
| Sample 15-10 | | | | 0.01 | 3.15 | — | 12.8 |
| Sample 15-11 | | | | 0.50 | 2.91 | — | 12.2 |
| Sample 15-12 | | | | 1.0 | 2.60 | — | 7.33 |
| Sample 15-13 | | — | — | — | 8.21 | — | No Si and W detected |

Samples 15-2 to 15-7 and Samples 15-10 to 15-12 were secondary batteries produced by adding silicotungstic acid to the positive electrode. It was confirmed from the results of the XPS analysis shown in Table 16 that a layer including silicon and tungsten was present on the surface of the negative electrode in the secondary battery. Therefore, it was confirmed that some of the silicotungstic acid added to the positive electrode was eluted, and a layer including silicon and tungsten was precipitated and present on the surface of the negative electrode.

As shown in Table 16, it was found that battery swelling can be suppressed in the secondary batteries in which silicotungstic acid was added to the positive electrode, and a layer including silicon and tungsten was precipitated on the surface of the negative electrode in comparison to the secondary batteries of Samples 15-1, 15-8, 15-9, and 15-13.

Samples 15-1 and 15-9 were secondary batteries in which silicotungstic acid was added to the positive electrode, and tungsten was detected on the surface of the negative electrode, but silicon was not detected, and the effect of suppressing swelling was also slight. It is considered that a small amount of silicotungstic acid eluted from the positive electrode was reduced and decomposed at the surface of the negative electrode whose potential was low, and precipitated as a tungsten compound in which the structure of silicotungstic acid was collapsed, and silicon was not included. It was found that, like Samples 15-2 to 15-7, and Samples 15-10 to 15-12, formation of a layer in which both silicon and tungsten were included, and the structure of silicotungstic acid was stably maintained is important to suppress a gas generation reaction in the battery.

Samples 15-1 to 15-8 were secondary batteries in which $Li_{0.98}Co_{0.15}Ni_{0.80}Al_{0.05}O_2$ was used as the positive electrode active material. As shown in Table 16, it was found that the swelling amount of the battery is reduced by precipitating a layer including silicon and tungsten on the surface of the negative electrode in comparison to Sample 15-8 to which silicotungstic acid was not added and Sample 15-1 in which silicon was not detected. In addition, it was found that, as the added amount of silicotungstic acid was increased, the effect of suppressing battery swelling was increased, and substantially the same effect is maintained when the added amount is 1.0% by weight or more. Furthermore, as the added amount of silicotungstic acid was increased, the discharge capacity was decreased, and, for example, the discharge capacity was abruptly decreased at an added amount of 7.0% by weight.

Samples 15-9 to 15-13 were secondary batteries in which $Li_{1.02}Co_{0.98}Mg_{0.01}Al_{0.01}O_2$ was used as the positive electrode active material, and, similarly to Samples 15-1 to 15-8, battery swelling could be suppressed when the layer including silicon and tungsten was precipitated.

As is clear from the comparison of Samples 15-8 and 15-13, when a positive electrode active material having a large content of nickel (Ni) was used, the amount of gas generated became large, and battery swelling became large. However, it was found that, in Samples 15-4 and 15-12 to which the same amount of silicomolybdic acid wad added, the amount of battery swelling was substantially the same, and a particularly significant effect of suppressing battery swelling was obtained with respect to the secondary batteries in which a positive electrode active material having a large content of nickel (Ni) was used.

EXAMPLE 16

[When Silicotungstic Acid is Added to the Electrolytic Solution so that a Layer Including Silicon and Tungsten is Precipitated on the Surface of the Negative Electrode]
<Sample 16-1>
[Manufacturing of the Positive Electrode]

A positive electrode was manufactured in the same manner as in Sample 15-1 except that the addition of silicotungstic acid was not carried out.

[Manufacturing of the Negative Electrode]

91% by weight of artificial graphite as a negative electrode active material and 9% by weight of polyvinylidene fluoride powder as a bonding agent were dispersed in N-methyl-2-pyrrolidone so as to prepare a slurry-form negative electrode compound. Next, the negative electrode compound slurry was evenly coated on both faces of a copper foil, which acts as a negative electrode collector, and was dried at a reduced pressure at 120° C. for 24 hours, thereby forming a negative electrode active material layer. In addition, compacting was carried out using a roll press machine so as to produce a negative electrode sheet, and the negative electrode sheet was cut out into a 50 mm×310 mm band shape, thereby producing a negative electrode. Finally, a negative electrode lead composed of a nickel ribbon was welded to the negative electrode collector exposed portion at the end portion of the negative electrode.

[Manufacturing of the Electrolytic Solution]

The electrolytic solution was manufactured in the following manner. Firstly, ethylene carbonate (EC) and diethyl carbonate (DEC) were mixed in a weight ratio of 4:6 so as to produce a mixed solvent. Subsequently, hexafluorophosphate ($LiPF_6$) was dissolved in the mixed solvent in a concentration of 1.0 mol/kg so as to prepare a solution, and, furthermore, 0.005% by weight of silicotungstic acid ($H_4(SiW_{12}O_{40})$) was dissolved.

[Manufacturing of the Wound Electrode Body]

Next, the band-shaped positive electrode and the band-shaped negative electrode, which were manufactured in the above manner, were laminated through a 20 μm-thick porous polyethylene separator, and wound in the longitudinal direction, thereby obtaining a wound electrode body. The positive electrode, the negative electrode, and the separator had a configuration in which the end portion of the negative electrode was protruded from the end portion of the positive electrode, and the end portion of the separator was protruded toward the outside of the end portion of the negative electrode. The positive electrode, the negative electrode, and the separator were assembled so that the protruded widths in both sides were equivalent. This wound electrode body was interposed by a laminate film in which a resin layer was formed on both faces of an aluminum foil, and the outer circumferential portions of the laminate film were thermally fused except one side.

Subsequently, an electrolytic solution was injected from the opening of the laminate film, and the remaining side was sealed at a reduced pressure, thereby sealing the wound electrode body in the laminate film. Meanwhile, the resin side was disposed at a part of the positive electrode lead and the negative electrode lead, and the laminate film faces and is sealed on the laminated film.

Next, the manufactured battery was preliminarily charged until 3.2 V at 100 mA, and the tungsten compound was allowed to precipitate. Meanwhile, the capacity change of the positive electrode in this phase was a small amount that could be ignored. Thereby, a secondary battery for testing, in which a tungsten compound was precipitated on the negative electrode, was manufactured.

<Sample 16-2>

A secondary battery was manufactured in the same manner as in Sample 16-1 except that the added amount of the silicotungstic acid was set to 0.20% by weight of the positive electrode active material.

<Sample 16-3>

A secondary battery was manufactured in the same manner as in Sample 16-1 except that the added amount of the silicotungstic acid was set to 0.50% by weight of the positive electrode active material.

<Sample 16-4>

A secondary battery was manufactured in the same manner as in Sample 16-1 except that the added amount of the silicotungstic acid was set to 1.0% by weight of the positive electrode active material.

<Sample 16-5>

A secondary battery was manufactured in the same manner as in Sample 16-1 except that the added amount of the silicotungstic acid was set to 3.0% by weight of the positive electrode active material.

<Sample 16-6>

A secondary battery was manufactured in the same manner as in Sample 16-1 except that the added amount of the silicotungstic acid was set to 5.0% by weight of the positive electrode active material.

<Sample 16-7>

A secondary battery was manufactured in the same manner as in Sample 16-1 except that the addition of the silicotungstic acid was not carried out.

[Evaluation of the Battery for Testing]

With regard to batteries for testing of each of the examples and comparative examples, the same evaluation test of the swelling amount of the battery as in Example 15 was carried out. In addition, the same XPS analysis as in Example 15 was carried out on the negative electrode. In addition, the following safety evaluation test was carried out.

(a) Heating Test

The battery for testing was disposed under conditions of room temperature, constant current charging was carried out at 1 C, and then the constant current charging was switched to constant voltage charging when the battery voltage reached 4.5 V, thereby charging the battery into a full charge state. After that, the battery for testing was fed into a constant temperature vessel of room temperature, heated at 5° C./minute, maintained at a constant temperature at a point of time when the battery reached 150° C., and maintained for 1 hour from the point of the time.

(b) Nail Penetration Test

The battery for testing was disposed under conditions of 60° C., constant current charging was carried out at 1 C, and then the constant current charging was switched to constant voltage charging when the battery voltage reached 4.5 V, thereby charging the battery into a full charge state. After that, the battery for testing was penetrated by a nail having a diameter of 2.5 mm under conditions of 60° C.

(c) Overcharging Test

The battery in a discharged state was disposed under conditions of room temperature, and the battery for testing was over-charged by a large electric current of 5 C from the discharged state with a maximum of 24 V.

The results of the respective tests are shown in Table 2. Meanwhile, "O" is marked for the battery where nothing occurred in the heating test, the nail penetration test, and the overcharging test. Meanwhile, "1" is marked for the battery in which the laminate film was swollen by heat generation, "2" is marked for the battery in which slight smoking occurred, and "3" is marked for the battery in which gas blowout occurred.

The following Table 17 shows the results of the evaluations.

TABLE 17

| | Heteropoly acid | | | | | | | |
|---|---|---|---|---|---|---|---|---|
| | Addition location | Material | Added amount [% by weight] | Swelling amount [mm] | Overcharging test | Overcharging test | Overcharging test | Atomic ratio of tungsten to silicon |
| Sample 16-1 | Electrolytic solution | Silicotungstic acid | 0.005 | 11.8 | 2 | 3 | 2 | No silicon detected |
| Sample 16-2 | | | 0.20 | 3.51 | O | 1 | 1 | 14.4 |
| Sample 16-3 | | | 0.50 | 3.30 | O | 0 | 1 | 13.2 |
| Sample 16-4 | | | 1.0 | 3.15 | 1 | O | O | 10.2 |
| Sample 16-5 | | | 3.0 | 2.91 | O | 1 | O | 8.90 |
| Sample 16-6 | | | 5.0 | 2.85 | O | 1 | O | 6.54 |
| Sample 16-7 | — | — | — | 14.0 | 3 | 3 | 2 | No Si and W detected |

Sample 16-1 was a secondary battery in which silicotungstic acid was added to the electrolytic solution, and tungsten was detected on the surface of the negative electrode, but silicon was not detected, and the effect of suppressing swelling was also slight. It is considered that, since the added amount of silicotungstic acid was small, the majority of the added silicotungstic acid was reduced and decomposed on the surface of the negative electrode whose potential was low, the structure of silicotungstic acid was collapsed, and only a tungsten compound not including silicon remained. It was found that, like Samples 16-2 to 16-7, formation of a layer in which both silicon and tungsten were included, and the structure of silicotungstic acid was stably maintained is important to suppress a gas generation reaction in the battery.

As shown in Table 17, it was found that battery swelling can be suppressed in the secondary battery configured to precipitate a layer including silicon and tungsten on the surface of the negative electrode in comparison to the secondary batteries of Sample 16-7 not containing silicotungstic acid and Sample 16-1 in which a layer not including silicon was precipitated.

In addition, in Samples 16-2 to 16-6 in which silicotungstic acid was added to the electrolytic solution, and a layer including silicon and tungsten was precipitated, no problem occurred in each of the tests, or simply the laminate film was swollen. In contrast to this, in Sample 16-1 and Sample 16-7 in which silicotungsten was not added to the electrolytic solution, or a layer not including silicon was precipitated, slight smoking or gas blowout occurred in the batteries for testing.

Therefore, suppression of battery swelling and improvement of safety were confirmed in secondary batteries having a configuration in which a layer including silicon and tungsten was precipitated.

EXAMPLE 17

[When Silicotungstic Acid is Added to the Positive Electrode Active Material so that a Layer Including Silicon and Tungsten is Precipitated on the Surface of the Negative Electrode]
<Sample 17-1>
[Manufacturing of the Positive Electrode]
A positive electrode was manufactured in the same manner as in Sample 15-1.
[Manufacturing of the Negative Electrode]
91% by weight of artificial graphite as a negative electrode active material and 9% by weight of polyvinylidene fluoride powder as a bonding agent were dry-mixed. Subsequently, N-methyl-2-pyrrolidone was adjusted and added to the mixture, thereby preparing a slurry-form negative electrode compound. Meanwhile, silicotungstic acid ($H_4(SiW_{12}O_{40})$) was dissolved in N-methyl-2-pyrrolidone so as to manufacture a silicotungstic acid solution having a concentration of 5.0% by mass. In addition, the silicotungstic acid solution having an added amount of silicotungstic acid corresponding to 0.005% by mass with respect to the negative electrode active material was added to the negative electrode compound slurry. A negative electrode was manufactured in the same manner as in Example 17-1 except the above.
[Manufacturing of the Electrolytic Solution]
An electrolytic solution was manufactured in the same manner as in Sample 17-1 except that silicotungstic acid was not added.

<Sample 17-2>
A negative electrode was manufactured in the same manner as in Sample 17-1 except that the added amount of the silicotungstic acid was set to 0.2% by mass with respect of the negative electrode active material.
<Sample 17-3>
A negative electrode was manufactured in the same manner as in Sample 17-1 except that the added amount of the silicotungstic acid was set to 0.5% by mass with respect of the negative electrode active material.
<Sample 17-4>
A negative electrode was manufactured in the same manner as in Sample 17-1 except that the added amount of the silicotungstic acid was set to 1.0% by mass with respect of the negative electrode active material.
<Sample 17-5>
A negative electrode was manufactured in the same manner as in Sample 17-1 except that the added amount of the silicotungstic acid was set to 3.0% by mass with respect of the negative electrode active material.
<Sample 17-6>
A negative electrode was manufactured in the same manner as in Sample 17-1 except that the added amount of the silicotungstic acid was set to 5.0% by mass with respect of the negative electrode active material.
<Sample 17-7>
A negative electrode was manufactured in the same manner as in Sample 17-1 except that the added amount of the silicotungstic acid was not added.
[Evaluation of the Battery for Testing]
With regard to each of the batteries for testing, the same evaluation test of the swelling amount of the battery, XPS analysis of the surface of the negative electrode, and safety evaluation test as in Example 16 were carried out.
The following Table 18 shows the results of the evaluations.

TABLE 18

| | Heteropoly acid | | | | | | | |
| --- | --- | --- | --- | --- | --- | --- | --- | --- |
| | Addition location | Material | Added amount [% by weight] | Swelling amount [mm] | Overcharging test | Overcharging test | Overcharging test | Atomic ratio of tungsten to silicon |
| Sample 17-1 | Negative electrode | Silicotungstic acid | 0.005 | 13.1 | 2 | 3 | 2 | No silicon detected |
| Sample 17-2 | | | 0.20 | 3.21 | 0 | 1 | 1 | 12.5 |
| Sample 17-3 | | | 0.50 | 3.05 | 1 | 0 | 1 | 14.1 |
| Sample 17-4 | | | 1.0 | 2.86 | 1 | 0 | 0 | 9.85 |
| Sample 17-5 | | | 3.0 | 2.44 | 0 | 0 | 0 | 10.0 |
| Sample 17-6 | | | 5.0 | 2.53 | 0 | 1 | 0 | 7.89 |
| Sample 17-7 | — | — | — | 15.8 | 3 | 3 | 2 | No Si and W detected |

[Manufacturing of the Wound Electrode Body]
A battery for testing was manufactured in the same manner as in Example 16-1 using the positive electrode, the negative electrode, and the electrolyte. Next, the manufactured battery was preliminarily charged until 3.2 V at 100 mA, and a tungsten compound was precipitated. Meanwhile, the capacity change of the positive electrode in this phase was a small amount that could be ignored. Thereby, a secondary battery for testing in which a tungsten compound was precipitated on the surface of the negative electrode was manufactured.

Sample 17-1 was a secondary battery in which silicotungstic acid was added to the electrolytic solution, and tungsten was detected on the surface of the negative electrode, but silicon was not detected, and the effect of suppressing swelling was also slight. It is considered that, since the added amount of silicotungstic acid was small, the majority of the added silicotungstic acid was reduced and decomposed on the surface of the negative electrode whose potential was low, the structure of silicotungstic acid was collapsed, and only a tungsten compound not including silicon remained. It was found that, like Samples 17-2 to 17-7, formation of a layer in which both silicon and tungsten were included, and the structure of silicotungstic acid was stably maintained is important to suppress a gas generation reaction in the battery.

As shown in Table 18, it was found that battery swelling can be suppressed in the secondary battery configured to precipitate a layer including silicon and tungsten on the surface of the negative electrode in comparison to the secondary batteries of Sample 17-7 not containing silicotungstic acid and Sample 17-1 in which a layer not including silicon was precipitated.

In addition, in Samples 17-2 to 17-6 in which silicotungstic acid was added to the electrolytic solution, and a layer including silicon and tungsten was precipitated, no problem occurred in each of the tests, or simply the laminate film was swollen. In contrast to this, in Sample 17-1 and Sample 17-7 in which silicotungsten was not added to the electrolytic solution, or a layer not including silicon was precipitated, slight smoking or gas blowout occurred in the batteries for testing.

Therefore, suppression of battery swelling and improvement of safety were confirmed in secondary batteries having a configuration in which a layer including silicon and tungsten was precipitated.

As described above, in the non-aqueous electrolyte batteries in which a layer including silicon and tungsten is precipitated on the surface of the negative electrode by adding silicotungstic acid, batteries in which gas generation and short circuiting between the positive electrode and the negative electrode are suppressed, battery swelling is small, and stability is high can be obtained.

Such effects can be obtained even in any battery configurations.

EXAMPLE 18

[When a Layer in which Both of the Polyacid and/or Polyacid Compound and Lithium and/or a Lithium Compound are Present on the Surface of the Negative Electrode is Precipitated by Including the Heteropoly Acid and/or Heteropoly Acid Compound in the Positive Electrode]
<Sample 18-1>

Firstly, 90 parts by mass of a positive electrode active material composed of complex oxide particles having an average composition of $Li_{0.98}Co_{0.15}Ni_{0.80}Al_{0.05}O_2$, 5 parts by mass of graphite, which is a conducting agent, and 5 parts by mass of polyvinylidene fluoride, which is a bonding agent, were mixed.

Subsequently, silicotungstic acid ($H_4(SiW_{12}O_{40})$) was dissolved in N-methyl-2-pyrrolidone, thereby manufacturing 10% by weight of a silicotungstic acid solution. In addition, the silicotungstic acid solution in which the added amount of silicotungstic acid corresponded to 0.005% by weight of the positive electrode active material was added to the above mixture. Furthermore, a desired amount of N-methyl-2-pyrrolidone was added and dispersed, thereby manufacturing a slurry-form positive electrode compound.

This positive electrode compound slurry was evenly coated and dried on both faces of a positive electrode collector composed of a 20 μm-thick aluminum foil, and compacting was carried out using a roll press machine so as to form a positive electrode active material layer, thereby manufacturing a positive electrode. Subsequently, a positive electrode lead was attached to the positive electrode collector exposed portion of the positive electrode.

Next, 95 parts by mass of graphite powder that was crushed as a negative electrode active material, and 5 parts by mass of polyvinylidene fluoride as a bonding agent were mixed so as to prepare a negative electrode compound, and, furthermore, the mixture was dispersed in N-methyl-2-pyrrolidone, which was a dispersion medium, thereby producing a negative electrode compound.

Next, this negative electrode compound slurry was evenly coated and dried on both faces of a negative electrode collector composed of a 15 μm-thick copper foil, and compacting was carried out using a roll press machine so as to form a negative electrode active material layer, thereby manufacturing a negative electrode. Subsequently, a negative electrode lead was attached to the negative electrode collector exposed portion of the negative electrode.

Next, the manufactured positive electrode and negative electrode were adhered through a separator composed of a 25 μm-thick microporous polyethylene film, wound in the longitudinal direction, and a protective tape was attached to the outermost circumferential portion, thereby manufacturing a wound electrode body. Subsequently, this wound electrode body was filled in an exterior member, the sides of the exterior member were thermally fused, and one side was not thermally fused, thereby having an opening. A damp-proof aluminum laminate film composed by laminating a 25 μm-thick nylon film, a 40 μm-thick aluminum foil, and a 30 μm-thick polypropylene film sequentially from the outermost layer was used as the exterior member.

Subsequently, an electrolytic solution was manufactured by dissolving 1 mol/l of hexafluorophosphate ($LiPF_6$) as an electrolyte salt in a solvent in which ethylene carbonate (EC) and ethyl methyl carbonate (EMC) were mixed so that the mass ratio became 5:5. This electrolytic solution was injected from the opening of the exterior member, and the remaining side of the exterior member was thermally fused at a reduced pressure and sealed, thereby manufacturing a secondary battery.

Next, the manufactured battery was preliminarily charged by 100 mA until 3.2 V so as to precipitate a tungsten compound. Meanwhile, the capacity change of the positive electrode at this stage was a small amount that could be ignored. Thereby, a secondary battery for testing in which a layer where the polyacid and/or the polyacid compound and lithium and/or the lithium compound coexist was precipitated on the negative electrode was manufactured.
<Sample 18-2>

A secondary battery was manufactured in the same manner as in Sample 18-1 except that the added amount of the silicotungstic acid was set to 0.20% by weight of the positive electrode active material.
<Sample 18-3>

A secondary battery was manufactured in the same manner as in Sample 18-1 except that the added amount of the silicotungstic acid was set to 0.50% by weight of the positive electrode active material.
<Sample 18-4>

A secondary battery was manufactured in the same manner as in Sample 18-1 except that the added amount of the silicotungstic acid was set to 1.0% by weight of the positive electrode active material.
<Sample 18-5>

A secondary battery was manufactured in the same manner as in Sample 18-1 except that the added amount of the silicotungstic acid was set to 3.0% by weight of the positive electrode active material.
<Sample 18-6>

A secondary battery was manufactured in the same manner as in Sample 18-1 except that the added amount of the silicotungstic acid was set to 5.0% by weight of the positive electrode active material.

<Sample 18-7>

A secondary battery was manufactured in the same manner as in Sample 18-1 except that the added amount of the silicotungstic acid was set to 7.0% by weight of the positive electrode active material.

<Sample 18-8>

A secondary battery was manufactured in the same manner as in Sample 18-4 except that phosphotungstic acid ($H_3(PW_{12}O_{40})$) was used as the added heteropoly acid.

<Sample 18-9>

A secondary battery was manufactured in the same manner as in Sample 18-4 except that silicomolybdic acid ($H_4(SiMo_{12}O_{40})$) was used as the added heteropoly acid.

<Sample 18-10>

A secondary battery was manufactured in the same manner as in Sample 18-4 except that phosphomolybdic acid ($H_3(PMo_{12}O_{40})$) was used as the added heteropoly acid.

<Sample 18-11>

A secondary battery was manufactured in the same manner as in Sample 18-1 except that the addition of the heteropoly acid was not carried out.

<Sample 18-12>

A secondary battery was manufactured in the same manner as in Sample 18-1 except that a positive electrode active material having an average composition of $Li_{1.02}Co_{0.98}Mg_{0.01}Al_{0.01}O_2$ was used, and the added amount of the silicotungstic acid was set to 0.005% by weight of the positive electrode active material.

<Sample 18-13>

A secondary battery was manufactured in the same manner as in Sample 18-9 except that the added amount of the silicotungstic acid was set to 0.1% by weight of the positive electrode active material.

<Sample 18-14>

A secondary battery was manufactured in the same manner as in Sample 18-9 except that the added amount of the silicotungstic acid was set to 0.5% by weight of the positive electrode active material.

<Sample 18-15>

A secondary battery was manufactured in the same manner as in Sample 18-9 except that the added amount of the silicotungstic acid was set to 1.0% by weight of the positive electrode active material.

<Sample 18-16>

A secondary battery was manufactured in the same manner as in Sample 18-15 except that phosphotungstic acid ($H_3(PW_{12}O_{40})$) was used as the added heteropoly acid.

<Sample 18-17>

A secondary battery was manufactured in the same manner as in Sample 18-15 except that silicomolybdic acid ($H_4(SiMo_{12}O_{40})$) was used as the added heteropoly acid.

<Sample 18-18>

A secondary battery was manufactured in the same manner as in Sample 18-15 except that phosphomolybdic acid ($H_3(PMo_{12}O_{40})$) was used as the added heteropoly acid.

<Sample 18-19>

A secondary battery was manufactured in the same manner as in Sample 18-2 except that the addition of the heteropoly acid was not carried out.

[Evaluation of the Secondary Battery: The Swelling Amount of the Battery]

After the secondary battery of each of the samples was charged by a constant current until the battery voltage reached 4.2 V at a constant current of 880 mA under conditions of 23° C., constant voltage charging was carried out until the electric current value reached 1 mA at a constant voltage of 4.2 V. After that, the full-charged secondary battery was maintained under conditions of 80° C. for 4 days. The amount of change of the thickness of the secondary battery at this time was measured as the swelling amount of the battery during the high-temperature storage.

[Evaluation of the Secondary Battery: Discharge Capacity]

Regarding the secondary batteries of Samples 18-1 to 1-11 in which $Li_{0.98}Co_{0.15}Ni_{0.80}Al_{0.05}O_2$ was used as the positive electrode active material, the discharge capacity was measured. Firstly, after constant current charging was carried out until the battery voltage of the secondary battery of each of the samples reached 4.2 V at a constant current of 880 mA under conditions of 23° C., constant voltage charging was carried out until the electric current value reached 1 mA at a constant voltage of 4.2 V. Subsequently, discharging at 0.2 C was carried out, and the discharge capacity was measured until the battery voltage reached 3.0 V.

[Evaluation of the Secondary Battery: Surface Analysis by XPS]

After the secondary battery of each of the samples was charged by a constant current until the battery voltage reached 4.2 V at a constant current of 880 mA under conditions of 23° C., constant voltage charging was carried out until the electric current value reached 1 mA at a constant voltage of 4.2 V. Subsequently, after discharging was carried out at 0.2 C until the battery voltage reached 3.0 V, the battery was disassembled in an inert atmosphere, and the removed negative electrode was washed using dimethyl carbonate for 30 seconds. After that, an X-ray photoelectron spectroscopy (XPS) analysis of the surface of the negative electrode was carried out, and the presence of lithium and a polyatom included in the added heteropoly acid (tungsten or molybdenum) was investigated. Specifically, when the peak of each of the elements detected in the measured spectrum appeared, it was determined that each of the elements was present.

At this time, a QUANTERA SXM, manufactured by Ulvac-Phi, Inc., was used as an XPS analysis apparatus. In addition, as the analysis conditions, a monochromized Al-kα ray (1486.6 eV, a beam size of about 100 μmΦ) was irradiated, and a photoelectron spectrum was measured. A charging neutralization treatment was not carried out. A fluorine is peak was used for the energy correction of the spectrum. Specifically, the F1s spectrum of the sample was measured, a waveform analysis was carried out, and the location of the main peak present on the minimum bonding energy side was set to 685.1 eV. Commercially available software was used for the waveform analysis.

For reference, the XPS analysis results of the surface of the negative electrode of Sample 18-3 in which the XPS was used are shown in FIG. 14.

[Evaluation of the Secondary Battery: Surface Analysis by ToF-SIMS]

After the secondary battery of each of the samples was charged by a constant current until the battery voltage reached 4.2 V at a constant current of 880 mA under conditions of 23° C., constant voltage charging was carried out until the electric current value reached 1 mA at a constant voltage of 4.2 V. Subsequently, after discharging was carried out at 0.2 C until the battery voltage reached 3.0 V, the battery was disassembled in an inert atmosphere, and the removed negative electrode was washed using dimethyl carbonate for 30 seconds. After that, a time of flight secondary ion mass spectroscopy (ToF-SIMS) analysis of the surface of the negative electrode was carried out, and the presence of lithium and the polyacid or polyacid compound derived from the added heteropoly acid was investigated. Specifically, in the measured spectrum, it was determined that lithium or a lithium compound was present when the peak of a secondary ion group (A) as shown below was present, and the polyacid or polyacid compound was present when the peak of a secondary ion group (B).

Secondary ion group (A) $Li_2OH^+$, $Li_2F^+$, $Li_3F_2^+$, $Li_4F_3^+$, $Li_5F4^+$, $Li_2PO_3^+$, $Li_4PO_4^+$, $Li_5PO4F^+$, $Li_3CO_3^+$, $LiF_2^-$, $Li_2F_3^-$, $Li_3F4^-$, $LiPO_2F^-$, $LiPO_3F^-$, $LiPO_2F_3^-$, $LiPF7^-$, $LiP_2F_{12}^-$, $Li_2P_2F_{13}^-$ Secondary ion group (B) $Li_3WO4^+$, $Li_4WO_5F^+$, $WO_3^-$, $WO_3H^-$, $WO_3F^-$, $WO_2F_3^-$, $W_2O_5^-$, $W_2O_6^-$, $W_2O_6F^-$, $MoO_3^-$, $MoO_4H^-$, $MoO_3F^-$, $Mo_3O_6^-$ At this time, a TOF-SIMSV, manufactured by ION-TOF Inc., was used as the ToF-SIMS analysis apparatus. In addition, the analysis conditions were as follows: primary ion=$Bi_3^+$, the acceleration voltage of an ion gun=25 KeV, analysis mode=bunching mode, an electric current of an irradiation ion (measurement by a pulse beam)=0.3 pA, pulse width=11.7 ns, mass range=1 amu to 800 amu, scanning range=200 μm×200 μm.

For reference, the ToF-SIMS analysis results of the surface of the negative electrode of Sample 18-3 are shown in FIG. 7.

The following Table 19 shows the results of the evaluations.

which both of the polyacid and/or polyacid compound and lithium and/or a lithium compound were precipitated on the surface of the negative electrode.

As shown in Table 1, it was found that battery swelling can be suppressed in the secondary battery configured so that the heteropoly acid was added to the positive electrode, and a layer in which both of the polyacid and/or polyacid compound and lithium and/or a lithium compound were present on the surface of the negative electrode was precipitated in comparison to the secondary batteries of Samples 18-1, 18-11, 18-12, and 18-19 in which a layer in which both of the polyacid and/or polyacid compound and lithium and/or a lithium compound were present.

Samples 18-1 and 18-12 were secondary batteries in which silicotungstic acid was added to the positive electrode, and the presence of tungsten or a tungsten compound was not confirmed in the XPS and ToF-SIMS analyses of the surface of the negative electrode, and the effect of suppressing battery swelling remained slight. This is considered to be because the added amount of the silicotungstic acid was small, and therefore the amount was not sufficient such that the silicotungstic acid eluted from the positive electrode could not form a precipitate layer on the surface of the negative electrode. Therefore, it was found that the precipi-

TABLE 19

| | | Heteropoly acid | | | | XPS measurement | | ToF-SIMS | |
|---|---|---|---|---|---|---|---|---|---|
| | Positive electrode active material | Addition location | Material | Added amount [% by weight] | Swelling amount [mm] | Discharge capacity [mAh/g] | Presence of lithium | Presence of polyatom | Presence of lithium | Presence of polyatom |
| Sample 18-1 | $Li_{0.98}Co_{0.15}Ni_{0.80}Al_{0.05}O_2$ | Positive electrode | Silicotungstic acid | 0.005 | 12.8 | 185.3 | | x | 0 | x |
| Sample 18-2 | | | | 0.20 | 4.01 | 184.1 | 0 | W | 0 | W |
| Sample 18-3 | | | | 0.50 | 3.57 | 183.3 | 0 | W | 0 | W |
| Sample 18-4 | | | | 1.0 | 3.09 | 182.6 | 0 | W | 0 | W |
| Sample 18-5 | | | | 3.0 | 2.91 | 177.2 | 0 | W | 0 | W |
| Sample 18-6 | | | | 5.0 | 2.46 | 170.2 | 0 | W | 0 | W |
| Sample 18-7 | | | | 7.0 | 2.40 | 156.0 | 0 | W | 0 | W |
| Sample 18-8 | | Positive electrode | Phosphotungstic acid | 1.0 | 3.34 | 183.0 | 0 | W | 0 | W |
| Sample 18-9 | | Positive electrode | Silicomolybdic acid | 1.0 | 3.43 | 183.1 | 0 | Mo | 0 | Mo |
| Sample 18-10 | | Positive electrode | Phosphomolybdic acid | 1.0 | 3.18 | 182.4 | 0 | Mo | 0 | Mo |
| Sample 18-11 | | — | — | — | 13.9 | 185.6 | 0 | x | 0 | x |
| Sample 18-12 | $Li_{1.02}Co_{0.98}Mg_{0.01}Al_{0.01}O_2$ | Positive electrode | Silicotungstic acid | 0.005 | 6.82 | — | 0 | x | 0 | x |
| Sample 18-13 | | | | 0.20 | 3.40 | — | 0 | W | 0 | W |
| Sample 18-14 | | | | 0.50 | 2.82 | — | 0 | W | 0 | W |
| Sample 18-15 | | | | 1.0 | 2.76 | — | 0 | W | 0 | W |
| Sample 18-16 | | Positive electrode | Phosphotungstic acid | 1.0 | 2.89 | — | 0 | W | 0 | W |
| Sample 18-17 | | Positive electrode | Silicomolybdic acid | 1.0 | 2.80 | — | 0 | Mo | 0 | Mo |
| Sample 18-18 | | Positive electrode | Phosphomolybdic acid | 1.0 | 2.67 | — | 0 | Mo | 0 | Mo |
| Sample 18-19 | | — | — | — | 8.36 | — | 0 | x | 0 | x |

In Samples 18-2 to 1-10 and Samples 18-13 to 18-18 which are secondary batteries produced by adding the heteropoly acid to the positive electrode, the presence of lithium and a polyatom was confirmed as shown in Table 1. In an analysis of the peak belonging to the inner shell electron of C1s by XPS which was carried out in harmonization, no peak of elements included in graphite, which was the negative electrode active material, and the graphite compound to which lithium was inserted was observed. Therefore, it was confirmed that some of the heteropoly acid added to the positive electrode was eluted, and a layer in tation of a layer including the polyacid and/or polyacid compound on the surface of the negative electrode is important to suppress a gas generation reaction in the battery.

Samples 18-1 to 18-11 were secondary batteries in which $Li_{0.98}Co_{0.15}Ni_{0.80}Al_{0.05}O_2$ was used as the positive electrode active material. As shown in Table 1, it was found that the swelling amount of the battery was reduced by precipitating a layer in which both of the polyacid and/or polyacid compound and lithium and/or a lithium compound were present on the surface of the negative electrode in comparison to the secondary batteries of Sample 18-11 in which the heteropoly acid was not added and Sample 18-1 in which the polyatom was not detected. In addition, it was found that, as the added amount of heteropoly acid is increased, the effect of suppressing battery swelling is improved, and substantially the same effect is maintained when the added amount is 1.0% by weight or more. Furthermore, as the added amount of the heteropoly acid is increased, the discharge capacity was degraded, and, for example, the discharge capacity was abruptly degraded when the added amount was 7.0% by weight.

Samples 18-2 to 18-19 were secondary batteries in which $Li_{1.02}Co_{0.98}Mg_{0.01}Al_{0.01}O_2$ was used as the positive electrode active material, and, similarly to Samples 18-1 to 18-11, battery swelling could be suppressed when a layer in which both of the polyacid and/or polyacid compound and lithium and/or a lithium compound were present on the surface of the negative electrode was precipitated.

As is clear from the comparison of Samples 18-11 and 18-19, when the positive electrode active material having a large content of nickel (Ni) was used, the generated amount of gas was increased, and battery swelling was increased. However, it was found that, in Samples 18-4 and 18-15 to which the same amount of silicotungstic acid was added, the amount of battery swelling was substantially the same, and a particularly significant effect of suppressing battery swelling was obtained in the secondary batteries in which the positive electrode active material having a large content of nickel (Ni) was used.

Sample 18-4 and Samples 18-8 to 18-10, or Samples 18-15 to 18-18 were secondary batteries in which the same amounts of different kinds of the heteropoly acid were added. It was found that the swelling amount of the battery was substantially the same regardless of the kinds of the heteropoly acid, and the effect of suppressing battery swelling was obtained in any case in which any heteropoly acid was used.

EXAMPLE 19

[A Case in which a Layer in which Both of the Polyacid and/or Polyacid Compound and Lithium and/or a Lithium Compound are Present on the Surface of the Negative Electrode is Precipitated by Including the Heteropoly Acid and/or Heteropoly Acid Compound in the Electrolytic Solution]
<Sample 19-1>
[Manufacturing of the Positive Electrode]
A positive electrode was manufactured in the same manner in Sample 18-1 except that the addition of the heteropoly acid was not carried out.
[Manufacturing of the Negative Electrode]
91% by weight of artificial graphite as a negative electrode active material and 9% by weight of polyvinylidene fluoride powder as a bonding agent were dispersed in N-methyl-2-pyrrolidone so as to prepare a slurry-form negative electrode compound. Next, the negative electrode compound slurry was evenly coated on both faces of a copper foil, which acts as a negative electrode collector, and was dried at a reduced pressure at 120° C. for 24 hours, thereby forming a negative electrode active material layer. In addition, compacting was carried out using a roll press machine so as to produce a negative electrode sheet, and the negative electrode sheet was cut out into a 50 mm×310 mm band shape, thereby producing a negative electrode. Finally, a negative electrode lead composed of a nickel ribbon was welded to the negative electrode collector exposed portion at the end portion of the negative electrode.

[Manufacturing of the Electrolytic Solution]
The electrolytic solution was manufactured in the following manner. Firstly, ethylene carbonate (EC) and diethyl carbonate (DEC) were mixed in a weight ratio of 4:6 so as to produce a mixed solvent. Subsequently, hexafluorophosphate ($LiPF_6$) was dissolved in the mixed solvent in a concentration of 1.0 mol/kg so as to prepare a solution, and, furthermore, 0.2% by weight of silicotungstic acid ($H_4(SiW_{12}O_{40})$) was dissolved.
[Manufacturing of the Wound Electrode Body]
Next, the band-shaped positive electrode and the band-shaped negative electrode, which were manufactured in the above manner, were laminated through a 20 µm-thick porous polyethylene separator, and wound in the longitudinal direction, thereby obtaining a wound electrode body. The positive electrode, the negative electrode, and the separator had a configuration in which the end portion of the negative electrode was protruded from the end portion of the positive electrode, and the end portion of the separator was protruded toward the outside of the end portion of the negative electrode. The positive electrode, the negative electrode, and the separator were assembled so that the protruded widths in both sides were equivalent. This wound electrode body was interposed by a laminate film in which a resin layer was formed on both faces of an aluminum foil, and the outer circumferential portions of the laminate film were thermally fused except one side.

Subsequently, an electrolytic solution was injected from the opening of the laminate film, and the remaining side was sealed at a reduced pressure, thereby sealing the wound electrode body in the laminate film. Meanwhile, the resin side was disposed at a part of the positive lead and the negative electrode, and the laminate film faces and is sealed on the laminated film.

Next, the manufactured battery was preliminarily charged until 3.2 V at 100 mA, and electrolysis reduction of silicotungstic acid was carried out. Meanwhile, the capacity change of the positive electrode in this phase was a small amount that could be ignored. Thereby, a secondary battery for testing, in which a tungsten compound layer was precipitated on the negative electrode, was manufactured.
<Sample 19-2>
A secondary battery was manufactured in the same manner as in Sample 19-1 except that the added amount of the silicotungstic acid was set to 0.50% by weight of the negative electrode active material.
<Sample 19-3>
A secondary battery was manufactured in the same manner as in Sample 19-1 except that the added amount of the silicotungstic acid was set to 1.0% by weight of the negative electrode active material.
<Sample 19-4>
A secondary battery was manufactured in the same manner as in Sample 19-1 except that the added amount of the silicotungstic acid was set to 3.0% by weight of the negative electrode active material.
<Sample 19-5>
A secondary battery was manufactured in the same manner as in Sample 19-1 except that the added amount of the silicotungstic acid was set to 5.0% by weight of the negative electrode active material.
<Sample 19-6>
A secondary battery was manufactured in the same manner as in Sample 19-3 except that phosphotungstic acid ($H_3(PW_{12}O_{40})$) was used as the added heteropoly acid.

<Sample 19-7>

A secondary battery was manufactured in the same manner as in Sample 19-3 except that silicomolybdic acid ($H_4(SiMo_{12}O_{40})$) was used as the added heteropoly acid.

<Sample 19-8>

A secondary battery was manufactured in the same manner as in Sample 19-3 except that phosphomolybdic acid ($H_3(PMo_{12}O_{40})$) was used as the added heteropoly acid.

occurred in the heating test, the nail penetration test, and the overcharging test. Meanwhile, "1" is marked for the battery in which the laminate film was swollen by heat generation, "2" is marked for the battery in which slight smoking occurred, and "3" is marked for the battery in which gas blowout occurred.

The following Table 20 shows the results of the evaluations.

TABLE 20

| | Heteropoly acid | | | | | | | XPS measurement | | ToF-SIMS | |
| | | Added | | | | | | | | | |
| | Addition location | Material | amount [% by weight] | Swelling amount [mm] | Over-charging test | Over-charging test | Over-charging test | Presence of lithium | Presence of polyatom | Presence of lithium | Presence of polyatom |
|---|---|---|---|---|---|---|---|---|---|---|---|
| Sample 19-1 | Electrolytic solution | Silico-tungstic acid | 0.20 | 4.08 | 1 | 1 | 1 | O | W | O | W |
| Sample 19-2 | | | 0.50 | 3.43 | 1 | O | 1 | O | W | O | W |
| Sample 19-3 | | | 1.0 | 3.11 | 1 | O | O | O | W | O | W |
| Sample 19-4 | | | 3.0 | 2.78 | O | O | 1 | O | W | O | W |
| Sample 19-5 | | | 5.0 | 2.61 | O | O | O | O | W | O | W |
| Sample 19-6 | Electrolytic solution | Phosphotungstic acid | 1.0 | 3.50 | 1 | O | 1 | O | W | O | W |
| Sample 19-7 | Electrolytic solution | Silicomolybdic acid | 1.0 | 3.44 | 1 | O | O | O | Mo | O | Mo |
| Sample 19-8 | Electrolytic solution | Phosphomolybdic acid | 1.0 | 3.29 | 1 | O | O | O | Mo | O | Mo |
| Sample 19-9 | — | — | — | 14.2 | 3 | 2 | 3 | O | x | O | x |

<Sample 19-9>

A secondary battery was manufactured in the same manner as in Sample 19-1 except that the addition of the heteropoly acid was not carried out.

[Evaluation of the Battery for Testing]

With regard to batteries for testing of each of the examples and comparative examples, the same evaluation test of the swelling amount of the battery as in Example 1 was carried out. In addition, the same XPS and ToF-SIMS analyses as in Example 1 were carried out on the negative electrode. In addition, the following safety evaluation test was carried out.

(a) Heating Test

The battery for testing was disposed under conditions of room temperature, constant current charging was carried out at 1 C, and then the constant current charging was switched to constant voltage charging when the battery voltage reached 4.5 V, thereby charging the battery into a full charge state. After that, the battery for testing was fed into a constant temperature vessel of room temperature, heated at 5° C./minute, maintained at a constant temperature at a point of time when the battery reached 150° C., and maintained for one hour from the point of the time.

(b) Nail Penetration Test

The battery for testing was disposed under conditions of 60° C., constant current charging was carried out at 1 C, and then the constant current charging was switched to constant voltage charging when the battery voltage reached 4.5 V, thereby charging the battery into a full charge state. After that, the battery for testing was penetrated by a nail having a diameter of 2.5 mm under conditions of 60° C.

(c) Overcharging Test

The battery in a discharged state was disposed under conditions of room temperature, and the battery for testing was over-charged by a large electric current of 5 C from the discharged state with a maximum of 24 V.

The results of the respective tests are shown in Table 2. Meanwhile, "O" is marked for the battery where nothing In Samples 19-1 to 19-8 that were secondary batteries produced by adding the heteropoly acid to the positive electrode, the presence of lithium and a polyatom was confirmed as shown in Table 20. In the analysis of the peak belonging to the C1s inner shell electron by XPS, which was carried out in harmonization, the peak of carbon included in the graphite compound to which graphite which was the negative electrode active material and lithium were inserted was not observed. Therefore, it was confirmed that a layer in which both of the polyacid and/or polyacid compound and lithium and/or a lithium compound were present on the surface of the negative electrode was precipitated.

As shown in Table 20, it was found that battery swelling can be suppressed in secondary batteries configured so that the heteropoly acid was added to the positive electrode, and a layer in which both of the polyacid and/or polyacid compound and lithium and/or a lithium compound were present on the surface of the negative electrode was precipitated in comparison to the secondary batteries of Samples 19-1 and 19-11, and Samples 19-12 and 19-19 in which a layer in which both the polyacid and/or polyacid compound and lithium and/or a lithium compound were present was not present.

As shown in Table 20, it was found that battery swelling can be suppressed in secondary batteries configured so that a layer in which both of the polyacid and/or polyacid compound and lithium and/or a lithium compound were present on the surface of the negative electrode was precipitated in comparison to the secondary battery of Samples 19-9 not containing silicotungstic acid.

In addition, in Samples 19-1 to 19-8 in which the heteropoly acid was added to the electrolytic solution, and a layer in which both of the polyacid and/or polyacid compound and lithium and/or a lithium compound were present was precipitated, no problem occurred in each of the tests, or simply the laminate film was swollen. In contrast to this, in Sample 19-9 in which the heteropoly acid was not added to the electrolytic solution, slight smoking or gas blowout occurred in the battery for testing.

Sample 19-3 and Samples 19-6 to 19-8 are secondary batteries in which the same amounts of various kinds of heteropoly acid were added. It was found that the results of the battery swelling amount and the safety test were substantially the same regardless of the kinds of the heteropoly acid, and the effects of suppressing battery swelling and safety improvement were obtained even when any heteropoly acid was used.

Therefore, in secondary batteries having a configuration in which a layer in which both of the polyacid and/or polyacid compound and lithium and/or a lithium compound were present was precipitated, suppression of battery swelling and improvement of safety were confirmed.

EXAMPLE 20

[When Silicotungstic Acid is Added to the Negative Electrode Active Layer so that a Layer Including Silicon and Tungsten is Precipitated on the Surface of the Negative Electrode]
<Sample 20-1>
[Manufacturing of the Positive Electrode]

A positive electrode was manufactured in the same manner in Sample 19-1.
[Manufacturing of the Negative Electrode]

91% by weight of artificial graphite as a negative electrode active material and 9% by weight of polyvinylidene fluoride powder as the bonding agent were dry-mixed. Subsequently, N-methyl-2-pyrrolidone was adjusted and added to the mixture, thereby preparing a slurry-form negative electrode compound. Meanwhile, silicotungstic acid ($H_4(SiW_{12}O_{40})$) was dissolved in N-methyl-2-pyrrolidone so as to manufacture a silicotungstic acid solution having a concentration of 5.0% by mass. In addition, the silicotungstic acid solution having an added amount of silicotungstic acid corresponding to 0.2% by mass with respect to the negative electrode active material was added to the negative electrode compound slurry. A negative electrode was manufactured in the same manner as in Example 2-1 except the above.
[Manufacturing of the Electrolytic Solution]

An electrolytic solution is manufactured in the same manner as in Example 2-1 except that silicotungstic acid is not added.
[Manufacturing of the Wound Electrode Body]

A battery for testing was manufactured in the same manner as in Example 2-1 by using the positive electrode, the negative electrode, and the electrolyte. Next, the manufactured battery was preliminarily charged by 100 mA until 3.2 V so as to precipitate a tungsten compound. Meanwhile, the capacity change of the positive electrode at this stage was a small amount that could be ignored. Thereby, a secondary battery for testing in which a layer including tungsten compound layer was precipitated on the negative electrode was manufactured.
<Sample 20-2>

A secondary battery was manufactured in the same manner as in Sample 20-1 except that the added amount of the silicotungstic acid was set to 0.50% by weight of the negative electrode active material.
<Sample 20-3>

A secondary battery was manufactured in the same manner as in Sample 20-1 except that the added amount of the silicotungstic acid was set to 1.0% by weight of the negative electrode active material.
<Sample 20-4>

A secondary battery was manufactured in the same manner as in Sample 20-1 except that the added amount of the silicotungstic acid was set to 3.0% by weight of the negative electrode active material.
<Sample 20-5>

A secondary battery was manufactured in the same manner as in Sample 20-1 except that the added amount of the silicotungstic acid was set to 5.0% by weight of the negative electrode active material.
<Sample 20-6>

A secondary battery was manufactured in the same manner as in Sample 20-3 except that phosphotungstic acid ($H_3(PW_{12}O_{40})$) was used as the added heteropoly acid.
<Sample 20-7>

A secondary battery was manufactured in the same manner as in Sample 20-3 except that silicomolybdic acid ($H_4(SiMo_{12}O_{40})$) was used as the added heteropoly acid.
<Sample 20-8>

A secondary battery was manufactured in the same manner as in Sample 20-3 except that phosphomolybdic acid ($H_3(PMo_{12}O_{40})$) was used as the added heteropoly acid.
<Sample 20-9>

A secondary battery was manufactured in the same manner as in Sample 20-1 except that the addition of the heteropoly acid was not carried out.
[Evaluation of the Battery for Testing]

With regard to batteries for testing of each of the examples and comparative examples, the same evaluation test of the swelling amount of the battery, XPS and ToF-SIMS analyses of the surface of the negative electrode, and safety evaluation test as in Example 19 was carried out.

The following Table 21 shows the results of the evaluations.

TABLE 21

| | Heteropoly acid | | Added amount [% by weight] | Swelling amount [mm] | Over-charging test | Over-charging test | Over-charging test | XPS measurement | | ToF-SIMS | |
| | Addition location | Material | | | | | | Presence of lithium | Presence of polyatom | Presence of lithium | Presence of polyatom |
|---|---|---|---|---|---|---|---|---|---|---|---|
| Sample 20-1 | Negative electrode | Silicotungstic acid | 0.20 | 3.85 | 1 | 1 | 1 | O | W | O | W |
| Sample 20-2 | | | 0.50 | 3.12 | 1 | O | 1 | O | W | O | W |
| Sample 20-3 | | | 1.0 | 2.96 | 1 | O | O | O | W | O | W |
| Sample 20-4 | | | 3.0 | 2.66 | O | O | 1 | O | W | O | W |
| Sample 20-5 | | | 5.0 | 2.38 | O | O | O | O | W | O | W |
| Sample 20-6 | Negative electrode | Phosphotungstic acid | 1.0 | 3.22 | 1 | O | 1 | O | W | O | W |

TABLE 21-continued

| | Heteropoly acid | | | | | | XPS measurement | | ToF-SIMS | |
| | Addition location | Material | Added amount [% by weight] | Swelling amount [mm] | Over-charging test | Over-charging test | Over-charging test | Presence of lithium | Presence of polyatom | Presence of lithium | Presence of polyatom |
|---|---|---|---|---|---|---|---|---|---|---|---|
| Sample 20-7 | Negative electrode | Silicomolybdic acid | 1.0 | 3.43 | 1 | O | 0 | O | Mo | O | Mo |
| Sample 20-8 | Negative electrode | Phosphomolybdic acid | 1.0 | 3.20 | 1 | O | O | O | Mo | O | Mo |
| Sample 20-9 | — | — | — | 14.0 | 3 | 2 | 3 | O | x | O | x |

As shown in Table 21, it was found that battery swelling can be suppressed in secondary batteries configured so that a layer in which both of the polyacid and/or polyacid compound and lithium and/or a lithium compound were present on the surface of the negative electrode was precipitated in comparison to the secondary battery of Samples 20-9 not containing silicotungstic acid.

In addition, in Samples 20-1 to 20-8 in which the heteropoly acid was added to the negative electrode, and a layer in which both of the polyacid and/or polyacid compound and lithium and/or a lithium compound were present was precipitated, no problem occurred in each of the tests, or simply the laminate film was swollen. In contrast to this, in Sample 20-9 in which the heteropoly acid was not added to the negative electrode, slight smoking or gas blowout occurred in the battery for testing.

Sample 20-3 and Samples 20-6 to 20-8 are secondary batteries in which the same amounts of various kinds of heteropoly acid were added. It was found that the results of the battery swelling amount and the safety test were substantially the same regardless of the kinds of the heteropoly acid, and the effects of suppressing battery swelling and safety improvement were obtained even when any heteropoly acid was used.

Therefore, in secondary batteries having a configuration in which a layer in which both of the polyacid and/or polyacid compound and lithium and/or a lithium compound were present was precipitated on the negative electrode, suppression of battery swelling and improvement of safety were confirmed.

EXAMPLE 21

[When a Metal or Alloy-based Negative Electrode Active Material is Used]
<Sample 21-1> to <Sample 21-5>

90 parts by mass of a positive electrode active material composed of complex oxide particles having an average composition of $Li_{0.98}Co_{0.15}Ni_{0.80}Al_{0.05}O_2$ and an average particle diameter of 14 μm measured by the laser scattering method, 5 parts by mass of graphite, which is a conducting agent, and 5 parts by mass of polyvinylidene fluoride, which is a bonding agent, were mixed.

Subsequently, silicotungstic acid ($H_4(SiW_{12}O_{40})$) was dissolved in N-methyl-2-pyrrolidone, thereby manufacturing 10% by weight of a silicotungstic acid solution. In addition, silicotungstic acid ($H_4(SiW_{12}O_{40})$) was added to the positive electrode active material with the added amount of the silicotungstic acid varied as Table 22. Furthermore, a desired amount of N-methyl-2-pyrrolidone was added and dispersed, thereby manufacturing a slurry-form positive electrode compound.

This positive electrode compound slurry was evenly coated and dried on both faces of a positive electrode collector composed of a 20 μm-thick aluminum foil, and compacting was carried out using a roll press machine so as to form a positive electrode active material layer, thereby manufacturing a positive electrode. Subsequently, a positive electrode lead was attached to the positive electrode collector exposed portion of the positive electrode.

Next, silicon powder having an average particle diameter of 2 μm was used as a negative electrode active material, 90 parts by mass of the silicon powder and 10 parts by mass of polyvinylidene fluoride as a bonding agent were dispersed in N-methyl-2-pyrrolidone as a solvent so as to manufacture a slurry-form negative electrode compound. Subsequently, this negative electrode compound slurry was evenly coated and dried on a negative electrode collector composed of a 15 μm-thick band-shaped copper foil, and compacting was carried out using a roll press machine so as to form a negative electrode active material layer, thereby manufacturing a negative electrode. Subsequently, a negative electrode lead was attached to the negative electrode collector exposed portion of the negative electrode.

The electrolytic solution was manufactured in the following manner. Firstly, ethylene carbonate (EC) and diethyl carbonate (DEC) were mixed in a weight ratio of 4:6 so as to produce a mixed solvent. Subsequently, hexafluorophosphate ($LiPF_6$) was dissolved in the mixed solvent in a concentration of 1.0 mol/kg so as to prepare the solution.

Next, the manufactured positive electrode and negative electrode were adhered through a separator composed of a 25 μm-thick microporous polyethylene film, wound in the longitudinal direction, and a protective tape was attached to the outermost circumferential portion, thereby manufacturing a wound electrode body. Subsequently, a center pin was inserted in the center of the wound electrode body, the positive electrode lead was joined to a safety valve joined to the battery case lid, the negative electrode lead was joined to the battery can, the wound electrode boy was interposed by a pair or insulating plates so as to be accommodated in the battery can.

Subsequently, the electrolytic solution was injected to the inside of the battery can from the top of the insulating plate. Finally, the safety valve, a disc holder, a safety valve mechanism composed of a blocking disc, a PTC element, and the battery case lid were swaged through an insulating sealing gasket so as to be fixed, thereby manufacturing a so-called 18650 size cylindrical battery.

Finally, after the manufactured battery was charged by a constant current until 4.25 V at 0.2 C, constant voltage charging was carried out at 4.25 V so as to carry out preliminary charging, and a tungsten compound was precipitated. Meanwhile, the capacity change of the positive electrode at this stage was a small amount that could be ignored. Subsequently, discharging was carried out until 2.50 V at 0.2 C. Thereby, a secondary battery for testing in which a layer in which both of the polyacid and/or polyacid compound and lithium and/or a lithium compound were precipitated on the negative electrode was manufactured.
<Sample 21-6> to <Sample 21-8>

Secondary batteries for testing were manufactured in the same manner as in Sample 21-3 except that, instead of silicotungstic aid, phosphotungstic acid ($H_3(PW_{12}O_{40})$), silicomolybdic acid ($H_4(SiMo_{12}O_{40})$), and phosphomolybdic acid ($H_3(PMo_{12}O_{40})$) were used as the heteropoly acid added to the positive electrode compound, respectively.
<Sample 21-9> to <Sample 21-16>

CoSnC-containing material powder was used as the negative electrode active material. 80 parts by mass of the CoSnC-containing material powder, 12 parts by mass of graphite, which is a negative electrode active material and also a conducting material, 1 part by mass of acetylene black, and 8 parts by mass of polyvinylidene fluoride as a bonding agent were dispersed in N-methyl-2-pyrrolidone as a solvent, thereby manufacturing a slurry-form negative electrode compound. Subsequently, the negative electrode compound slurry was evenly coated and dried on a negative electrode collector composed of a 15 μm-thick copper foil, and compacting was carried out using a roll press machine, thereby forming a negative electrode active material layer. Secondary batteries for testing were manufactured in the same manner as in Sample 21-1 to Sample 21-5 except the above.
<Sample 21-17> and <Sample 21-18>

Secondary batteries for testing were manufactured in the same manner as in Sample 21-1 and Sample 21-3 except that silicon was used as the negative electrode active material, and a negative electrode active material layer composed of silicon was formed on a negative electrode collector composed of a 15 μm-thick copper foil by the electron beam deposition method.
<Sample 21-19> and <Sample 21-20>

Secondary batteries for testing were manufactured in the same manner as in Sample 21-1 and Sample 21-3 except that a lithium metal was used as the negative electrode active material, and a 30 μm-thick lithium metal was pressed so as to form a negative electrode active material layer on a negative electrode collector composed of a 15 μm-thick band-shaped copper foil.
<Sample 21-21> and <Sample 21-22>

Artificial graphite was used as the negative electrode active material, 92 parts by mass of the artificial graphite, 2 parts by mass of VGCF as a conducting material, and 6 parts by mass of polyvinylidene fluoride as a bonding agent were dispersed in N-methyl-2-pyrrolidone as a solvent, thereby manufacturing a slurry-form negative electrode compound. Subsequently, the negative electrode compound slurry was evenly coated and dried on a negative electrode collector composed of a 15 μm-thick copper foil, and compacting was carried out using a roll press machine, thereby forming a negative electrode active material layer. Secondary batteries for testing were manufactured in the same manner as in Sample 21-1 and Sample 21-3 except the above.
<Sample 21-23> to <Sample 21-26>

The addition of a solution of 10% by weight of silicotungstic acid ($H_4(SiW_{12}O_{40})$) to the positive electrode compound was not carried out. In addition, ethylene carbonate (EC) and diethyl carbonate (DEC) were mixed in a weight ratio of 4:6 so as to produce a mixed solvent. Subsequently, hexafluorophosphate ($LiPF_6$) was dissolved in the mixed solvent in a concentration of 1.0 mol/kg so as to prepare a solution, and, furthermore, electrolytic solutions having silicotungstic acid ($H_4(SiW_{12}O_{40})$) dissolved in the added amounts shown in Table 23 was used. Secondary batteries for testing were manufactured in the same manner as in Sample 21-1 except the above.
<Sample 21-27> to <Sample 21-29>

Secondary batteries for testing were manufactured in the same manner as in Sample 21-24 except that, instead of silicotungstic aid, phosphotungstic acid ($H_3(PW_{12}O_{40})$), silicomolybdic acid ($H_4(SiMo_{12}O_{40})$), and phosphomolybdic acid ($H_3(PMo_{12}O_{40})$) were used as the heteropoly acid that was added to the electrolytic solution, respectively.
<Sample 21-30>

CoSnC-containing material powder was used as the negative electrode active material. 80 parts by mass of the CoSnC-containing material powder, 12 parts by mass of graphite, which is a negative electrode active material and also a conducting material, 1 part by mass of acetylene black, and 8 parts by mass of polyvinylidene fluoride as a bonding agent were dispersed in N-methyl-2-pyrrolidone as a solvent, thereby manufacturing a slurry-form negative electrode compound. Subsequently, the negative electrode compound slurry was evenly coated and dried on a negative electrode collector composed of a 15 μm-thick copper foil, and compacting was carried out using a roll press machine, thereby forming a negative electrode active material layer. A secondary battery for testing was manufactured in the same manner as in Sample 21-24 except the above.
<Sample 21-31>

A secondary battery for testing was manufactured in the same manner as in Sample 21-24 except that silicon was used as the negative electrode active material, and a negative electrode active material layer composed of silicon was formed on a negative electrode collector composed of a 15 μm-thick copper foil by the electron beam deposition method.
<Sample 21-32>

A secondary battery for testing was manufactured in the same manner as in Sample 21-24 except that a lithium metal was used as the negative electrode active material, and a 30 μm-thick lithium metal was pressed so as to form a negative electrode active material layer on a negative electrode collector composed of a 15 μm-thick band-shaped copper foil.
<Sample 21-33>

Artificial graphite was used as the negative electrode active material, 92 parts by mass of the artificial graphite, 2 parts by mass of VGCF as a conducting material, and 6 parts by mass of polyvinylidene fluoride as a bonding agent were dispersed in N-methyl-2-pyrrolidone as a solvent, thereby manufacturing a slurry-form negative electrode compound. Subsequently, the negative electrode compound slurry was evenly coated and dried on a negative electrode collector composed of a 15 μm-thick copper foil, and compacting was carried out using a roll press machine, thereby forming a negative electrode active material layer. A secondary battery for testing was manufactured in the same manner as in Sample 21-24 except the above.
<Sample 21-34> to <Sample 21-35>

Secondary batteries for testing were manufactured in the same manner as in Sample 21-2 and Sample 21-3 except that a solution of 10% by weight of silicotungstic acid in which silicotungstic acid was dissolved in N-methyl-2-pyrrolidone was added to the negative electrode compound.

[Evaluation of the Secondary Battery: Measurement of the Discharge Capacity]

After the secondary batteries of Sample 21-1 to Sample 21-5 were charged by a constant current until the battery voltage reached 4.2 V at a constant current corresponding to a designed rating capacity of 1 C under conditions of 23° C., constant voltage charging was carried out until the electric current value reached 0.05 C at a constant voltage of 4.2 V. Subsequently, after discharging was carried out at a constant current of 0.2 C until a final voltage of 2.5 V, and the discharge capacity per 1 g of the positive electrode active material was measured.

[Evaluation of the Secondary Battery: Nail Penetration Test]

After the secondary battery of each of the samples was charged by a constant current until the battery voltage reached an overcharged state of 4.5 V at a constant current corresponding to a designed rating capacity of 1 C under conditions of 23° C., the shape of the secondary battery was confirmed when a nail having a diameter of 2.5 mm was penetrated in the middle of the secondary battery under conditions of 23° C.

Meanwhile, in the nail penetration test, the battery state after the test was classified into three stages (level 0 to level 2) and evaluated. Level 0 represents no smoking and thermal runaway, level 1 represents the confirmation of slight smoking, but no thermal runaway, and level 2 represents thermal runaway. Among the above, batteries classified into level 0 and level 1 were evaluated to be highly safe during short-circuiting.

[Evaluation of the Secondary Battery: Blocking Valve Operation Test]

After the secondary batteries of Sample 21-1 to Sample 21-5 were charged by a constant current until the battery voltage reached 4.2 V at a constant current corresponding to a designed rating capacity of 1 C under conditions of 23° C., constant voltage charging was carried out until the electric current value reached 0.05 C at a constant voltage of 4.2 V. Next, the secondary battery was placed in a constant temperature vessel of 100° C., and was idle for 12 hours while the voltage of the secondary battery was monitored. The secondary battery was evaluated as "OK" when the blocking valve did not operation even after the passage of 12 hours, and as "NG" when the blocking valve operated so as to become unavailable. Five cells were used as samples, and reliability was determined based on the number of "OK".

The following Tables 22 and 23 show the results of the evaluations.

TABLE 22

| | Negative electrode active material | Heteropoly acid | | | Nail penetration test | Blocking valve operation test [the number of "OK" in 5 samples] | Positive electrode capacity [mAh/g] |
| | | Material | Addition location | Added amount [% by mass] | | | |
|---|---|---|---|---|---|---|---|
| Sample 21-1 | Silicon powder | None | — | 0 | Level 2 | 0 | 189.0 |
| Sample 21-2 | Silicon powder | Silicotungstic acid | Positive electrode | 0.1 | Level 1 | 2 | 189.0 |
| Sample 21-3 | Silicon powder | Silicotungstic acid | Positive electrode | 0.5 | Level 1 | 4 | 188.0 |
| Sample 21-4 | Silicon powder | Silicotungstic acid | Positive electrode | 2 | Level 0 | 5 | 182.0 |
| Sample 21-5 | Silicon powder | Silicotungstic acid | Positive electrode | 5 | Level 0 | 5 | 171.0 |
| Sample 21-6 | Silicon powder | Phosphotungstic acid | Positive electrode | 0.5 | Level 1 | 4 | — |
| Sample 21-7 | Silicon powder | Silicomolybdic acid | Positive electrode | 0.5 | Level 1 | 4 | — |
| Sample 21-8 | Silicon powder | Phosphomolybdic acid | Positive electrode | 0.5 | Level 1 | 4 | — |
| Sample 21-9 | Co—Sn—C compound | None | — | 0 | Level 2 | 3 | — |
| Sample 21-10 | Co—Sn—C compound | Silicotungstic acid | Positive electrode | 0.1 | Level 1 | 4 | — |
| Sample 21-11 | Co—Sn—C compound | Silicotungstic acid | Positive electrode | 0.5 | Level 0 | 5 | — |
| Sample 21-12 | Co—Sn—C compound | Silicotungstic acid | Positive electrode | 2 | Level 0 | 5 | — |
| Sample 21-13 | Co—Sn—C compound | Silicotungstic acid | Positive electrode | 5 | Level 0 | 5 | — |
| Sample 21-14 | Co—Sn—C compound | Phosphotungstic acid | Positive electrode | 0.5 | Level 0 | 5 | — |
| Sample 21-15 | Co—Sn—C compound | Silicomolybdic acid | Positive electrode | 0.5 | Level 0 | 5 | — |
| Sample 21-16 | Co—Sn—C compound | Phosphomolybdic acid | Positive electrode | 0.5 | Level 0 | 5 | — |
| Sample 21-17 | Deposited Si | None | — | 0 | Level 2 | 1 | — |
| Sample 21-18 | Deposited Si | Silicotungstic acid | Positive electrode | 0.5 | Level 0 | 4 | — |
| Sample 21-19 | Li metal | None | — | 0 | Level 2 | 0 | — |
| Sample 21-20 | Li metal | Silicotungstic acid | Positive electrode | 0.5 | Level 1 | 0 | — |

TABLE 23

| | Negative electrode active material | Heteropoly acid | | | Nail penetration test | Blocking valve operation test [the number of "OK" in 5 samples] | Positive electrode capacity [mAh/g] |
| | | Material | Addition location | Added amount [% by mass] | | | |
|---|---|---|---|---|---|---|---|
| Sample 21-21 | Graphite | None | — | 0 | Level 1 | 2 | — |
| Sample 21-22 | Graphite | Silicotungstic acid | Positive electrode | 0.5 | Level 0 | 5 | — |
| Sample 21-23 | Silicon powder | Silicotungstic acid | Electrolytic solution | 0.1 | Level 1 | 2 | — |
| Sample 21-24 | Silicon powder | Silicotungstic acid | Electrolytic solution | 1 | Level 0 | 5 | — |
| Sample 21-25 | Silicon powder | Silicotungstic acid | Electrolytic solution | 3 | Level 0 | 5 | — |
| Sample 21-26 | Silicon powder | Silicotungstic acid | Electrolytic solution | 5 | Level 0 | 5 | — |
| Sample 21-27 | Silicon powder | Phosphotungstic acid | Electrolytic solution | 1 | Level 0 | 5 | — |
| Sample 21-28 | Silicon powder | Silicomolybdic acid | Electrolytic solution | 1 | Level 0 | 5 | — |
| Sample 21-29 | Silicon powder | Phosphomolybdic acid | Electrolytic solution | 1 | Level 0 | 5 | — |
| Sample 21-30 | Co—Sn—C compound | Silicotungstic acid | Electrolytic solution | 1 | Level 0 | 5 | — |

TABLE 23-continued

| | Negative electrode active material | Heteropoly acid | | | Nail penetration test | Blocking valve operation test [the number of "OK" in 5 samples] | Positive electrode capacity [mAh/g] |
| | | Material | Addition location | Added amount [% by mass] | | | |
|---|---|---|---|---|---|---|---|
| Sample 21-31 | Deposited silicon | Silicotungstic acid | Electrolytic solution | 1 | Level 0 | 5 | — |
| Sample 21-32 | Li metal | Silicotungstic acid | Electrolytic solution | 1 | Level 1 | 4 | — |
| Sample 21-33 | Graphite | Silicotungstic acid | Electrolytic solution | 1 | Level 0 | 5 | — |
| Sample 21-34 | Silicon powder | Silicotungstic acid | Negative electrode | 0.1 | Level 1 | 2 | — |
| Sample 21-35 | Silicon powder | Silicotungstic acid | Negative electrode | 0.5 | Level 1 | 4 | — |
| Sample 21-36 | Silicon powder | Silicotungstic acid | Negative electrode | 2 | Level 0 | 5 | — |
| Sample 21-37 | Silicon powder | Silicotungstic acid | Negative electrode | 5 | Level 0 | 5 | — |
| Sample 21-38 | Co—Sn—C compound | Silicotungstic acid | Negative electrode | 0.1 | Level 1 | 4 | — |
| Sample 21-39 | Co—Sn—C compound | Silicotungstic acid | Negative electrode | 0.5 | Level 1 | 4 | — |
| Sample 21-40 | Co—Sn—C compound | Silicotungstic acid | Negative electrode | 2 | Level 0 | 5 | — |
| Sample 21-41 | Co—Sn—C compound | Silicotungstic acid | Negative electrode | 5 | Level 0 | 5 | — |

As is clear from Tables 22 and 23, in the secondary batteries for testing to which the heteropoly acid was not added, thermal runaway did occur even when any material was used as the negative electrode active material. In addition, the number of the batteries in which the blocking valve operated within 12 hours was increased.

In contrast to this, in the secondary battery of each of the samples to which any of the heteropoly acid, such as silicotungstic acid, phosphotungstic acid, silicomolybdic acid, and phosphomolybdic acid, was added, the battery was evaluated as level 0 or level 1 in the nail penetration test, and the number of "OK" was two or more even in the blocking valve operation test. In addition, it was found that, when the added amount of the heteropoly acid was 0.5% by mass or more, the number of "OK" was 4 or more, and, furthermore, the effect of suppressing gas generation under conditions of a high temperature was improved.

In the secondary battery of each of the samples to which the heteropoly acid was added, it is considered that the reasons why the results of the nail penetration test were favorable are because the heteropoly acid-derived film formed on the negative electrode played a role of a resistant body between the penetrated nail and the active material, and abrupt generation of electric current by short circuiting was suppressed.

Meanwhile, as is clear from Sample 21-1 to Sample 21-5, it was observed that the discharge capacity was degraded as the added amount of the heteropoly acid was increased. This is considered to be because the heteropoly acid-derived film formed on the negative electrode increased the resistance at the surface of the negative electrode.

From the above, the effect of improving the safety can be obtained even with the addition of a small amount of the heteropoly acid, and, particularly, a more preferable effect can be obtained with an added amount in a range of 0.5% by mass to 2.0% by mass.

EXAMPLE 22

[When a Positive Electrode Active Material Having an Olivine-type Crystal Structure is Used]
<Sample 22-1>

90 parts by mass of LiFePO$_4$ as a positive electrode active material, 8 parts by mass of polyvinylidene fluoride (PVdF) as a bonding agent, and 2 parts by mass of carbon black as a conducting agent were mixed.

Subsequently, a desired amount of N-methyl-2-pyrrolidone, which was a dispersion medium, was added to and dispersed in the mixture, thereby manufacturing a slurry-form positive electrode compound.

This positive electrode compound slurry was evenly coated and dried on both faces of a positive electrode collector composed of a 15 μm-thick band-shaped aluminum foil, and compacting was carried out using a roll press machine so as to form a positive electrode active material layer, thereby manufacturing a positive electrode. Subsequently, a positive electrode lead was attached to the positive electrode collector exposed portion of the positive electrode.

Next, mesocarbon microbead (MCMB) having an average particle diameter of 15 μm was used as the negative electrode active material, 100 parts by mass of the mesocarbon microbead (MCMB), 4 parts by mass of polyvinylidene fluoride as a bonding agent, and 2 parts by mass of vapor-grown carbon fiber (VGCF) as a conducting agent were mixed. Subsequently, the mixture was dispersed in N-methyl-2-pyrrolidone as a solvent, thereby manufacturing a slurry-form negative electrode compound. This negative electrode compound slurry was evenly coated and dried on a negative electrode collector composed of a 10 μm-thick copper foil, and compacting was carried out using a roll press machine so as to form a negative electrode active material layer, thereby manufacturing a negative electrode. Subsequently, a negative electrode lead was attached to the negative electrode collector exposed portion of the negative electrode.

The electrolytic solution was manufactured in the following manner. Firstly, ethylene carbonate (EC) and diethyl carbonate (DEC) were mixed in a weight ratio of 4:6 so as to produce a mixed solvent. Subsequently, hexafluorophosphate (LiPF$_6$) was dissolved in the mixed solvent in a concentration of 1.0 mol/kg so as to prepare the solution.

Next, the manufactured positive electrode and negative electrode were adhered through a separator composed of a 25 μm-thick microporous polyethylene film, wound in the longitudinal direction, and a protective tape was attached to the outermost circumferential portion, thereby manufacturing a wound electrode body. Subsequently, a center pin was inserted in the center of the wound electrode body, the positive electrode lead was joined to a safety valve joined to the battery case lid, the negative electrode lead was joined to the battery can, the wound electrode body was interposed by a pair or insulating plates so as to be accommodated in the battery can.

Subsequently, the electrolytic solution was injected to the inside of the battery can from the top of the insulating plate. Finally, the safety valve, a disc holder, a safety valve mechanism composed of a blocking disc, a PTC element, and the battery case lid were swaged through an insulating sealing gasket so as to be fixed, thereby manufacturing a so-called 18650 size cylindrical battery.

Finally, after the manufactured battery was charged by a constant current until 4.25 V at 0.2 C, constant voltage charging was carried out at 4.25 V so as to carry out preliminary charging, and a tungsten compound was precipitated. Meanwhile, the capacity change of the positive electrode at this stage was a small amount that could be ignored. Subsequently, discharging was carried out until 2.50 V at 0.2 C, and a secondary battery for testing was manufactured.

<Sample 22-2> to <Sample 22-6>

A 10% by weight of a silicotungstic acid solution manufactured by dissolving silicotungstic acid ($H_4(SiW_{12}O_{40})$) in N-methyl-2-pyrrolidone was added to a mixture of the positive electrode active material, the bonding agent, and the conducting agent with the added amount of the silicotungstic acid ($H_4(SiW_{12}O_{40})$) varied as Table 24 with respect to the positive electrode active material. Furthermore, a desired amount of N-methyl-2-pyrrolidone, which was a dispersion medium, was added to and dispersed in the mixture, thereby manufacturing a slurry-form positive electrode compound. Cylindrical batteries were manufactured in the same manner as in Sample 22-1 except the above.

Subsequently, discharging was carried out until 2.50 V at 0.2 C. Thereby, a secondary battery for testing in which a layer in which both of the polyacid and/or polyacid compound and lithium and/or a lithium compound were precipitated on the negative electrode was manufactured.

<Sample 22-7> to <Sample 22-9>

Secondary batteries for testing were manufactured in the same manner as in Sample 22-3 except that, instead of silicotungstic aid, phosphotungstic acid ($H_3(PW_{12}O_{40})$), silicomolybdic acid ($H_4(SiMo_{12}O_{40})$), and phosphomolybdic acid ($H_3(PMo_{12}O_{40})$) were used as the heteropoly acid added to the positive electrode compound, respectively.

<Sample 22-10> and <Sample 22-11>

The addition of a solution of 10% by weight of silicotungstic acid ($H_4(SiW_{12}O_{40})$) to the positive electrode compound was not carried out. In addition, ethylene carbonate (EC) and diethyl carbonate (DEC) were mixed in a weight ratio of 4:6 so as to produce a mixed solvent. Subsequently, hexafluorophosphate ($LiPF_6$) as the electrolyte salt was dissolved in the mixed solvent in a concentration of 1.0 mol/kg so as to prepare a solution, and, furthermore, electrolytic solutions having silicotungstic acid ($H_4(SiW_{12}O_{40})$) dissolved in the added amounts shown in Table 24 was used. Secondary batteries for testing were manufactured in the same manner as in Sample 22-2 except the above.

<Sample 22-12> to <Sample 22-15>

Secondary batteries for testing were manufactured in the same manner as in Sample 22-3, Sample 22-7, Sample 22-8, and Sample 22-9, respectively, except that a complex oxide particle having an average composition of $LiFe_{0.8}Co_{0.2}PO_4$ was used as the positive electrode active material.

<Sample 22-12> to <Sample 22-15>

Secondary batteries for testing were manufactured in the same manner as in Sample 22-3, Sample 22-7, Sample 22-8, and Sample 22-9, respectively, except that a complex oxide particle having an average composition of $LiFe_{0.8}Co_{0.2}PO_4$ was used as the positive electrode active material.

<Sample 22-12> to <Sample 22-15>

Secondary batteries for testing were manufactured in the same manner as in Sample 22-3, Sample 22-7, Sample 22-8, and Sample 22-9, respectively, except that a complex oxide particle having an average composition of $LiFe_{0.8}Co_{0.2}PO_4$ was used as the positive electrode active material.

<Sample 22-12> to <Sample 22-15>

Secondary batteries for testing were manufactured in the same manner as in Sample 22-3, Sample 22-7, Sample 22-8, and Sample 22-9, respectively, except that a complex oxide particle having an average composition of $LiMnPO_4$ was used as the positive electrode active material.

[Evaluation of the Secondary Battery: Output Characteristics Test]

After the secondary battery of each of the samples was charged by a constant current until the battery voltage reached 4.2 V at a constant current corresponding to a designed rating capacity of 1 C under conditions of 23° C., constant voltage charging was carried out until the electric current value reached 0.05 C at a constant voltage of 4.2 V. After that, discharging was carried out until 2.0 V at 1 C, and 1 C discharge capacity was obtained. Next, after charging was carried out again under the same conditions, discharging was carried out until 2.0 V at 20 C, and 20 C discharge capacity was obtained. High rate discharging characteristics were computed from the obtained discharge capacity using the following formulae.

High rate discharging characteristics [%]=(20 C discharge capacity/1 C discharge capacity)×100

[Evaluation of the Secondary Battery: Blocking Valve Operation Test]

After the secondary battery of each of the samples was charged by a constant current until the battery voltage reached 4.2 V at a constant current corresponding to a designed rating capacity of 1 C under conditions of 23° C., constant voltage charging was carried out until the electric current value reached 0.05 C at a constant voltage of 4.2 V. Next, the secondary battery was placed in a constant temperature vessel of 100° C., and was idle for 12 hours while the voltage of the secondary battery was monitored. The secondary battery was evaluated as "OK" when the blocking valve did not operation even after the passage of 12 hours, and as "NG" when the blocking valve operated so as to become unavailable. Five cells were used as samples, and reliability was determined based on the number of "OK".

The following Table 24 shows the results of the evaluations.

TABLE 24

| | Positive electrode active material | Heteropoly acid | | | Output characteristics | Blocking valve operation test [the number of "OK" in 5 samples] |
|---|---|---|---|---|---|---|
| | | Material | Addition location | Added amount [% by weight] | | |
| Sample 22-1 | $LiFePO_4$ | — | — | — | 90 | 0 |
| Sample 22-2 | $LiFePO_4$ | Silicotungstic acid | Positive electrode compound | 0.1 | 90 | 4 |
| Sample 22-3 | $LiFePO_4$ | Silicotungstic acid | Positive electrode compound | 0.5 | 90 | 5 |

TABLE 24-continued

| | Positive electrode active material | Heteropoly acid | | | Output characteristics | Blocking valve operation test [the number of "OK" in 5 samples] |
|---|---|---|---|---|---|---|
| | | Material | Addition location | Added amount [% by weight] | | |
| Sample 22-4 | LiFePO$_4$ | Silicotungstic acid | Positive electrode compound | 1 | 90 | 5 |
| Sample 22-5 | LiFePO$_4$ | Silicotungstic acid | Positive electrode compound | 3 | 90 | 5 |
| Sample 22-6 | LiFePO$_4$ | Silicotungstic acid | Positive electrode compound | 5 | 80 | 5 |
| Sample 22-7 | LiFePO$_4$ | Phosphotungstic acid | Positive electrode compound | 0.5 | 90 | 5 |
| Sample 22-8 | LiFePO$_4$ | Silicomolybdic acid | Positive electrode compound | 0.5 | 90 | 5 |
| Sample 22-9 | LiFePO$_4$ | Phosphomolybdic acid | Positive electrode compound | 0.5 | 90 | 5 |
| Sample 22-10 | LiFePO$_4$ | Silicotungstic acid | Electrolytic solution | 0.2 | 90 | 3 |
| Sample 22-11 | LiFePO$_4$ | Silicotungstic acid | Electrolytic solution | 1 | 90 | 5 |
| Sample 22-12 | LiFe$_{0.8}$Co$_{0.2}$PO$_4$ | Silicotungstic acid | Positive electrode compound | 0.5 | 90 | 5 |
| Sample 22-13 | LiFe$_{0.8}$Co$_{0.2}$PO$_4$ | Phosphotungstic acid | Positive electrode compound | 0.5 | 90 | 5 |
| Sample 22-14 | LiFe$_{0.8}$Co$_{0.2}$PO$_4$ | Silicomolybdic acid | Positive electrode compound | 0.5 | 90 | 5 |
| Sample 22-15 | LiFe$_{0.8}$Co$_{0.2}$PO$_4$ | Phosphomolybdic acid | Positive electrode compound | 0.5 | 90 | 5 |
| Sample 22-16 | LiMnPO$_4$ | Silicotungstic acid | Positive electrode compound | 0.5 | 90 | 5 |
| Sample 22-17 | LiMnPO$_4$ | Phosphotungstic acid | Positive electrode compound | 0.5 | 90 | 5 |
| Sample 22-18 | LiMnPO$_4$ | Silicomolybdic acid | Positive electrode compound | 0.5 | 90 | 5 |
| Sample 22-19 | LiMnPO$_4$ | Phosphomolybdic acid | Positive electrode compound | 0.5 | 90 | 5 |

Meanwhile, the output characteristics are denoted as 90 for batteries having the high rate discharging characteristics of 90s %, 80 for batteries having the high rate discharging characteristics of 80s %, . . . .

As is clear from Table 24, in Sample 22-1 to which the heteropoly acid was not added, the blocking valve was operated when the battery was exposed to a high temperature, and the battery became unavailable.

In contrast to this, in each of the batteries of Sample 22-2 to Sample 22-19 to which the heteropoly acid was added, in addition to high output characteristics, the number of the blocking valves operating under conditions of a high temperature was small, and high safety could be obtained.

EXAMPLE 23

[Coating Properties of the Positive Electrode Compound when a Positive Electrode Active Material Having an Olivine-type Crystal Structure is Used]
<Sample 23-1> to <Sample 23-3>

90 parts by mass of LiFePO$_4$ as a positive electrode active material, 8 parts by mass of polyvinylidene fluoride (PVdF) as a bonding agent, and the amounts as shown in Table 23 of carbon black as a conducting agent were mixed.

Subsequently, silicotungstic acid (H$_4$(SiW$_{12}$O$_{40}$)) was dissolved in N-methyl-2-pyrrolidone, thereby manufacturing 10% by weight of a silicotungstic acid solution. In addition, silicotungstic acid (H$_4$(SiW$_{12}$O$_{40}$)) was added to the positive electrode active material with the added amount of the silicotungstic acid varied as Table 25. Furthermore, a desired amount of N-methyl-2-pyrrolidone was added and dispersed, thereby manufacturing a slurry-form positive electrode compound.
<Sample 23-4> to <Sample 23-5>

Positive electrode compounds were manufactured in the same manner as in Sample 23-1 and Sample 23-2 except that the addition of 10% by weight of a silicotungstic acid solution (H$_4$(SiW$_{12}$O$_{40}$)) to the positive electrode compound was not carried out.
<Sample 23-6> to <Sample 23-10>

Positive electrode compounds were manufactured in the same manner as in Sample 23-1 to Sample 23-5 except that a complex oxide particle having an average composition of LiMnPO$_4$ was used as the positive electrode active material.
[Evaluation of the Secondary Battery: Confirmation of the Properties of the Positive Electrode Compound Slurry]

The positive electrode compound slurry of each of the samples was coated on the positive electrode collector, and the properties were confirmed.

The following Table 25 shows the results of the evaluation.

TABLE 25

| | Positive electrode active material | Heteropoly acid | | | Amount of the conducting agent [parts by mass] | Properties of the positive electrode compound slurry |
|---|---|---|---|---|---|---|
| | | Material | Addition location | Added amount [% by weight] | | |
| Sample 23-1 | LiFePO$_4$ | Silicotungstic acid | Positive electrode compound | 0.5 | 2 | Favorable |
| Sample 23-2 | LiFePO$_4$ | Silicotungstic acid | Positive electrode compound | 0.5 | 3.5 | Favorable |
| Sample 23-3 | LiFePO$_4$ | Silicotungstic acid | Positive electrode compound | 0.5 | 5 | Favorable |
| Sample 23-4 | LiFePO$_4$ | — | — | — | 2 | Favorable |
| Sample 23-5 | LiFePO$_4$ | — | — | — | 3.5 | Non-flowing |
| Sample 23-6 | LiMnPO$_4$ | Silicotungstic acid | Positive electrode compound | 0.5 | 2 | Favorable |
| Sample 23-7 | LiMnPO$_4$ | Phosphotungstic acid | Positive electrode compound | 0.5 | 3.5 | Favorable |

TABLE 25-continued

| Positive electrode active material | Heteropoly acid | | | Amount of the conducting agent [parts by mass] | Properties of the positive electrode compound slurry |
| --- | --- | --- | --- | --- | --- |
| | Material | Addition location | Added amount [% by weight] | | |
| Sample 23-8 | LiMnPO$_4$ | Silicomolybdic acid | Positive electrode compound | 0.5 | 5 | Favorable |
| Sample 23-9 | LiMnPO$_4$ | — | — | — | 2 | Favorable |
| Sample 23-10 | LiMnPO$_4$ | — | — | — | 3.5 | Non-flowing |

As is clear from Sample 23-1 to Sample 23-5 in Table 25, when the heteropoly acid was not added, while the positive electrode compound slurry could be favorably coated when the added amount of the conducting agent was 2% by mass, the positive electrode compound slurry did not flow, and a positive electrode active material layer could not be formed when the added amount of the conducting agent was 3.5% by mass.

In contrast to this, when the heteropoly acid was added, the properties of the positive electrode compound slurry was favorable even when the added amount of the conducting agent exceeded 3.5 parts by mass. When the added amount of the conducting agent was 5 parts by mass, the fluidity of the positive electrode compound slurry was slightly degraded, but was favorable enough to form a positive electrode active material layer by the addition of the heteropoly acid.

In addition, as is clear from Sample 23-6 to Sample 23-10, the same effect could be obtained by adding the heteropoly acid even when the positive electrode active material was changed.

EXAMPLE 24

[In the Case of High Charging Voltage]
<Sample 24-1>

After lithium carbonate (Li$_2$CO$_3$), cobalt carbonate (CoCO$_3$), aluminum hydroxide (Al (OH)$_3$), and magnesium carbonate (MgCO$_3$) were mixed in a mole ratio of 0.5:0.98:0.01:0.01, a lithium and cobalt complex oxide (LiCo$_{0.98}$Al$_{0.01}$Mg$_{0.01}$O$_2$) was obtained by firing at 900° C. in air for 5 hours. The average particle diameter of the lithium and cobalt complex oxide measured by the laser scattering method was 13 μm.

90 parts by mass of a positive electrode active material composed of the lithium and cobalt complex oxide, 5 parts by mass of graphite, which is a conducting agent, and 5 parts by mass of polyvinylidene fluoride, which is a bonding agent were mixed. Subsequently, a desired amount of N-methyl-2-pyrrolidone was added to and dispersed in the mixture, thereby manufacturing a slurry-form positive electrode compound.

This positive electrode compound slurry was evenly coated and dried on both faces of a positive electrode collector composed of a 20 μm-thick aluminum foil, and compacting was carried out using a roll press machine so as to form a positive electrode active material layer, thereby manufacturing a positive electrode. Subsequently, a positive electrode lead was attached to the positive electrode collector exposed portion of the positive electrode.

In addition, the non-aqueous solvent in the electrolytic solution had ethylene carbonate (EC) and diethyl carbonate (DEC)=4:6. A secondary battery for testing was manufactured in the same manner as in Sample 1-1. Subsequently, after the secondary battery of each of the samples was charged by a constant current until the battery voltage reached 4.2 V at a constant current of 880 mA under conditions of 23° C., constant voltage charging was carried out until the electric current value reached 1 mA at a constant voltage of 4.3 V.

<Sample 24-2>

When the positive electrode compound slurry was manufactured, silicotungstic acid (H$_4$(SiTa$_{12}$O$_{40}$)) was dissolved in N-methyl-2-pyrrolidone, and a 10% by weight silicotungsten solution was manufactured. In addition, a silicotungstic acid solution in which the added amount of silicotungstic acid corresponded to 0.50% by weight of the positive electrode active material was added. A secondary battery for testing was manufactured in the same manner as in Sample 24-1 except the above.

<Sample 24-3>

Lithium carbonate (Li$_2$CO$_2$) and ammonium dihydrogen phosphate (NH$_4$H$_2$PO$_4$) were weighed and mixed so that the atomic ratio became Co:Li:P=98:1:1 with respect to the lithium and cobalt complex oxide (LiCo$_{0.98}$Al$_{0.01}$Mg$_{0.01}$O$_4$), and, subsequently, a treatment was carried out for one hour using a mechanochemical apparatus. Thereby, the lithium and cobalt complex oxide was used as the main material, and lithium carbonate and ammonium dihydrogen phosphate were adhered on the surface of the lithium and cobalt complex oxide. This firing precursor was heated at a rate of 3° C./minute, maintained at 900° C. for 3 hours, and then cooled, thereby obtaining a positive active material.

This positive electrode active material had magnesium (Mg) evenly distributed on the particle surface, the surface concentration of magnesium (Mg) was higher than the inside of the particle, and, furthermore, lithium phosphate (Li$_3$PO$_4$) was dotted on the particle surface.

A secondary battery for testing charged with the maximum charging voltage of 4.3 V was manufactured in the same manner as in Sample 24-1 except that the lithium transition metal complex oxide was used as the positive electrode active material.

<Sample 24-4>

When the positive electrode compound slurry was manufactured, silicotungstic acid (H$_4$(SiTa$_{12}$O$_{40}$)) was dissolved in N-methyl-2-pyrrolidone, and a 10% by weight silicotungsten solution was manufactured. In addition, a silicotungstic acid solution in which the added amount of silicotungstic acid corresponded to 0.50% by weight of the positive electrode active material was added. A secondary battery for testing was manufactured in the same manner as in Sample 24-3 except the above.

<Sample 24-5>

A secondary battery for testing was manufactured in the same manner as in Sample 24-3 except that the maximum voltage during charging was set to 4.4 V.

135

<Sample 24-5>

A secondary battery for testing was manufactured in the same manner as in Sample 24-4 except that the maximum voltage during charging was set to 4.4 V.

[Evaluation of the Secondary Battery for Testing: the Swelling Amount of the Battery Swelling Amount]

After the thickness of the secondary battery of each of the samples which was charged with a predetermined maximum voltage into a fully-charged state was measured, the battery was stored under conditions of 80° C. for 4 days, and, the thickness of the secondary battery after the storage was measured. The amount of change of the thickness of the secondary battery at this time was measured as the swelling amount of the battery during high-temperature storage.

The following Table 26 shows the results of the evaluation.

136

EXAMPLE 25

[Confirmation of Float Characteristics]
<Sample 25-1>
[Manufacturing of the Positive Electrode]

A lithium complex oxide having an average composition represented by $Li_{1.02}Co_{0.978}Ml_{0.01}Mg_{0.01}Zr_{0.002}O_2$ and an average particle diameter of 16.5 μm measured by the laser scattering method, and a lithium complex oxide having an average composition represented by $Li_{0.02}Co_{0.98}Ml_{0.1}Mg_{0.01}O_2$ and an average particle diameter of 5.2 μm measured by the laser scattering method were mixed in a mass ratio of 85:15, thereby producing a positive electrode active material.

90 parts by mass of the positive electrode active material, 5 parts by mass of graphite, which is a conducting agent, and

TABLE 26

| | Positive electrode active material | | | | | | | |
|---|---|---|---|---|---|---|---|---|
| | | | Magnesium | Lithium phosphate | Heteropoly acid | | | |
| | Complex oxide particle | Average particle diameter [mm] | on the active material surface | on the active material surface | Addition | Material | Added amount [% by weight] | Charging voltage [V] | Battery swelling [mm] |
| Sample 24-1 | $Li_{1.02}Co_{0.98}Mg_{0.01}Al_{0.01}O_2$ | 13 | — | — | — | — | — | 4.3 | Pack cleaved |
| Sample 24-2 | $Li_{1.02}Co_{0.98}Mg_{0.01}Al_{0.01}O_2$ | 13 | — | — | Positive electrode compound | Silicotungstic acid | 0.50 | 4.3 | 5.8 |
| Sample 24-3 | $Li_{1.02}Co_{0.98}Mg_{0.01}Al_{0.01}O_2$ | 13 | Rich on surface | Dotted | — | — | — | 4.3 | 5.5 |
| Sample 24-4 | $Li_{1.02}Co_{0.98}Mg_{0.01}Al_{0.01}O_2$ | 13 | Rich on surface | Dotted | Positive electrode compound | Silicotungstic acid | 0.50 | 4.3 | 2.5 |
| Sample 24-5 | $Li_{1.02}Co_{0.98}Mg_{0.01}Al_{0.01}O_2$ | 13 | Rich on surface | Dotted | — | — | — | 4.4 | Pack cleaved |
| Sample 24-6 | $Li_{1.02}Co_{0.98}Mg_{0.01}Al_{0.01}O_2$ | 13 | Rich on surface | Dotted | Positive electrode compound | Silicotungstic acid | 0.50 | 4.4 | 4.7 |

As is clear from Table 26, in Sample 24-1 and Sample 24-2 in which the positive electrode active material for which the surface treatment was not carried out was used, when the silicotungstic acid was not added to the positive electrode compound, large gas generation occurred, and the batteries were cleaved. Meanwhile, in the secondary batteries in which silicotungstic acid was added to the positive electrode compound, battery swelling was significantly decreased.

Similarly, even when Sample 24-3 and Sample 24-4 in which the positive electrode active material for which the surface treatment was carried out was used, and the charging voltage was set to 4.3 V similarly to Sample 24-1 and Sample 24-2, the battery swelling of the secondary battery of Sample 24-4 in which silicotungstic acid was added to the positive electrode compound was significantly decreased.

Furthermore, when the positive electrode active material for which the surface treatment was carried out was used, and the charging voltage was set to 4.4 V, even when the surface improvement was carried out like Sample 24-5, since the charging voltage was 4.4 V, gas generation was increased, and the secondary battery was cleaved. In contrast to this, a significant effect of suppressing swelling can be confirmed even when the charging voltage was 4.4 V by adding silicotungstic acid like Sample 24-6.

5 parts by mass of polyvinylidene fluoride, which is a bonding agent were mixed. Subsequently, a desired amount of N-methyl-2-pyrrolidone was added to and dispersed in the mixture, thereby manufacturing a slurry-form positive electrode compound.

This positive electrode compound slurry was evenly coated and dried on both faces of a positive electrode collector composed of a 20 μm-thick aluminum foil, and compacting was carried out using a roll press machine so as to form a positive electrode active material layer, thereby manufacturing a positive electrode. Subsequently, a positive electrode lead was attached to the positive electrode collector exposed portion of the positive electrode.

[Manufacturing of the Negative Electrode]

95 parts by mass of crushed graphite powder as a negative electrode active material and 5 parts by mass of polyvinylidene fluoride powder as a bonding agent were mixed so as to prepare a negative electrode compound, and, furthermore, the negative electrode compound was dispersed in N-methyl-2-pyrrolidone which was a dispersion medium, thereby producing a negative electrode compound slurry. Next, the negative electrode compound slurry was evenly coated and dried on both faces of a negative electrode collector composed of a 15 μm-thick copper foil, and compacting was carried out using a roll press machine so as to form a negative electrode active material layer, thereby manufacturing a negative electrode. Subsequently, a negative electrode lead was attached to the negative electrode collector exposed portion of the negative electrode.
[Adjustment of the Non-aqueous Electrolytic Solution]

Hexafluorophosphate (LiPF$_6$) was dissolved as the electrolyte salt in a solvent in which ethylene carbonate (EC) and propylene carbonate (PC) were mixed so that the mass ratio became 5:5 so as to be 1.0 mol/l. Furthermore, 0.05% by weight of silicotungstic acid solution (H$_4$(SiW$_{12}$O$_{40}$)) was dissolved, thereby producing an electrolytic solution.
[Assembly of the Battery]

The manufactured positive electrode and negative electrode were adhered through a separator composed of a 25 μm-thick porous polyethylene film, wound in the longitudinal direction, and a protective tape was attached to the outermost circumferential portion, thereby manufacturing a wound electrode body. Subsequently, this wound electrode body was filled in an exterior member, three sides of the exterior member were thermally fused, and one side was not thermally fused, thereby having an opening. A damp-proof aluminum laminate film composed by laminating a 25 μm-thick nylon film, a 40 μm-thick aluminum foil, and a 30 μm-thick polypropylene film sequentially from the outermost layer was used as the exterior member. Subsequently, the electrolytic solution was injected from the opening of the exterior member, and sealed by thermally fusing the remaining side of the exterior member, thereby, manufacturing a secondary battery.
<Sample 25-2>

A secondary battery for testing was manufactured in the same manner as in Sample p-1 except the silicotungstic acid (H$_4$(SiW$_{12}$O$_{40}$)) was not dissolved in the non-aqueous electrolytic solution.
[Evaluation of the Secondary Battery: The Float Characteristics (Battery Swelling)]

The thickness of the battery of each of the samples before high-temperature storage was measured. After that, constant current charging was carried out until the battery voltage reached 4.38 V at a constant current of 1 C under conditions of 80° C., the charging was continued for 96 hours at a constant voltage of 4.38 V. At this time, the thickness of the battery was measured at points of time of 18 hours, 66 hours, and 96 hours after the beginning of the float charging, and the amount of change of the thickness of the secondary battery was computed.

The following Table 27 shows the results of the evaluation.

EXAMPLE 26

[When a Fluorine-containing Copolymer is Used as the Negative Bonding Agent]
<Sample 26-1> to <Sample 26-12>
[Manufacturing of the Positive Electrode]

100 parts by mass of a positive electrode active material composed of complex oxide particles having an average composition of Li$_{0.98}$Co$_{0.15}$Ni$_{0.80}$Al$_{0.05}$O$_2$ and an average particle diameter of 15 μm measured by the laser scattering method, 1 part by mass of carbon black, which is a conducting agent, and 4 parts by mass of vinylidene fluoride-hexafluoropropylene-tetrafluoroethylene copolymer, which is a bonding agent, were mixed. Meanwhile, the composition ratio of the bonding agent in each of the samples is shown in Table 28.

Subsequently, a desired amount of N-methyl-2-pyrrolidone, which was a dispersion medium, was added to and dispersed in the mixture, thereby manufacturing a slurry-form positive electrode compound.

This positive electrode compound slurry was evenly coated and dried on both faces of a positive electrode collector composed of a 15 μm-thick aluminum foil, and compacting was carried out using a roll press machine so as to form a positive electrode active material layer, thereby manufacturing a positive electrode. Subsequently, a positive electrode lead was attached to the positive electrode collector exposed portion of the positive electrode.
[Manufacturing of the Negative Electrode]

100 parts by mass of the mesocarbon microbead (MCMB) having an average particle diameter of 15 μm as the negative electrode active material, 4 parts by mass of polyvinylidene fluoride as a bonding agent, and vapor-grown carbon fiber (VGCF) as a conducting agent were mixed. The mixture was dispersed in N-methyl-2-pyrrolidone as a solvent, thereby manufacturing a slurry-form negative electrode compound. Subsequently, this negative electrode compound slurry was evenly coated and dried on a negative electrode collector composed of a 10 μm-thick copper foil, and compacting was carried out using a roll press machine so as to form a negative electrode active material layer, thereby manufacturing a negative electrode. Subsequently, a negative electrode lead was attached to the negative electrode collector exposed portion of the negative electrode.
[Adjustment of the Non-aqueous Electrolytic Solution]

Ethylene carbonate (EC) and diethyl carbonate (DEC) were mixed in a weight ratio of 4:6 so as to produce a mixed

TABLE 27

| | Positive electrode active material | Heteropoly acid | | Battery swelling amount [mm] | | |
|---|---|---|---|---|---|---|
| | | Material | Addition location | Added amount [% by mass] | After 18 hours | After 66 hours | After 96 hours |
| Sample 25-1 | 2 kind-mixed active material | Silicotungstic acid | Electrolytic solution | 0.50 | 0.010 | 0.104 | 0.837 |
| Sample 25-2 | | — | — | — | 0 | 0.140 | 0.934 |

As is clear from Table 27, even when charging was continued under conditions of a high temperature, battery swelling was decreased in Sample 25-1 to which silicotungstic acid was added in comparison to Sample 25-2 to which silicotungstic acid was not added.

solvent. Subsequently, hexafluorophosphate (LiPF$_6$) was dissolved in the mixed solvent in a concentration of 1.0 mol/kg as the electrolyte salt, and silicotungstic acid (H$_4$(SiW$_{12}$O$_{40}$)) was added in a fraction of 0.5% by weight, thereby preparing a non-aqueous electrolytic solution.

[Assembly of the Battery]

The manufactured positive electrode and negative electrode were adhered through a separator composed of a 15 μm-thick microporous polyethylene film, wound in the longitudinal direction, and a protective tape was attached to the outermost circumferential portion, thereby manufacturing a wound electrode body. Subsequently, a center pin was inserted in the center of the wound electrode body, the positive electrode lead was joined to a safety valve joined to the battery case lid, the negative electrode lead was joined to the battery can, the wound electrode boy was interposed by a pair of insulating plates so as to be accommodated in the battery can.

Subsequently, the electrolytic solution was injected to the inside of the battery can from the top of the insulating plate. Finally, the safety valve, a disc holder, a safety valve mechanism composed of a blocking disc, a PTC element, and the battery case lid were swaged through an insulating sealing gasket so as to be fixed, thereby manufacturing a so-called 18650 size cylindrical battery and using it as a secondary battery for testing.

<Sample 26-13> to <Sample 26-15>

Secondary batteries for testing were manufactured in the same manner as in Sample 26-1 except that the added amount of the heteropoly acid added to the non-aqueous electrolyte was varied as shown in Table 28.

<Sample 26-16> to <Sample 26-18>

Secondary batteries for testing were manufactured in the same manner as in Sample 26-1 except that, instead of silicotungstic aid, phosphotungstic acid ($H_3(PW_{12}O_{40})$), silicomolybdic acid ($H_4(SiMo_{12}O_{40})$), and phosphomolybdic acid ($H_3(PMo_{12}O_{40})$) were used as the heteropoly acid that was added to the non-aqueous electrolytic solution, respectively.

<Sample 26-19>

Silicon powder was used as the negative electrode active material. 90 parts by mass of silicon-containing material powder having an average particle diameter of 2 μm, and 10 parts by mass of polyvinylidene fluoride as a bonding agent were dispersed in N-methyl-2-pyrrolidone as a solvent. Subsequently, this negative electrode compound slurry was evenly coated and dried on a negative electrode collector composed of a 15 μm-thick copper foil, and compacting was carried out using a roll press machine so as to form a negative electrode active material layer. A secondary battery for testing was manufactured in the same manner as in Sample 26-1 except the above.

<Sample 26-20>

CoSnC-containing material powder was used as the negative electrode active material. 80 parts by mass of the CoSnC-containing material powder, 12 parts by mass of graphite, which is a negative electrode active material and also a conducting material, 1 part by mass of acetylene black, and 8 parts by mass of polyvinylidene fluoride as a bonding agent were dispersed in N-methyl-2-pyrrolidone as a solvent, thereby manufacturing a slurry-form negative electrode compound. Subsequently, the negative electrode compound slurry was evenly coated and dried on a negative electrode collector composed of a 15 μm-thick copper foil, and compacting was carried out using a roll press machine, thereby forming a negative electrode active material layer. A secondary battery for testing was manufactured in the same manner as in Sample 26-1 except the above.

<Sample 26-21>

A secondary battery for testing was manufactured in the same manner as in Sample 26-1 except that silicon was used as the negative electrode active material, and a negative electrode active material layer composed of silicon was formed on a negative electrode collector composed of a 15 μm-thick copper foil by the electron beam deposition method.

<Sample 26-22> to <Sample 26-33>

Secondary batteries for testing were manufactured in the same manner as in Sample 26-1 except that the composition ratio of the bonding agent used for the negative electrode was set as shown in Table 29.

<Sample 26-34> to <Sample 26-35>

Secondary batteries for testing were manufactured in the same manner as in Sample 26-1 and 26-2 except that silicotungstic acid was not added to the non-aqueous electrolyte.

<Sample 26-36> to <Sample 26-66>

Vinylidene fluoride-hexafluoropropylene-chlorotetrafluoroethylene copolymer was used as the bonding agent used for the negative electrode, and the composition ratio was changed as shown in Tables 30 and 31. In addition, the material of the heteropoly acid, the added amount, and the negative electrode active material were changed as shown in Tables 30 and 31. Secondary batteries for testing were manufactured in the same manner as in Sample 26-1 except the above.

[Evaluation of the Secondary Battery: Confirmation of the Flexibility of the Positive Electrode]

The positive electrode compound used for the secondary battery of each of the samples was coated on one face of a 15 μm-thick aluminum foil so as to provide a positive electrode active material layer, and compacting was carried out using a roll press machine, thereby producing an electrode having an active material layer density of 3.8 g/cc, and an active material layer thickness of 80 μm. With regard to this electrode, a test according to JIS K 5400 "testing method for paint" was carried out on 5 specimens taken from each of the samples, and the number of electrode from which φ2 mm was cleared was counted.

[Evaluation of the Secondary Battery: Measurement of Capacity Retention Ratio]

After the secondary battery of each of the samples was charged by a constant current until 4.25 V at 0.2 C, constant voltage charging was carried out at 4.25 V so as to carry out preliminary charging, and a tungsten compound was precipitated. Meanwhile, the capacity change of the positive electrode at this stage was a small amount that could be ignored. Subsequently, discharging was carried out until 2.50 V at 0.2 C. Thereby, a secondary battery for testing in which a layer in which both of the polyacid and/or polyacid compound and lithium and/or a lithium compound were precipitated on the negative electrode was manufactured.

Subsequently, after constant current charging was carried out until the battery voltage reached 4.2 V by a constant current corresponding to a designed rating capacity of 0.5 C under conditions of 23° C., 0.5 C low electric current discharging was carried out until a final voltage of 2.5 V, and the discharge capacity during the initial charging and discharging was measured. Subsequently, charging and discharging were carried out up to 50 cycles under the charging and discharging conditions, and the $50^{th}$ cycle discharge capacity was measured. The capacity retention ratio was computed from the following formula.

Capacity retention ratio [%]=(the discharge capacity at the $50^{th}$ cycle/the discharge capacity at the $1^{st}$ cycle)×100.

Meanwhile, the output characteristics are denoted as 90 for batteries having the high rate discharging characteristics of 90s %, 80 for batteries having the high rate discharging characteristics of 80s %, . . . .

[Evaluation of the Secondary Battery: Confirmation of the Deformation of the Secondary Battery]

During the measurement of the capacity retention ratio, the thickness of the battery at the $1^{st}$ cycle discharging and the thickness of the battery at the $50^{th}$ cycle discharging were measured, and an increase rate of the thickness of the battery was computed from the following formula. Thereby, an increase in the thickness or gas generation caused by the precipitation of lithium were detected.

Battery thickness increase ratio [%]={(the element thickness at the $50^{th}$ cycle−the element thickness at the $1^{st}$ cycle)/the element thickness at the $1^{st}$ cycle)×100.

Meanwhile, an increase ratio of the battery thickness of 5% was used as the criterion of "OK/NG" determination, "OK" was denoted when the increase rate of the battery thickness was 5% or less, and "NG" was denoted when the increase rate of the battery thickness exceeded 5%.

The following Tables 28 to 31 show the results of the evaluations.

TABLE 28

| | | Negative electrode active | Composition [mol %] | | | Additive | Added amount [% by weight] | Positive electrode flexibility | Capacity retention ratio [%] | Element deformation | Electrode state |
|---|---|---|---|---|---|---|---|---|---|---|---|
| | Bonding agent | material | VDF | HFP | TFE | Material | | | | | |
| Sample 26-1 | P (VDF-HFP-TFE) | MCMB | 85 | 1 | 14 | Silicotungstic acid | 0.5 | 4 | 90 | OK | — |
| Sample 26-2 | P (VDF-HFP-TFE) | MCMB | 85 | 5 | 10 | Silicotungstic acid | 0.5 | 5 | 90 | OK | — |
| Sample 26-3 | P (VDF-HFP-TFE) | MCMB | 85 | 10 | 5 | Silicotungstic acid | 0.5 | 5 | 90 | OK | — |
| Sample 26-4 | P (VDF-HFP-TFE) | MCMB | 80 | 10 | 10 | Silicotungstic acid | 0.5 | 5 | 90 | OK | — |
| Sample 26-5 | P (VDF-HFP-TFE) | MCMB | 79 | 1 | 20 | Silicotungstic acid | 0.5 | 4 | 90 | OK | — |
| Sample 26-6 | P (VDF-HFP-TFE) | MCMB | 75 | 5 | 20 | Silicotungstic acid | 0.5 | 5 | 90 | OK | — |
| Sample 26-7 | P (VDF-HFP-TFE) | MCMB | 70 | 10 | 20 | Silicotungstic acid | 0.5 | 5 | 90 | OK | — |
| Sample 26-8 | P (VDF-HFP-TFE) | MCMB | 69 | 1 | 30 | Silicotungstic acid | 0.5 | 5 | 90 | OK | — |
| Sample 26-9 | P (VDF-HFP-TFE) | MCMB | 60 | 10 | 30 | Silicotungstic acid | 0.5 | 5 | 90 | OK | — |
| Sample 26-10 | P (VDF-HFP-TFE) | MCMB | 59 | 1 | 40 | Silicotungstic acid | 0.5 | 5 | 90 | OK | — |
| Sample 26-11 | P (VDF-HFP-TFE) | MCMB | 55 | 5 | 40 | Silicotungstic acid | 0.5 | 5 | 90 | OK | — |
| Sample 26-12 | P (VDF-HFP-TFE) | MCMB | 55 | 10 | 35 | Silicotungstic acid | 0.5 | 5 | 90 | OK | — |
| Sample 26-13 | P (VDF-HFP-TFE) | MCMB | 85 | 1 | 14 | Silicotungstic acid | 0.1 | 5 | 90 | OK | — |
| Sample 26-14 | P (VDF-HFP-TFE) | MCMB | 85 | 1 | 14 | Silicotungstic acid | 1 | 5 | 90 | OK | — |
| Sample 26-15 | P (VDF-HFP-TFE) | MCMB | 85 | 1 | 14 | Silicotungstic acid | 2 | 5 | 90 | OK | — |
| Sample 26-16 | P (VDF-HFP-TFE) | MCMB | 85 | 1 | 14 | Phosphotungstic acid | 0.5 | 4 | 90 | OK | — |
| Sample 26-17 | P (VDF-HFP-TFE) | MCMB | 85 | 1 | 14 | Silicomolybdic acid | 0.5 | 4 | 90 | OK | — |
| Sample 26-18 | P (VDF-HFP-TFE) | MCMB | 85 | 1 | 14 | Phosphomolybdic acid | 0.5 | 4 | 90 | OK | — |
| Sample 26-19 | P (VDF-HFP-TFE) | Silicon powder | 85 | 1 | 14 | Silicotungstic acid | 0.5 | 4 | 90 | OK | — |
| Sample 26-20 | P (VDF-HFP-TFE) | Co—Sn—C compound | 85 | 1 | 14 | Silicotungstic acid | 0.5 | 4 | 90 | OK | — |
| Sample 26-21 | P (VDF-HFP-TFE) | Deposited Si | 85 | 1 | 14 | Silicotungstic acid | 0.5 | 4 | 90 | OK | — |

TABLE 29

| | | Negative electrode active | Composition [mol %] | | | Additive | Added amount [% by weight] | Positive electrode flexibility | Capacity retention ratio [%] | Element deformation | Electrode state |
|---|---|---|---|---|---|---|---|---|---|---|---|
| | Bonding agent | material | VDF | HFP | TFE | Material | | | | | |
| Sample 26-22 | P (VDF-HFP-TFE) | MCMB | 100 | 0 | 0 | Silicotungstic acid | 0.5 | 0 | 80 | OK | Electrode breakage |
| Sample 26-23 | P (VDF-HFP-TFE) | MCMB | 89 | 1 | 10 | Silicotungstic acid | 0.5 | 3 | 80 | OK | Electrode breakage |
| Sample 26-24 | P (VDF-HFP-TFE) | MCMB | 85 | 0 | 15 | Silicotungstic acid | 0.5 | 2 | 80 | OK | Electrode breakage |
| Sample 26-25 | P (VDF-HFP-TFE) | MCMB | 83 | 17 | 0 | Silicotungstic acid | 0.5 | 5 | 50 | NG | Binder dissolution - separation |
| Sample 26-26 | P (VDF-HFP-TFE) | MCMB | 80 | 0 | 20 | Silicotungstic acid | 0.5 | 0 | 80 | OK | Battery breakage |
| Sample 26-27 | P (VDF-HFP-TFE) | MCMB | 78 | 12 | 10 | Silicotungstic acid | 0.5 | 5 | 70 | NG | Binder dissolution - separation |
| Sample 26-28 | P (VDF-HFP-TFE) | MCMB | 70 | 0 | 30 | Silicotungstic acid | 0.5 | 4 | 80 | NG | Element strain |
| Sample 26-29 | P (VDF-HFP-TFE) | MCMB | 68 | 12 | 20 | Silicotungstic acid | 0.5 | 5 | 60 | NG | Binder dissolution - separation |

TABLE 29-continued

| | Bonding agent | Negative electrode active material | Composition [mol %] VDF | HFP | TFE | Additive Material | Added amount [% by weight] | Positive electrode flexibility | Capacity retention ratio [%] | Element deformation | Electrode state |
|---|---|---|---|---|---|---|---|---|---|---|---|
| Sample 26-30 | P (VDF-HFP-TFE) | MCMB | 60 | 0 | 40 | Silicotungstic acid | 0.5 | 5 | 70 | NG | Element strain |
| Sample 26-31 | P (VDF-HFP-TFE) | MCMB | 58 | 12 | 30 | Silicotungstic acid | 0.5 | 5 | 60 | NG | Binder dissolution - separation |
| Sample 26-32 | P (VDF-HFP-TFE) | MCMB | 55 | 1 | 44 | Silicotungstic acid | 0.5 | 5 | 70 | NG | Binder dissolution - separation |
| Sample 26-33 | P (VDF-HFP-TFE) | MCMB | 50 | 10 | 40 | Silicotungstic acid | 0.5 | 5 | 60 | NG | Binder dissolution - separation |
| Sample 26-34 | P (VDF-HFP-TFE) | MCMB | 85 | 1 | 14 | None | — | 4 | 60 | NG | Element strain |
| Sample 26-35 | P (VDF-HFP-TFE) | MCMB | 85 | 5 | 10 | None | — | 5 | 60 | NG | Element strain |

TABLE 30

| | Bonding agent | Negative electrode active material | Composition [mol %] VDF | HFP | TFE | Additive Material | Added amount [% by weight] | Positive electrode flexibility | Capacity retention ratio [%] | Element deformation | Electrode state |
|---|---|---|---|---|---|---|---|---|---|---|---|
| Sample 26-36 | P (VDF-HFP-CTFE) | MCMB | 85 | 0 | 15 | Silicotungstic acid | 0.5 | 5 | 90 | OK | — |
| Sample 26-37 | P (VDF-HFP-CTFE) | MCMB | 93 | 0 | 7 | Silicotungstic acid | 0.5 | 5 | 90 | OK | — |
| Sample 26-38 | P (VDF-HFP-CTFE) | MCMB | 99 | 0 | 1 | Silicotungstic acid | 0.5 | 4 | 90 | OK | — |
| Sample 26-39 | P (VDF-HFP-CTFE) | MCMB | 93 | 0 | 7 | Silicotungstic acid | 0.1 | 5 | 90 | OK | — |
| Sample 26-40 | P (VDF-HFP-CTFE) | MCMB | 93 | 0 | 7 | Silicotungstic acid | 1 | 5 | 90 | OK | — |
| Sample 26-41 | P (VDF-HFP-CTFE) | MCMB | 93 | 0 | 7 | Silicotungstic acid | 2 | 5 | 90 | OK | — |
| Sample 26-42 | P (VDF-HFP-CTFE) | MCMB | 93 | 0 | 7 | Phosphotungstic acid | 0.5 | 5 | 90 | OK | — |
| Sample 26-43 | P (VDF-HFP-CTFE) | MCMB | 93 | 0 | 7 | Silicomolybdic acid | 0.5 | 5 | 90 | OK | — |
| Sample 26-44 | P (VDF-HFP-CTFE) | MCMB | 93 | 0 | 7 | Phosphomolybdic acid | 0.5 | 5 | 90 | OK | — |
| Sample 26-45 | P (VDF-HFP-CTFE) | MCMB | 85 | 15 | 0 | Silicotungstic acid | 0.5 | 5 | 90 | OK | — |
| Sample 26-46 | P (VDF-HFP-CTFE) | MCMB | 96 | 4 | 0 | Silicotungstic acid | 0.5 | 5 | 90 | OK | — |
| Sample 26-47 | P (VDF-HFP-CTFE) | MCMB | 99 | 1 | 0 | Silicotungstic acid | 0.5 | 4 | 90 | OK | — |
| Sample 26-48 | P (VDF-HFP-CTFE) | MCMB | 96 | 4 | 0 | Silicotungstic acid | 0.1 | 5 | 90 | OK | — |
| Sample 26-49 | P (VDF-HFP-CTFE) | MCMB | 96 | 4 | 0 | Silicotungstic acid | 1 | 5 | 90 | OK | — |
| Sample 26-50 | P (VDF-HFP-CTFE) | MCMB | 96 | 4 | 0 | Silicotungstic acid | 2 | 5 | 90 | OK | — |
| Sample 26-51 | P (VDF-HFP-CTFE) | MCMB | 96 | 4 | 0 | Phosphotungstic acid | 0.5 | 5 | 90 | OK | — |
| Sample 26-52 | P (VDF-HFP-CTFE) | MCMB | 96 | 4 | 0 | Silicomolybdic acid | 0.5 | 5 | 90 | OK | — |
| Sample 26-53 | P (VDF-HFP-CTFE) | MCMB | 96 | 4 | 0 | Phosphomolybdic acid | 0.5 | 5 | 90 | OK | — |
| Sample 26-54 | P (VDF-HFP-CTFE) | MCMB | 95 | 4 | 1 | Silicotungstic acid | 0.5 | 5 | 90 | OK | — |
| Sample 26-55 | P (VDF-HFP-CTFE) | MCMB | 90 | 3 | 7 | Silicotungstic acid | 0.5 | 5 | 90 | OK | — |
| Sample 26-56 | P (VDF-HFP-CTFE) | MCMB | 85 | 5 | 10 | Silicotungstic acid | 0.5 | 5 | 90 | OK | — |

TABLE 31

| | Bonding agent | Negative electrode active material | Composition [mol %] VDF | HFP | LTFE | Additive Material | Added amount [% by weight] | Positive electrode flexibility | Capacity retention ratio [%] | Element deformation | Electrode state |
|---|---|---|---|---|---|---|---|---|---|---|---|
| Sample 26-57 | P (VDF-HFP-CTFE) | Silicon powder | 93 | 0 | 7 | Silicotungstic acid | 0.5 | 5 | 90 | OK | — |
| Sample 26-58 | P (VDF-HFP-CTFE) | Silicon powder | 96 | 4 | 0 | Silicotungstic acid | 0.5 | 5 | 90 | OK | — |
| Sample 26-59 | P (VDF-HFP-CTFE) | Co—Sn—C compound | 93 | 0 | 7 | Silicotungstic acid | 0.5 | 5 | 90 | OK | — |
| Sample 26-60 | P (VDF-HFP-CTFE) | Co—Sn—C compound | 96 | 4 | 0 | Silicotungstic acid | 0.5 | 5 | 90 | OK | — |

TABLE 31-continued

| | Bonding agent | Negative electrode active material | Composition [mol %] VDF | HFP | LTFE | Additive Material | Added amount [% by weight] | Positive electrode flexibility | Capacity retention ratio [%] | Element deformation | Electrode state |
|---|---|---|---|---|---|---|---|---|---|---|---|
| Sample 26-61 | P (VDF-HFP-CTFE) | Deposited Si | 93 | 0 | 7 | Silicotungstic acid | 0.5 | 5 | 90 | OK | — |
| Sample 26-62 | P (VDF-HFP-CTFE) | Deposited Si | 96 | 4 | 0 | Silicotungstic acid | 0.5 | 5 | 90 | OK | — |
| Sample 26-63 | P (VDF-HFP-CTFE) | MCMB | 83 | 0 | 17 | Silicotungstic acid | 0.5 | 5 | 50 | NG | Binder dissolution - separation |
| Sample 26-65 | P (VDF-HFP-CTFE) | MCMB | 83 | 17 | 0 | Silicotungstic acid | 0.5 | 5 | 50 | NG | Binder dissolution - separation |
| Sample 26-64 | P (VDF-HFP-CTFE) | MCMB | 93 | 0 | 7 | None | — | 5 | 60 | NG | Element strain |
| Sample 26-66 | P (VDF-HFP-CTFE) | MCMB | 96 | 4 | 0 | None | — | 5 | 60 | NG | Element strain |

As is clear from Table 28 and Table 29, it was found that, in the secondary batteries for testing to which the heteropoly acid was added, when the composition ratio of the negative electrode bonding agent was a combination of 55 mol % to 85 mol % of vinylidene fluoride, 1 mol % to 10 mol % of hexafluoropropylene, and 5 mol % to 40 mol % of tetrafluoroethylene, good battery characteristics were obtained, and deformation of the battery was suppressed. In addition, even in Sample 26-19 to Sample 26-21 in which the volume change caused by ordinary charging and discharging was large, and a metal or alloy-based negative electrode active material causing a large deformation of the battery was used, both of good battery characteristics and suppression of the deformation could be satisfied.

Meanwhile, when the composition ratio of the bonding agent was outside the above ranges like Sample 26-22 to Sample 26-33, deformation of the battery occurred even when silicotungstic acid was added, or breakage of the electrode occurred even when deformation was small. In addition, when the heteropoly acid was not added like Sample 26-34 and Sample 26-35, strain of the battery element occurred, and the capacity retention ratio was also degraded.

In addition, even when vinylidene fluoride and at least one of hexafluoropropylene and tetrafluoroethylene were used as the composition of the bonding agent, similarly, good battery characteristics and the effect of suppressing deformation could be obtained by setting an appropriate composition ratio and jointly using the heteropoly acid.

EXAMPLE 27

[When a Separator that Absorbs Polyvinylidene Fluoride in Advance is Used]
<Sample 27-1> to <Sample 27-8>
[Manufacturing of the Positive Electrode]
97.2 parts by mass of a complex oxide particle (lithium nickelate) having an average composition of $LiNi_{0.77}Co_{0.20}Al_{0.03}O_2$, 0.8 parts by mass of graphite powder as a conducting agent, and 2 parts by mass of polyvinylidene fluoride as a bonding agent were mixed. Subsequently, a desired amount of N-methyl-2-pyrrolidone, which was a dispersion medium, was added to and dispersed in the mixture, thereby manufacturing a slurry-form positive electrode compound.

This positive electrode compound slurry was evenly coated in a predetermined area on both faces of a positive electrode collector composed of a 12 μm-thick aluminum foil, and dried at a reduced pressure at 100° C. for 24 hours, thereby forming a positive electrode active material layer. In addition, compacting was carried out using a roll press machine so as to produce a positive electrode sheet. Furthermore, the positive electrode sheet was cut out into a 30 mm×300 mm band shape, thereby producing a positive electrode. Subsequently, a positive electrode lead was attached to the positive electrode collector exposed portion of the positive electrode.

[Manufacturing of the Negative Electrode]
95 parts by mass of artificial graphite as a negative electrode active material, 1.5 parts by mass of needle-shaped graphite as a conducting agent, and 3.5 parts by mass of polyvinylidene fluoride powder as a bonding agent were mixed so as to prepare a negative electrode compound, and, a desired amount of N-methyl-2-pyrrolidone was added to and dispersed, thereby manufacturing a slurry-form negative electrode compound. This negative electrode compound slurry was evenly coated in a predetermined area on both faces of a negative electrode collector composed of a 8 μm-thick copper foil, and dried at a reduced pressure at 100° C. for 24 hours, thereby forming a negative electrode active material layer. At this time, negative electrode compound slurry-uncoated portions were provided with a width shown in Table z at the winding inner circumferential side end portion and the winding outer circumferential side end portion. Meanwhile, in Sample 27-6, a 1 mm-wide uncoated portion was provided at a location 100 mm away from the winding outer circumferential side end portion in addition to the winding both end portions.

In addition, the negative electrode active material layer was compacted using a roll press machine so as to produce a negative electrode sheet. Furthermore, the negative electrode sheet was cut out into a 31.5 mm×610 mm band shape so as to manufacture a negative electrode. Subsequently, a negative electrode lead was attached to the negative electrode collector exposed portion of the negative electrode.

[Adjustment of the Non-aqueous Electrolytic Solution]
1.5% by weight of hexafluorophosphate ($LiPF_6$) was added to and dissolved in as an electrolyte salt in a solvent in which ethylene carbonate (EC) and propylene carbonate (PC) were mixed in a mass ratio of 3:7, and silicotungstic acid ($H_4(SiW_{12}O_{40})$) was added, thereby manufacturing an electrolytic solution.

[Manufacturing of the Separator]

Polyvinylidene fluoride (PVdF) was adhered on the surface of a 9 μm-thick polypropylene (PP) film. The adhesion of the polyvinylidene fluoride (PVdF) was carried out by, for example, the following method.

A solution in which polyvinylidene fluoride (PVdF) was dissolved in N-methyl-2-pyrrolidone in a concentration of 15% by weight was coated on both faces of the polypropylene film. After that, the polyvinylidene fluoride solution-coated polypropylene film was immersed in water, and then dried, thereby manufacturing a separator.

[Assembly of the Battery]

The positive electrode and negative electrode were laminated through the separator having the polyvinylidene fluoride coated on the surface, wound in the longitudinal direction, and a protective tape was attached to the outermost circumferential portion, thereby manufacturing a flat-type wound electrode body.

Next, this wound electrode body was filled in an exterior member, three sides of the exterior member were thermally fused, and one side was not thermally fused, thereby having an opening. A damp-proof aluminum laminate film composed by laminating a 25 μm-thick nylon film, a 40 μm-thick aluminum foil, and a 30 μm-thick polypropylene film sequentially from the outermost layer was used as the exterior member.

Subsequently, a non-aqueous electrolytic solution to which silicotungstic acid was added was injected from the opening of the exterior member, and the remaining side of the exterior member was thermally fused at a reduced pressure so as to be sealed. Meanwhile, at this time, an adhering film was interposed between the positive lead and the negative lead, and the exterior member. Subsequently, the polyvinylidene fluoride and the non-aqueous electrolytic solution were reacted by heating the wound electrode body covered with an aluminum laminate film while embossing the wound electrode body from the outside, thereby forming a gel electrolyte.

Finally, after the manufactured battery was charged by a constant current until 4.25 V at 0.2 C, constant voltage charging was carried out at 4.25 V so as to carry out preliminary charging so as to precipitate a tungsten compound-derived silicotungstic acid. Meanwhile, the capacity change of the positive electrode at this stage was a small amount that could be ignored. Subsequently, discharging was carried out until 2.50 V at 0.2 C. Thereby, a secondary battery for testing in which a layer in which both of the polyacid and/or polyacid compound and lithium and/or a lithium compound were precipitated on the negative electrode was manufactured.

<Sample 27-9> to <Sample 27-11>

Secondary batteries for testing were manufactured in the same manner as in Sample 27-1 except that the added amount of the silicotungstic acid ($H_4(SiW_{12}O_{40})$) added to the non-aqueous electrolytic solution was varied as shown in Table 32.

<Sample 27-12> to <Sample 27-14>

Secondary batteries for testing were manufactured in the same manner as in Sample 27-1 except that, instead of silicotungstic aid, phosphotungstic acid ($H_3(PW_{12}O_{40})$), silicomolybdic acid ($H_4(SiMo_{12}O_{40})$), and phosphomolybdic acid ($H_3(PMo_{12}O_{40})$) were used as the heteropoly acid added to the non-aqueous electrolytic solution, respectively.

<Sample 27-15>

Secondary batteries for testing were manufactured in the same manner as in Sample 27-1 except that the width of the negative electrode compound slurry-uncoated portions at the winding inner circumferential side end portion of the negative electrode was set to 3 mm.

<Sample 27-16>

A secondary battery for testing was manufactured in the same manner as in Sample 27-1 except that the added amount of the silicotungstic acid ($H_4(SiW_{12}O_{40})$) added to the non-aqueous electrolytic solution was set to 0.005% by weight.

<Sample 27-17>

A secondary battery for testing was manufactured in the same manner as in Sample 27-1 except that the adhesion of the polyvinylidene fluoride on the surface of the separator was not carried out.

<Sample 27-18>

A secondary battery for testing was manufactured in the same manner as in Sample 27-1 except that the silicotungstic acid ($H_4(SiW_{12}O_{40})$) was not added to the non-aqueous electrolytic solution.

[Evaluation of the Secondary Battery: Measurement of the Separation Strength Between the Separator and the Negative Electrode Collector]

The secondary battery for testing of each of the samples was disassembled, and the separation strength between the separator and the negative electrode collector was measured by the 180 degree separation test as defined by JIS K6854-2.

[Evaluation of the Secondary Battery: Measurement of Capacity Retention Ratio]

After the secondary battery for testing of each of the samples was charged by a constant current until the battery voltage reached 4.2 V by a constant current corresponding to a designed rating capacity of 1 C under conditions of 23° C., constant voltage charging was carried out until the electric current value reached 0.05 C at a constant voltage of 4.2 V. Subsequently, discharging was carried out at a constant current of 0.2 C until a final voltage of 2.5 V, and the discharge capacity at the first cycle was measured.

Subsequently, the charging and discharging cycle was repeated under the above charging and discharging conditions, and the discharge capacity at the $300^{th}$ cycle was measured. The capacity retention ratio was computed at the $300^{th}$ cycle from the following formula.

$$\text{Capacity retention ratio [\%]} = (\text{the discharge capacity at the } 300^{th} \text{ cycle/the initial discharge capacity} \times 100).$$

[Evaluation of the Secondary Battery: Measurement of the Amount of Change of Battery Swelling]

The secondary battery for testing of each of the samples was charged and discharged under the same conditions as for the measurement of the capacity retention ratio, and the battery thickness after the initial discharging was measured. Subsequently, the charging and discharging cycle was repeated under the charging and discharging conditions, and the battery thickness after the $300^{th}$ cycle discharging was measured. The increased amount of the battery thickness at the $300^{th}$ cycle was computed from the following formula.

$$\text{Increased amount of the battery thickness [mm]} = \text{battery thickness after the } 300^{th} \text{ cycle} - \text{battery thickness after the initial discharging}.$$

The following Table 32 shows the results of the evaluations

TABLE 32

| | Active material-uncoated width [mm] | | | Heteropoly acid | | | | | |
|---|---|---|---|---|---|---|---|---|---|
| | Wound inside | Wound outside | Electrode middle portion | Material | Added amount [% by weight] | PVdF coating on the separator | Average separation strength [mN/mm] | Capacity retention ratio [%] | Battery swelling amount [mm] |
| Sample 27-1 | 40 | 1 | — | Silicotungstic acid | 1.50 | Yes | 70 | 85 | 0.4 |
| Sample 27-2 | 40 | 0 | — | Silicotungstic acid | 1.50 | Yes | 74 | 77 | 0.9 |
| Sample 27-3 | 40 | 5 | — | Silicotungstic acid | 1.50 | Yes | 76 | 91 | 0.3 |
| Sample 27-4 | 40 | 10 | — | Silicotungstic acid | 1.50 | Yes | 77 | 90 | 0.4 |
| Sample 27-5 | 0 | 40 | — | Silicotungstic acid | 1.50 | Yes | 72 | 77 | 0.9 |
| Sample 27-6 | 40 | 1 | 1 | Silicotungstic acid | 1.50 | Yes | 76 | 92 | 0.3 |
| Sample 27-7 | 40 | 1 (both faces) | — | Silicotungstic acid | 1.50 | Yes | 68 | 91 | 0.2 |
| Sample 27-8 | 5 | 1 | — | Silicotungstic acid | 1.50 | Yes | 69 | 76 | 0.8 |
| Sample 27-9 | 40 | 1 | — | Silicotungstic acid | 0.10 | Yes | 14 | 70 | 0.8 |
| Sample 27-10 | 40 | 1 | — | Silicotungstic acid | 0.75 | Yes | 40 | 80 | 0.6 |
| Sample 27-11 | 40 | 1 | — | Silicotungstic acid | 5.0 | Yes | 70 | 85 | 0.4 |
| Sample 27-12 | 40 | 1 | — | Silicomolybdic acid | 1.50 | Yes | 69 | 87 | 0.5 |
| Sample 27-13 | 40 | 1 | — | Phosphotungstic acid | 1.50 | Yes | 71 | 86 | 0.6 |
| Sample 27-14 | 40 | 1 | — | Phosphomolybdic acid | 1.50 | Yes | 74 | 86 | 0.4 |
| Sample 27-15 | 3 | 1 | — | Silicotungstic acid | 1.50 | Yes | 67 | 65 | 1.4 |
| Sample 27-16 | 40 | 1 | — | Silicotungstic acid | 0.05 | Yes | 5 | 64 | 1.6 |
| Sample 27-17 | 40 | 1 | — | Silicotungstic acid | 1.50 | No | 0 | 60 | 1.8 |
| Sample 27-18 | 40 | 1 | — | — | — | Yes | 0 | 55 | 2.1 |

As is clear from the comparison between Sample 27-1 to Sample 27-17 and Sample 27-18 in Table 32, improvement in the capacity retention ratio or the effect of suppressing battery swelling can be obtained by providing an active material layer-unformed portion (the negative electrode compound slurry-uncoated portion) at least in one of both end portions of the negative electrode in the battery in which the heteropoly acid was added to the non-aqueous electrolytic solution.

In addition, as is clear from the comparison between Sample 27-1 to Sample 27-16 and Sample 27-17, the adhesion strength and the capacity retention ratio were improved, and the effect of suppressing battery swelling was obtained when the separator having polyvinylidene fluoride adhered on the surface was used.

In addition, as is clear from the comparison between Sample 27-1 to Sample 27-15 and Sample 27-16, the adhesion strength was improved when the added amount of silicotungstic acid to the non-aqueous electrolytic solution was 0.1% by weight or more, and improvement in the adhesion strength was significantly exhibited when the added amount was 0.75% by weight. In addition, a higher capacity retention ratio and little battery swelling could be realized by the improvement of the adhesion strength.

Furthermore, as is clear from the comparison between Sample 27-1 to Sample 27-14 and Sample 27-15, improvement in the capacity retention ratio or the effect of suppressing battery swelling can be further obtained by providing 5 mm or more of an active material layer-unformed portion (the negative electrode compound slurry-uncoated portion) at least in one of both end portions of the negative electrode.

EXAMPLE 28

[Confirmation of the Effect of the Keggin-structured and Preyssler-structured Heteropoly Acid]

The heteropoly acid or heteropoly acid compound used in the following samples is as follows.

Compound A: Preyssler-structured lithium phosphotungstate

Compound B: Preyssler-structured potassium phosphotungstate

Compound C: Preyssler-structured phosphotungstate 44-hydrate

Compound D: Keggin-structured phosphotungstate 30-hydrate

Meanwhile, in the following description, the mass of the heteropoly acid is a value from which the mass of water of hydration contained in the heteropoly acid is subtracted. The mass of the heteropoly acid compound is a value from which the mass of water of hydration contained in the heteropoly acid compound is subtracted.

<Sample 28-1>

[Manufacturing of the Positive Electrode]

94 parts by mass of lithium cobalt oxide (LiCoO$_2$) as a positive electrode active material, 3 parts by mass of graphite as a conducting agent, and 3 parts by mass of polyvinylidene fluoride (PVdF) as a bonding agent were mixed, and N-methyl-2-pyrrolidone was added, thereby obtaining a positive electrode compound slurry. Next, this positive electrode compound slurry was evenly coated on both faces of a 10 μm-thick aluminum foil, and dried, and, compacting was carried out using a roll press machine so as to produce a positive electrode sheet in which a positive electrode active material layer having a volume density of 3.40 g/cc was formed. Finally, the positive electrode sheet was cut into a 50 mm-wide and 300 mm-long shape, and an aluminum positive electrode lead was attached to one end of the positive electrode collector by welding, thereby producing a positive electrode.

[Manufacturing of the Negative Electrode]

97 parts by mass of the mesocarbon microbead (MCMB) as a negative electrode active material and 3 parts by mass of polyvinylidene fluoride (PVdF) as a bonding agent were mixed, and N-methyl-2-pyrrolidone was added, thereby obtaining a negative electrode compound slurry. Next, this negative electrode compound slurry was evenly coated and dried on both faces of a 10 μm-thick copper foil that acted as a negative electrode collector, and compacting was carried out using a roll press machine so as to produce a positive electrode sheet in which a negative electrode active material layer having a volume density of 1.80 g/cc was formed. Finally, the negative electrode sheet was cut into a 50 mm-wide and 300 mm-long shape, and a nickel (Ni) positive electrode lead was attached to one end of the negative electrode collector by welding, thereby producing a positive electrode.

[Adjustment of the Non-aqueous Electrolytic Solution]

0.8 mol/kg of hexafluorophosphate (LiPF$_6$) as an electrolyte salt and 1.0% by weight of the heteropoly acid salt compound of the compound A were dissolved in a mixed solution in which ethylene carbonate (EC) and diethyl carbonate (DEC) were mixed in 5:5 (mass ratio).

[Assembly of the Battery]

A separator having polyvinylidene fluoride coated 2 µm respectively on both surface of a 7 µm-thick microporous polypropylene film was used. The positive electrode and negative electrode were laminated through the separator, wound many times in the longitudinal direction of the laminate, and then a flat-type wound electrode body was formed by fixing the winding end portion with a adhesive tape. Subsequently, the wound electrode body was accommodated in a bag-shaped exterior member composed of an aluminum laminate film, and 2 g of the electrolytic solution was injected. Subsequently, after the opening portion of the aluminum laminate film was sealed by thermal fusion under a reduced-pressure atmosphere, a laminate film-type secondary battery for testing in which a gel electrolyte layer was formed was manufactured by applying a pressure from the outside so as to heat the exterior member.

Meanwhile, as a result of disassembling the battery after preliminary charging, it was confirmed that a gel-state film was formed on the surface of the negative electrode.

<Sample 28-2> to <Sample 28-4>

Secondary batteries for testing were manufactured in the same manner as in Sample 28-1 except that the compound B, the compound C, and the compound D were used instead of the compound A as the heteropoly acid compound or heteropoly acid.

<Sample 28-5> to <Sample 28-8>

Secondary batteries for testing were manufactured in the same manner as in Sample 28-1 to Sample 28-4 except that the added amount of the heteropoly acid compound or heteropoly acid added to the non-aqueous electrolytic solution was set to 2.0% by weight.

<Sample 28-9>

A secondary battery for testing was manufactured in the same manner as in Sample 28-1 except that the heteropoly acid compound or heteropoly acid was not added to the non-aqueous electrolytic solution.

[Evaluation of the Secondary Battery: Measurement of the Change in Battery Swelling after High-temperature Storage]

After the secondary battery for testing of each of the samples was charged by a constant current until the battery voltage reached 4.2 V at a constant current of 800 mA under conditions of 23° C., constant voltage charging was carried out until the total charging time became 3 hours at a constant voltage of 4.2 V. Subsequently, constant current charging was carried out until a final voltage of 3.0 V at 800 mA.

Subsequently, after charging was carried out under the charging conditions, the battery thickness was measured. The battery was stored in a constant temperature layer of 85° C. for 12 hours in a state of a battery voltage of 4.2 V, and the battery thickness after the storage was measured. The difference in the battery thickness before and after the storage was computed as the increased amount of the battery thickness.

The following Table 33 shows the results of the evaluation.

TABLE 33

| | Electrolytic solution composition | | Heteropoly acid compound | | Increased amount of battery thickness during high-temperature storage [mm] |
|---|---|---|---|---|---|
| | Non-aqueous solvent | Electrolyte salt | Type | Added amount [% by weight] | |
| Sample 28-1 | EC + DEC | LiPF$_6$ 0.8 mol/kg | Compound A | 1 | 0.53 |
| Sample 28-2 | | | Compound B | | 0.62 |
| Sample 28-3 | | | Compound C | | 1.24 |
| Sample 28-4 | | | Compound D | | 1.43 |
| Sample 28-5 | | | Compound A | 2 | 0.35 |
| Sample 28-6 | | | Compound B | | 0.46 |
| Sample 28-7 | | | Compound C | | 0.64 |
| Sample 28-8 | | | Compound D | | 0.71 |
| Sample 28-9 | EC + DEC | LiPF$_6$ 0.8 mol/kg | — | — | 1.76 |

As is clear from Table 33, the compound A and the compound B, which were the Preyssler-structured heteropoly acid compound, the compound C, which was the Preyssler-structured heteropoly acid, and the compound D, which was the Keggin structure heteropoly acid could obtain a large effect in suppressing battery swelling with the same added amount. Particularly, in the case of the heteropoly acid, the Preyssler-structured heteropoly acid could obtain a slightly larger effect than the Keggin-structured heteropoly acid. In addition, in the case of Sample 28-1 and Sample 28-2 in which the Preyssler-structured heteropoly acid compound was used, a larger effect of suppressing battery swelling could be obtained from both the Preyssler-structured and Keggin-structured heteropoly acid compound than when the heteropoly acid was used.

In addition, a lithium salt of the heteropoly acid is preferred as the heteropoly acid compound. The lithium salt has a relatively high content of polyacid anion and a large effect in comparison to a potassium salt.

In addition, a larger effect in suppressing battery swelling could be obtained by setting the added amount of the heteropoly acid or heteropoly acid compound to 2.0% by weight.

EXAMPLE 29

[Confirmation of the Effect of the Keggin-structured and Preyssler-structured Heteropoly Acid]

The same heteropoly acid or heteropoly acid compound as in Example 28 was used in the following samples.

<Sample 29-1> to <Sample 29-8>

Secondary batteries for testing were manufactured in the same manner as in Sample 28-1 except that the added amount of the compound A, which was the heteropoly acid, was set to the added amount shown in Table 34.

<Sample 29-9> to <Sample 29-16>

Secondary batteries for testing were manufactured in the same manner as in Sample 28-1 except that the added amount of the compound B, which was the heteropoly acid, was set to the added amount shown in Table 34.

<Sample 29-17> to <Sample 29-20>

Secondary batteries for testing were manufactured in the same manner as in Sample 28-1 to Sample 28-4 except that 1% by weight of fluoroethylene carbonate (FEC) was added to the non-aqueous electrolytic solution.

<Sample 29-21> to <Sample 29-24>

Secondary batteries for testing were manufactured in the same manner as in Sample 28-1 to Sample 28-4 except that 1% by weight of vinylene carbonate (VC) was added to the non-aqueous electrolytic solution.

[Evaluation of the Secondary Battery: Measurement of the Initial Discharge Capacity]

After the secondary battery for testing of each of the samples was charged by a constant current until the battery voltage reached 4.2 V at a constant current of 800 mA under conditions of 23° C., constant voltage charging was carried out until the total charging time became 3 hours at a constant voltage of 4.2 V. Subsequently, constant current charging was carried out until a final voltage of 3.0 V at 800 mA, and the discharge capacity at the initial charging and discharging was measured.

[Evaluation of the Secondary Battery: Measurement of the Change in Battery Swelling after High-temperature Storage]

Subsequently, after charging was carried out under the charging conditions, the battery thickness was measured. The battery was stored in a constant temperature layer of 85° C. for 12 hours in a state of a battery voltage of 4.2 V, and the battery thickness after the storage was measured. The difference in the battery thickness before and after the storage was computed as the increased amount of the battery thickness.

The following Table 34 shows the results of the evaluation.

TABLE 34

| | Electrolytic solution composition | | Heteropoly acid compound | | Initial discharge capacity [mAh/g] | Increased amount of battery thickness during high-temperature storage [mm] |
|---|---|---|---|---|---|---|
| | Non-aqueous solvent | Electrolyte salt | Type | Added amount [% by weight] | | |
| Sample 29-1 | EC + DEC | LiPF$_6$ 0.8 mol/kg | Compound A | 0.01 | 154.3 | 1.09 |
| Sample 29-2 | | | | 0.05 | 154.1 | 0.98 |
| Sample 29-3 | | | | 0.1 | 153.6 | 0.78 |
| Sample 29-4 | | | | 0.5 | 152.5 | 0.70 |
| Sample 29-5 | | | | 1 | 151.1 | 0.53 |
| Sample 29-6 | | | | 2 | 150.4 | 0.35 |
| Sample 29-7 | | | | 3 | 146.1 | 0.35 |
| Sample 29-8 | | | | 5 | 137.5 | 0.35 |
| Sample 29-9 | | | Compound B | 0.01 | 154.4 | 1.13 |
| Sample 29-10 | | | | 0.05 | 154.2 | 1.01 |
| Sample 29-11 | | | | 0.1 | 153.4 | 0.82 |
| Sample 29-12 | | | | 0.5 | 152.1 | 0.77 |
| Sample 29-13 | | | | 1 | 150.8 | 0.62 |
| Sample 29-14 | | | | 2 | 148.9 | 0.46 |
| Sample 29-15 | | | | 3 | 142.5 | 0.37 |
| Sample 29-16 | | | | 5 | 136.2 | 0.36 |
| Sample 29-17 | EC + DEC + FEC | LiPF$_6$ 0.8 mol/kg | Compound A | 1 | — | 0.54 |
| Sample 29-18 | | | Compound B | | — | 0.61 |
| Sample 29-19 | | | Compound C | | — | 0.54 |
| Sample 29-20 | | | Compound D | | — | 0.57 |
| Sample 29-21 | EC + DEC + VC | | Compound A | | — | 1.23 |
| Sample 29-22 | | | Compound B | | — | 1.40 |
| Sample 29-23 | | | Compound C | | — | 1.26 |
| Sample 29-24 | | | Compound D | | — | 1.47 |

As is clear from Table 34, the heteropoly acid and heteropoly acid compound of the compound A to the compound D could obtain the effect of suppressing battery swelling in a wide range of the added amount.

In addition, the lithium salt of the heteropoly acid is preferred as the heteropoly acid compound, but a potassium salt also has a large effect in suppressing battery swelling in a high added amount range, which is preferred.

EXAMPLE 30

[When Natural Graphite is Used as the Negative Electrode Active Material]

<Sample 30-1>

[Manufacturing of the Positive Electrode]

Firstly, 92 parts by mass of a positive electrode active material composed of complex oxide particles (lithium cobalt acid) having an average composition of $LiCo_{0.98}Al_{0.01}Mg_{0.01}O_2$, 5 parts by mass of graphite powder, which was a conducting agent, and 3 parts by mass of polyvinylidene fluoride powder, which was a bonding agent, were mixed so as to prepare a positive electrode compound, and, furthermore, the positive electrode compound was dispersed in N-methyl-2-pyrrolidone, which was a dispersion medium, thereby manufacturing a slurry-form positive electrode compound slurry.

This positive electrode compound slurry was evenly coated on both faces of a positive electrode collector composed of a 20 μm-thick aluminum foil, and was dried at a reduced pressure at 100° C. for 24 hours, thereby forming a positive electrode active material layer. In addition, compacting was carried out on the positive electrode active material layer using a roll press machine so as to produce a positive electrode sheet. The positive electrode sheet was cut out into a 48 mm×300 mm band shape, thereby producing a positive electrode. Subsequently, a positive electrode lead was attached to the positive electrode collector exposed portion of the positive electrode.

[Manufacturing of the Negative Electrode]

97 parts by mass of natural graphite as a negative electrode active material, 1.5 parts by mass of styrene-butadiene-rubber as a bonding agent, and carboxyl methyl cellulose as a thickening agent were mixed so as to prepare a negative electrode compound, and, furthermore, the negative electrode compound was dispersed in a distilled water, which was a dispersion medium, thereby producing a negative electrode compound slurry. Next, the negative electrode compound slurry was evenly coated on both faces of a negative electrode collector composed of a 15 μm-thick copper foil, and dried at a reduced pressure at 120° C. for 24 hours, thereby forming a negative electrode active material layer. In addition, compacting was carried out on the negative electrode active material layer using a roll press machine so as to produce a negative electrode sheet. The negative electrode sheet was cut out into a 50 mm×310 mm band shape, thereby manufacturing a negative electrode. Subsequently, a negative electrode lead was welded to the negative electrode collector exposed portion of the negative electrode.

[Manufacturing of the Electrolytic Solution]

Ethylene carbonate (EC) and diethyl carbonate (DEC) were mixed in a weight ratio of 4:6 so as to produce a mixed solvent. Subsequently, hexafluorophosphate ($LiPF_6$) was dissolved in the mixed solvent in a concentration of 1.0 mol/kg so as to prepare a solution, and, furthermore, 1.5% by weight of silicotungstic acid ($H_4(SiW_{12}O_{40})$) was dissolved.

[Assembly of the Non-aqueous Electrolyte Battery]

Next, the manufactured positive electrode, negative electrode, and separator were laminated in the order of the positive electrode, the separator, and the negative electrode, adhered, wound in the longitudinal direction, and a protective tape was attached to the outermost circumferential portion, thereby manufacturing a flat-type wound electrode body. At this time, a structure in which the negative electrode was protruded outside the positive electrode, and the separator was protruded outside the negative electrode was made.

Subsequently, this wound electrode body was filled in an exterior member, three sides of the exterior member were thermally fused, and one side was not thermally fused, thereby having an opening. A damp-proof aluminum laminate film composed by laminating a 25 μm-thick nylon film, a 40 μm-thick aluminum foil, and a 30 μm-thick polypropylene film sequentially from the outermost layer was used as the exterior member.

Subsequently, the electrolytic solution was injected from the opening of the exterior member, and sealed by thermally fusing the remaining side of the exterior member at a reduced pressure, thereby, manufacturing a secondary battery. Meanwhile, at this time, an adhering film was interposed between the positive lead and the negative lead, and the exterior member.

<Sample 30-2>

A secondary battery for testing was manufactured in the same manner as in Sample 30-1 except that an electrolytic solution in which 0.8% by weight of silicotungstic acid ($H_4(SiW_{12}O_{40})$) was dissolved was used.

<Sample 30-3>

A secondary battery for testing was manufactured in the same manner as in Sample 30-1 except that an electrolytic solution in which silicotungstic acid ($H_4(SiW_{12}O_{40})$) was not included was used.

<Sample 30-4>

A secondary battery for testing was manufactured in the same manner as in Sample 30-1 except that an electrolytic solution in which silicotungstic acid ($H_4(SiW_{12}O_{40})$) was not included was used, and artificial graphite was used as the negative electrode active material.

[Evaluation of the Secondary Battery: Swelling Amount of the Battery]

The swelling amount (the amount of change of the thickness) of the secondary battery of each of the samples was measured as the swelling amount during high-temperature storage by the same method as in Example 1.

[Evaluation of the Secondary Battery: Recovery Test]

The secondary battery stored at a high temperature for 24 hours was discharged by a constant current until 2.5 V at 0.2 C under conditions of room temperature. After that, charging was carried out by a constant current and a constant voltage until 4.2 V at 1 C under conditions of room temperature, and then discharging was carried out by a constant current until 2.5 V at 0.2 C. The discharge capacity at this time was measured as the recovery capacity. The recovery ratio was computed from the following formula.

$$\text{Recovery ratio [\%]} = (\text{recovery capacity/rating capacity}) \times 100$$

[Evaluation of the Secondary Battery: Recovery Cycle Test]

After the swelling amount during high-temperature storage was measured, the secondary battery of each of the samples was charged by a constant current and a constant voltage until 4.2 V at 1 C under conditions of room temperature, and then discharging was carried out by a constant current until 2.5 V at 1 C. The discharge capacity at this time was obtained as the initial capacity. After that, charging and discharging were carried out 50 times under the same conditions, and the discharge capacity at the $50^{th}$ cycle was measured. The capacity retention ratio was computed from the following formula.

$$\text{Recovery ratio [\%]} = (\text{the discharge capacity at the } 50^{th} \text{ cycle/the initial discharge capacity}) \times 100.$$

The following Table 35 shows the results of the evaluations.

TABLE 35

| | | Heteropoly acid | | | |
|---|---|---|---|---|---|
| | Negative electrode active material | Material | Added amount [% by mass] | Battery swelling amount [mm] | Recovery ratio [%] | Capacity retention ratio [%] |
| Sample 30-1 | Natural graphite | Silicotungstic acid | 1.5 | 0.14 | 93.8 | 89.2 |
| Sample 30-2 | Natural graphite | Silicotungstic acid | 0.8 | 0.25 | 95.1 | 91.6 |
| Sample 30-3 | Natural graphite | — | — | 0.87 | 83.5 | 58 |
| Sample 30-4 | Artificial graphite | — | — | 2.27 | 99.8 | 93.1 |

As is clear from Table 35, the use of natural graphite suppresses battery swelling, but reduces battery characteristics, and the use of artificial graphite can maintain good battery characteristics, but extremely increases battery swelling. In batteries in which natural graphite is used as the negative electrode active material, the problem of natural graphite can be solved, and both high battery characteristic and the effect of suppressing battery swelling can be satisfied when the heteropoly acid or heteropoly acid compound was added to the battery system.

As described above, in a non-aqueous electrolyte battery in which a layer in which both the polyacid and/or polyacid compound and lithium and/or a lithium compound are present is precipitated on the surface of the negative electrode by adding the heteropoly acid, gas generation or short circuiting between the positive electrode and the negative electrode are suppressed, and a non-aqueous electrolyte battery having little battery swelling and high stability can be obtained. Such an effect can be obtained even in any battery composition.

As described above, in a non-aqueous electrolyte battery including the polyacid and heteropoly acid or a compound thereof in the battery system, gas generation or short circuiting between the positive electrode and the negative electrode are suppressed, and a non-aqueous electrolyte battery having little battery swelling and high safety can be obtained. Such an effect can be obtained even in any battery composition. In addition, the configuration of each of the embodiments can be used in combination.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:
1. A non-aqueous electrolyte battery comprising:
a positive electrode having a positive electrode active material layer including a positive electrode active material provided on a positive electrode collector;
a negative electrode having a negative electrode active material layer including a negative electrode active material provided on a negative electrode collector;
a separator provided between the positive electrode and the negative electrode;
an electrolyte including an electrolyte salt and an electrolyte solvent; and
a polyacid or a polyacid compound providing an amorphous material on the negative electrode in an amount greater than 0.005 wt % to 5.0 wt %, wherein a polyacid ion of the polyacid or the polyacid compound has a Preyssler structure represented by $HxAy [B_5D_{30}O_{110}] \cdot zH_2O$, wherein

A is at least one element selected from the group consisting of lithium (Li), sodium (Na), potassium (K), rubidium (Rb), cesium (Cs), magnesium (Mg), calcium (Ca), aluminum (Al), ammonium ($NH_4$), ammonium salts, and phosphonium salts, B is at least one element selected from the group consisting of phosphorous (P), silicon (Si), arsenic (As), and germanium (Ge), D is at least one element selected from the group consisting of titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z are values in ranges of $0 \leq x \leq 15$, $0 \leq y \leq 15$, and $0 \leq z \leq 50$, respectively, and at least one of x and y is not 0.

2. The non-aqueous electrolyte battery according to claim 1, wherein the electrolyte salt includes a lithium salt.

3. The non-aqueous electrolyte battery according to claim 2, wherein the lithium salt is selected from the group consisting of $LiPF_6$, $LiClO_4$, $LiBF_4$, $LiN(SO_2CF_3)_2$, $LiN(SO_2C_2F_5)_2$ and $LiAsF_6$.

4. The non-aqueous electrolyte battery according to claim 1, wherein the polyacid or polyacid compound is further added to the positive electrode active material, and wherein the positive electrode active material includes a lithium-containing oxide.

5. The non-aqueous electrolyte battery of claim 4, wherein the lithium-containing oxide includes one or more of Co, Ni, Fe, P, Mg, Mn, Al, Ba, Sn, Fe, P, Zr, and Mg.

6. The non-aqueous electrolyte battery of claim 1, wherein the polyacid or polyacid compound is added to the negative electrode active material, and wherein the negative electrode active material includes a carbon material, a silicon material or a metal material.

7. The non-aqueous electrolyte battery according to claim 6, wherein the carbon material includes one or more of natural graphite, artificial graphite, mesocarbon microbead, and a CoSnC compound; wherein the silicon material includes a silicon powder; and wherein the metal material includes a lithium metal.

8. The non-aqueous electrolyte battery of claim 1, wherein the amount of the polyacid or polyacid compound ranges from 1.0 wt % to 5.0 wt %.

9. The non-aqueous electrolyte battery of claim 8, wherein the amorphous material includes a gel-state film.

10. The non-aqueous electrolyte battery of claim 1, wherein the electrolyte solvent includes one or more of ethylene carbonate, dimethyl carbonate, and propylene carbonate.

11. The non-aqueous electrolyte battery of claim 1, wherein the amorphous material is provided on the negative electrode during charging or preliminary charging so as to suppress swelling of the non-aqueous electrolyte battery.

12. The non-aqueous electrolyte battery of claim 1, wherein the polyacid or the polyacid compound is selected from the group consisting of Preyssler- structured lithium phosphotungstate, Preyssler-structured potassium phosphotungstate, and Preyssler-structured phosphotungstate 44-hydrate.

* * * * *